United States Patent
Niederfeld et al.

(10) Patent No.: US 11,422,518 B2
(45) Date of Patent: Aug. 23, 2022

(54) SIGNAL COMMUNICATION SYSTEM

(71) Applicant: ISTA INTERNATIONAL GMBH, Essen (DE)

(72) Inventors: Gerhard Niederfeld, Essen (DE); Nicola Altan, Gelsenkirchen (DE)

(73) Assignee: ISTA INTERNATIONAL GMBH, Essen (DE)

( * ) Notice: Subject to any disclaimer, the term of this patent is extended or adjusted under 35 U.S.C. 154(b) by 0 days.

(21) Appl. No.: 16/498,920

(22) PCT Filed: Mar. 28, 2017

(86) PCT No.: PCT/EP2017/057288
§ 371 (c)(1),
(2) Date: Sep. 27, 2019

(87) PCT Pub. No.: WO2018/177509
PCT Pub. Date: Oct. 4, 2018

(65) Prior Publication Data
US 2020/0119969 A1   Apr. 16, 2020

(51) Int. Cl.
*G06F 15/16* (2006.01)
*G05B 15/02* (2006.01)
(Continued)

(52) U.S. Cl.
CPC ........ *G05B 15/02* (2013.01); *H04L 29/08045* (2013.01); *H04L 63/0823* (2013.01);
(Continued)

(58) Field of Classification Search
CPC .... H04W 4/70; H04L 29/08045; H04L 67/12; H04L 69/326
See application file for complete search history.

(56) References Cited

U.S. PATENT DOCUMENTS

2006/0202834 A1*  9/2006  Moriwaki ............. G01D 21/00
                                                                340/573.1
2007/0189312 A1   8/2007  Acharya et al.
(Continued)

FOREIGN PATENT DOCUMENTS

EP   2334017 A1   6/2011
EP   2945330 A1   11/2015
(Continued)

OTHER PUBLICATIONS

Inetenatinal Search Report and Written Opinion dated Dec. 7, 2017 in International application No. PCT/EP2017/057288, 12 pages.
(Continued)

*Primary Examiner* — Padma Mundur
(74) *Attorney, Agent, or Firm* — Lee & Hayes, P.C.

(57) ABSTRACT

A signal communication system comprising a number of signal nodes arranged to interact physically with their environment and to convert between physical properties and corresponding signals, a number of client nodes arranged to receive or send the signals to interact with the signal nodes, and a distribution system arranged to switch the signals between the signal nodes and the client nodes. The signal nodes are communicatively coupled to the distribution system via injection transport channels to send and receive injection transport representations of signal representations of the signals; the client nodes are communicatively coupled to the distribution system via distribution transport channels to send and receive distribution transport representations of signal representations of the signals; and the signal nodes are communicatively coupled to the client nodes to transport the signal representations using the injection transport channels, distribution system and distribution transport channels. The distribution system is arranged to switch signal representations between an injection transport channel and one or more distribution transport channels on the basis of a signal
(Continued)

Figure 1:
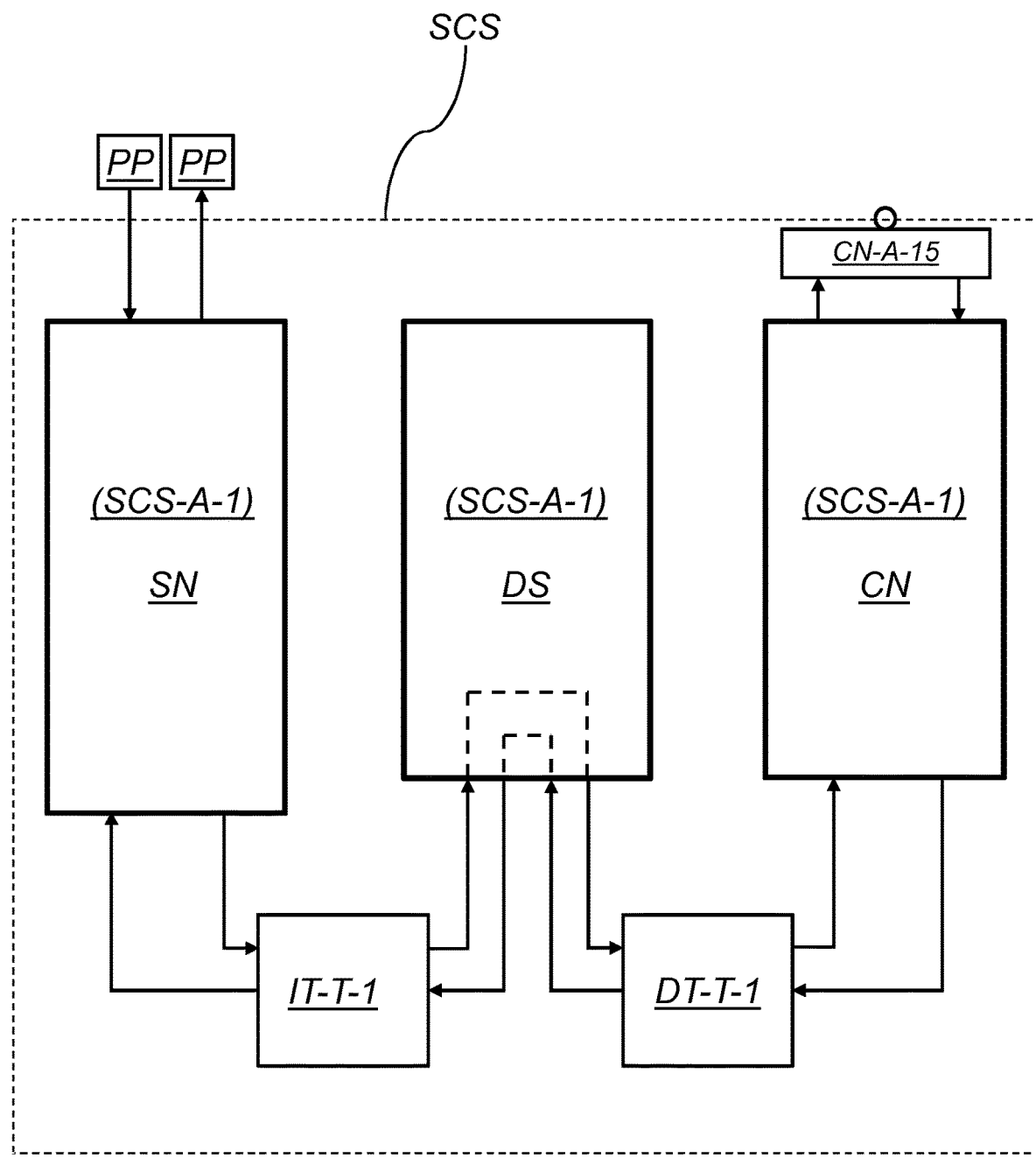

injection label and one or more associated signal distribution labels. Thereby is enabled end-to-end encryption between signal nodes and client nodes. A catalog system for facilitating initiation of communication in the signal communication system is also disclosed.

20 Claims, 39 Drawing Sheets

(51) Int. Cl.
    *H04W 4/70* (2018.01)
    *H04L 69/326* (2022.01)
    *H04L 9/40* (2022.01)
    *H04L 67/12* (2022.01)
    *H04W 12/069* (2021.01)

(52) U.S. Cl.
    CPC ............ *H04L 67/12* (2013.01); *H04L 69/326* (2013.01); *H04W 4/70* (2018.02); *H04W 12/069* (2021.01)

(56) References Cited

U.S. PATENT DOCUMENTS

| | | | |
|---|---|---|---|
| 2007/0263661 A1 | 11/2007 | DeMartino | |
| 2009/0043407 A1 | 2/2009 | Mathiesen et al. | |
| 2009/0299919 A1 | 12/2009 | Frutkin | |
| 2011/0032896 A1* | 2/2011 | Cubic | H04L 41/12 370/329 |
| 2012/0039186 A1* | 2/2012 | Vasseur | H04W 40/248 370/248 |
| 2014/0269421 A1 | 9/2014 | Previdi et al. | |
| 2016/0057004 A1 | 2/2016 | Ge | |
| 2017/0005920 A1 | 1/2017 | Previdi et al. | |
| 2017/0033939 A1 | 2/2017 | Bragg et al. | |
| 2018/0225895 A1* | 8/2018 | Oda | H04W 4/44 |

FOREIGN PATENT DOCUMENTS

| | | |
|---|---|---|
| WO | WO2014000741 A1 | 1/2014 |
| WO | WO2018178170 A1 | 10/2018 |

OTHER PUBLICATIONS

Al-Karaki, et al. "Routing techniques in wireless sensor networks: a survey," Jan. 2005. IEEE wireless communications, 11(6), 6-28.

U.S. Department of Energy "Advanced Metering Infrastructre and Customer Systems: Results from the Smart Grid Investement Grant Program" Sep. 2016, U.S. Deparlmnent of Energy, Office of Electricity Delivery and Energy Reliability, 98 pages.

Donev, D., "Wireless M-Bus based eXtremely Low Power protocol for wireless communication with water meters," May 2012, Aalborg Universitet Department of Electronic Systems, Aalborg Ost, Denmark. Group 1000 NDS, 71 pages.

Levy, R., "Meter Scoping Study," 2002. UC Berkeley, University of California. Energy Use in Buildings Enabling Technologies. 66 pages.

* cited by examiner

🔒 : private

SIGNAL COMMUNICATION SYSTEM

CROSS REFERENCE TO RELATED APPLICATIONS

This application is a U.S. National Phase Application of International Application No. PCT/EP2017/057288, filed Mar. 28, 2017, which is hereby incorporated by reference in its entirety.

FIELD OF THE INVENTION

The present invention relates to a signal communication system and a method for communicating signals.

BACKGROUND

Signal communication systems are widely used for different purposes and different users. In particular, communication systems communicating via the Internet offer flexibility and scalability when establishing communication between communicating parties. A well-known problem within this field of technology is that such systems have to be protected against access or disruption from third-parties; e.g. protected against at least some of unauthorized access to information, surveillance of activities and parties, modification of information, identity spoofing, denial-of-service attacks, hacking, etc. Thus, any computer connected to the Internet will include some kind of protection against such unwanted and unauthorized access. A problem related to such protection is that the computer connected must be updated regularly and that the performance of the computer is reduced or that the flexibility of the computer becomes restricted.

Another challenge with conventional signal communication systems, in particular when various security measures are applied, is the search for and subscription to desired information. One problem in this regard is the exploding amount of new information made available in various systems, for example with the introduction of literally billions of Internet-connected devices, and the way conventional search engines manage this challenge. Other challenges in this regard is the proportionally exploding energy consumption required to manage, find and transport this information, and how to achieve accurate and reliable data identification and descriptions to improve searches and reduce irrelevant and/or potentially malicious data communication.

Also conventional cloud based storage and data proxies introduced to handle some of these challenges raise issues themselves, e.g. by creating instability and privacy concerns.

SUMMARY OF THE INVENTION

The inventors have identified the above and other challenges and problems of various conventional systems and approaches for large-scale signal communication, and have invented new and useful improved signal communication systems and methods that in various embodiments overcome or reduce one or more of the above-mentioned challenges and problems.

In an aspect, the present invention relates to a signal communication system,
the signal communication system comprising at least three signal communication system entities,
at least one of said signal communication system entities being a signal node being identified by a signal node identification and comprising a signal node physical property method being arranged to interact physically with its environment and to convert between one or more physical properties and corresponding one or more signals,
at least one of said signal communication system entities being a client node, comprising a client node signal data interface being arranged to provide a data interface for signals and said client node being identified by a client node identification, and being arranged to receive or send at least one of said one or more signals to interact with said signal node, and
at least one of said signal communication system entities being a distribution system, being identified by a distribution system identification, being arranged to switch said at least one of said one or more signals between a signal node and a client node;
the signal node being communicatively coupled to at least one of the at least one distribution system using an injection transport channel to send and receive an injection transport representation of a signal representation of said at least one of said one or more signals;
the client node being communicatively coupled to at least one of the at least one distribution system using a distribution transport channel to send and receive a distribution transport representation of said signal representation of said at least one of said one or more signals;
the signal node being communicatively coupled to at least one of said client nodes to transport said signal representations using the injection transport channel, said distribution system and the distribution transport channel;
the signal node being configured to maintain a signal node identity register, comprising a signal node identification and one or more signal injection labels each being a handle of a respective signal of said one or more signals;
the signal node being arranged to carry out
a signal node signal representation method being arranged to provide said signal representation from a signal,
a signal node signal representation interpretation method being arranged to provide a signal from a signal representation,
a signal node request method being arranged to transmit a signal node request to convey a signal representation to said injection transport channel, and
a signal node response method being arranged to receive a signal node response conveying a signal representation on said injection transport channel;
the client node being configured to maintain a client node identity register, comprising a client node identification and one or more signal distribution labels each being a handle of a respective signal of said one or more signals;
the client node being arranged to carry out
a client node signal representation interpretation method being arranged to provide a signal from a signal representation,
a client node signal representation method being arranged to provide a signal representation from a signal,
a client node request method being arranged to transmit a client node request to convey a signal representation to a distribution transport channel, and a client node response method being arranged to receive a client node response conveying a signal representation on a distribution transport channel;

the distribution system being configured to distribute said signal representations, and being configured to maintain a distribution system identity register, comprising a distribution system identification, one or more of said signal node identifications with associated signal injection labels and one or more of said client node identifications with associated signal distribution labels;

the distribution system being arranged to carry out
a distribution system injection transport representation interpretation method being arranged to provide a signal representation and a corresponding signal injection label from an injection transport representation, and
a distribution system distribution transport representation method being arranged to provide a distribution transport representation from a signal representation and a corresponding signal distribution label;
a distribution system distribution transport representation interpretation method being arranged to provide a signal representation and a corresponding signal distribution label from a distribution transport representation, and
a distribution system injection transport representation method being arranged to provide an injection transport representation from a signal representation and a corresponding signal injection label;

wherein the distribution system is arranged to carry out a distribution system signal representation switching method arranged to switch signal representations between an injection transport channel and one or more distribution transport channels on the basis of a signal injection label and one or more associated signal distribution labels.

In an aspect, the present invention relates to a signal communication system,
the signal communication system comprising at least three signal communication system entities,
at least one of said signal communication system entities being a signal node being identified by a signal node identification and comprising a signal node physical property method being arranged to interact physically with its environment and to convert between one or more physical properties and corresponding one or more signals,
at least one of said signal communication system entities being a client node, comprising a client node signal data interface being arranged to provide a data interface for signals and said client node being identified by a client node identification, and being arranged to receive at least one of said one or more signals to interact with said signal node, and
at least one of said signal communication system entities being a distribution system, being identified by a distribution system identification, being arranged to switch said at least one of said one or more signals between a signal node and a client node;

the signal node being communicatively coupled to at least one of the at least one distribution system using an injection transport channel to send an injection transport representation of a signal representation of said at least one of said one or more signals;

the client node being communicatively coupled to at least one of the at least one distribution system using a distribution transport channel to receive a distribution transport representation of said signal representation of said at least one of said one or more signals;

the signal node being communicatively coupled to at least one of said client nodes to transport said signal representations using the injection transport channel, said distribution system and the distribution transport channel;

the signal node being configured to maintain a signal node identity register, comprising a signal node identification and one or more signal injection labels each being a handle of a respective signal of said one or more signals;

the signal node being arranged to carry out
a signal node signal representation method being arranged to provide said signal representation from a signal, and
a signal node request method being arranged to transmit a signal node request to convey a signal representation to said injection transport channel;

the client node being configured to maintain a client node identity register, comprising a client node identification and one or more signal distribution labels each being a handle of a respective signal of said one or more signals;

the client node being arranged to carry out
a client node signal representation interpretation method being arranged to provide a signal from a signal representation, and
a client node response method being arranged to receive a client node response conveying a signal representation on a distribution transport channel;

the distribution system being configured to distribute said signal representations, and being configured to maintain a distribution system identity register, comprising a distribution system identification, one or more of said signal node identifications with associated signal injection labels and one or more of said client node identifications with associated signal distribution labels;

the distribution system being arranged to carry out
a distribution system injection transport representation interpretation method being arranged to provide a signal representation and a corresponding signal injection label from an injection transport representation, and
a distribution system distribution transport representation method being arranged to provide a distribution transport representation from a signal representation and a corresponding signal distribution label;

wherein the distribution system is arranged to carry out a distribution system signal representation switching method arranged to switch signal representations between an injection transport channel and one or more distribution transport channels on the basis of a signal injection label and one or more associated signal distribution labels.

In an aspect, the present invention relates to a signal communication system,
the signal communication system comprising at least three signal communication system entities,
at least one of said signal communication system entities being a signal node being identified by a signal node identification and comprising a signal node physical property method being arranged to interact physically with its environment and to convert between one or more physical properties and corresponding one or more signals,
at least one of said signal communication system entities being a client node, comprising a client node signal data interface being arranged to provide a data interface for signals and said client node being identified by a client node identification, and being arranged to send at least one of said one or more signals to interact with said signal node, and at least one of said signal communication system entities being a distribution system, being identified by a distribution system identification, being arranged to switch said at least one of said one or more signals between a signal node and a client node;

the signal node being communicatively coupled to at least one of the at least one distribution system using an injection transport channel to receive an injection transport representation of a signal representation of said at least one of said one or more signals;

the client node being communicatively coupled to at least one of the at least one distribution system using a distribution transport channel to send a distribution transport representation of said signal representation of said at least one of said one or more signals;

the signal node being communicatively coupled to at least one of said client nodes to transport said signal representations using the injection transport channel, said distribution system and the distribution transport channel;

the signal node being configured to maintain a signal node identity register, comprising a signal node identification and one or more signal injection labels each being a handle of a respective signal of said one or more signals;

the signal node being arranged to carry out
a signal node signal representation interpretation method being arranged to provide a signal from a signal representation, and
a signal node response method being arranged to receive a signal node response conveying a signal representation on said injection transport channel;

the client node being configured to maintain a client node identity register, comprising a client node identification and one or more signal distribution labels each being a handle of a respective signal of said one or more signals;

the client node being arranged to carry out
a client node signal representation method being arranged to provide a signal representation from a signal, and
a client node request method being arranged to transmit a client node request to convey a signal representation to a distribution transport channel;

the distribution system being configured to distribute said signal representations, and being configured to maintain a distribution system identity register, comprising a distribution system identification, one or more of said signal node identifications with associated signal injection labels and one or more of said client node identifications with associated signal distribution labels;

the distribution system being arranged to carry out
a distribution system distribution transport representation interpretation method being arranged to provide a signal representation and a corresponding signal distribution label from a distribution transport representation, and
a distribution system injection transport representation method being arranged to provide an injection transport representation from a signal representation and a corresponding signal injection label;

wherein the distribution system is arranged to carry out a distribution system signal representation switching method arranged to switch signal representations between an injection transport channel and one or more distribution transport channels on the basis of a signal injection label and one or more associated signal distribution labels.

The present invention offers a high degree of flexibility and efficiency of the distribution of physical signals by individual signal nodes because the flexibility is contained and executed by a distribution system. The signal nodes may be addressed in a flexible way, but the individual signal nodes are centrally controlled or managed for the purpose of receiving and outputting data. The reduced functionality of the signal nodes may be fully compensated by a central control of the signal flow according to the provisions of the invention, while at the same time obtaining that the reduced functionality forms a barrier for third party unwanted or unauthorized access.

The signal communication system enables full privacy of the signals transmitted in the system so that only the signal node and the client node can examine the signal, even though the control and management is left to the distribution system. Hence, even a corrupted or infiltrated distribution system, or more or less secure transmission lines, will not allow a third party to get access to the transmitted signals.

A further advantage of the present invention is that it is possible to obtain a dynamic control of the distribution of signals. Optimally and optionally, the central distribution system may be updated on a runtime basis without requiring updating and maintenance of the signal nodes of the system, thereby ensuring that the flow of signals through the central distribution system is in complete alignment with updated rules, agreements, data subscriptions, etc. The system enables fast and reliable establishment of communication routes, as well as fast and reliable revocation thereof upon cancellation of rules and agreements.

An advantage of an embodiment of the signal communication system is that the signal nodes do not need to manage identity, addresses, etc., of a client node to address the client in question. This may be managed by the distribution system. In fact, the signal nodes may in an embodiment simply be transmitting signals without knowing to which extent they are distributed and used. In a preferred embodiment, the signal nodes are only informed whether or not anyone needs their signals, in order to avoid wasting energy on producing signals that are not distributed. In a preferred embodiment, initial commissioning of communication between a certain signal node and certain client node requires an identity check and negotiation of signal representation parameters, e.g. encryption keys, but after that the signal communication may commence under management of the distribution system without the signal node having to consider security or identity issues, but still without the distribution system or man-in-the-middle being able to read or forge signals or otherwise interfere, e.g. by means of homomorphic technology, with the signal communication.

The signal nodes may therefore preferably be extremely light in terms of the hardware and software required for their participation in the signal communication system, as in preferred embodiments they need not serve incoming requests, they need no firewall functionality, they need no routing or distribution functionality, etc.

By the present invention may in various embodiments further be achieved a robust, reliable and accurate cataloguing of signals made available by the signal nodes connected to the signal communication system. Due to the high resistance of the signal communication system to external influence and in various embodiments very reliable authenticity of nodes and signals, the discovery of signals with accurate and reliable data identification and descriptions and secure subscription to signals reduce irrelevant and/or potentially malicious data communication, and may substantially reduce energy consumption and processing time in large-scale systems with vast amounts of signal nodes compared to a search engine discovery approach.

The present invention aims at managing signals only at the end nodes, while managing the communication of the signals only by the central distribution system. Thereby some of the concerns and challenges of cloud solutions are overcome, as the signal privacy is not trusted to a central party, but still allowing the central party to manage the communication control, security, flexibility and scaling.

A signal node according to the invention comprises means for establishing a signal output from physical properties of its environment, and/or for influencing physical properties of its environment based on a signal input. Physical properties may for example be temperature, pressure, humidity, sound, light, electromagnetic properties, radiation, flow, location or dimension of a physical object, etc., and signals comprise digital or analog data representing physical properties, e.g. sensor signals, or desired physical properties, i.e. control signals aimed at changing a physical property. The conversion may be performed by any kind of transducer, sensor, actuator, etc. The signal node is preferably a small, optionally mobile, computer device with a communication interface, optionally with no conventional computer interfaces like monitor and keyboard, but may in various embodiments also be comprised by a general purpose PC, a tablet computer, etc.

A client node according to the invention comprises a data interface to output or receive signals that are communicated with a signal node. In preferred embodiments the client node may for example be implemented as an app on a tablet computer for allowing a user to monitor and optionally control a physical property, e.g. a temperature, acquired, and optionally influenced, somewhere by a signal node, or for example be implemented as a data collection database receiving, storing and analyzing signals from several signal nodes, or for example be implemented in central control system of, e.g., an industrial plant, receiving signals from several monitoring signal nodes, and sending signals to several controlling signal nodes.

Communicative coupling may comprise any suitable communication link, for example various kinds of wired or wireless networks or point-to-point communication, with or without intermediate network or link devices such as switches, routers, access points, etc., by one or more of electrical, radio frequency, optical, acoustical, etc., technologies along the way. In preferred embodiments, the distribution system is connected to the Internet or other large data network, and the communicative coupling to signal nodes and client nodes thereby at least partially involve the Internet or large data network. In preferred embodiments the part of the communicative coupling closest to the signal node and/or client node may be a local area network or a point-to-point communication technology comprising an interface to the Internet or large data network.

The signal node and client node are communicatively coupled to the distribution system on a transport level by transport channels, but because of the distribution system signal representation switching method also communicatively coupled end-to-end through the distribution system on a signal representation level, thereby being able to communicate signals privately and securely. The signal node and client node are arranged to represent and interpret representations on both the transport level and the signal representation level, whereas the distribution system is only arranged to represent and interpret the transport level. The transport representations comprise signal injection labels or signal distribution labels to facilitate the distribution system to distribute the signal representations appropriately, even without being able to interpret the signal representations. The labels are preferably incorporated in the transport representations so as to hide them from third parties and intermediate network components other than the appropriate distribution system comprising the corresponding transport representation interpretation method. By representation is referred to content provided in a specific format which can comprise a digital envelope.

In an embodiment the signal communication system comprises at least two signal nodes that are geographically distributed. In an embodiment the distribution system is a distributed distribution system comprising a plurality of distribution nodes. In an embodiment the signal communication system comprises at least one of said distribution nodes which is redundant to another of said distribution nodes.

Switching Control

In an embodiment, the distribution system is configured to maintain a distribution system switching control register comprising distribution system signal representation switching parameter records each associating a signal injection label with one or more signal distribution labels.

According to the invention, a signal injection label is comprised in the communication of an injection transport representation between a signal node and the distribution system, and a signal distribution label is comprised in the communication of a distribution transport representation between a client node and the distribution system. By providing the signal communication system with distribution system signal representation switching parameter records associating signal injection labels with signal distribution labels the distribution system is facilitated to determine from one label, e.g. by look-up, what the corresponding label on the other side of the distribution system is, i.e. where to send the attached signal representation.

Each signal injection label may be associated with one or more signal distribution labels, thereby facilitating sending a signal representation from a signal node to one or more client nodes, or sending signal representations from several client nodes to one signal node. In an embodiment the signal injection label is also being used as signal distribution labels, or vice versa. Each of the signal distribution labels can be chosen as unique or identical to one or more other signal distribution labels for distribution transport. Hence, the distribution, including node addressing, of signal representations is managed by the distribution system and not by the signal nodes and client nodes.

In an embodiment, said distribution system signal representation switching method is arranged to provide a number of distribution transport representations, the number corresponding to the number of signal distribution labels associated with said signal injection label according to said distribution system signal representation switching parameter records.

The switching method is configured to provide as many distribution transport representations as there are signal distribution labels associated with a particular signal injection label, thereby being able to multiply a signal representation coming from a signal node to all client nodes associated with that signal. In other words, the distribution system is configured to send one signal representation received from a signal node to as many client nodes as have subscribed to it. Hence, the multiplying of information for several receivers is performed and managed by the distribution system and not by the signal nodes.

In an embodiment, said distribution system signal representation switching method is arranged to provide said number of distribution transport representations each with a copy of said obtained signal representation and one of the one or more signal distribution labels associated with said signal injection label by a respective one of said distribution system signal representation switching parameter records.

When multiplying a signal representation for several receivers, the distribution system is preferably configured to include receiver-specific signal distribution labels with each copy.

In an embodiment, said distribution system signal representation switching method is arranged to provide each of said number of distribution transport representations by replacing the signal injection label of said injection transport representation with a respective signal distribution label.

The distribution system may be configured to make an appropriate number of copies of the received injection transport representation and in each copy replace the signal injection label with an individual of the signal distribution labels.

In an embodiment, said distribution system signal representation switching method is arranged to provide each of said number of distribution transport representations by complementing a copy of said signal representation of said injection transport representation with a respective signal distribution label.

In an alternative embodiment the distribution system is configured to go through all signal distribution labels associated with a signal injection label of a received injection transport representation and for each signal distribution label make a copy of the signal representation, attach the respective signal distribution label, and form a distribution transport representation therefrom.

In an embodiment, said distribution system signal representation switching method is arranged to provide an injection transport representation with a copy of said obtained signal representation and a signal injection label associated with said signal distribution label by a respective one of said distribution system signal representation switching parameter records. With regard to a distribution transport representation received from a client node, the distribution system is preferably configured to establish an injection transport representation for a signal node by combining the received signal representation with the signal injection label associated with the received signal distribution label.

In an embodiment, the distribution system is arranged to perform a distribution system signal representation switching parameter record deregistration method, arranged to reconfigure a distribution system signal representation switching parameter record to stop switching between injection transport representations and distribution transport representations configured in the regarded distribution system signal representation switching parameter record.

When it comes to managing the switching parameters, i.e. managing which nodes receives signals from which nodes, the distribution system is in a preferred embodiment configured with a method allowing a deregistration or reconfiguration of specific switching parameters. In other words, the distribution system is preferably configured to allow removal of for example a specific association of a signal injection label and a signal distribution label, or for example all associations with a specific label or node. Thereby is achieved a central managing option to control the distribution, in particular to stop the distribution of specific signals to specific nodes, without having to contact or update the relevant nodes, and without requiring the relevant nodes to take action or even be aware about the change. This is a highly advantageous aspect of a preferred embodiment of the present invention, as it further emphasizes the flexibility, scalability and central control, while facilitating lightweight nodes and a secure and private signal communication.

In an embodiment, said distribution system is arranged to perform a distribution system signal representation switching parameter record registration method, arranged to configure a distribution system signal representation switching parameter record to start switching between injection transport representations and distribution transport representations configured in the regarded distribution system signal representation switching parameter record.

The distribution system is in a preferred embodiment further configured with a method allowing a registration of new switching parameters, i.e. registering when a node starts subscribing to a certain signal. This is preferably achieved by implementing a method configured to insert a specific association of a signal injection label and a signal distribution label into the distribution system switching parameter records. Like with the deregistration method, is hereby achieved a central managing option to control the distribution, in this case in particular to start the distribution of specific signals to specific nodes, without having to contact or update the relevant nodes, and without requiring the relevant nodes to take action or even be aware about the change. In a preferred embodiment, however, in order for the receiving node to be able to interpret the signal representation created by the sending node and distributed by the system in response to the newly registered switching parameters, the particular signal node and particular client node is preferably required to negotiate representation parameters, thereby requiring a small engagement of the nodes in the registration process to commence communication, but thereby also achieving the advantage that a corrupted distribution system or man-in-the-middle cannot get access to the signal itself simply by registering new associations in the switching parameter register.

Network Channels

In an embodiment, each of said signal communication system entities is arranged to perform a signal communication system network representation method arranged to provide a signal communication system network representation from a signal communication system transport representation, and a signal communication system network representation interpretation method arranged to provide a signal communication system transport representation from a signal communication system network representation.

Conveying network representations via a network may comprise arranging the signal representation and/or transport representation in one or more network packets in accordance with the respective network technology and standard of the network, for example an IP packet, for example by adding a network header and footer specifying packet type, packet size, network addresses, e.g. IP addresses, etc.

In an embodiment, each of said signal communication system entities comprises at least one signal communication system entity network interface to a signal communication system entity network comprising or being connected to a signal communication system network.

In an embodiment, said signal communication system entity network interface is arranged to apply said signal communication system network representation method to a signal communication system transport representation to establish a signal communication system network representation to convey on said signal communication system entity network, and to apply said signal communication system network representation interpretation method to establish a signal communication system transport representation from a signal communication system network representation received on said signal communication system entity network.

In an embodiment, the signal communication system comprises a signal communication system network arranged to convey signal communication system transport representations by means of signal communication system network representations between said signal communication system entities.

In an embodiment, each of said signal communication system entities comprises at least one signal communication system entity network interface to a signal communication system entity network comprising or being connected to said signal communication system network.

In an embodiment one or more of said signal communication system entities comprises two or more signal communication system entity network interfaces of different network technologies or standards. In an embodiment one or more of said signal communication system entities comprises two or more signal communication system entity network interfaces of equal network technologies or standards.

In an embodiment, said signal communication system entity network comprises one or more selected from a wired network, a wireless network, an optical network and a power signal network.

Power signal network may for example comprise a hydraulic, pneumatic or mechanical, network, etc.

In an embodiment, said signal communication system network comprises at least two signal communication system entity networks of different network technologies or standards. In an embodiment, the signal communication system entity network interfaces of at least two different signal communication system entities are arranged to interface different network technologies or standards. In an embodiment, said different network technologies or standards comprise at least two technologies or standards selected among IPv4, IPv6, WiFi, LPWAN, Bluetooth, ZigBee, LoRa, LTE and GPRS.

Different network technologies to select from may for example comprise TCP/IP protocols such as IPv4, IPv6, various personal area networks PAN, e.g. Bluetooth or ZigBee, wireless network technologies under the WiFi label, i.e. based on IEEE 802.11 specifications, various Low-Power Wide-Area Network LPWAN technologies, e.g. NarrowBand IoT NB-IOT, LoRa-based technologies, various machine type communications, e.g. based on classical telecommunication networks such as LTE, GPRS, 3G, 4G, 5G, or LTE advanced for machine type communication LTE-MTC, etc., or other wired or wireless platforms.

In an embodiment, said signal communication system network is a wide area network.

In an embodiment, said signal communication system transport representation comprises said injection transport representation and said signal communication system network is arranged to convey a signal communication system network representation comprising said signal communication system transport representation between said signal node and said distribution system.

In an embodiment, said signal communication system entity is said signal node and comprises a signal communication system entity network interface to a signal communication system entity network being an LPWAN network. In an embodiment, said signal communication system entity is said distribution system or said client node and comprises a signal communication system entity network interface to a signal communication system entity network being the Internet.

In an embodiment, said signal communication system transport representation comprises said distribution transport representation and said signal communication system network is arranged to convey a signal communication system network representation comprising said signal communication system transport representation between said client node and said distribution system.

In an embodiment, the signal communication system entity network interface is configured to be addressable in said signal communication system entity network using a signal communication system entity network identification. In an embodiment, the signal communication system entity network interface is configured to address at least one other signal communication system entity directly to provide a signal communication system sub-network conveying signal communication system network representations from the signal communication system entity to said at least one other signal communication system entity. In an embodiment, the signal communication system entity network interface is configured to being addressable for at least one other signal communication system entity directly to provide a signal communication system sub-network conveying signal communication system network representations from said at least one other signal communication system entity to the signal communication system entity.

In an embodiment, the signal communication system sub-network comprises at least one gateway to connect a radio link being used by said signal communication system entity and a public land mobile radio system being frequently used for internet access and telephony. In an embodiment, the signal communication system sub-network comprises a link to use a public land mobile radio system being frequently used for internet access and telephony directly on the signal communication system entity. In an embodiment, the signal communication system sub-network comprises at least one gateway to connect said signal communication system entity being equipped with a signal communication system entity wired communication link to a signal communication system entity network including said at least one other signal communication system entity. In an embodiment, said signal communication system entity wired communication link is part of a public wired network for data or telephony. In an embodiment, the signal communication system entity network interface is arranged to use electromagnetic waves in a frequency range below 1 GHz. In an embodiment, the signal communication system entity network interface is a radio interface being arranged to provide a range of more than 500 m by using a bandwidth of not more than 200 kHz. In an embodiment, the signal communication system entity network interface is a radio interface being connected to a public land mobile radio system being frequently used for internet access and telephony.

Signal Nodes

In an embodiment, said signal node comprises a signal node battery and is arranged to be primarily battery-operated. In an embodiment, said signal node is powered from a battery for more than 1 year. In an embodiment, said signal node comprises a signal node processor and a signal node memory. In an embodiment, said signal node processor and said signal node memory are combined in a signal node embedded system.

In an embodiment, the signal node comprises a signal node physical unit sensor converting a physical property into a signal. In an embodiment, said signal node physical unit sensor is arranged to work autonomously. In an embodiment, said signal node physical unit sensor is powered from a signal node battery for more than 1 year. In an embodiment, said signal node physical unit sensor comprises at least one sensor and means for signal node communication. In an embodiment, said signal node comprises a display to indicate values associated with the signal node physical unit sensor.

In an embodiment, the signal node comprises a signal node electrical actuator being arranged to be powered or controlled by electrical means, and being arranged to convert a signal into a physical property. In an embodiment, the signal node electrical actuator is arranged to be controlled by the signal being conveyed by said signal communication system. In an embodiment, the signal node electrical actuator is powered from a battery for more than 1 year. In an embodiment, the signal node electrical actuator comprises at least one actuator and means for communication of a signal node. In an embodiment, said signal node electrical actuator comprises at least one user interface to interact locally with said signal node electrical actuator.

In an embodiment, the signal node comprises a signal node data interface arranged to acquire data from one or more selected from the list of a sensor not being contained in the signal node and a signal node user interface. In an embodiment, the signal node comprises a combination of two or more selected from the list of said signal node physical unit sensors, said signal node electrical actuators and said signal node data interfaces. In an embodiment, the signal node is a machine arranged to be used as one or more selected from the list of an autonomously working signal node physical unit sensor and a dedicated signal node electrical actuator.

In an embodiment, said signal node identity register comprises a signal node identity and a corresponding signal node identification.

According to an advantageous embodiment of the invention, the signal node identity register is preferable comprising both a signal node identification and a signal node identity referred to by said corresponding signal node identification. This effectively facilitates that the identity of the signal node may be represented in the signal node identity register in two ways. In one of the two ways, the signal node identity may form a unique designation of the identity of the signal node, which is provided for non-public use, e.g. as an internal identifier such a private key. In the other way, the signal node identification, the identity of the signal node may be represented in the signal node identity register with an identifier suitable for public use in the sense that this identification may be applied for the purpose of addressing the signal node.

In an embodiment, said signal node is arranged to perform a signal node identification transmit method to send said signal node identification.

In an embodiment, said signal node identity register comprises a distribution system identification, the signal node being arranged to perform a signal node distribution system identity verification method being arranged to verify the distribution system identity using a distribution system identification. In an embodiment, said signal node identity register comprises one or more client node identifications, the signal node being arranged to perform a signal node client node identity verification method arranged to receive a client node identification and verify a client node identity using said client node identification.

In an embodiment, the signal node is arranged to perform a signal node client node identity verification method arranged to receive a verification of the client node identity from an identity verifying signal communication system entity. In an embodiment, said identity verifying signal communication system entity is an identity register. In an embodiment, said identity verifying signal communication system entity is a distribution system.

In an embodiment, the signal node is arranged to generate one or more of said signal injection labels by means of a signal injection label generation method arranged to provide a signal injection label corresponding to a respective signal of said one or more signals. In an embodiment, the signal node is arranged to receive one or more of said signal injection labels by means of a signal injection label receive method, arranged to receive a signal injection label corresponding to a respective signal of said one or more signals from a distribution system. In an embodiment, the signal injection label represents the type of the signal referred to. In an embodiment, the signal injection label represents the identity of the signal referred to.

In an embodiment, the signal node maintains a signal node signal representation property register comprising signal node signal representation properties being used in providing and receiving signal representations. In an embodiment, the signal node is arranged to perform a signal node signal representation method, arranged to provide a signal representation from a signal based on the corresponding signal node signal representation properties. In an embodiment, the signal node signal representation method is arranged to provide a signal representation comprising a signal representation integrity protection tag. In an embodiment, the signal node signal representation method is arranged to provide a signal representation authentication tag designating the originator of said signal representation. In an embodiment, the signal node signal representation method is arranged to provide a signal representation comprising a signal representation integrity protection tag and a signal representation authentication tag by representing the signal representation integrity protection tag based on a signal node authentication identity.

In an embodiment, the signal node is arranged to perform signal node signal representation interpretation method, arranged to provide a signal from a signal representation based on said corresponding signal node signal representation properties. In an embodiment, the signal node signal representation interpretation method is arranged to verify the integrity of a signal representation based on an integrity protection tag. In an embodiment, the signal node signal representation interpretation method is arranged to verify a signal representation authentication tag designating the originator of said signal representation. In an embodiment, the signal node signal representation interpretation method is arranged to verify a signal representation integrity protection tag and a signal representation authentication tag by verifying the signal representation integrity protection tag based on a client node authentication identification.

In an embodiment, the signal node is arranged to perform a signal node signal representation property method, arranged to generate signal node signal representation properties for formatting or encrypting the signal to establish a signal representation, and a signal node signal representation property interface method, arranged to negotiate the signal node signal representation properties with one or more client nodes. In an embodiment, the signal node signal representation properties are shared with associated client nodes. In an embodiment, the signal node signal representation properties are shared with a client node in accordance with said distribution system switching control register related to said client node.

In an embodiment, the signal node signal representation method is arranged to provide said signal representation using formatting in accordance with said signal node signal representation properties. In an embodiment, the signal node signal representation interpretation method is arranged to provide said signal using formatting in accordance with said signal node signal representation properties. In an embodiment, the signal node signal representation properties comprise a definition for a formatting for said providing the signal representation. In an embodiment, the signal node signal representation method is arranged to provide said signal representation using encryption in accordance with said signal node signal representation properties. In an embodiment, the signal node signal representation interpretation method is arranged to provide said signal using decryption in accordance with said signal node signal representation properties. In an embodiment, the signal node signal representation properties comprise a signal node representation cryptographic key system for said providing the signal representation.

In a preferred embodiment, the signal node signal representation properties comprise both a definition for formatting and a signal node representation cryptographic key system. The signal node representation cryptographic key system may for example comprise a pair of a private key and public key.

In an embodiment, the signal node signal representation properties correspond to the client node signal representation properties.

In an embodiment, the signal node is arranged to maintain a signal node injection transport identity register comprising a signal node injection transport identity being a signal communication system transport identity, a corresponding signal node injection transport identification being a signal communication system transport identification, and a distribution system injection transport identification being associated with the distribution system injection transport identity of a corresponding distribution system. In an embodiment, the signal node is arranged to perform a signal node distribution system injection transport identity verification method, arranged to verify the distribution system injection transport identity using said distribution system injection transport identification.

In an embodiment, a signal node injection transport identification is derived from a signal node identification. When a signal node injection transport identification is derived from a signal node identification the verification could advantageously use the same verification methods.

In an embodiment, the signal node is arranged to maintain a signal node injection transport representation property register comprising signal node injection transport representation properties. In an embodiment, the signal node is arranged to perform a signal node injection transport request method, arranged to provide an injection transport representation to a distribution system identified by a distribution system injection transport identification, and a signal node injection transport response method, arranged to receive an injection transport representation from a distribution system in response to a requested injection transport representation. In an embodiment, the signal node injection transport response method is arranged to request a transfer of an injection transport representation from a distribution system. In an embodiment, the signal node injection transport request method is configured to determine a local energy budget and schedule transmission of said injection transport representation on the basis thereof.

Due to the signal nodes typically being battery driven and/or optimized for power management, they may advantageously schedule transmissions, for example sending of injection transport representations to the distribution system or picking up injection transport representations from the distribution system, for the least energy consuming communication. Factors to include in the scheduling may for example comprise availability of network resources and network routes, distances, expected or measured data traffic congestion times, transmission costs, etc. In some embodiments, the grouping of transmissions and/or invoking a sleep mode at regular intervals may be acceptable and consume less energy. In some embodiments, the scheduling of transmissions may include the possibility of cancelling or rejecting a transmission, for example in case of low remaining battery. The signal node may in a preferred embodiment be configured to provide the injection transport representation, and thereby its signals, isochronously or according to a predefined schedule.

In an embodiment, the signal node is arranged to perform a signal node injection transport representation method arranged to provide an injection transport representation from each signal injection label and the corresponding signal representation based on corresponding signal node injection transport representation properties, and a signal node injection transport representation interpretation method arranged to provide a signal injection label and a signal representation corresponding to a signal from an injection transport representation.

In an embodiment, the signal node is arranged to perform a signal node injection transport representation property method arranged to generate signal node injection transport representation properties for formatting or encrypting the signal representation to establish an injection transport representation, and a signal node injection transport representation property interface method arranged to negotiate signal node injection transport representation properties with a distribution system.

In an embodiment, the signal node injection transport representation method is arranged to apply a format in accordance with said signal node injection transport representation properties to provide said injection transport representation. In an embodiment, the signal node injection transport representation interpretation method is arranged to interpret said injection transport representation to provide a signal injection label and a signal representation in accordance with said signal node injection transport representation properties. In an embodiment, the signal node injection transport representation properties comprise a definition for a format to be applied for said providing the injection transport representation. In an embodiment, the signal node injection transport representation method is arranged to provide said injection transport representation using encryption in accordance with said signal node injection transport representation properties. In an embodiment, the signal node injection transport representation interpretation method is arranged to provide said signal injection label and a signal representation using decryption in accordance with said signal node injection transport representation properties. In an embodiment, the signal node injection transport representation properties comprise a signal node injection transport cryptographic key system for said providing the injection transport representation.

In a preferred embodiment, the signal node injection transport representation properties comprise both a definition for formatting and a signal node injection transport cryptographic key system. The signal node injection transport cryptographic key system may for example comprise a pair of a private key and public key.

In an embodiment, the signal node injection transport representation properties correspond to the client node distribution transport representation properties. In an embodiment, the signal node injection transport representation properties correspond to the signal node signal representation properties.

In an embodiment, the signal node is arranged to maintain a signal node network identity register comprising a signal node network identification of a signal node and a distribution system injection network identification of a corresponding distribution system.

In an embodiment, the signal node comprises a signal node network interface being a signal communication system entity network interface arranged to convey a signal communication system network representation comprising an injection transport representation on a signal communication system entity network being connected to a signal communication system network comprising at least said distribution system as described above with respect to network channels.

In an embodiment, the signal node is arranged to apply said signal communication system network representation method to provide a signal communication system network representation from an injection transport representations, and apply said signal communication system network representation interpretation method to provide an injection transport representations from a signal communication system network representation.

In an embodiment, the signal node network interface is configured to be addressable in said signal communication system entity network using a signal node network identification. In an embodiment, the signal node network interface is configured to address the distribution system directly by using a signal communication system sub-network conveying signal communication system network representations comprising signal representations from the signal node to the distribution system. In an embodiment, the signal node network interface is configured to being addressable for the distribution system directly by using a signal communication system sub-network conveying signal communication system network representations comprising signal representations from the distribution system to the signal node.

In an embodiment, the signal communication system entity network comprises at least one gateway to connect a radio link being used by said signal node and a public land mobile radio system being frequently used for internet access and telephony. In an embodiment, the signal communication system entity network comprises a link to use a public land mobile radio system being frequently used for internet access and telephony directly on the signal node. In an embodiment, the signal communication system entity network comprises at least one gateway to connect said signal node being equipped with a signal node wired communication link to a signal communication system entity network including said distribution system. In an embodiment, said signal node wired communication link is part of a public wired network for data or telephony. In an embodiment, the signal node network interface is arranged to use electromagnetic waves in a frequency range below 1 GHz. In an embodiment, the signal node network interface is a radio interface being arranged to provide a range of more than 500 m by using a bandwidth of not more than 200 kHz. In an embodiment, the signal node network interface is a radio interface being connected to a public land mobile radio system being frequently used for internet access and telephony.

In an embodiment, the signal node comprises a signal node vendor register comprising a signal node vendor identification identifying a signal node vendor. In an embodiment, the signal node vendor is communicatively coupled to a signal node using a signal node vendor channel. In an embodiment, the signal node comprises a signal node operator register comprising a signal node operating entity identification identifying a signal node operating entity. In an embodiment, the signal node is communicatively coupled to a signal node operating entity using a signal node operating entity channel.

In an embodiment, the signal node comprises a signal node local interface method and a signal node local interface communicatively coupled to a signal node operating entity.

In an embodiment, the signal node comprises a signal node commissioning method arranged to establish a communication between a signal node and a distribution system. In an embodiment, the signal node comprises a signal node commissioning identification message generation method arranged to generate a signal node commissioning identification message. In an embodiment, the signal node comprises a signal node commissioning identification message indication method arranged to indicate said signal node commissioning identification message to the signal node local interface. In an embodiment, the signal node comprises a signal node commissioning identification message confirmation receive method, arranged to receive a signal node commissioning identification message confirmation in response to the indicated signal node commissioning identification message. In an embodiment, the signal node comprises a signal node commissioning identification message verification method arranged to verify the generated signal node commissioning identification message against the received signal node commissioning identification message confirmation. In an embodiment, the signal node comprises a signal node commissioning confirmation transmission method arranged to transmit a signal node commissioning confirmation to confirm or reject the signal node commissioning identification message.

Client Nodes

In an embodiment, the client node is a machine arranged as an autonomously working device for providing and receiving signals on said client node signal data interface. In an embodiment, said client node signal data interface comprises one or more from the list of a display and one or more buttons. In an embodiment, said client node signal data interface comprises a machine type interface. In an embodiment, said client node comprises a client node battery and is arranged to be primarily battery-operated. In an embodiment, said client node is powered from a battery for more than 1 year. In an embodiment, said client node is a mobile device. In an embodiment, said client node is a general purpose computing device comprising a client node software configuring said general purpose computing device as a client node according to any of the preceding claims. In an embodiment, said client node comprises a client node processor and a client node memory. In an embodiment, said client node processor and said client node memory are combined in a client node embedded system.

In an embodiment, said client node comprises a client node application controller and said client node is arranged to receive one or more signals being input signals from one or more of said signal nodes, to process the received signals by said client node application controller to establish one or more signals being control signals and to transmit said signals being control signals to one or more of said signal nodes comprising signal node electrical actuators.

In an embodiment, said client node comprises a client node application controller and said client node is arranged to receive one or more signals being input signals from said client node signal data interface, to process said received signals by said client node application controller to establish one or more signals being control signals and to transmit said signals being control signals to one or more of said signal nodes comprising signal node electrical actuators.

In an embodiment, said client node comprises a client node electrical actuator being arranged to be powered or controlled by electrical means, and being arranged to receive one or more signals from one or more signal nodes. In an embodiment, said client node comprises a client node application controller and said client node is arranged to receive one or more signals being input signals from one or more of said signal nodes, to process the received signals by said client node application controller and to control said client node electrical actuator on the basis thereof. In an embodiment, the client node electrical actuator is arranged to be controlled by the signal being conveyed by said signal communication system.

In an embodiment, the client node identity register comprises a client node identity and a corresponding client node identification.

According to an advantageous embodiment of the invention, the client node identity register is preferable comprising both a client node identification and a client node identity referred to by said corresponding client node identification. This effectively facilitates that the identity of the client node may be represented in the client node identity register in two ways. In one of the two ways, the client node identity may form a unique designation of the identity of the client node, which is provided for non-public use, e.g. as an internal identifier such a private key. In the other way, the client node identification, the identity of the client node may be represented in the client node identity register with an identifier suitable for public use in the sense that this identification may be applied for the purpose of addressing the client node.

In an embodiment, the client node is arranged to perform a client node identification transmit method to send said client node identification.

In an embodiment, said client node identity register comprises a distribution system identification and a client node distribution system identity verification method arranged to verify the distribution system identity using a distribution system identification. In an embodiment, said client node identity register comprising one or more signal node identifications, the client node being arranged to perform a client node signal node identity verification method arranged to receive a signal node identification and verify a signal node identity using said signal node identification.

In an embodiment, the client node is arranged to perform a client node signal node identity verification method arranged to receive a verification of the signal node identity from an identity verifying signal communication system entity. In an embodiment, said identity verifying signal communication system entity is an identity register. In an embodiment, said identity verifying signal communication system entity is a distribution system.

In an embodiment, the client node is arranged to generate one or more said signal distribution labels by means of a signal distribution label generation method arranged to provide a signal distribution label corresponding to said signal of said one or more signals. In an embodiment, the client node is arranged to receive one or more said signal distribution labels by means of a signal distribution label receiving method arranged to receive a signal distribution label corresponding to said signal of said one or more signals from a distribution system. In an embodiment, signal distribution label represents the type of the signal referred to. In an embodiment, signal distribution label represents the identity of the signal referred to.

In an embodiment, the client node maintains a client node signal representation property register comprising client node signal representation properties being used in providing and receiving signal representations. In an embodiment, the client node is arranged to perform a client node signal representation method, arranged to provide a signal representation from a signal based on the corresponding client node signal representation properties. In an embodiment, the client node signal representation method is arranged to provide a signal representation comprising a signal representation integrity protection tag. In an embodiment, the client node signal representation method is arranged to provide a signal representation authentication tag designating the originator of said signal representation. In an embodiment, the client node signal representation method is arranged to provide a signal representation comprising a signal representation integrity protection tag and a signal representation authentication tag by representing the signal representation integrity protection tag based on a client node authentication identity.

In an embodiment, the client node is arranged to perform a client node signal representation interpretation method arranged to provide a signal from a signal representation based on the corresponding client node signal representation properties. In an embodiment, the client node signal representation interpretation method is arranged to verify the integrity of a signal representation based on an integrity protection tag. In an embodiment, the client node signal representation interpretation method is arranged to verify a signal representation authentication tag designating the originator of said signal representation. In an embodiment, the client node signal representation interpretation method is arranged to verify a signal representation integrity protection tag and a signal representation authentication tag by verifying the signal representation integrity protection tag based on a signal node authentication identification.

In an embodiment, the client node is arranged to perform a client node signal representation property method, arranged to generate client node signal representation properties for formatting or encrypting the signal to establish a signal representation, and a client node signal representation property interface method, arranged to negotiate client node signal representation properties between said client node a signal node. In an embodiment, the client node signal representation properties are shared with an associated signal node. In an embodiment, the client node signal representation properties are shared with a signal node in accordance with a distribution system switching control register related to said signal node.

In an embodiment, the client node signal representation method is arranged to provide said signal representation using formatting in accordance with said client node signal representation properties. In an embodiment, the client node signal representation interpretation method is arranged to provide said signal using formatting in accordance with said client node signal representation properties. In an embodiment, said client node signal representation properties comprise a definition for a formatting for said providing the signal representation. In an embodiment, the client node signal representation method is arranged to provide said signal representation using encryption in accordance with said client node signal representation properties. In an embodiment, the client node signal representation interpretation method is arranged to provide said signal using decryption in accordance with said client node signal representation properties. In an embodiment, said client node signal representation properties comprise a client node signal representation cryptographic key system for said providing the signal representation.

In a preferred embodiment the client node signal representation properties comprise both a definition for formatting and a client node signal representation cryptographic key system. The client node signal representation cryptographic key system may for example comprise a pair of a private key and public key.

In an embodiment, the client node is arranged to maintain a client node distribution transport identity register comprising a client node distribution transport identity being a signal communication system transport identity, a corresponding client node distribution transport identification being a signal communication system transport identification, and a distribution system distribution transport identification being associated with the distribution system distribution transport identity of a corresponding distribution system.

In an embodiment, the client node is arranged to perform a client node distribution system distribution transport identity verification method, arranged to verify the distribution system distribution transport identity using a distribution system distribution transport identification.

In an embodiment, the client node distribution transport identification is derived from a client node identification. When the client node distribution transport identification is derived from a client node identification the verification could advantageously use the same verification methods.

In an embodiment, the client node is arranged to maintain a client node distribution transport representation property register comprising client node distribution transport representation properties. In an embodiment, said client node is arranged to perform a client node distribution transport request method, arranged to provide a distribution transport representation to a distribution system identified by a distribution system distribution transport identification, and a client node distribution transport response method, arranged to receive a distribution transport representation from a distribution system in response to a requested distribution transport representation. In an embodiment, the client node distribution transport response method is arranged to request a transfer of a distribution transport representation from a distribution system.

In an embodiment, the client node distribution transport request method is configured to determine a local energy budget and schedule transmission of said distribution transport representation on the basis thereof.

The client nodes, or some client nodes, may in some embodiments advantageously be optimized for power management and schedule transmissions, for example sending of distribution transport representations to the distribution system or picking up distribution transport representations from the distribution system, for the least energy consuming communication. Factors to include in the scheduling may for example comprise availability of network resources and network routes, distances, expected or measured data traffic congestion times, transmission costs, etc. The client node may in a preferred embodiment be configured to provide the distribution transport representation, and thereby its signals, isochronously or according to a predefined schedule.

In an embodiment, said client node is arranged to perform a client node distribution transport representation method arranged to provide a distribution transport representation from each signal distribution label and the corresponding signal representation based on corresponding client node distribution transport representation properties, and a client node distribution transport representation interpretation method arranged to provide a signal distribution label and a signal representation corresponding to a signal from a distribution transport representation.

In an embodiment, said client node is arranged to perform a client node distribution transport representation property method arranged to generate distribution transport representation properties for formatting or encrypting the signal representation to establish a distribution transport representation, and a client node distribution transport representation property interface method arranged to negotiate distribution transport representation properties with a distribution system.

In an embodiment, the client node distribution transport representation method is arranged to apply a format in accordance with said client node distribution transport representation properties to provide said distribution transport representation. In an embodiment, the client node distribution transport representation interpretation method is arranged to interpret said distribution transport representation to provide a signal distribution label and a signal representation in accordance with said client node distribution transport representation properties. In an embodiment, the client node distribution transport representation properties comprise a definition for a format to be applied for said providing the distribution transport representation. In an embodiment, the client node distribution transport representation method is arranged to provide said distribution transport representation using encryption in accordance with said client node distribution transport representation properties. In an embodiment, the client node distribution transport representation interpretation method is arranged to provide said signal distribution label and a signal representation using decryption in accordance with said client node distribution transport representation properties. In an embodiment, the client node distribution transport representation properties comprise a client node distribution transport cryptographic key system for said providing the distribution transport representation.

In a preferred embodiment the client node distribution transport representation properties comprise both a definition for formatting and a client node distribution transport cryptographic key system. The client node distribution transport cryptographic key system may for example comprise a pair of a private key and public key.

In an embodiment, the client node distribution transport representation properties correspond to the client node signal representation properties.

In an embodiment, the client node is arranged to maintain a client node network identity register comprising a client node network identification of a client node and a distribution system distribution network identification of a corresponding distribution system.

In an embodiment, the client node comprises a client node network interface being a signal communication system entity network interface arranged to convey a signal communication system network representation comprising a distribution transport representation on a signal communication system entity network being connected to a signal communication system network comprising at least said distribution system as described above with respect to network channels.

In an embodiment, the client node is arranged to apply said signal communication system network representation method to provide a signal communication system network representation from a distribution transport representations, and apply said signal communication system network representation interpretation method to provide a distribution transport representations from a signal communication system network representation.

In an embodiment, the client node network interface is configured to be addressable in said signal communication system entity network using a client node network identification. In an embodiment, the client node network interface is configured to address the distribution system directly by using a signal communication system sub-network conveying signal communication system network representations comprising distribution transport representations from the client node to the distribution system. In an embodiment, the client node network interface is configured to being addressable for the distribution system directly by using a signal communication system sub-network conveying signal communication system network representations comprising distribution transport representations from the distribution system to the client node.

In an embodiment, the signal communication system entity network comprises a gateway system arranged to communicatively couple said signal node to said distribution system via the Internet. In an embodiment, the signal communication system entity network comprises at least one gateway to connect a radio link being used by said signal node and a public land mobile radio system being frequently used for internet access and telephony. In an embodiment, the signal communication system entity network comprises a link to use a public land mobile radio system being frequently used for internet access and telephony directly on the signal node. In an embodiment, the signal communication system entity network comprises at least one gateway to connect said signal node being equipped with a client node wired communication link to a signal communication system entity network including said distribution system. In an embodiment, said client node wired communication link is part of a public wired network for data or telephony. In an embodiment, the client node network interface is arranged to use electromagnetic waves in a frequency range below 1 GHz. In an embodiment, the client node network interface is a radio interface being arranged to provide a range of more than 500 m by using a bandwidth of not more than 200 kHz. In an embodiment, the client node network interface is a radio interface being connected to a public land mobile radio system being frequently used for internet access and telephony.

In an embodiment, the client node comprises a client node vendor register comprising a client node vendor identification identifying a client node vendor. In an embodiment, the client node vendor is communicatively coupled to a client node using a client node vendor channel.

The signal communication system of any of the preceding claims, wherein the client node comprises a client node operator register comprising a client node operating entity identification identifying a client node operating entity. In an embodiment, the client node is communicatively coupled to a client node operating entity using a client node operating entity channel.

In an embodiment, the client node comprises a client node local interface method and a client node local interface configured to be communicatively coupled to a client node operating entity.

In an embodiment, the client node comprises a client node commissioning method arranged to communicatively couple a client node and a distribution system. In an embodiment, the client node comprises a client node commissioning identification message generation method, arranged to generate a client node commissioning identification message. In an embodiment, the client node comprises a client node commissioning identification message indication method, arranged to indicate a client node commissioning identification message to the client node local interface. In an embodiment, the client node comprises a client node commissioning identification message confirmation receive method, arranged to receive a client node commissioning identification message confirmation in response to the indicated client node commissioning identification message. In an embodiment, the client node comprises a client node commissioning identification message verification method, arranged to verify the generated client node commissioning identification message against the received client node commissioning identification message confirmation. In an embodiment, the client node comprises a client node commissioning confirmation transmission method, arranged to transmit a client node commissioning confirmation to confirm or reject the client node commissioning identification message.

Catalog System

In an embodiment, the distribution system is communicatively coupled to an entity being a catalog system arranged to provide a list of catalog system records to be used to commission the switching of said signals in the distribution system, the catalog system and the distribution system being communicatively coupled by a distribution system catalog system channel. In an embodiment, the catalog system is communicatively coupled to a catalog system vendor using a catalog system vendor channel. In an embodiment, the catalog system is communicatively coupled to a catalog system operating entity using a catalog system operating entity channel. In an embodiment, the catalog system is communicatively coupled to a signal node operating entity using a catalog system signal node operating entity channel. In an embodiment, the catalog system is communicatively coupled to a client node operating entity using a catalog system client node operating entity channel. In an embodiment, the catalog system is communicatively coupled to a client node using a catalog system client node channel.

In an embodiment, the catalog system is arranged to maintain a catalog system identity register comprising a catalog system identity and a corresponding catalog system identification and one or more distribution system identifications being associated with the identity of each of said distribution systems. In an embodiment, the catalog system is arranged to perform a catalog system distribution system identification verification method to verify the distribution system identification.

In an embodiment, the catalog system is arranged to maintain a catalog system signal label register comprising one or more catalog system records, each comprising one or more data selected from a signal node catalog name and a signal node catalog label, all being associated with one of said signals. In an embodiment, a catalog system record comprises a signal node catalog description being a string of characters representing a human readable text corresponding to said signal. In an embodiment, the catalog system is arranged to perform a catalog system signal node catalog label generation method arranged to provide signal node catalog labels from a list of strings of characters being associated with said signals. In an embodiment, the catalog system is arranged to perform a catalog system record receive method arranged to receive one or more catalog system records.

In an embodiment, the catalog system is arranged to perform a catalog system record request receive method arranged to receive a catalog system record request comprising one or more of catalog system record request parameters and a catalog system record request response method arranged to provide catalog system records in accordance with said catalog system record request parameters. In an embodiment, a catalog system record request parameter comprises one or more signal node catalog keywords, being terms associated with one or more from the list of the signal node catalog description, the signal node catalog label and the signal node catalog name.

In an embodiment, said catalog system is arranged to perform a catalog system switching request receive method arranged to receive a catalog system switching request based on one or more selected from the list of signal node catalog labels and catalog system records to configure switching of the associated signals in said distribution system and provide for that a reference to said distribution system is replied with. In an embodiment, said catalog system is arranged to perform a catalog system switching link request method arranged to request a signal node distribution system reference from said distribution system on the basis of a list of signal node catalog labels or catalog system records. In an embodiment, said catalog system is arranged to perform a catalog system switching link receive method arranged to receive a signal node distribution system reference from said distribution system in response to a catalog system switching link request method. In an embodiment, said catalog system is arranged to perform a catalog system switching request response method arranged to provide a specific signal node distribution system reference in response to a catalog system switching request receive method.

As the distribution system is generally not available for access by entities not being commissioned in the signal communication system, a special reference, e.g. a specific uniform resource locator URL pointing at a distribution system webserver location, is in an embodiment provided for client nodes trying to subscribe to a signal. Thereby is among other things reduced the vulnerability to Denial-of-Service attacks (DoS).

In an embodiment, the signal node catalog labels is based on said catalog system identification.

In an embodiment, the catalog system is arranged to maintain a catalog system distribution system data representation property register comprising catalog system distribution system data representation properties being used in providing and receiving catalog system distribution system data representations. In an embodiment, the catalog system is arranged to perform a catalog system distribution system data representation property method, being arranged to generate catalog system distribution system data representation properties for formatting or encrypting the catalog system distribution system data to establish catalog system distribution system data representations. In an embodiment, the catalog system is arranged to perform a catalog system distribution system data representation property interface method, being arranged to negotiate catalog system distribution system data representation properties with a distribution system.

In an embodiment, said catalog system is arranged to perform a catalog system distribution system data representation method, arranged to provide catalog system distribution system data representations from catalog system distribution system data based on said catalog system distribution system data representation properties. In an embodiment, said catalog system is arranged to perform a catalog system distribution system data representation interpretation method to provide catalog system distribution system data from catalog system distribution system data representations based on said catalog system distribution system data representation properties.

In an embodiment, the catalog system is configured to maintain a catalog system transport representation property register comprising a catalog system transport identity being a signal communication system transport identity, a corresponding catalog system identification being a signal communication system transport identification, a distribution system transport identification and catalog system distribution system transport representation properties. In an embodiment, the catalog system is configured to perform a catalog system distribution system transport identification verification method being arranged to verify the distribution system transport identification associated with a distribution system catalog system channel of said distribution system.

In an embodiment, the catalog system is arranged to perform a catalog system distribution system transport representation property method, arranged to generate catalog system distribution system transport representation properties for formatting or encrypting the catalog system distribution system data representations to establish catalog system distribution system transport representations. In an embodiment, said catalog system is arranged to perform a catalog system distribution system transport representation property interface method, arranged to negotiate catalog system distribution system transport representation properties with a distribution system identified by a distribution system transport identification. In an embodiment, said catalog system is arranged to perform a catalog system distribution system transport representation method, arranged to provide a catalog system distribution system transport representation from a catalog system distribution system data representation based on corresponding catalog system distribution system transport representation properties. In an embodiment, said catalog system is arranged to perform a catalog system distribution system transport representation interpretation method, arranged to provide a catalog system distribution system data representation from a catalog system distribution system transport representation based on corresponding catalog system distribution system transport representation properties.

In an embodiment, said catalog system is arranged to perform a catalog system distribution system transport representation transmit method, arranged to provide a catalog system distribution system transport representation to a distribution system. In an embodiment, said catalog system is arranged to perform a catalog system distribution system transport representation receive method, arranged to receive a catalog system distribution system transport representation.

In an embodiment, the catalog system comprises a catalog system network interface being a signal communication system entity network interface arranged to convey a signal communication system network representation comprising a catalog system distribution system transport representation corresponding to a signal communication system transport representation on a signal communication system entity network being connected to a signal communication system network comprising at least said distribution system as described above with respect to network channels.

In an embodiment, the catalog system is arranged to apply said signal communication system network representation method to provide a signal communication system network representation from a catalog system distribution system transport representation, and apply said signal communication system network representation interpretation method to provide a catalog system distribution system transport representation from a signal communication system network representation.

In an embodiment, the catalog system is arranged to maintain a catalog system client node operating entity data representation property register comprising catalog system client node operating entity data representation properties being used in providing and receiving a catalog system client node operating entity data representation between said catalog system and a client node operating entity using said catalog system client node operating entity channel.

In an embodiment, the catalog system is arranged to perform a catalog system client node operating entity data representation property method, being arranged to generate catalog system client node operating entity data representation properties for formatting or encrypting catalog system client node operating entity data to establish catalog system client node operating entity data representations. In an embodiment, the catalog system is arranged to perform a catalog system client node operating entity data representation property interface method, being arranged to negotiate catalog system client node operating entity data representation properties with a client node operating entity.

In an embodiment, said catalog system is arranged to perform a catalog system client node operating entity data representation method, arranged to provide catalog system client node operating entity data representations from catalog system client node operating entity data based on said catalog system client node operating entity data representation properties. In an embodiment, said catalog system is arranged to perform a catalog system client node operating entity data representation interpretation method, arranged to provide catalog system client node operating entity data from catalog system client node operating entity data representations based on said catalog system client node operating entity data representation properties.

In an embodiment, the catalog system is configured to maintain the catalog system transport representation property register comprising a client node operating entity transport identification. In an embodiment, the catalog system is configured to perform a catalog system client node operating entity transport identification verification method being arranged to verify the client node operating entity transport identification associated with a catalog system client node operating entity channel.

In an embodiment, the catalog system is arranged to perform a catalog system client node operating entity transport representation property method, arranged to generate catalog system client node operating entity transport representation properties for formatting or encrypting the catalog system client node operating entity data representations to establish catalog system client node operating entity transport representations. In an embodiment, said catalog system is arranged to perform a catalog system client node operating entity transport representation property interface method, arranged to negotiate catalog system client node operating entity transport representation properties with a client node operating entity identified by a client node operating entity transport identification.

In an embodiment, said catalog system is arranged to perform a catalog system client node operating entity transport representation method, arranged to provide a catalog system client node operating entity transport representation from a catalog system client node operating entity data representation based on corresponding catalog system client node operating entity transport representation properties. In an embodiment, said catalog system is arranged to perform a catalog system client node operating entity transport representation interpretation method, arranged to provide a catalog system client node operating entity data representation from a catalog system client node operating entity transport representation based on corresponding catalog system client node operating entity transport representation properties.

In an embodiment, said catalog system is arranged to perform a catalog system client node operating entity transport representation transmit method, arranged to provide a catalog system client node operating entity transport representation to a client node operating entity. In an embodiment, said catalog system is arranged to perform a catalog system client node operating entity transport representation receive method, arranged to receive a catalog system client node operating entity transport representation.

In an embodiment, the catalog system is arranged to maintain a catalog system network identity register comprising a catalog system network identification of a catalog system and a distribution system injection network identification of a corresponding distribution system.

In an embodiment, the catalog system comprises a catalog system network interface being a signal communication system entity network interface arranged to convey signal communication system network representations comprising catalog system client node operating entity transport representations on a signal communication system entity network being connected to a signal communication system network comprising at least one or more client node operating entities. In an embodiment, the catalog system is arranged to apply said signal communication system network representation method to provide a signal communication system network representation from a catalog system client node operating entity transport representations, and apply said signal communication system network representation interpretation method to provide a catalog system client node operating entity transport representation from a signal communication system network representation.

Distribution System

In an embodiment, the distribution system is communicatively coupled to a multiplicity of distribution system communication entities, each using a distribution system communication channel for communication.

The distribution system communication channel may be a dedicated channel for the purpose, or a common channel also used for other communication.

In an embodiment, said multiplicity of distribution system communication entities comprises at least one signal node using an injection transport channel as distribution system communication channel and at least one client node using a distribution transport channel as distribution system communication channel. In an embodiment, said multiplicity of distribution system communication entities comprises at least one catalog system using an injection transport channel as distribution system communication channel. In an embodiment, at least one of the distribution system communication entities is a distribution system operating entity using a distribution system operating entity channel as a distribution system communication channel. In an embodiment, at least one of the distribution system communication entities is a distribution system vendor using a distribution system vendor channel as a distribution system communication channel. In an embodiment, at least one of the distribution system communication entities is a signal node operating entity using a distribution system signal node operating entity channel as a distribution system communication channel. In an embodiment, at least one of the distribution system communication entities is a signal node vendor using a signal node vendor channel as a distribution system communication channel. In an embodiment, at least one of the distribution system communication entities is a client node operating entity using a distribution system client node operating entity channel as a distribution system communication channel. In an embodiment, at least one of the distribution system communication entities is a client node vendor using a client node vendor channel as a distribution system communication channel.

In an embodiment, the distribution system maintains a distribution system identity register comprising a distribution system identity and a corresponding distribution system identification. In an embodiment, said multiplicity of distribution system communication entities comprises one or more entities selected among a distribution system operating entity, a distribution system vendor, a signal node, a signal node operating entity, a signal node vendor, a client node, a client node operating entity, a client node vendor, a catalog system, a catalog system operating entity and a catalog system vendor. In an embodiment, the distribution system identity register comprising distribution system communication entity identifications for each of said multiplicity of distribution system communication entities being connected to said distribution system.

In an embodiment, the distribution system is arranged to perform a corresponding distribution system communication entity identification verification method to verify the identity of the regarding distribution system communication entity. In an embodiment, the distribution system is arranged to perform a distribution system communication entity identification verification transmit method to provide a result of said distribution system communication entity identification verification method to a different distribution system communication entity. In an embodiment, the distribution system is arranged to perform a distribution system communication entity identification receive method, arranged to receive said distribution system communication entity identification for a respective distribution system communication entity. In an embodiment, the distribution system is arranged to perform a distribution system communication entity identification transmit method to send a distribution system communication entity identification to respective distribution system communication entities.

In an embodiment, the distribution system is arranged to maintain a distribution system data representation property register comprising distribution system data representation properties being used in providing and receiving distribution system data representations between said distribution system and distribution system communication entities. In an embodiment, the distribution system is arranged to perform a distribution system data representation property method being arranged to generate distribution system data representation properties for formatting or encrypting the distribution system communication data to establish distribution system data representations. In an embodiment, the distribution system is arranged to perform a distribution system data representation property interface method being arranged to negotiate distribution system data representation properties with a distribution system communication entity. In an embodiment, said distribution system is arranged to perform a distribution system data representation method, arranged to provide distribution system data representations from distribution system communication data based on the distribution system data representation properties. In an embodiment, said distribution system is arranged to perform a distribution system data representation interpretation method to provide distribution system communication data from distribution system data representations based on the distribution system data representation properties.

In an embodiment, the distribution system is arranged to maintain a distribution system transport identity register comprising a distribution system transport identity being a signal communication system transport identity, a corresponding distribution system transport identification being a signal communication system transport identification, and distribution system communication entity transport identifications corresponding to referring distribution system communication entity identities of which corresponding distribution system communication entity identifications are comprised in the distribution system identity register.

In an embodiment, the distribution system transport identity to use with communication with a signal node and a client node, respectively, may be different, thereby causing the distribution system to comprise a distribution system injection transport identity and a distribution system distribution transport identity, and corresponding identifications being a distribution system injection transport identification and a distribution system distribution transport identification.

In an embodiment, said distribution system is arranged to perform a distribution system communication entity transport identification verification method, arranged to verify the distribution system communication entity transport identification of a distribution system communication entity.

In an embodiment, said distribution system communication entity transport identifications comprise one or more identifications selected among a signal node injection transport identification corresponding to a referring signal node identity, a client node distribution transport identification corresponding to a referring client node identity, a distribution system operating entity transport identification, a distribution system vendor transport identification, a signal node operating entity transport identification, a signal node vendor transport identification, a client node operating entity transport identification, and a client node vendor transport identification.

In an embodiment, the distribution system is arranged to maintain a distribution system communication entity transport representation property register comprising for each distribution system communication entity in the distribution system identity register one or more distribution system communication entity transport representation properties. In an embodiment, said distribution system is arranged to perform a distribution system communication entity transport representation method arranged to provide a distribution system communication entity transport representation from a corresponding distribution system data representation based on corresponding distribution system communication entity transport representation properties. In an embodiment, said distribution system is arranged to perform a distribution system communication entity transport representation interpretation method, arranged to provide a distribution system data representation from a corresponding distribution system communication entity transport representation based on corresponding distribution system communication entity transport representation properties.

In an embodiment, said distribution system is arranged to perform a distribution system communication entity transport representation property method, arranged to generate said distribution system communication entity transport representation properties for formatting or encrypting said distribution system data representation to establish a distribution system communication entity transport representation. In an embodiment, said distribution system is arranged to perform a distribution system communication entity transport representation property interface method, arranged to negotiate said distribution system communication entity transport representation properties with a distribution system communication entity identified by said distribution system communication entity transport identification. In an embodiment, said distribution system communication entity comprises an entity selected among a distribution system operating entity, a distribution system vendor, a signal node, a signal node operating entity, a signal node vendor, a client node, a client node operating entity, a client node vendor, a catalog system, a catalog system operating entity and a catalog system vendor and with which said distribution system communication entity transport representation properties are negotiated.

In an embodiment, said distribution system communication entity transport representation property register comprises a distribution system injection transport representation property register and, for each distribution system communication entity being a signal node in the distribution system identity register, corresponding distribution system injection transport representation properties as distribution system communication entity transport representation properties.

In an embodiment, said distribution system communication entity transport representation method being arranged to provide an injection transport representation as a distribution system communication entity transport representation from a signal injection label and a corresponding signal representation by formatting or encrypting based on corresponding distribution system injection transport representation properties. In an embodiment, said distribution system communication entity transport representation interpretation method being arranged to provide a signal injection label and a corresponding signal representation from an injection transport representation based on corresponding distribution system injection transport representation properties.

The signal communication system of any of the preceding claims, wherein said distribution system communication entity transport representation property register comprises a distribution system distribution transport representation property register and, for each distribution system communication entity being a client node in the distribution system identity register, corresponding distribution system distribution transport representation properties as distribution system communication entity transport representation properties. In an embodiment, said distribution system communication entity transport representation method being arranged to provide a distribution transport representation as a distribution system communication entity transport representation from a signal distribution label and a corresponding signal representation by formatting or encrypting based on corresponding distribution system distribution transport representation properties. In an embodiment, said distribution system communication entity transport representation interpretation method being arranged to provide a signal distribution label and a signal representation from a distribution transport representation based on corresponding distribution system distribution transport representation properties.

In an embodiment, said distribution system is arranged to perform a distribution system signal injection label generation method, arranged to provide a signal injection label, corresponding to said signal, to a signal node. In an embodiment, said distribution system is arranged to perform a distribution system signal injection label receive method, arranged to receive a signal injection label, corresponding to said signal, from a signal node. In an embodiment, said distribution system is arranged to perform a distribution system signal distribution label generation method, arranged to provide a signal distribution label, corresponding to said signal, to a client node. In an embodiment, said distribution system is arranged to perform a distribution system signal distribution label receive method, arranged to receive a signal distribution label, corresponding to said signal, from a client node. In an embodiment, said distribution system is arranged to perform a distribution system catalog label generation method, being arranged to provide a signal node catalog labels, corresponding to said signal, to a catalog system. In an embodiment, said distribution system is arranged to perform a distribution system catalog label receive method, being arranged to receive a signal node catalog label, corresponding to said signal, from a catalog system.

In an embodiment, said distribution system signal representation switching method being arranged to perform said switching between said injection transport channel and said distribution transport channel by using said distribution system injection transport representation interpretation method to provide a signal injection label and a corresponding signal representation from an injection transport representation and by using said distribution system distribution transport representation method to provide one or more distribution transport representations each comprising a signal distribution label and said signal representation.

In an embodiment, said distribution system signal representation switching method being arranged to perform said switching between said distribution transport channel and said injection transport channel by using said distribution system distribution transport representation interpretation method to provide a signal distribution label and a corresponding signal representation from a distribution transport representation and by using said distribution system injection transport representation method to provide an injection transport representation comprising a signal injection label and said signal representation.

In an embodiment, said distribution system switching control register comprises one or more signal node operating entity identifications being related to one or more of said signal nodes identified by respective signal node identifications, one or more client node operating entity identifications being related to one or more of said client nodes identified by respective client node identifications, and a distribution system operating entity identification being related to said distribution system.

In an embodiment, said distribution system switching control register comprises one or more distribution system signal transport classifiers being arranged to account for a property selected from a list of volume and frequency of signal representations. In an embodiment, said distribution system switching control register comprises one or more distribution system operational classifiers being arranged to account for a property selected from a list of security events, non-delivering events and unavailability events.

By implementing distribution system signal transport classifiers and/or distribution system operational classifiers, is facilitated monitoring and control of the signal distribution in the signal communication system, e.g. facilitating Quality of Service (QoS) concepts. For example, the distribution system signal transport classifiers, for example accounting for volume or frequency of signal representations through the signal communication system, may be used for resource allocation, load balancing, scaling, billing, etc. For example, the distribution system operational classifiers, for example accounting for security events, non-delivering events or unavailability events happening in the signal communication system, may for example facilitate fault detection, finding bottlenecks, documenting the reliability of the signal communication system, penalize or block non-compliant nodes, etc.

In an embodiment, the distribution system comprises one or more distribution system network interfaces being signal communication system entity network interfaces arranged to convey signal communication system network representations comprising injection transport representations and signal communication system network representations comprising distribution transport representations on one or more signal communication system entity networks being connected to a signal communication system network comprising at least one of said signal nodes and at least one of said client nodes as described above with respect to network channels.

In an embodiment, the distribution system is arranged to apply said signal communication system network representation method to provide a signal communication system network representation from an injection transport representations or a distribution transport representations, and apply said signal communication system network representation interpretation method to provide an injection transport representations or a distribution transport representations from a signal communication system network representation.

In an embodiment, said distribution system signal representation switching parameter record in relation to said signal injection label comprises an associated signal node network identification arranged to be used to provide an injection transport representation as a signal communication system network representation on a signal communication system sub-network between said distribution system and the corresponding signal node, and in relation to said one or more signal distribution labels comprises associated client node network identifications arranged to be used to provide a distribution transport representation as a signal communication system network representation on a signal communication system sub-network between said distribution system and the corresponding client node. In an embodiment, said distribution system signal representation switching parameter record registration method being arranged to configure said distribution system signal representation switching parameter record on the basis of a catalog system record and a signal distribution label.

In an embodiment, the distribution system is arranged to maintain a distribution system network identity register comprising a distribution system injection network identification and a distribution system distribution network identification of a distribution system.

Identity Register

In an embodiment, the signal communication system comprises an identity register, the identity register, comprising an identity register identity, a corresponding identity register identification and one or more identifications arranged to verify respective identities of said signal communication system entities. In an embodiment, the identifications are selected from the list of said at least one distribution system identification, said at least one signal node identification, and said at least one client node identification. In an embodiment, each of said identifications belongs to an identification category selected from the list comprising at least a signal communication system entity identification and a signal communication system transport identification. In an embodiment, a signal communication system entity is arranged to provide the same identification as both a signal communication system entity identification and a signal communication system transport identification. In an embodiment, said identity register for at least one of said signal communication system entities comprises two or more identifications belonging to different of said identification categories.

In an embodiment, said identifications of said identity register comprises one or more selected from the list of distribution system identifications, distribution system transport identifications, distribution system vendor identifications and distribution system vendor transport identification.

In an embodiment, said identifications of said identity register comprises one or more identification selected from a list of distribution system operating entity identifications and distribution system operating entity transport identifications.

In an embodiment, said identifications of said identity register comprises one or more identification selected from a list of signal node identifications and signal node transport identifications. In an embodiment, said identifications of said identity register comprises one or more identification selected from a list of the signal node vendor identifications and signal node vendor transport identifications. In an embodiment, said identifications of said identity register comprises one or more identification selected from a list of signal node operating entity identifications and signal node operating entity transport identifications.

In an embodiment, said identifications of said identity register comprises one or more identification selected from a list of client node identifications and client node distribution transport identifications. In an embodiment, said identifications of said identity register comprises one or more identification selected from a list of client node vendor identifications and client node vendor transport identifications. In an embodiment, said identifications of said identity register comprises one or more identification selected from a list of client node operating entity identifications and client node operating entity transport identifications.

In an embodiment, said identifications of said identity register comprises one or more identification selected from a list of catalog system identifications, catalog system transport identifications, catalog system operating entity identifications, and catalog system operating entity transport identifications. In an embodiment, said identifications of said identity register comprises one or more identification selected from a list of catalog system vendor identifications and catalog system vendor transport identifications.

In an embodiment, the identity register is arranged to perform an identity register identity representation receiving method arranged to receive one or more identity representations. In an embodiment, the identity register is arranged to perform an identity register identity representation verification method arranged to verify one or more identity representations against one or more identity properties being different from said identity representations. In an embodiment, a signal communication system entity is arranged to perform a signal communication system identification generating method arranged to generate an identification being a signal communication system entity identification corresponding to an identity of said signal communication system entity. In an embodiment, the identity register is arranged to perform an identity register identification validation method to confirm or reject the validity of an identification.

The identity representations may be generated by the identity register, the entity that the identification is generated on behalf of, or by any other identity representation generating service provider. In a preferred embodiment, the identity representation comprises a public key of the respective entity.

Combinations of Signal Communication System Entities

In an embodiment, the signal communication system comprises a hybrid signal client node being a physical device arranged to comprise at least one of said signal nodes and at least one of said client nodes. In an embodiment, the signal communication system comprises a hybrid signal distribution node being a physical device arranged to comprise at least one of said signal nodes and at least one of said distribution systems. In an embodiment, the signal communication system comprises a hybrid client distribution node being a physical device arranged to comprise at least one of said client nodes and at least one of said distribution systems. In an embodiment, the signal communication system comprises a hybrid signal distribution client node being a physical device arranged to comprise at least one of said signal nodes, at least one of said distribution systems and at least one of said client nodes. In an embodiment, the signal communication system comprises a hybrid distribution catalog node being a physical device arranged to comprise at least one of said distribution systems and at least one of said catalog systems. In an embodiment, the signal communication system comprises a hybrid distribution identity node being a physical device arranged to comprise at least one of said distribution systems and at least one of said identity registers. In an embodiment, the signal communication system comprises a hybrid distribution catalog identity node being a physical device arranged to comprise at least one of said distribution systems, at least one of said catalog systems and at least one of said identity registers.

DRAWINGS

Figure 2A:
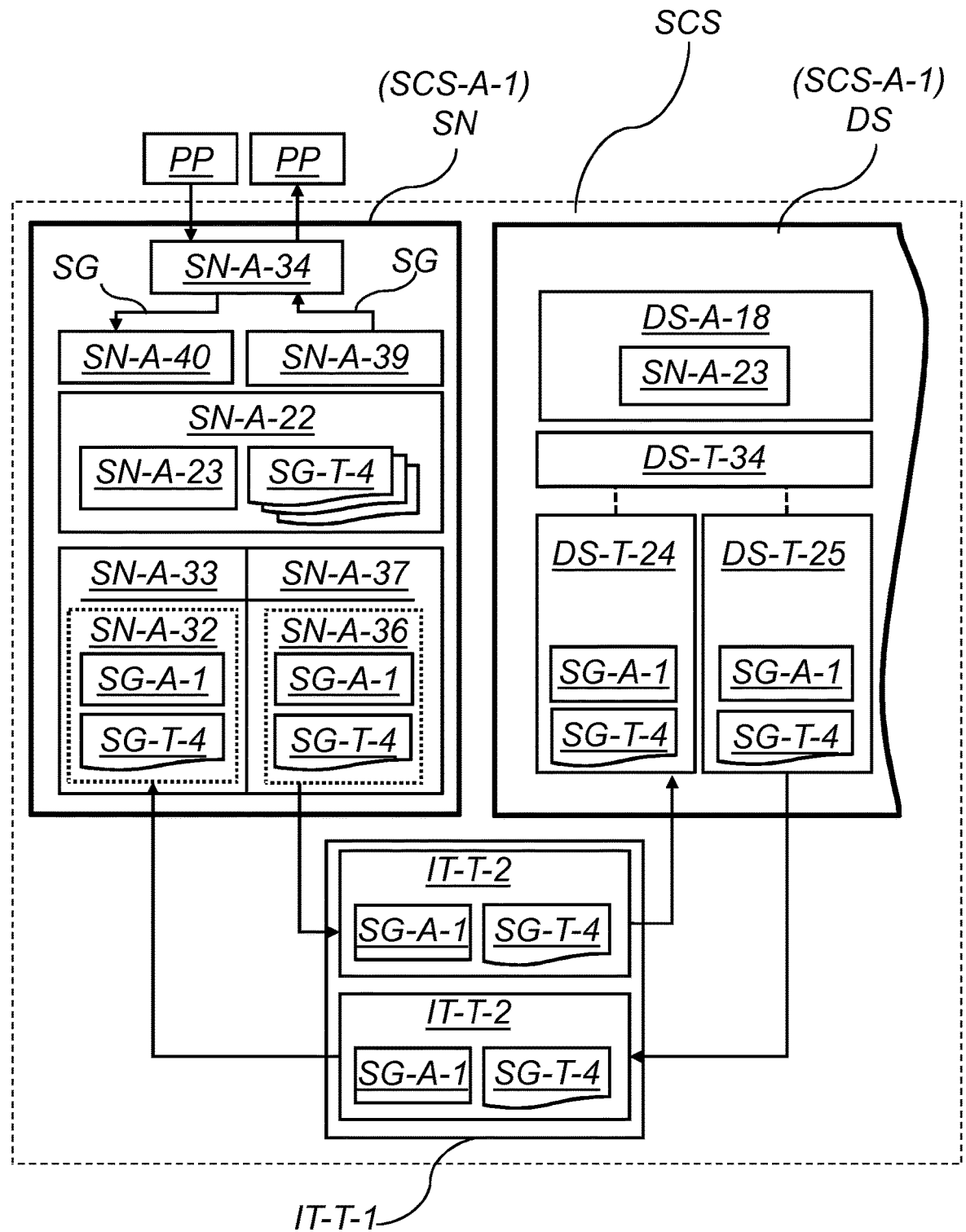
Figure 2B:
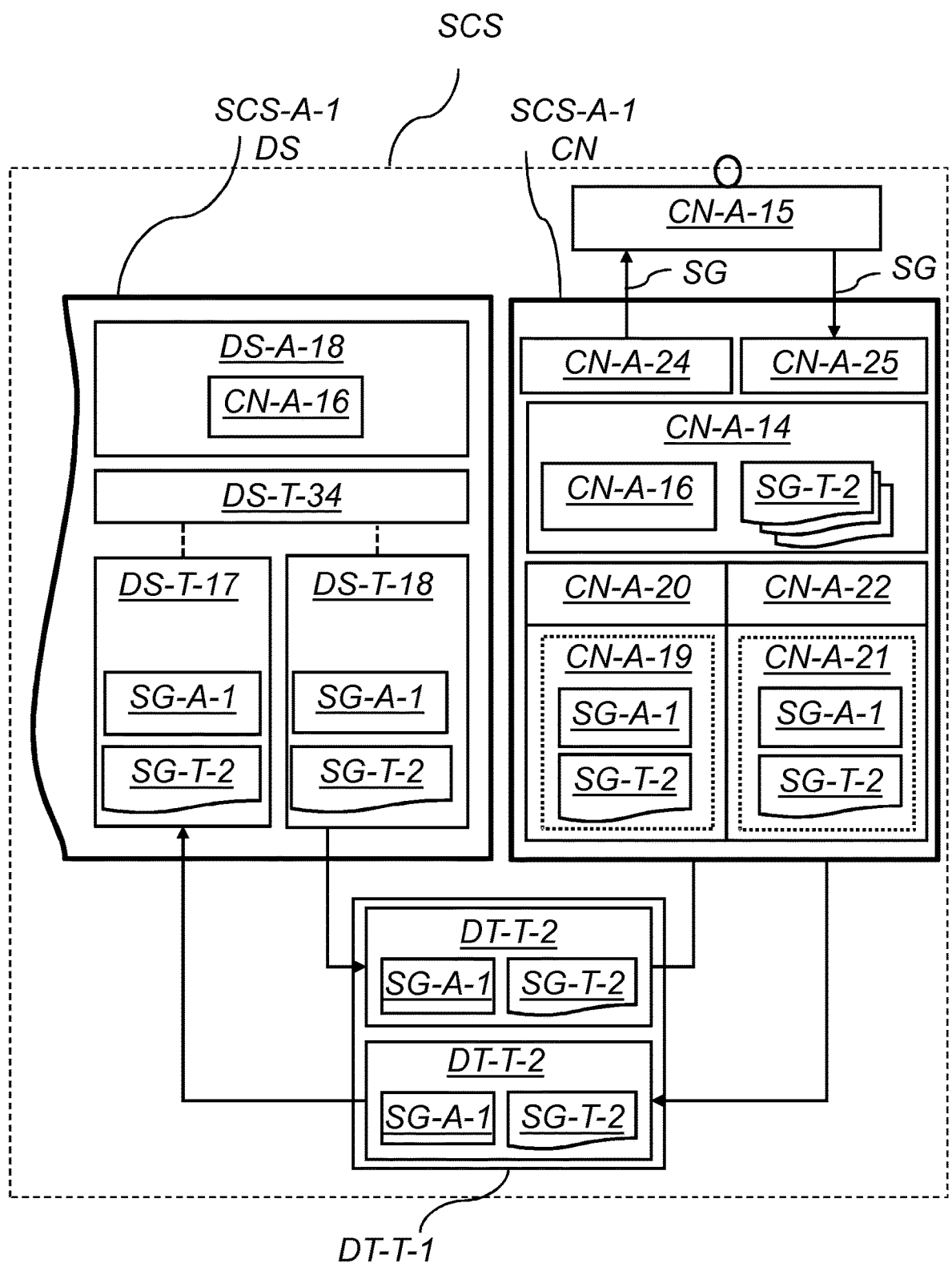
Figure 2C:
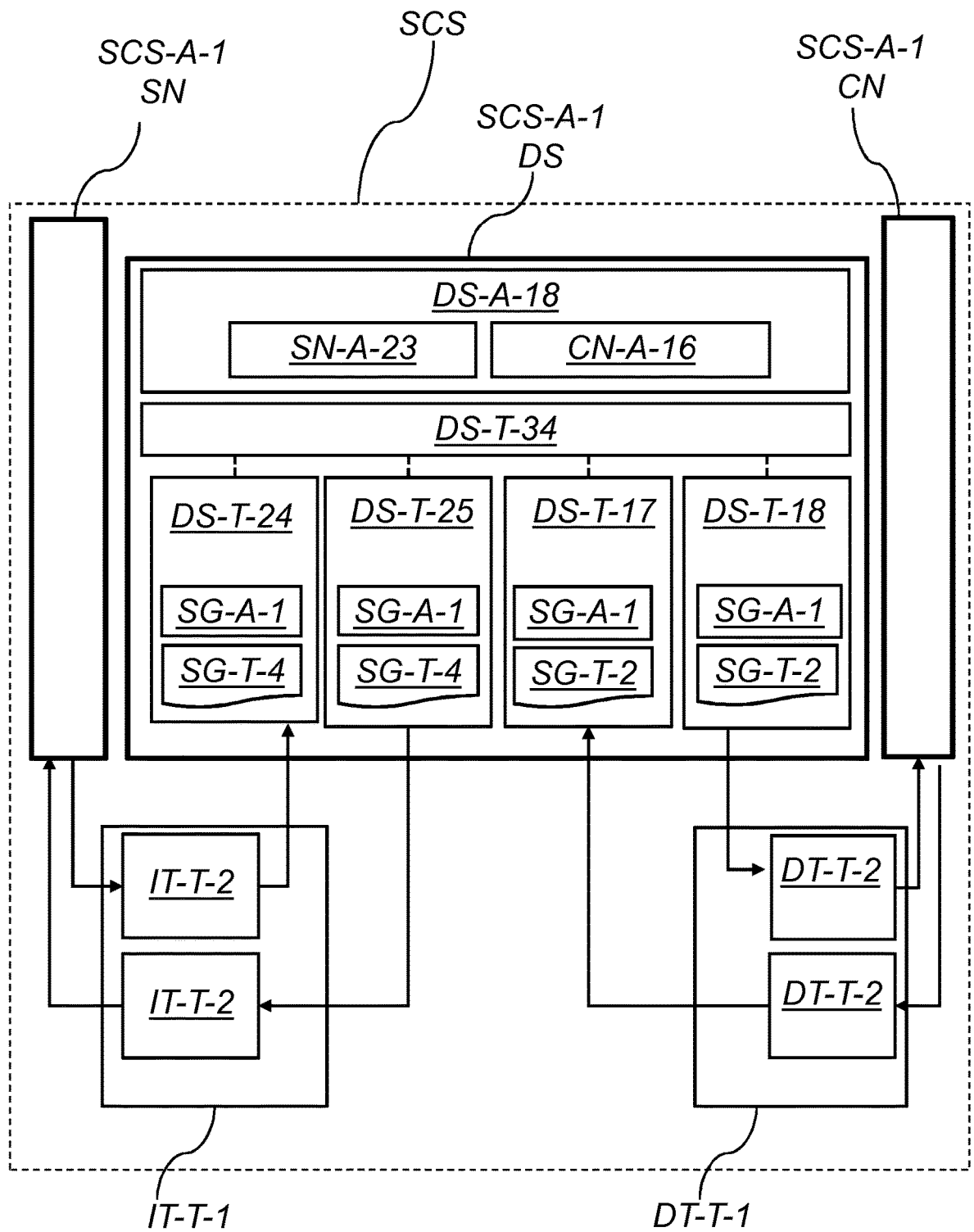
Figure 3:
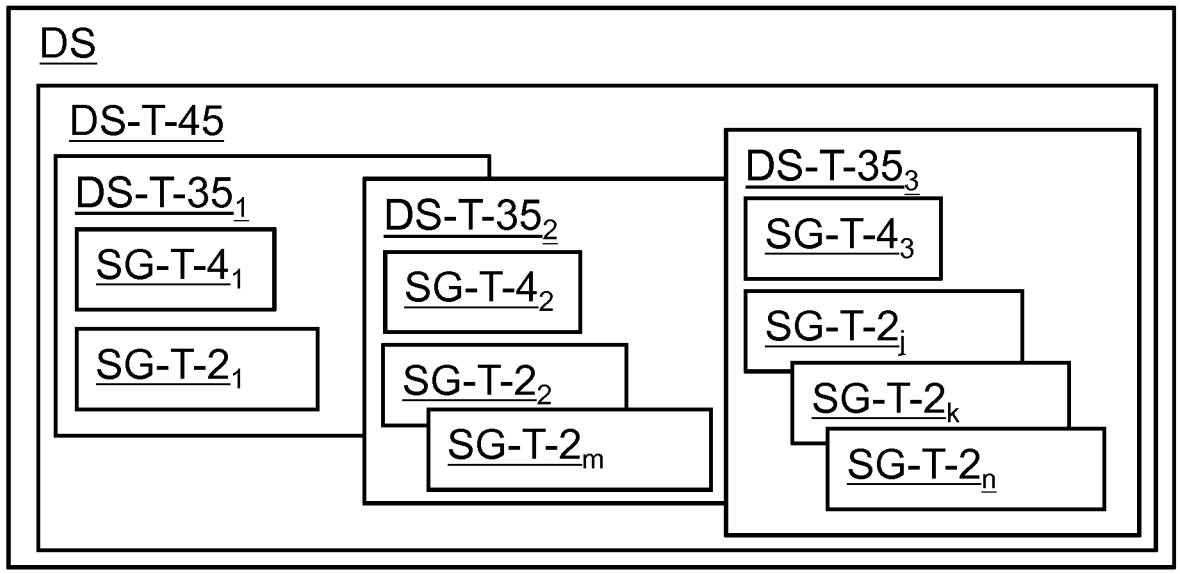
Figure 4A:
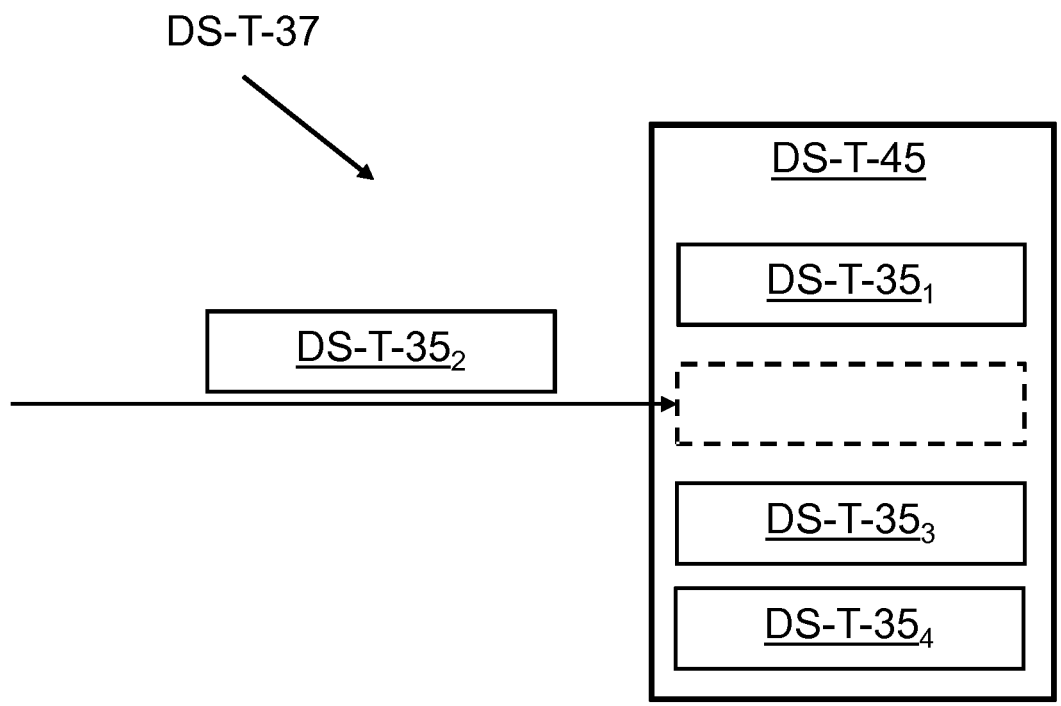
Figure 4B:
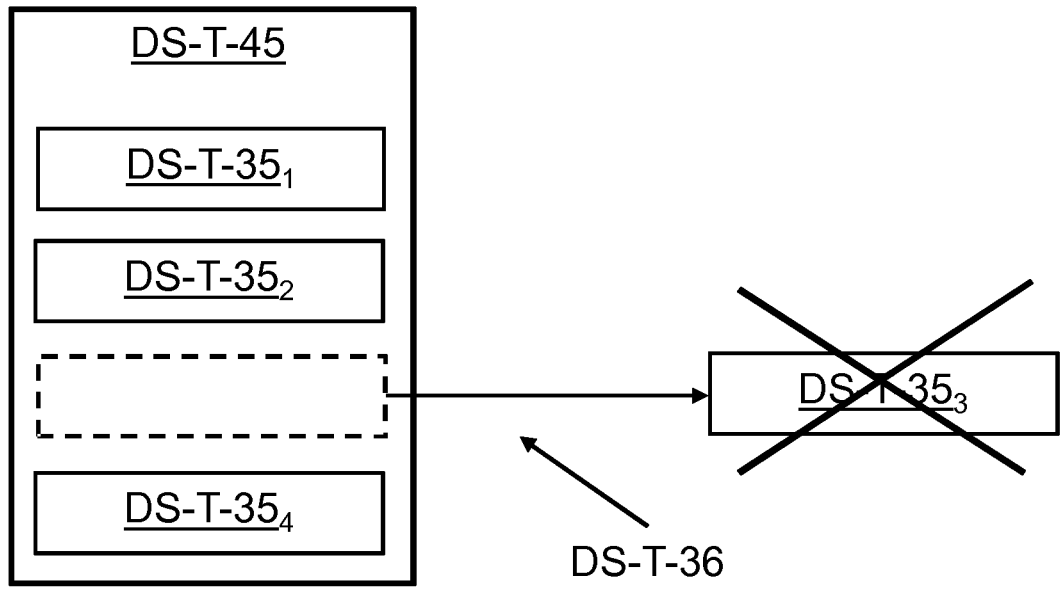
Figure 5:
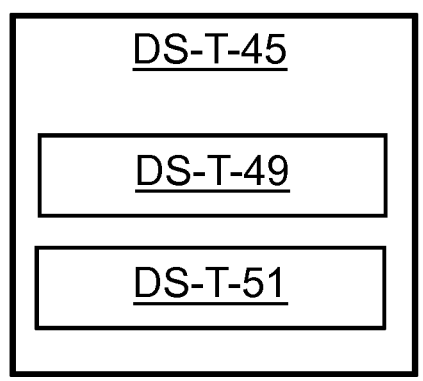
Figure 6:
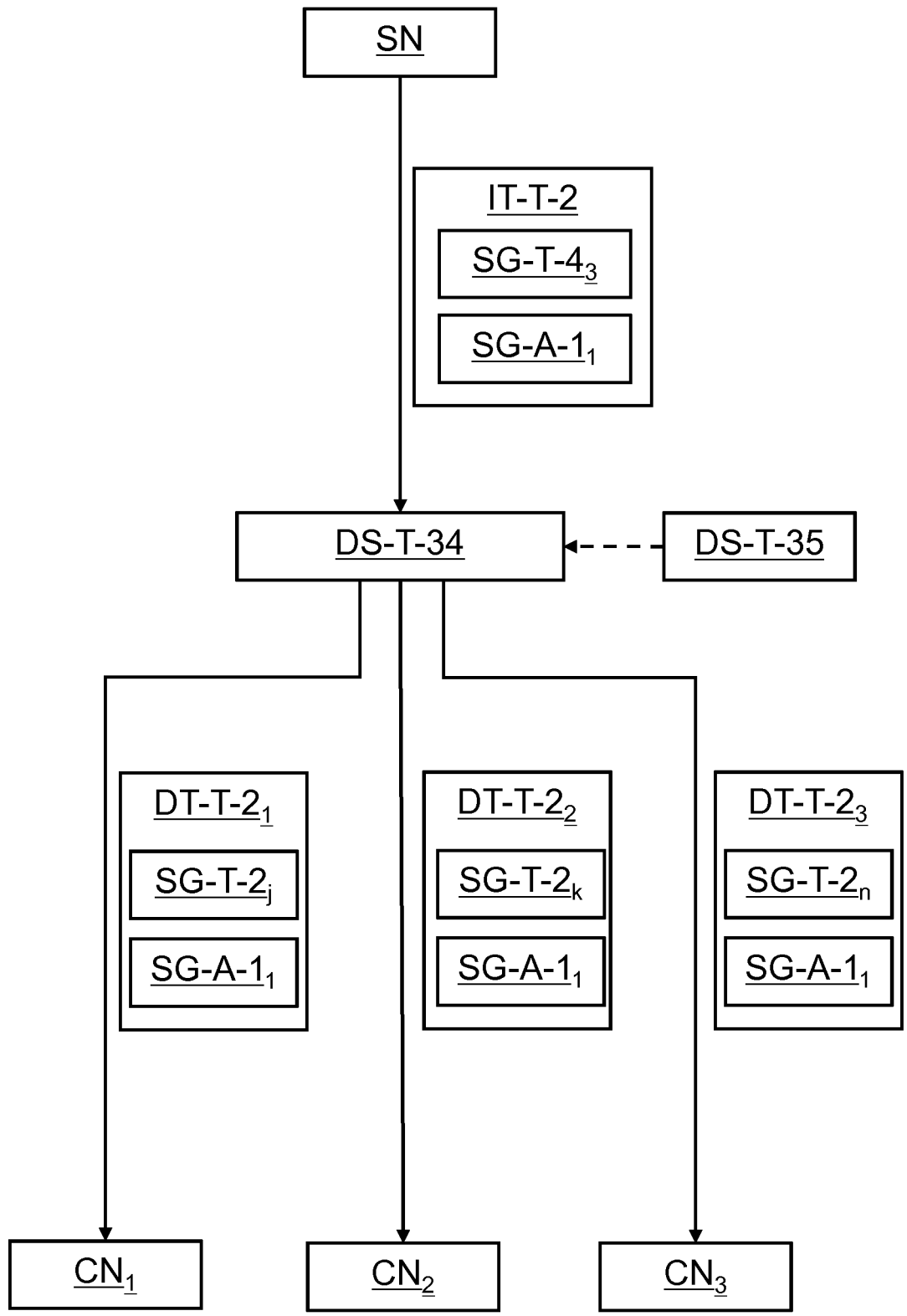
Figure 7:
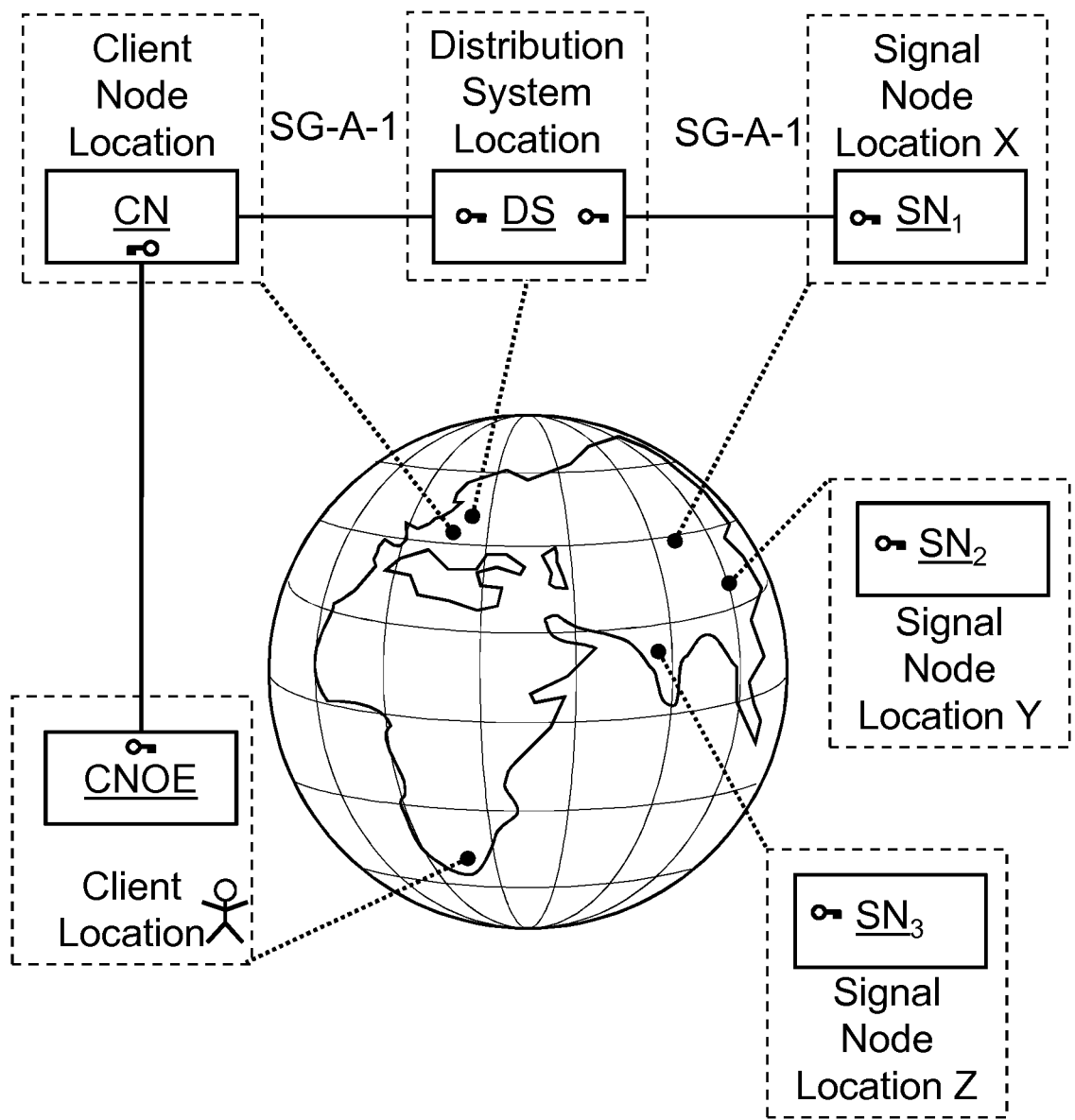
Figure 8A:
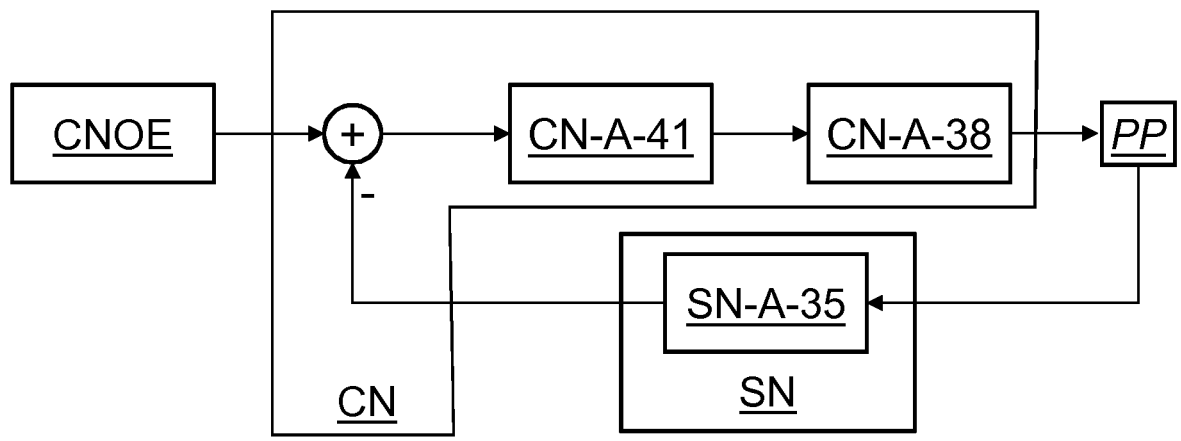
Figure 8B:
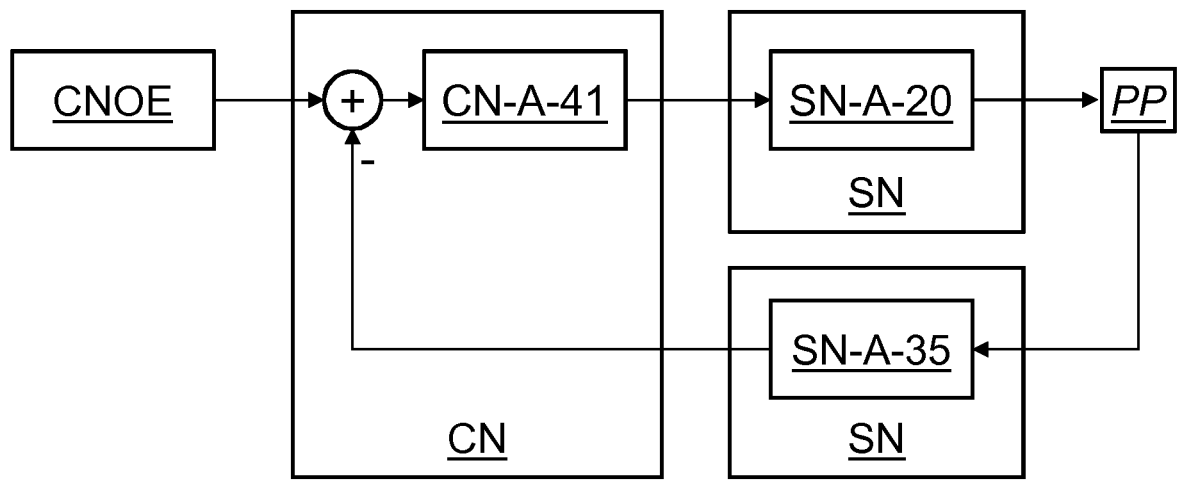
Figure 8C:
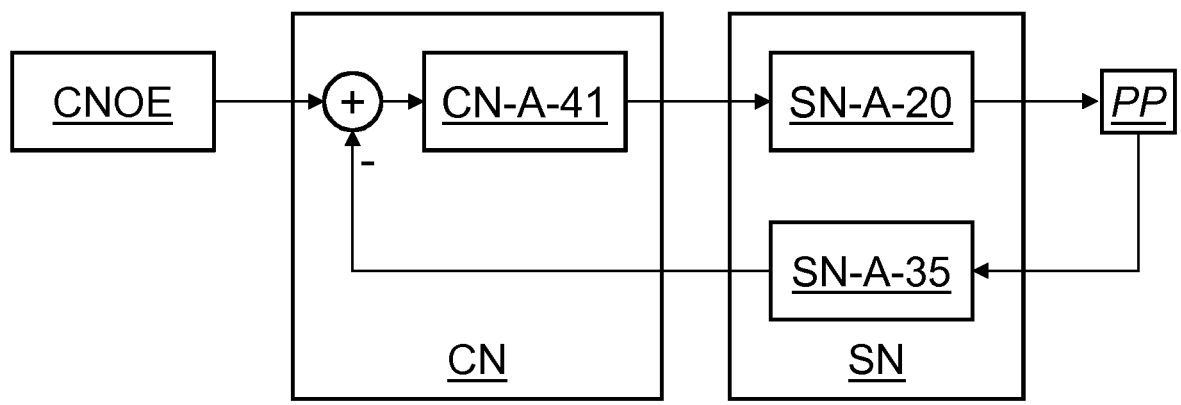
Figure 9A:
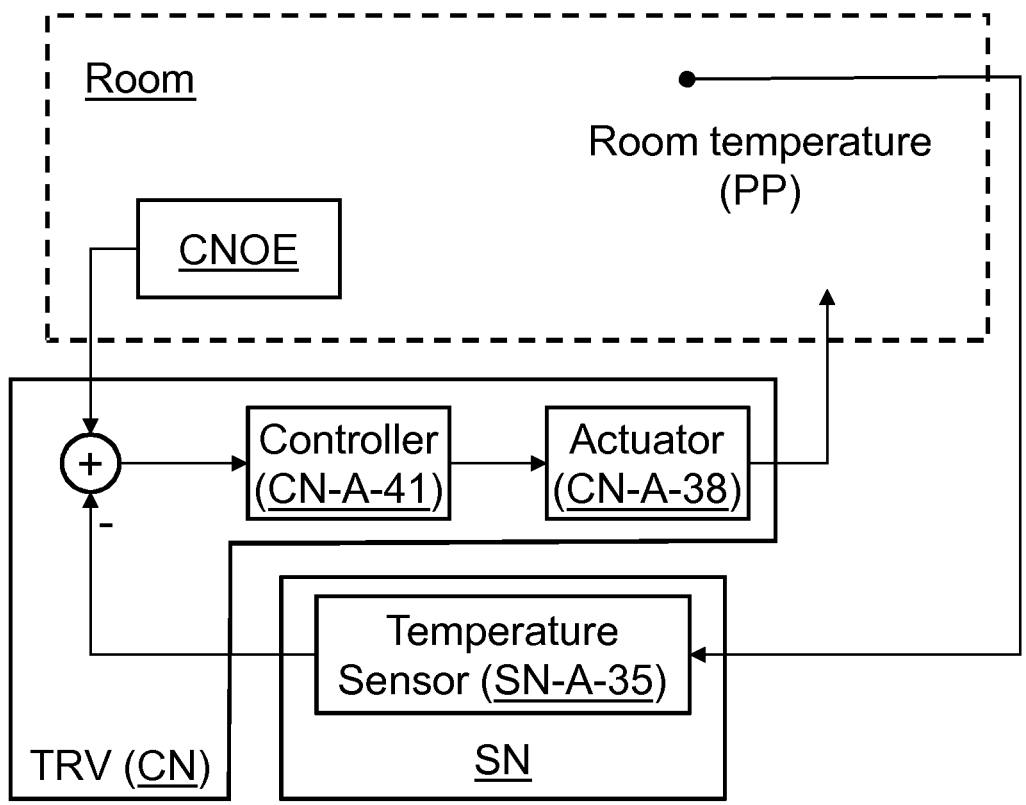
Figure 9B:
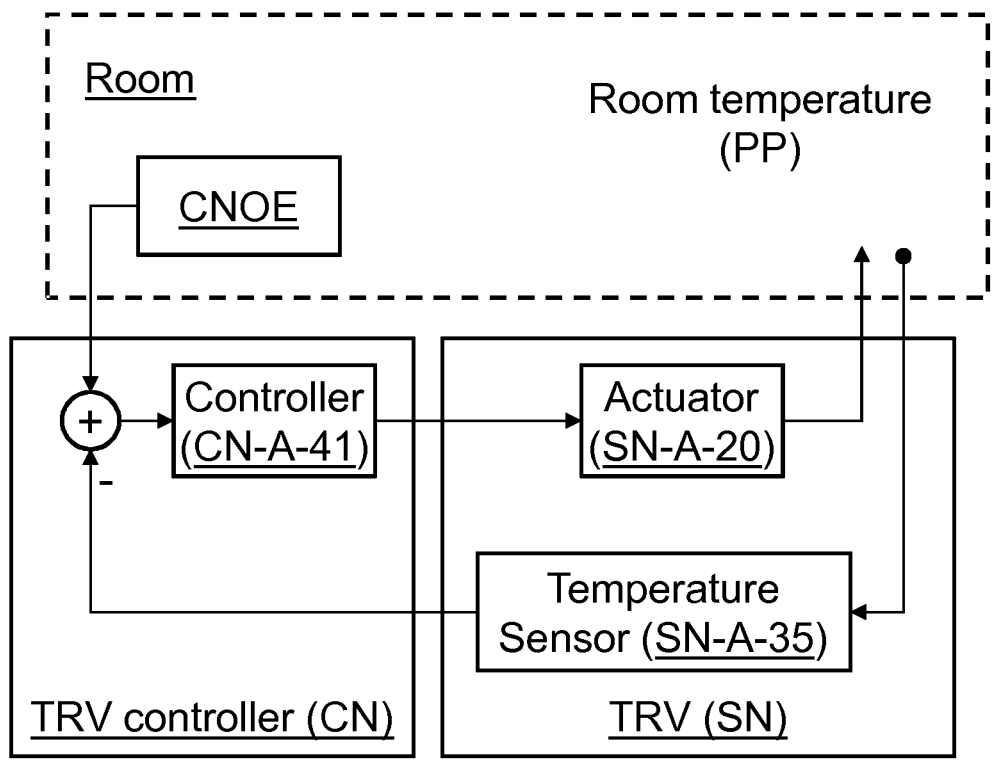
Figure 10:
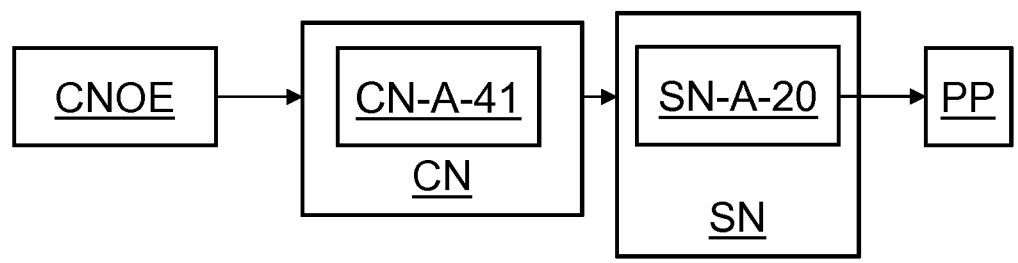
Figure 11:
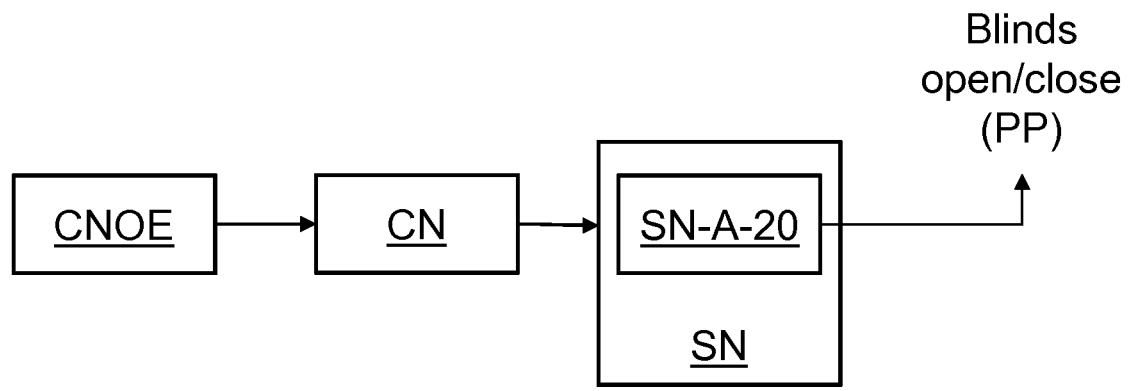
Figure 12:
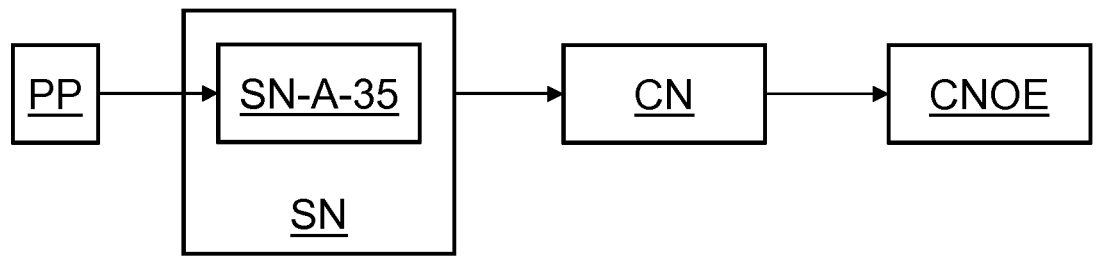
Figure 13:
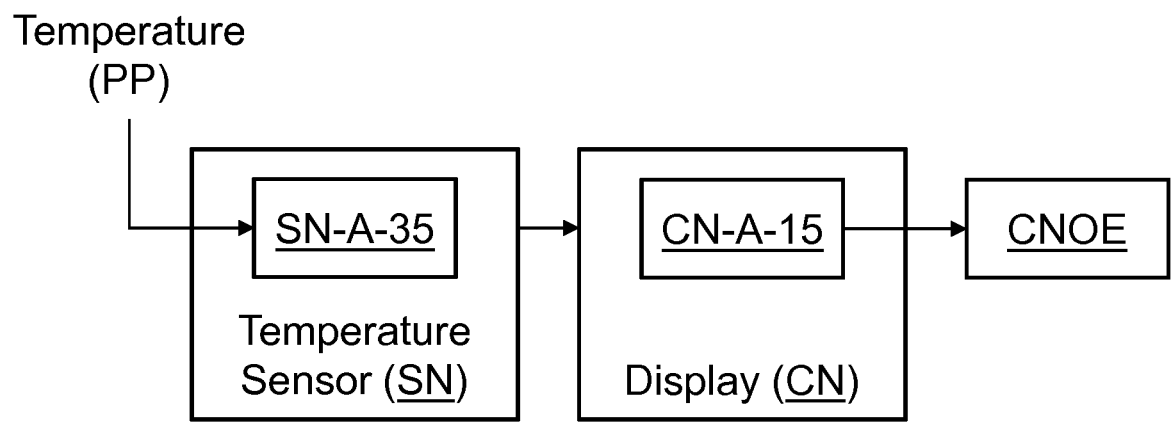
Figure 14:
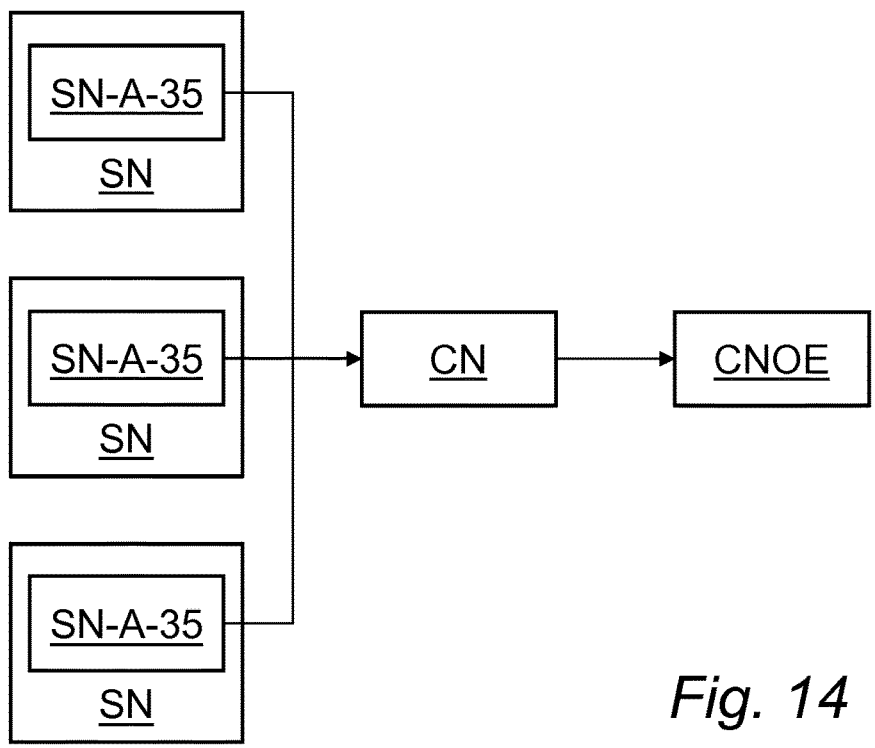
Figure 15:
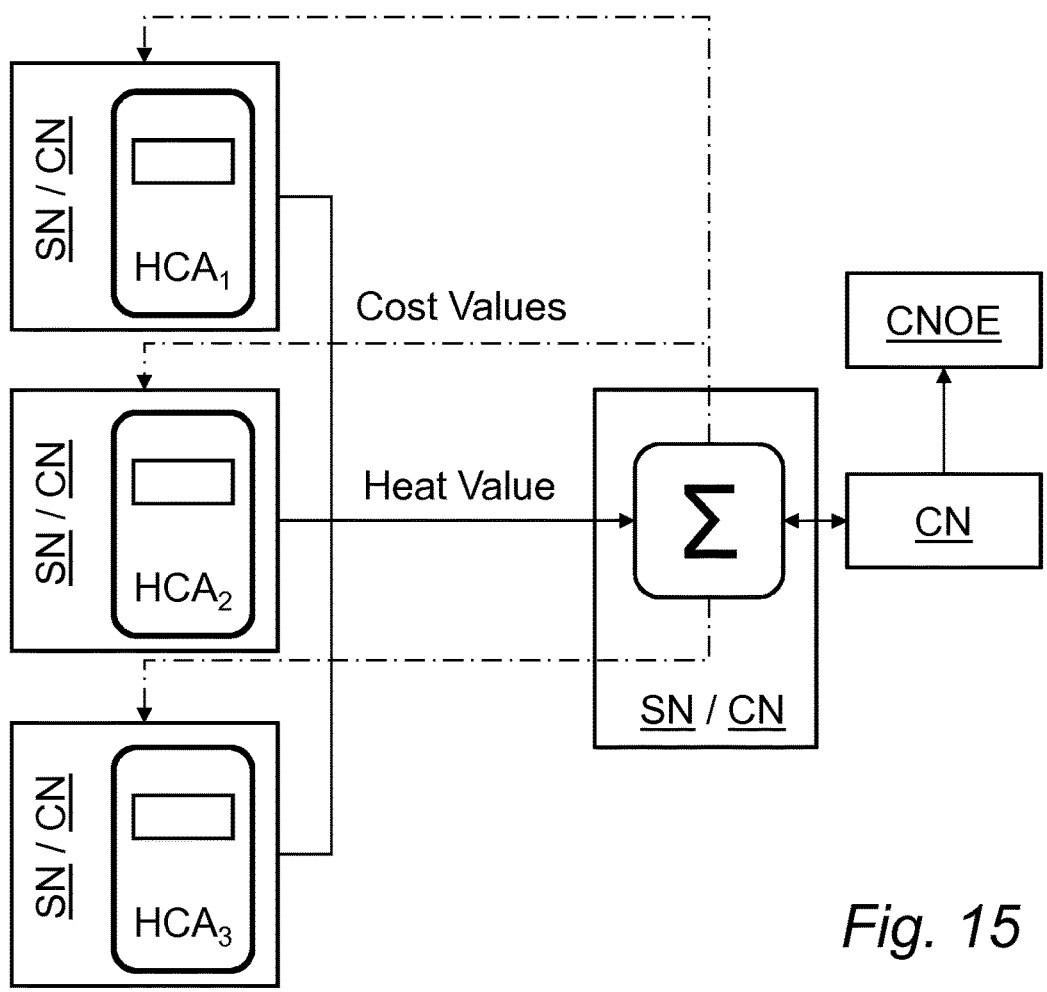
Figure 16:
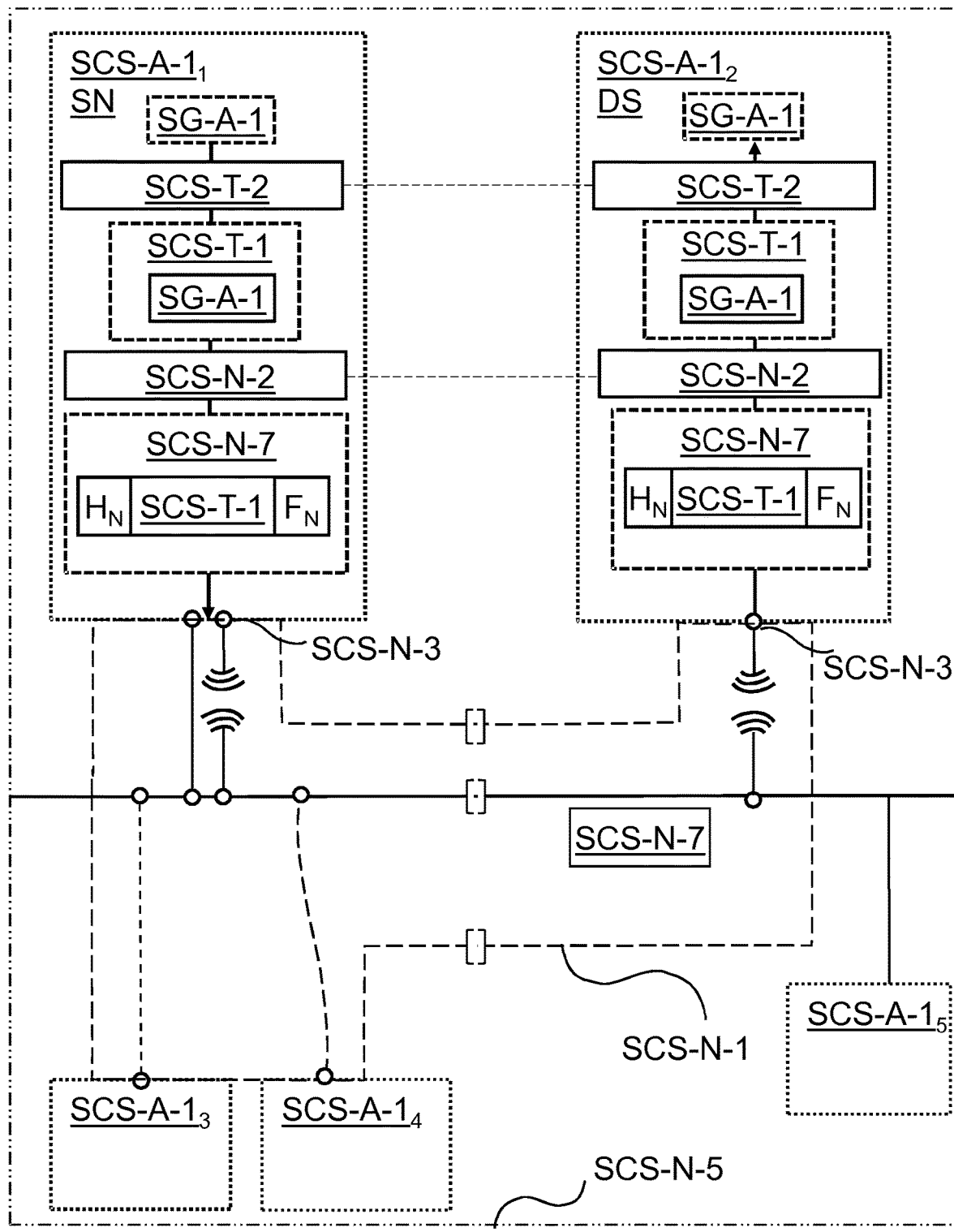
Figure 17:
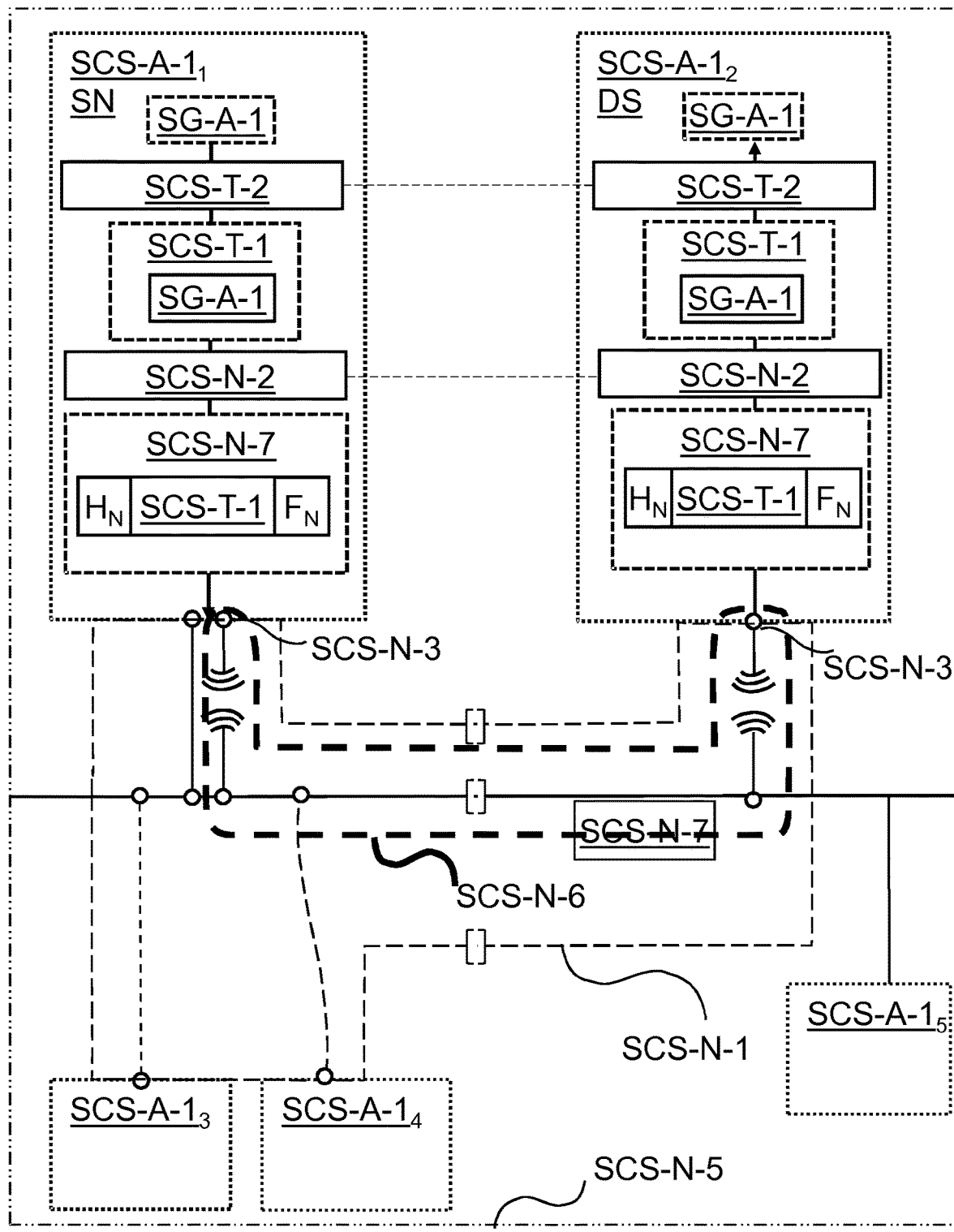
Figure 18:
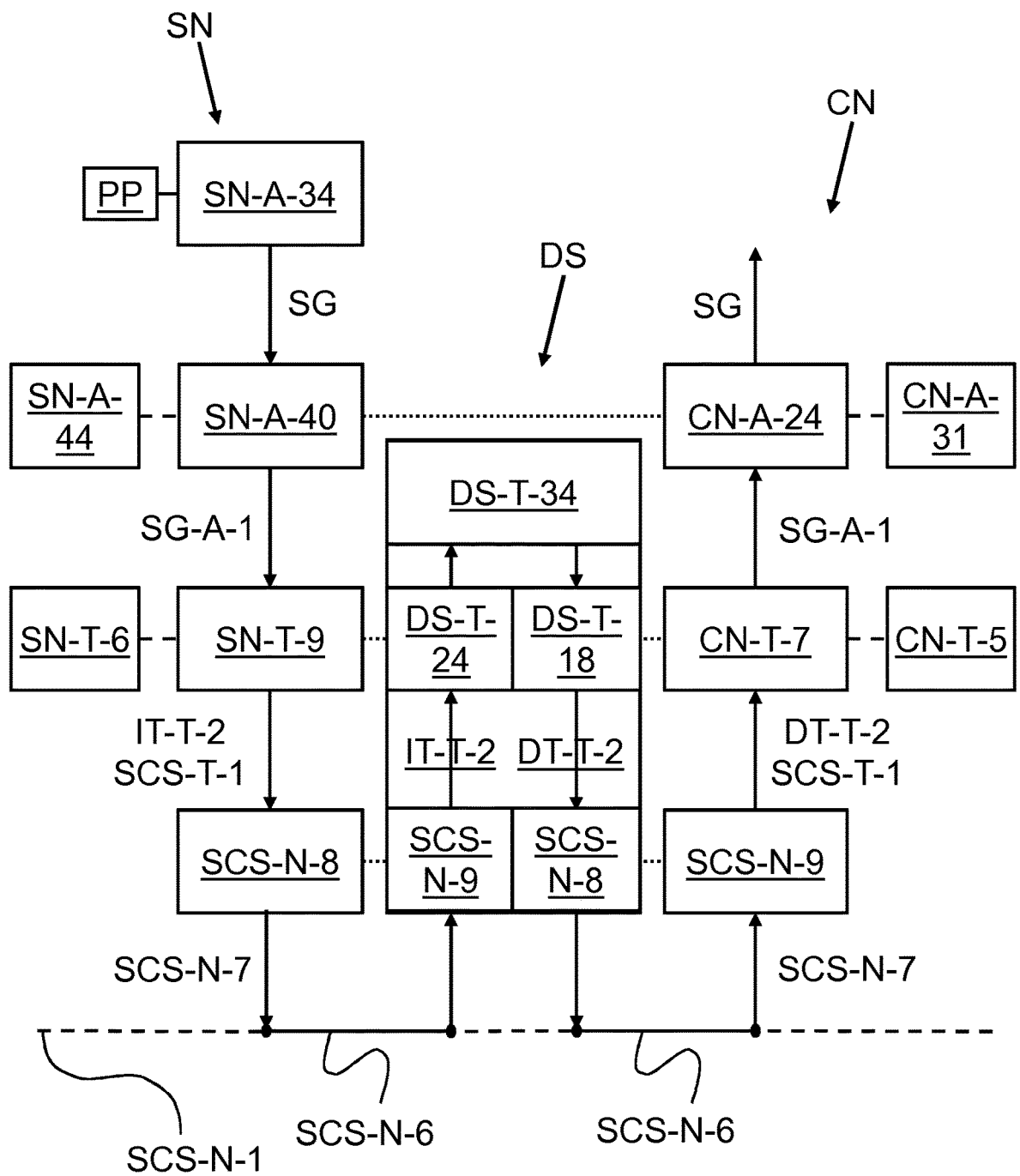
Figure 25:
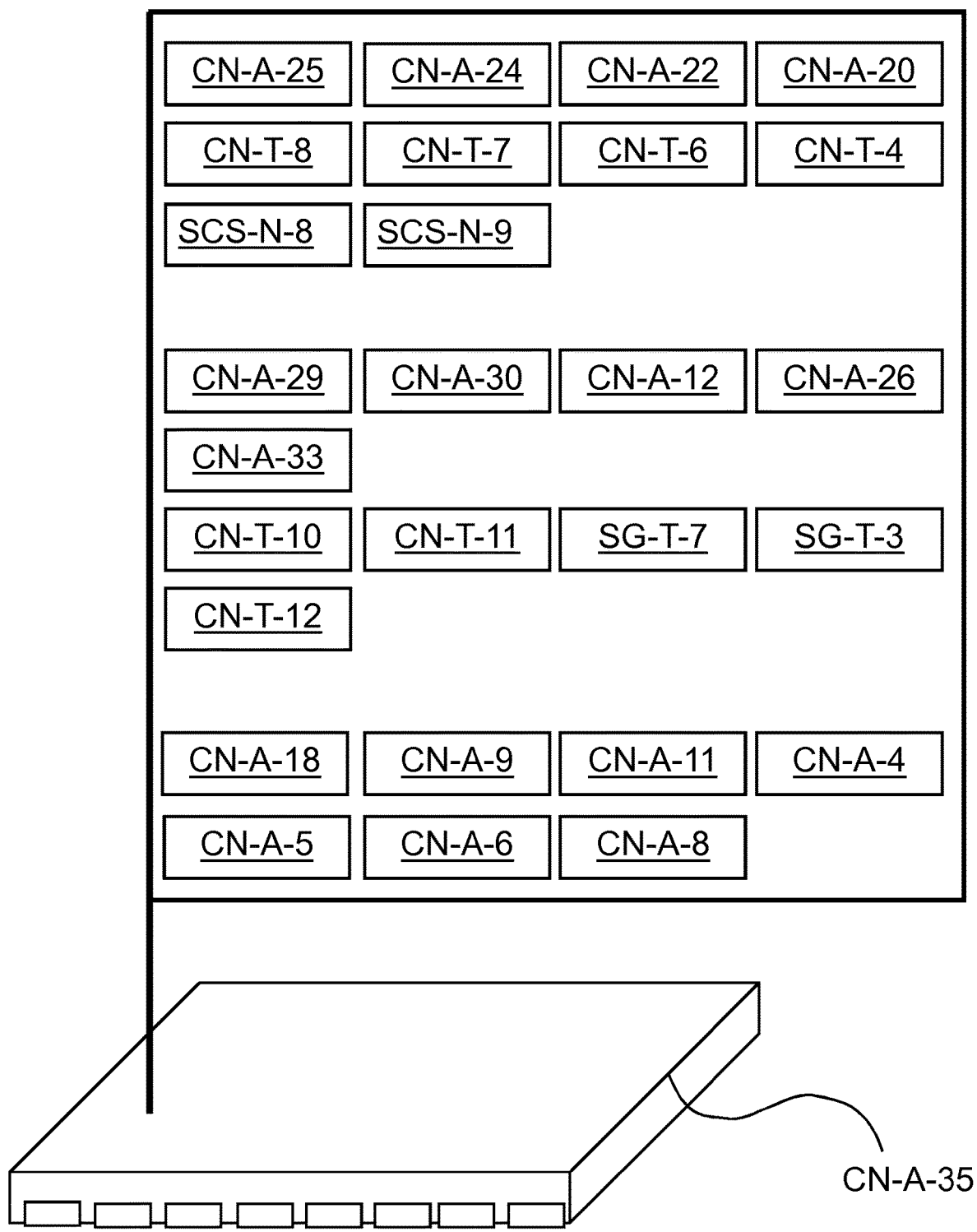
Figure 26:
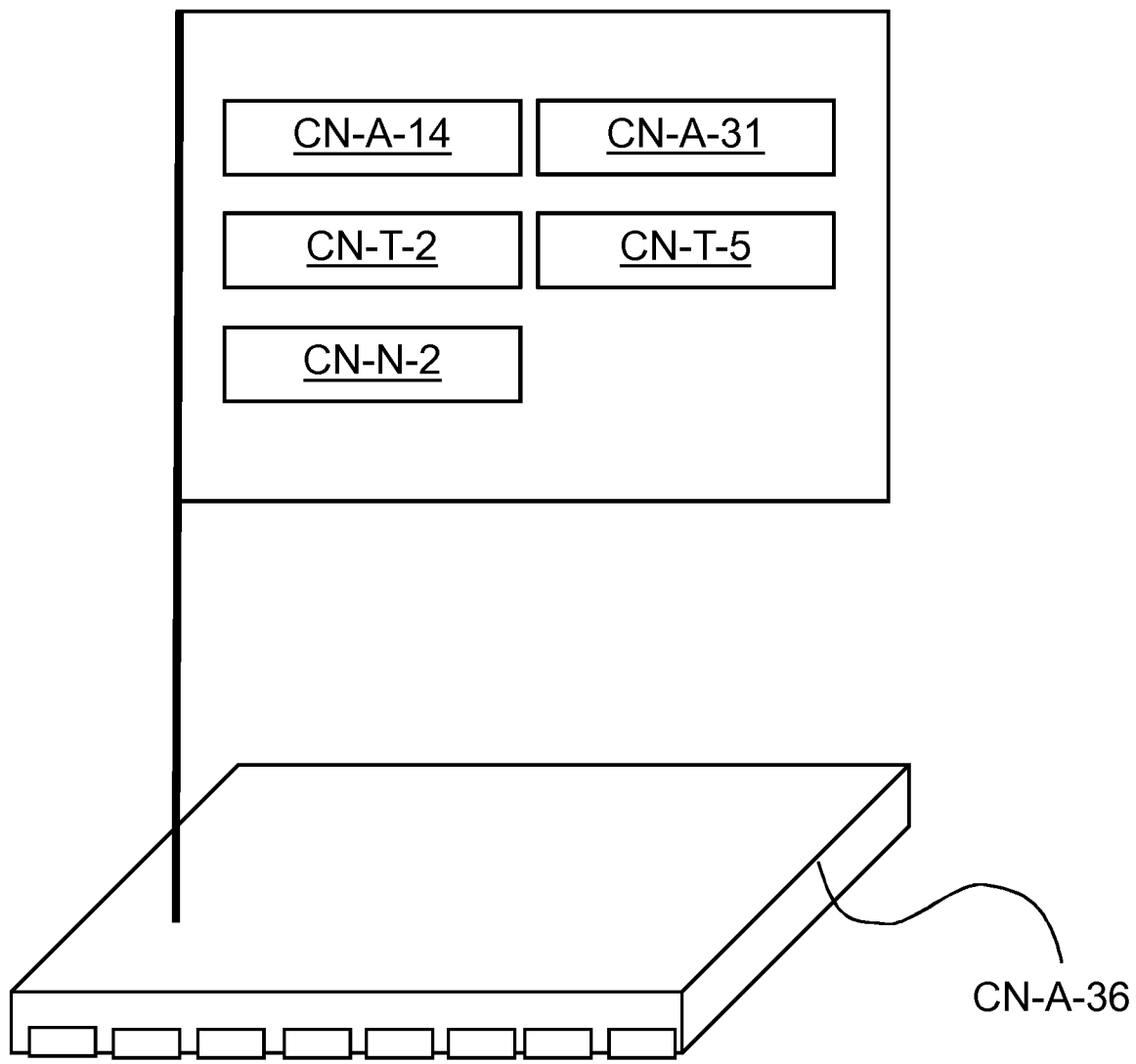
Figure 27:
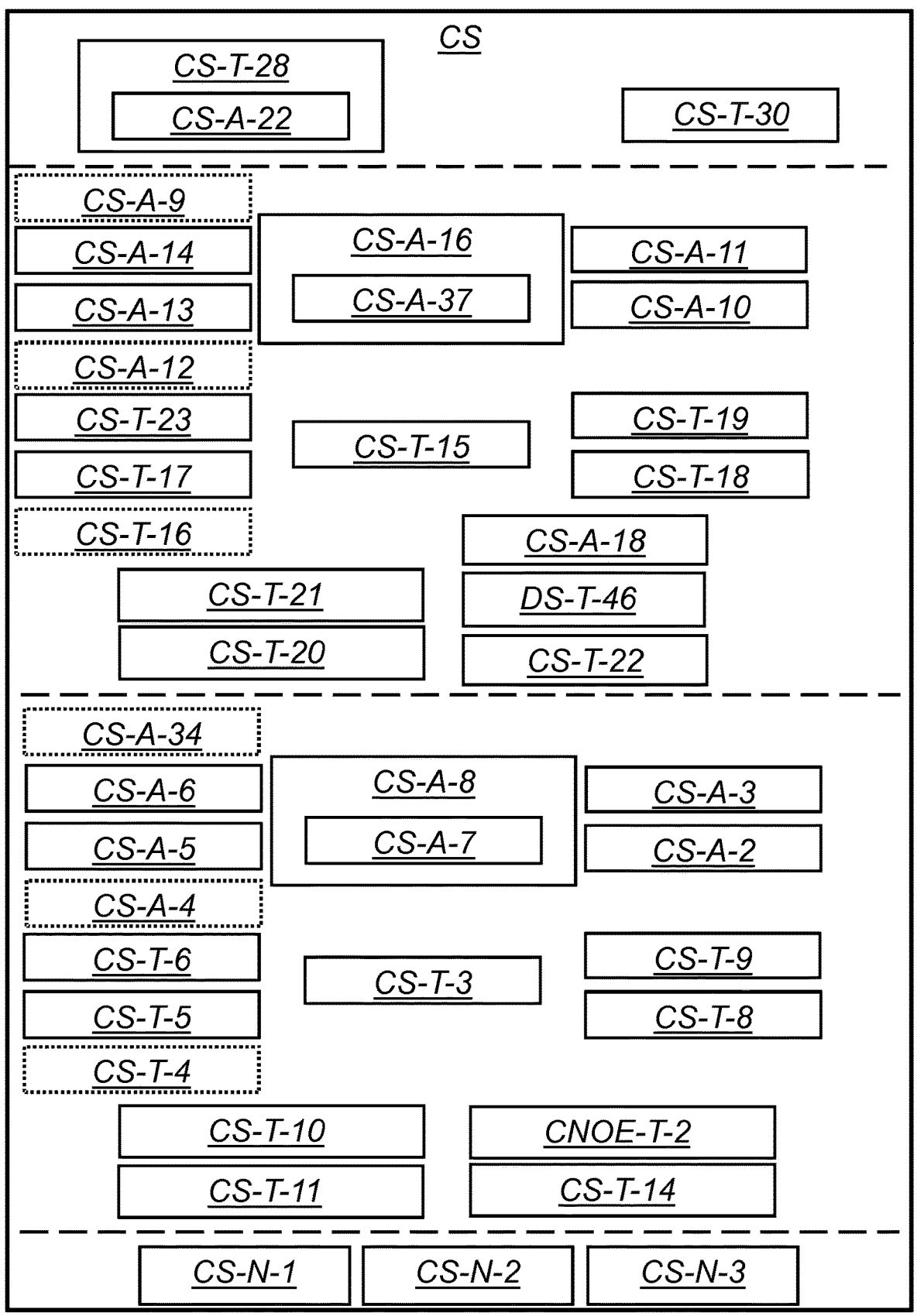
Figure 28:
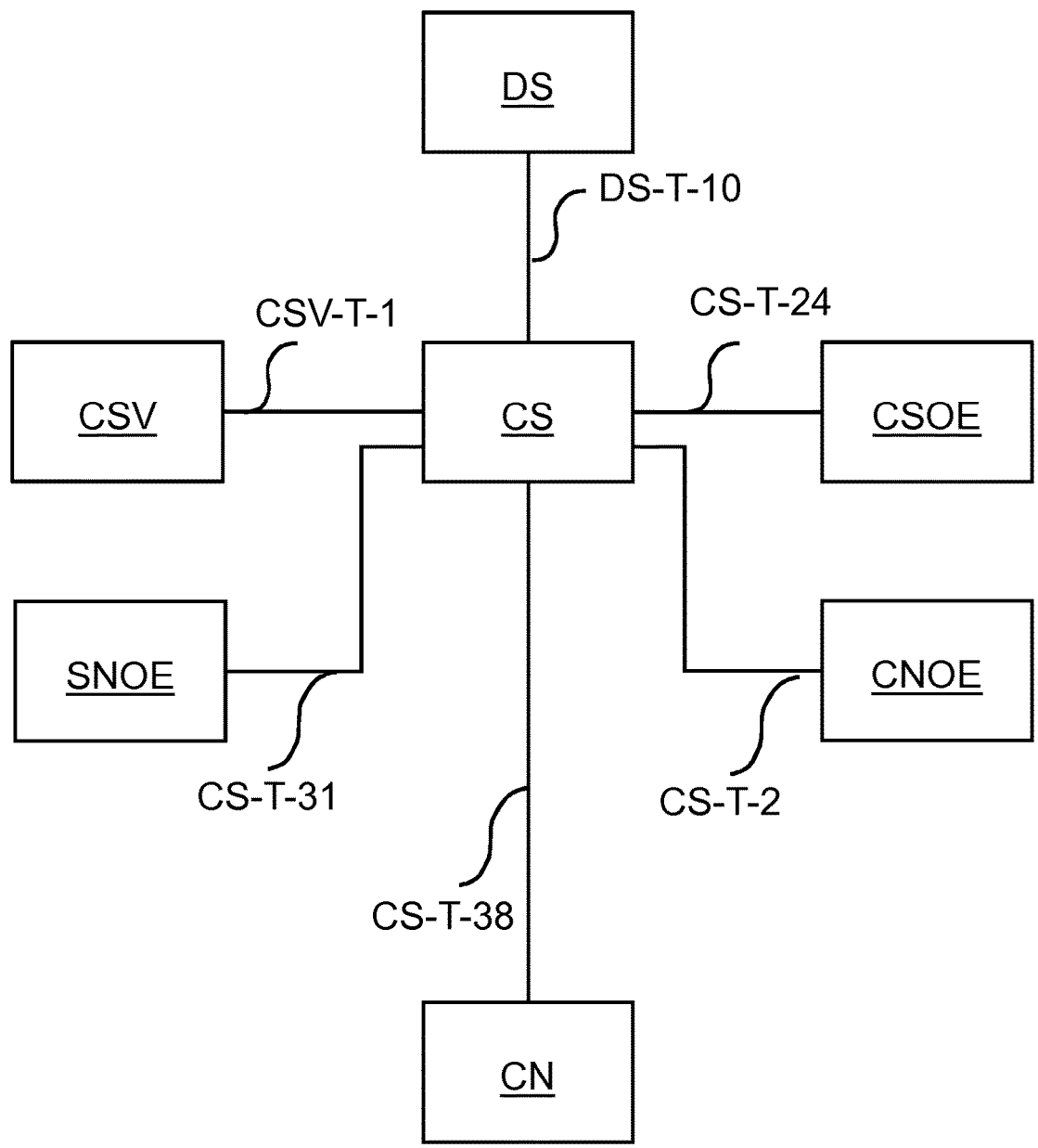
Figure 31A:
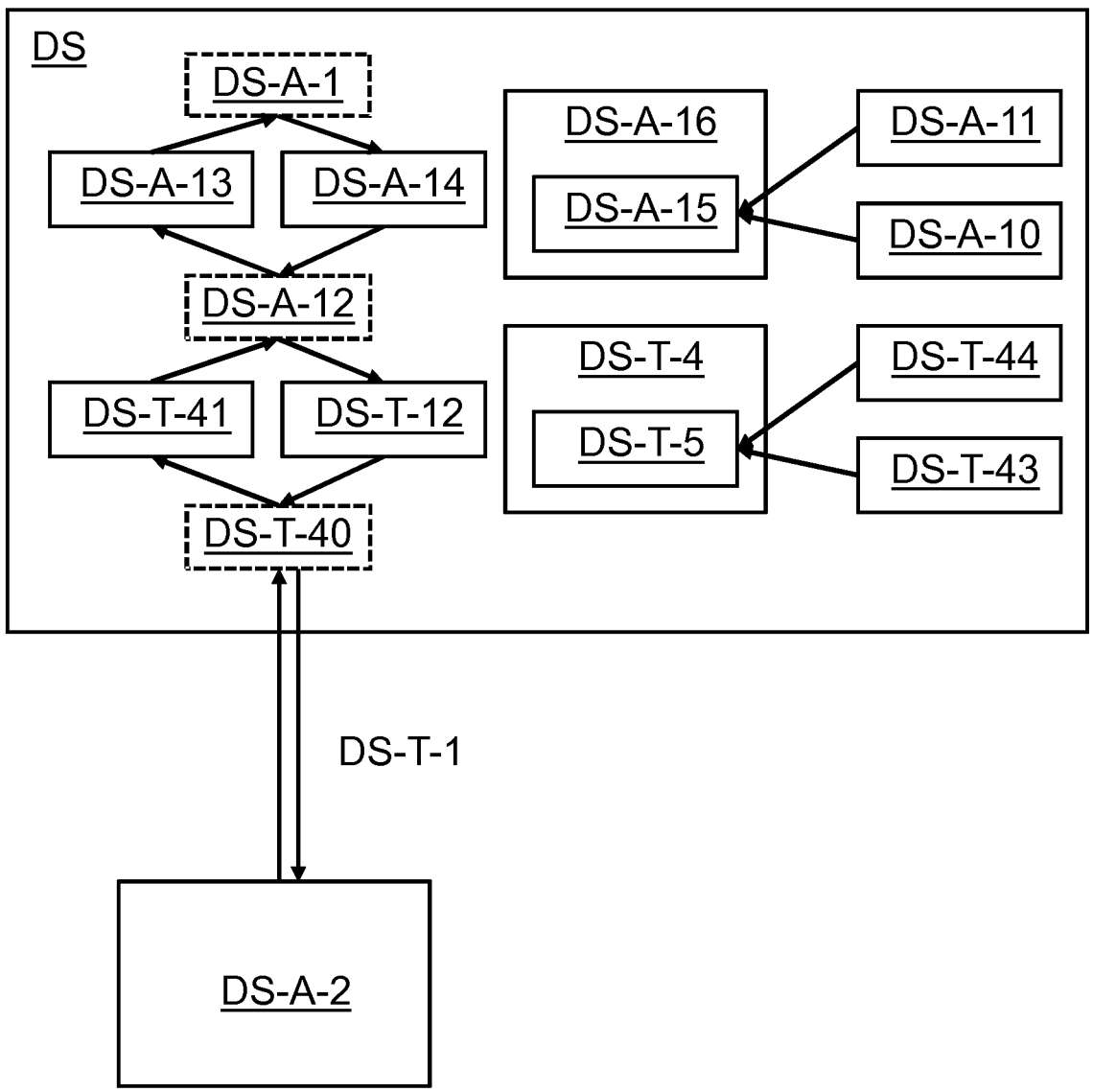
Figure 31B:
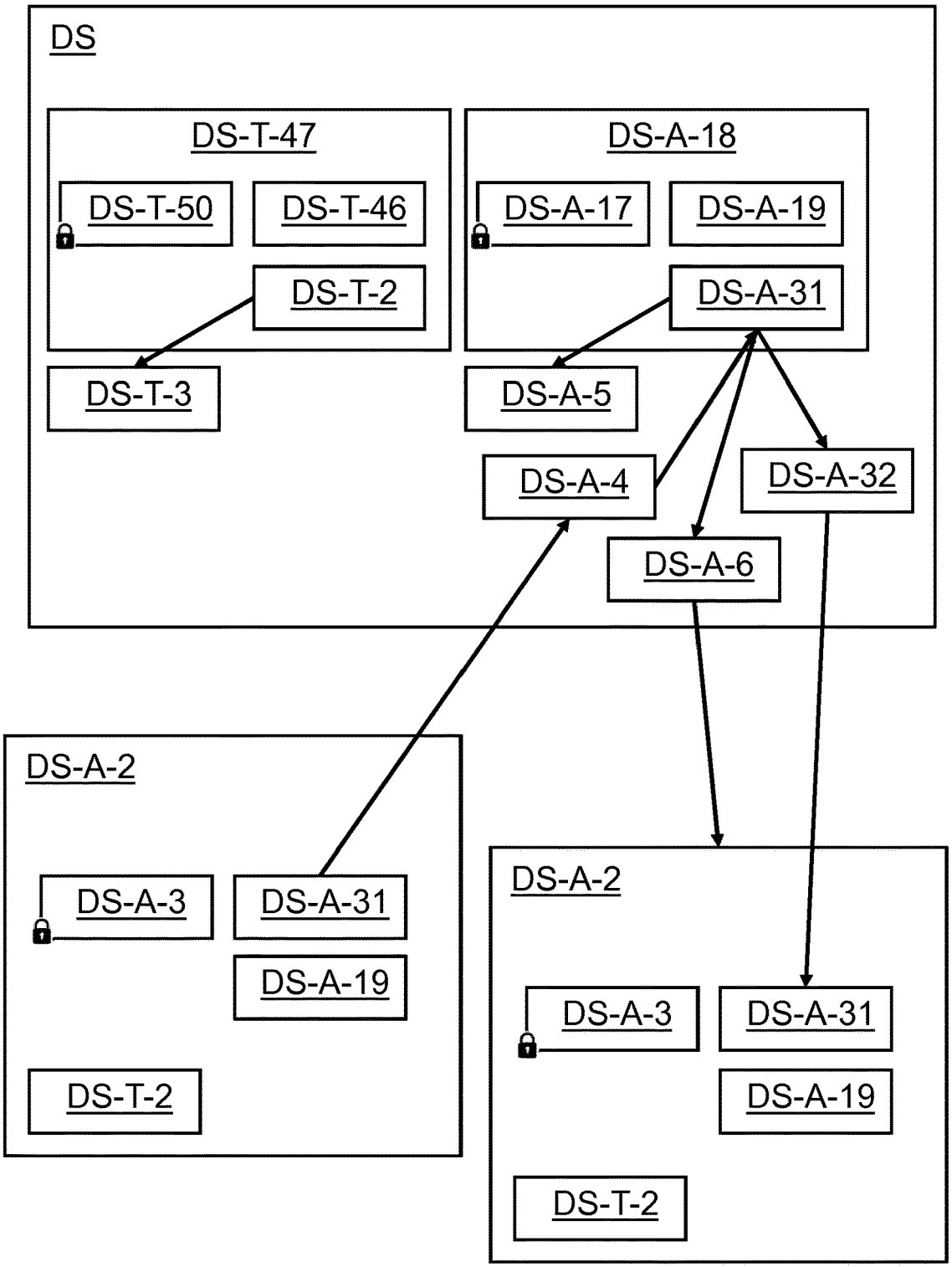
Figure 32:
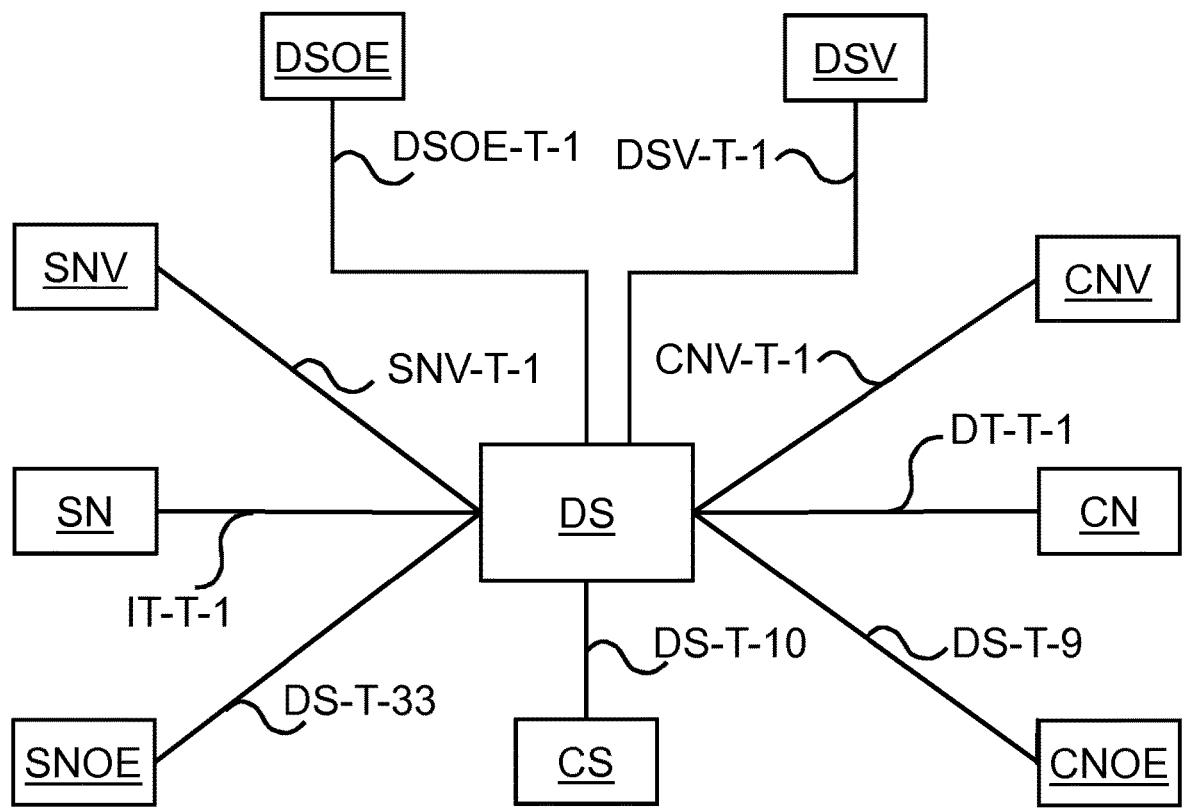
Figure 33:
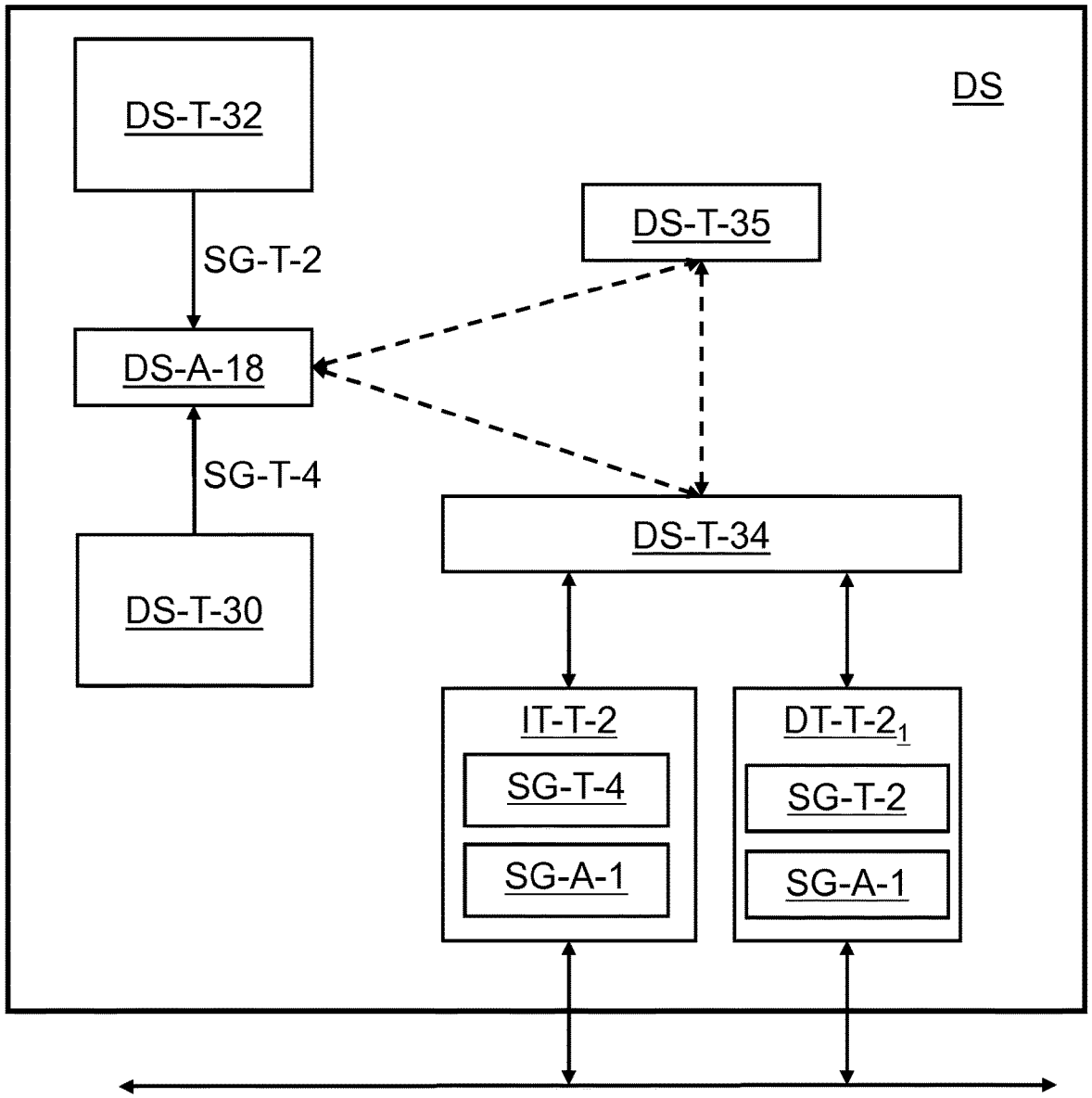
Figure 34:
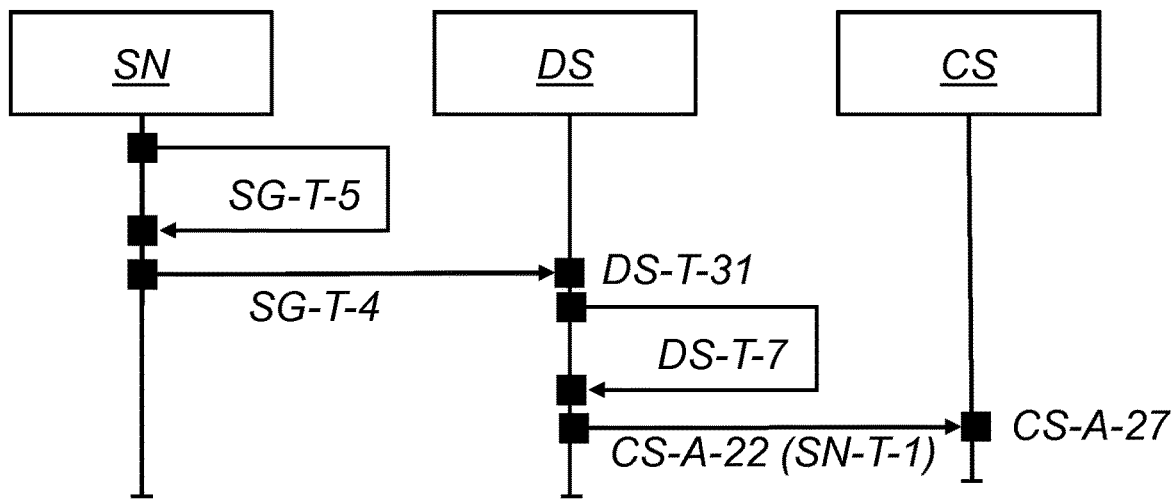
Figure 35:
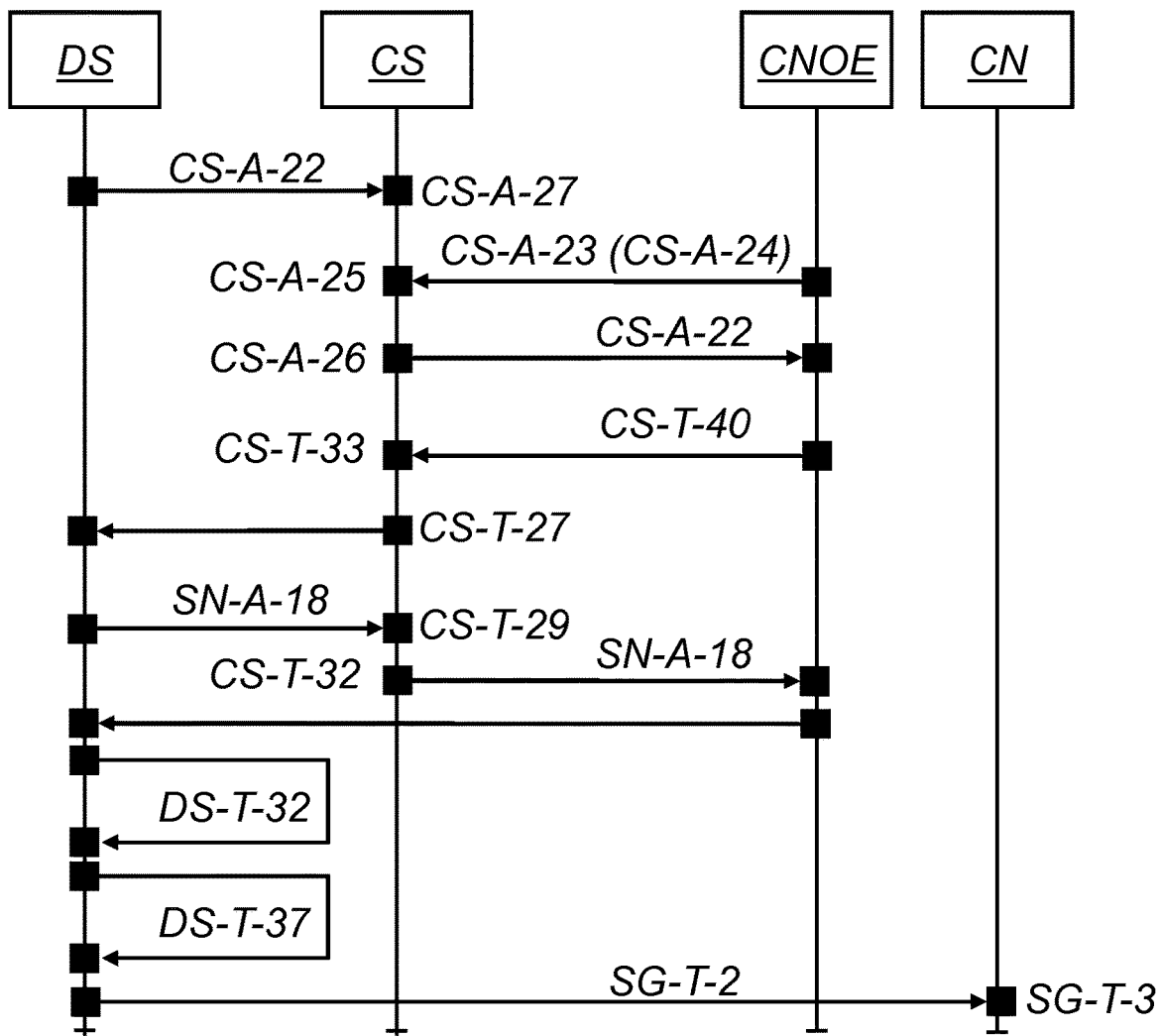
Figure 36:
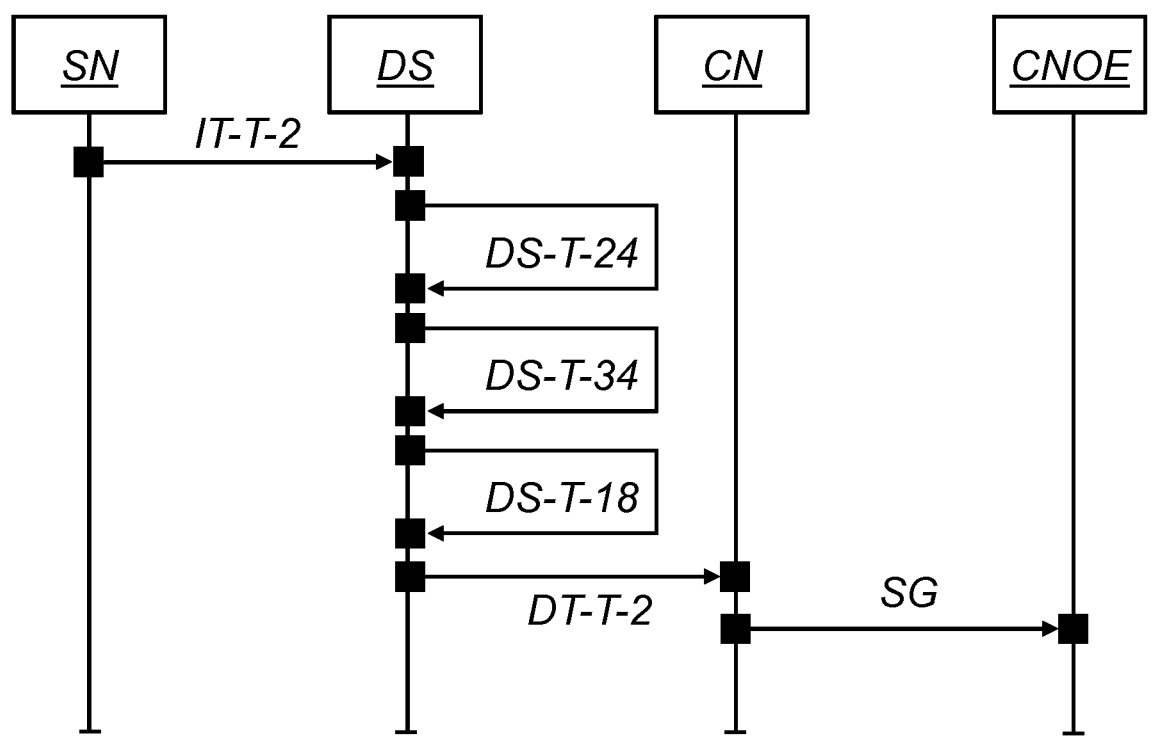
Figure 37:
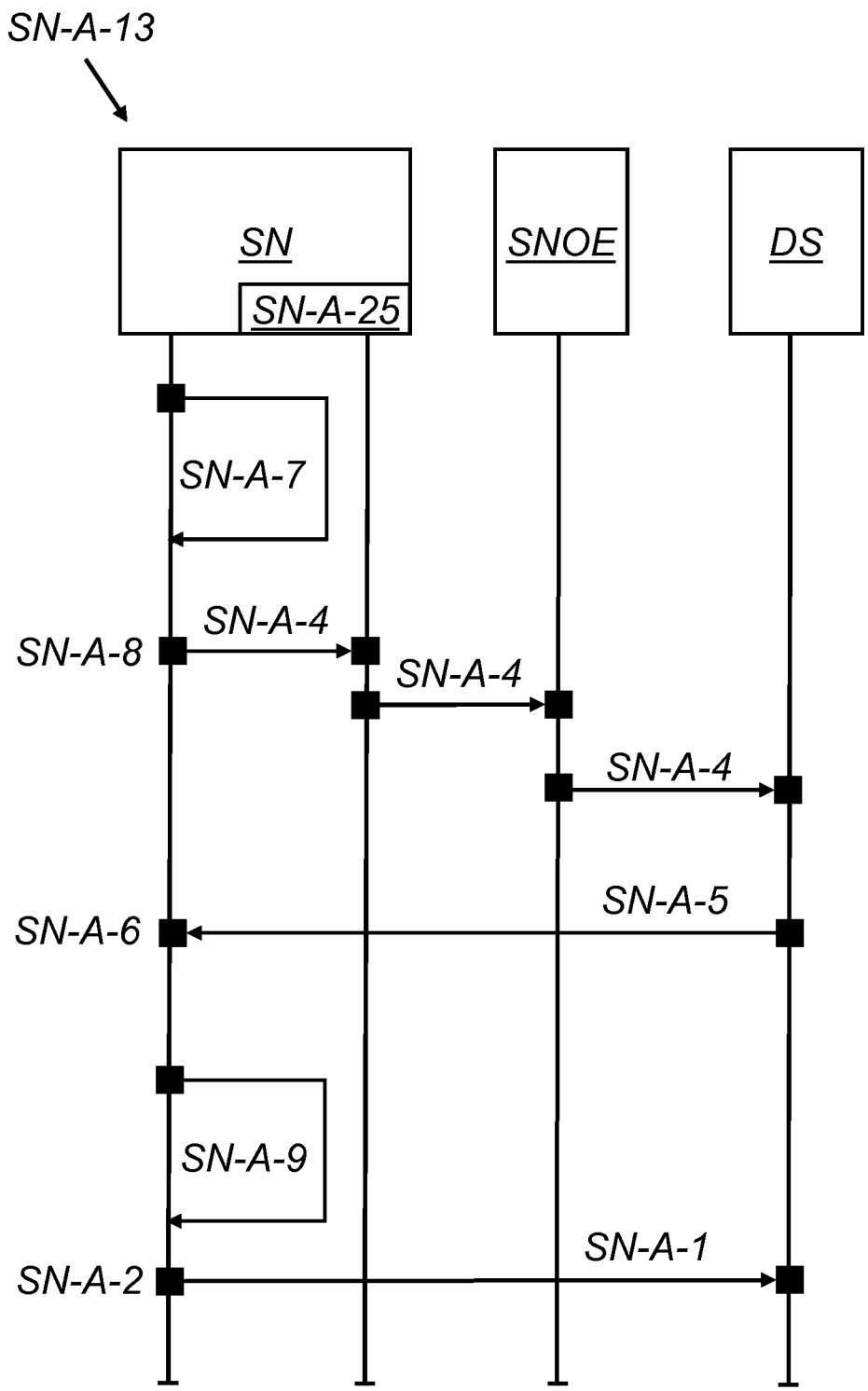
Figure 38:
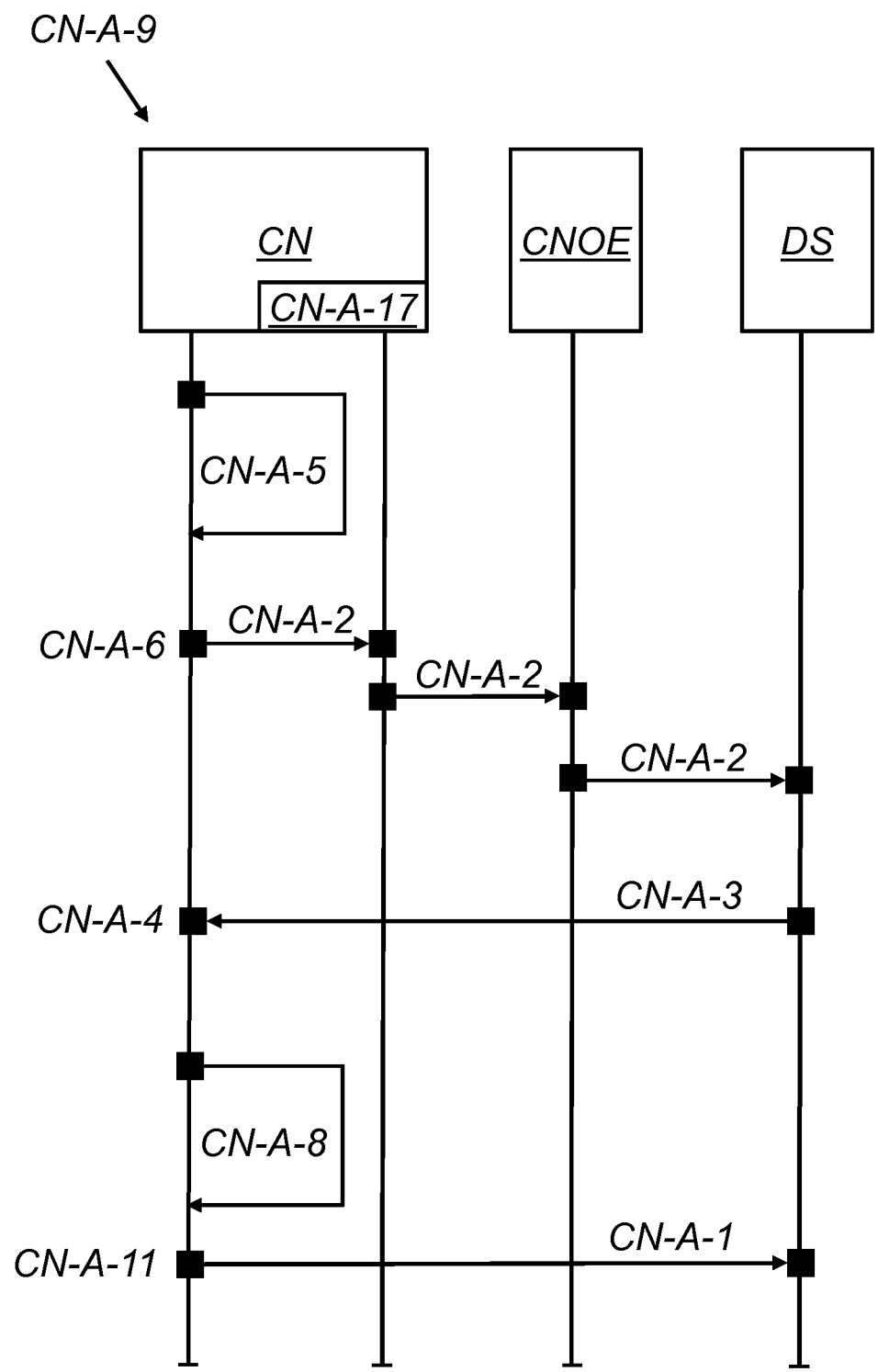
Figure 39:
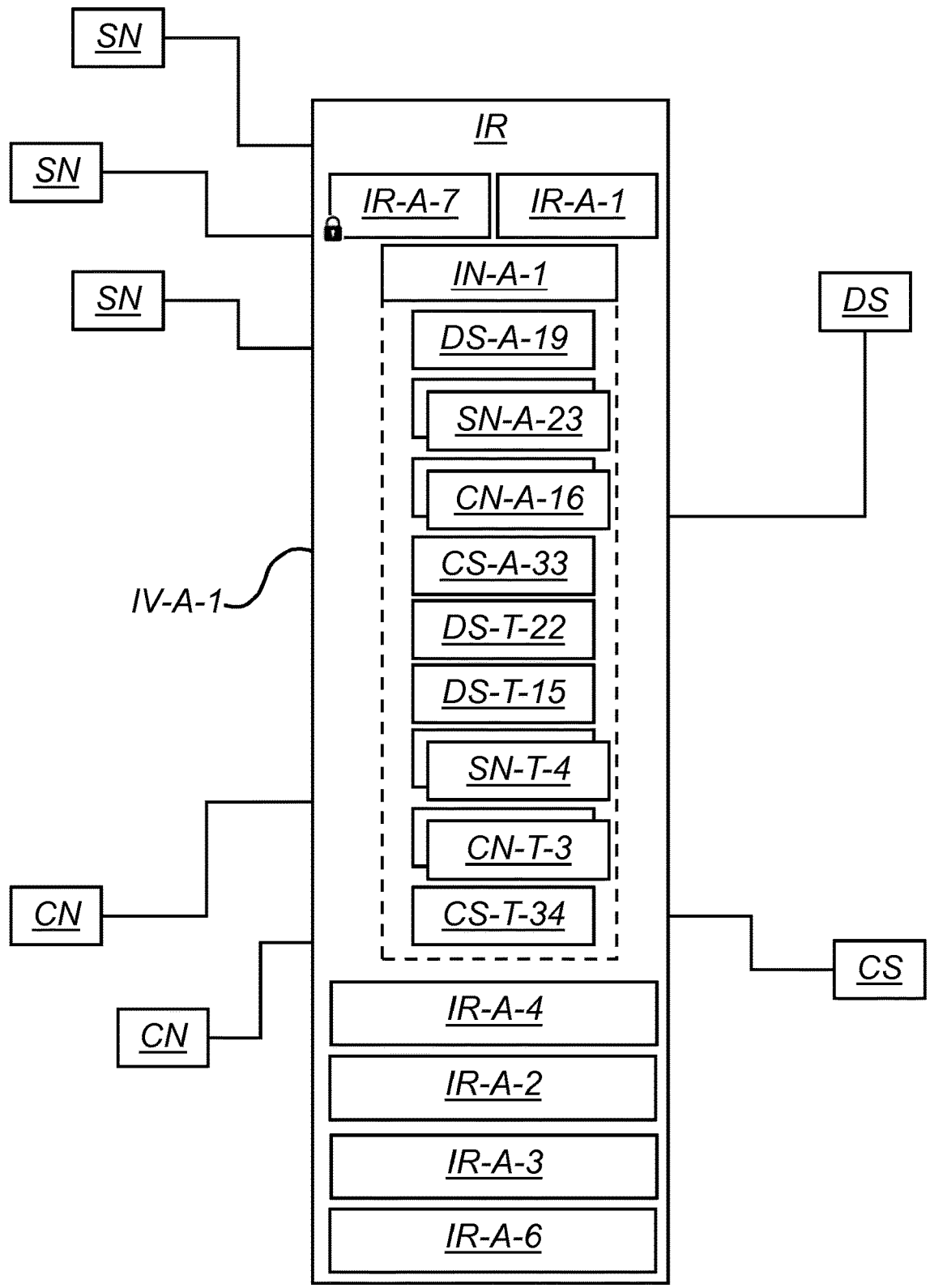
Figure 40:
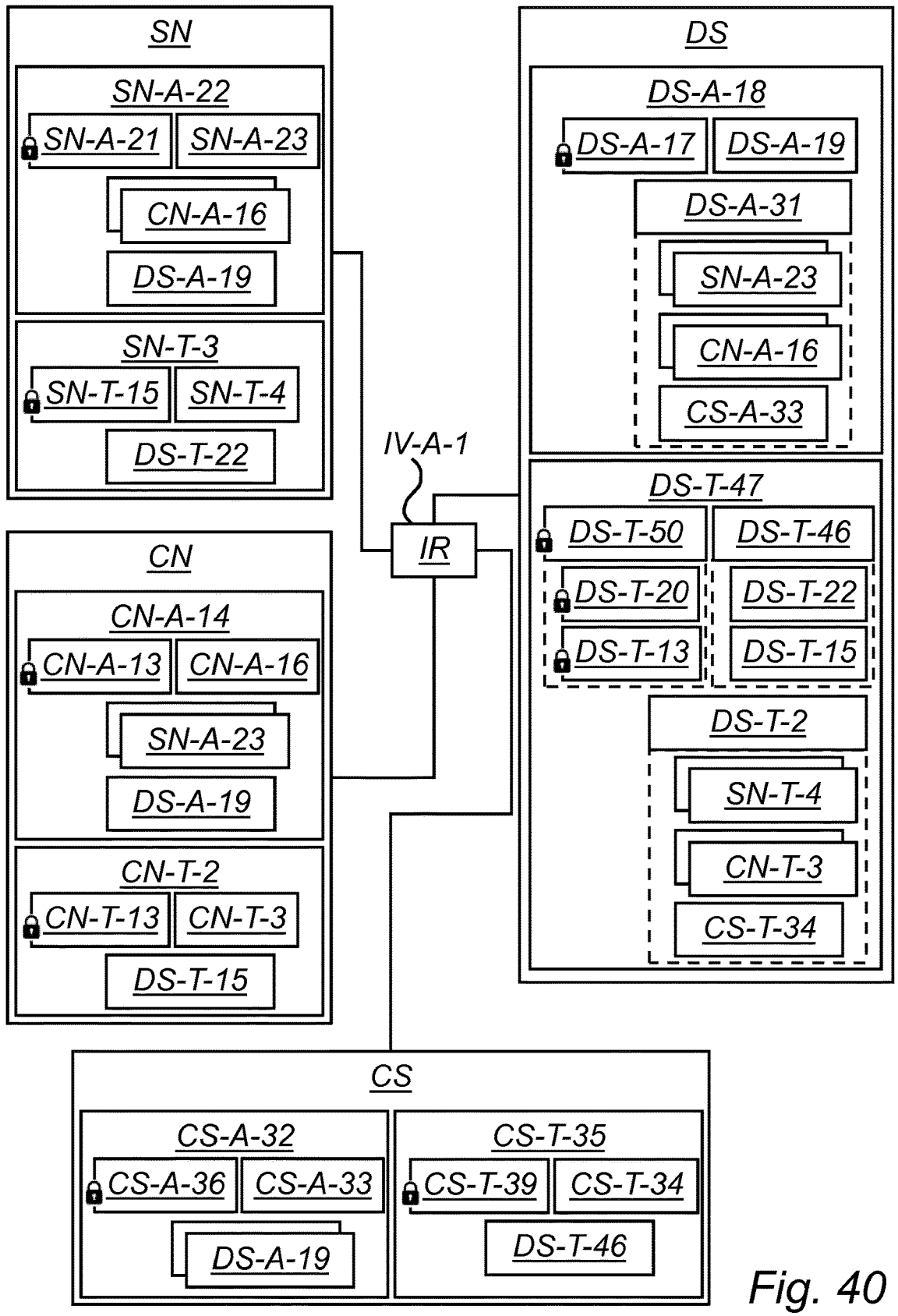
Figure 41A:
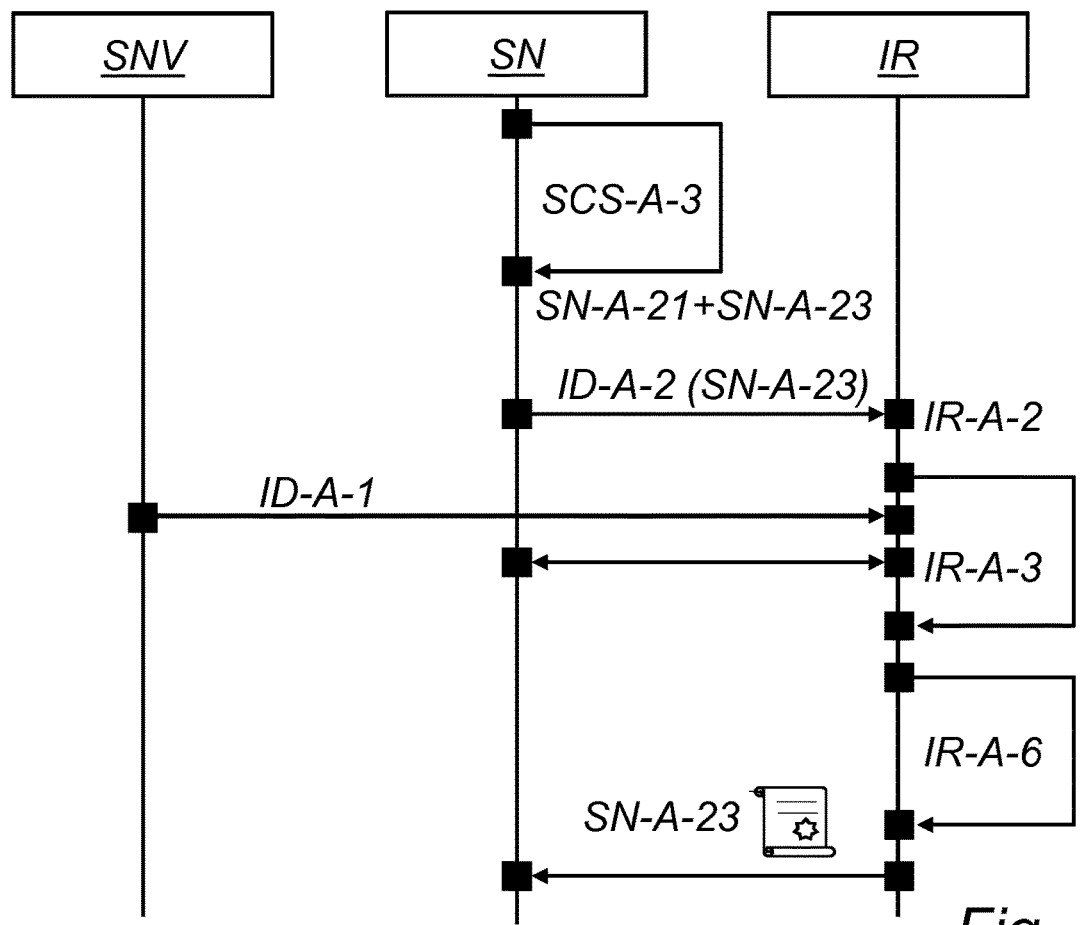
Figure 41B:
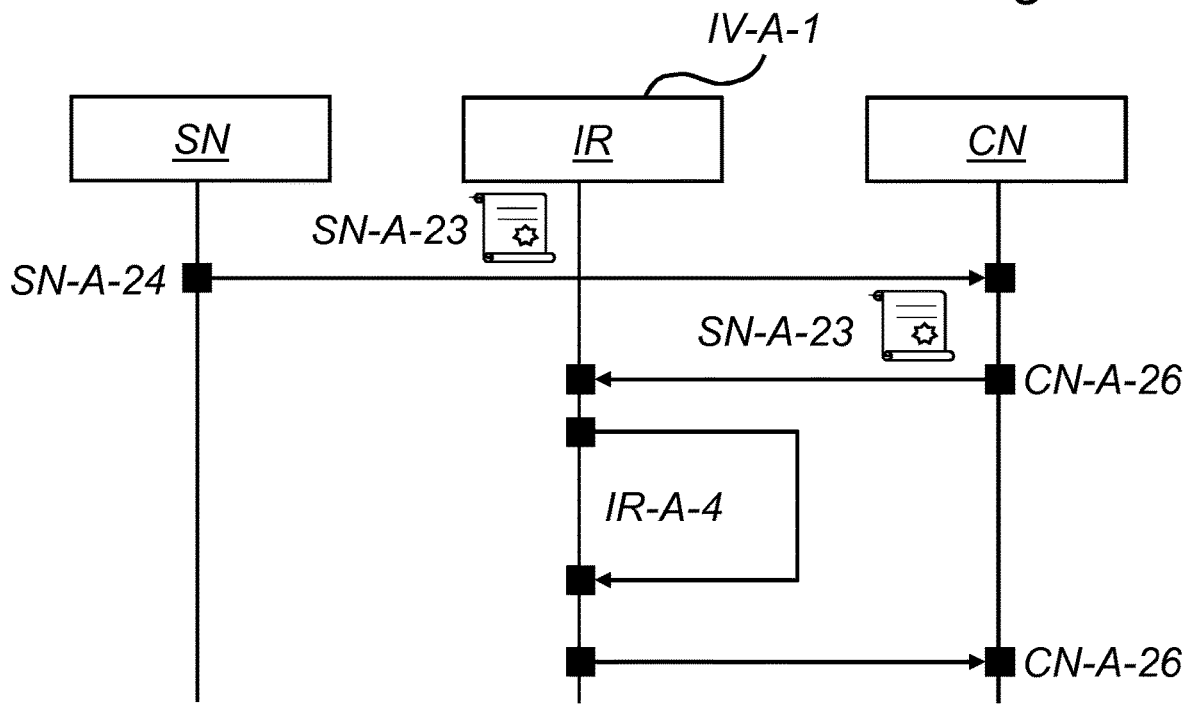

Embodiments of the invention are described in the following with reference to the drawings, where FIG. 1 illustrates an embodiment of a signal communication system according to the invention, FIG. 2a-2c illustrate an embodiment of a signal communication system according to the invention in more detail, FIG. 3 illustrates an embodiment of a distribution system switching control register, FIG. 4a-4b illustrate embodiments of distribution system signal representation switching parameter record registration and deregistration methods, FIG. 5 illustrate an embodiment facilitating quality of service measurements, FIG. 6 illustrates a special ability of the distribution system signal representation switching method in a preferred embodiment, FIG. 7 illustrates a signal communication system according to an embodiment of the present invention, FIG. 8a-9b illustrate examples of closed loop control configurations enabled by embodiments of a signal communication system of the present invention, FIG. 10-11 illustrate examples of open loop control configurations enabled by embodiments of a signal communication system of the present invention, FIG. 12-13 illustrate examples of sensor or measurement configurations enabled by embodiments of a signal communication system of the present invention, FIG. 14-15 illustrate examples of distributed sensor configurations and application thereof enabled by embodiments of a signal communication system of the present invention, FIG. 16-18 illustrate embodiments of a signal communication system showing details of a network layer, entity networks and sub-networks, FIG. 19-22 illustrate various embodiments of signal nodes of a signal communication system according to the invention, FIG. 23-26 illustrate various embodiments of client nodes of a signal communication system according to the invention, FIG. 27-28 illustrate various embodiments of a catalog system of a signal communication system according to the invention, FIG. 29-32 illustrate various embodiments of a distribution system of a signal communication system according to the invention, FIG. 33 illustrates an embodiment of signal label generation by the distribution system, FIG. 34 illustrates an embodiment of signal label insertion in the catalog system, FIG. 35 illustrates an embodiment of searching for a signal in the catalog system and registering a corresponding distribution system signal representation switching parameter record, FIG. 36 illustrates an embodiment of switching at the distribution system DS when a signal is transmitted from a signal node SN to a client node CN, FIG. 37 illustrates an embodiment of a signal node commissioning method, FIG. 38 illustrates an embodiment of a client node commissioning method, FIG. 39-40 illustrate various embodiments of an identity register of a signal communication system according to the invention, and FIGS. 41A and 41B illustrates embodiments of registering an identification and verifying an identification at the identity register.

DETAILED DESCRIPTION

System, FIGS. 1, 2a, 2b, 2c

FIG. 1 illustrates an embodiment of a signal communication system SCS according to the invention. The illustrated embodiment comprises three signal communication system entities SCS-A-1, one of these entities being a signal node SN, another being a client node CN and the last one being a distribution system DS. The signal node SN interacts physically with its environment as illustrated by arrows to and from physical properties PP. The client node CN comprises a client node signal data interface CN-A-15. The signal node SN is communicatively coupled to the distribution system DS, preferably at a transport layer, by an injection transport channel IT-T-1 and similarly the client node CN is communicatively coupled to the distribution system DS, preferably at a transport layer, by a distribution transport channel DT-T-1. The signal node SN and client node CN are communicatively coupled with each other, preferably at an application layer, via functionality of the distribution system DS, as will be described in more detail below.

The communicative coupling between the signal node SN and distribution system DS, and between the client node CN and distribution system DS at the transport layer may preferably be implemented based on electronic communication technology including digital networks.

For simplicity, only one of each entity type is illustrated in the figure, but as will be clear from the below, a preferred system comprises several signal nodes and/or several client nodes, and possibly also several distribution systems.

It is noted, that the use of application layer, transport layer and network layer herein is intended to indicate a hierarchical level of e.g. information, purpose or access, but that they do not necessarily correspond to specific layers of specific communication layer models from the literature, or may correspond to layers with different naming. Hence, the application layer is herein referring to the highest level where details about transmission are irrelevant but the actual content of the transmission, e.g. a signal, is available for use by applications. The transport layer is herein referring to a lower level dealing with the logistics of getting the content from sender to recipient reliably and securely but preferably without intermediate nodes getting access to the actual content, i.e. the signal. The even lower level used herein, the network layer, deals with the highly practical issue of navigating and converting between possibly different networks, different network technologies, etc. on the way from sender to intermediate node to receiver. Several further communication layers may be identified below, between or above the mentioned layers, for example a physical layer at the lowest level, or for example a further application layer at a higher strategic level. The layers as used herein may also when comparing with various communication layer theory be comparable to two or more layers, for example may the transport layer as used herein correspond to the collective role of two layers of other layer models, etc.

FIG. 2*a*-2*c* illustrate an embodiment of the signal communication system SCS in more detail. In accordance with the embodiment illustrated in the previous figure, this embodiment comprises the three signal communication system entities SCS-A-1: at least one signal node SN, at least one client node CN and at least one distribution system DS, and the respective communicative couplings by injection transport channel IT-T-1 and distribution transport channel DT-T-1. Due to complexity the drawing is for illustrative purposes split at the distribution system DS so that FIG. 2*a* illustrates the signal node SN and a related part of the distribution system DS, FIG. 2*b* illustrates the client node CN and a related part of the distribution system DS, and FIG. 2*c* illustrates the combined distribution system DS.

As shown in FIG. 2*a*, the signal node SN is arranged to interact physically with its environment and to convert between a physical property PP and a corresponding signal SG by means of a signal node physical property method SN-A-34. The signal node SN further comprises a signal node signal representation method SN-A-40 configured to provide a signal representation SG-A-1, e.g. an application layer packet, from a signal SG, e.g. used when a physical property PP is measured and should be transmitted through the signal communication system SCS as a signal representation SG-A-1. For the opposite direction, e.g. when a signal representation SG-A-1 is received through the signal communication system SCS and should be converted to a physical property PP, the signal node SN comprises a signal node signal representation interpretation method SN-A-39 to interpret a signal representation SG-A-1 into a signal SG.

A signal SG may thereby be established by converting a physical property into the signal, e.g. in relation to doing a measurement with a sensor, reading a state or input from e.g. a knob, etc. A signal SG may also be received by the signal node and converted into a physical property, e.g. by means of an actuator, transducer, etc. Various embodiments may comprise signal nodes SN that are only input signal nodes converting from physical properties to signals, or signal nodes SN that are only output signal nodes converting from signals to physical properties, or signal nodes SN that are combined input/output signal nodes. Various embodiments may comprise only input signal nodes, only output signal nodes, or a combination of input signal nodes and output signal nodes.

The signal node SN further comprises a signal node identity register SN-A-22 comprising a signal node identification SN-A-23, e.g. a certificate, corresponding to the signal node identity SN-A-21 of the signal node itself. The signal node identity register SN-A-22 also comprises one or more signal injection labels SG-T-4 used as handles for the respective signals SG that the signal node is able to manage, i.e. send and/or receive. In other words, the signal node identity register SN-A-22 manages data to be able to identify the signal node itself and each of its signals.

A signal node request method SN-A-37 of the signal node is arranged to transmit a signal node request SN-A-36 to convey a signal representation SG-A-1 to the injection transport channel IT-T-1. The signal node request SN-A-36 also involves the respective signal injection label SG-T-4 associated as handle for the particular signal SG, either as part of the signal representation SG-A-1 or together with the signal representation SG-A-1. Hence, a signal representation SG-A-1 of a signal SG at the application layer is thereby made into an injection transport representation IT-T-2 at the transport layer, e.g. a transport layer packet, to be able to be transmitted via the injection transport channel IT-T-1.

Similarly, for the opposite signal direction, i.e. when the signal node SN is receiving a signal SG to modify a physical property, the signal node SN comprises a signal node response method SN-A-33 to, at the application layer, receive a signal node response SN-A-32 conveying a signal representation SG-A-1 which was received in an injection transport representation IT-T-2 at the transport layer via the injection transport channel IT-T-1. The signal node response SN-A-32 also involves the respective signal injection label SG-T-4 associated as handle for the particular signal SG, either as part of the signal representation SG-A-1 or together with the signal representation SG-A-1.

The injection transport representation IT-T-2, regardless of direction from or to the signal node SN, thereby comprises at least a signal representation SG-A-1 and a signal injection label SG-T-4. The changing from signal SG to signal representation SG-A-1 preferably involves encryption to protect the signal SG at the application layer, while the changing from signal representation SG-A-1 to injection transport representation IT-T-2 preferably also involves encryption to protect the signal representation SG-A-1 at the transport layer.

The encryption at the application layer achieves in a preferred embodiment, that only the end recipient, in this case the client node CN, can obtain the signal SG from the signal representation SG-A-1. This makes the signal SG unavailable to the distribution system DS and any other intended and unintended intermediaries. The signal injection label SG-T-4 is preferably included in the injection transport representation IT-T-2 and thereby preferably encrypted at the transport layer together with the signal representation SG-A-1. Alternatively, the signal injection label may be attached to the injection transport representation IT-T-2 without being included in the transport layer encryption. In any way, the signal injection label SG-T-4 may be available to the distribution system DS even when the content of the signal representation SG-A-1 is obscured to the distribution system DS by coding or encryption at the application layer.

The distribution system DS comprises a distribution system injection transport representation interpretation method DS-T-24 to receive and interpret an injection transport representation IT-T-2 from the signal node SN via the injection transport channel IT-T-1. The interpretation of the injection transport representation IT-T-2 may e.g. imply decrypting, decoding or plainly reading to result in the distribution system DS obtaining the signal representation SG-A-1 and the signal injection label SG-T-4. The interpretation may preferably involve decryption at the transport layer, but will in preferred embodiments not be able to access the content of the signal representation SG-A-1, i.e. the signal SG.

A distribution system signal representation switching method DS-T-34 manages that the received signal representation SG-A-1 is forwarded to the one or more appropriate client nodes CN, as explained in more detail below. The distribution system signal representation switching method DS-T-34 also manages to forward signal representations SG-A-1 received from a client node CN to the appropriate signal node SN by means of a distribution system injection transport representation method DS-T-25. This method establishes an injection transport representation IT-T-2 from a signal representation SG-A-1 received from a client node CN and a signal injection label SG-T-4 related to the respective signal node SN, and conveys the injection transport representation IT-T-2 to the signal node SN on the injection transport channel IT-T-1.

FIG. 2b shows the client node CN and its client node signal data interface CN-A-15 being an interface to output and/or input signals SG for machine communication and/or presentation to a user. The client node CN further comprises a client node signal representation method CN-A-25 configured to provide a signal representation SG-A-1 from a signal SG, e.g. used when a signal SG is input to the client node via the client node signal data interface CN-A-15 and should be transmitted through the signal communication system SCS as a signal representation SG-A-1. For the opposite direction, e.g. when a signal representation SG-A-1 is received through the signal communication system SCS and should be output from the client node via the client node signal data interface CN-A-15, the client node CN comprises a client node signal representation interpretation method CN-A-24 to interpret a signal representation SG-A-1 into a signal SG.

A signal SG may thereby be established by the client node receiving an input, e.g. a control parameter, from a person or a machine, e.g. a controller, intended to be transmitted to a signal node SN to there be converted into a physical property, e.g. as a control parameter for an actuator, a thermostat, etc. A signal SG, e.g. a measurement value, may also be received from a signal node by the client node and output to a person for information or a machine for monitoring or e.g. as a feedback value in a control loop. Various embodiments may comprise client nodes CN that are only control client nodes receiving signals at the interface and transmitting to signal nodes for control, or client nodes CN that are only monitor client nodes providing received signals to persons or machines, or client nodes CN that are combined control/monitor client nodes. Various embodiments may comprise only control client nodes, only monitor client nodes, or a combination of control client nodes and monitor client nodes.

The client node CN further comprises a client node identity register CN-A-14 comprising a client node identification CN-A-16, e.g. a certificate, corresponding to the client node identity CN-A-13 of the client node itself. The client node identity register CN-A-14 also comprises one or more signal distribution labels SG-T-2 used as handles for the respective signals SG that the client node is able to manage, i.e. send and/or receive. In other words, the client node identity register CN-A-14 manages data to be able to identify the client node itself and each of its signals.

A client node request method CN-A-22 of the client node is arranged to transmit a client node request CN-A-21 to convey a signal representation SG-A-1 to the distribution transport channel DT-T-1. The client node request CN-A-21 also involves the respective signal distribution label SG-T-2 associated as handle for the particular signal SG, either as part of the signal representation SG-A-1 or together with the signal representation SG-A-1. Hence, a signal representation SG-A-1 of a signal SG at the application layer is thereby made into a distribution transport representation DT-T-2 at the transport layer to be able to be transmitted via the distribution transport channel DT-T-1.

Similarly, for the opposite signal direction, i.e. when the client node CN is receiving a signal SG, the client node CN comprises a client node response method CN-A-20 to, at the application layer, receive a client node response CN-A-19 conveying a signal representation SG-A-1 which was received in a distribution transport representation DT-T-2 at the transport layer via the distribution transport channel DT-T-1. The client node response CN-A-19 also involves the respective signal distribution label SG-T-2 associated as handle for the particular signal SG, either as part of the signal representation SG-A-1 or together with the signal representation SG-A-1.

The distribution transport representation DT-T-2, regardless of direction from or to the client node CN, thereby comprises at least a signal representation SG-A-1 and a signal distribution label SG-T-2. The changing from signal SG to signal representation SG-A-1 preferably involves encryption to protect the signal SG at the application layer, while the changing from signal representation SG-A-1 to distribution transport representation DT-T-2 preferably also involves encryption to protect the signal representation SG-A-1 at the transport layer. The encryption at the application layer achieves in a preferred embodiment, that only the end recipient, in this case the signal node SN, can obtain the signal SG from the signal representation SG-A-1. This makes the signal SG unavailable to the distribution system DS and any other intended and unintended intermediaries. The signal distribution label SG-T-2 is preferably included in the distribution transport representation DT-T-2 and thereby preferably encrypted at the transport layer together with the signal representation SG-A-1. Alternatively, the signal distribution label may be attached to the distribution transport representation DT-T-2 without being included in the transport layer encryption. In any way, the signal distribution label SG-T-2 may be available to the distribution system DS even when the content of the signal representation SG-A-1 is obscured to the distribution system DS by coding or encryption at the application layer.

The distribution system DS comprises a distribution system distribution transport representation interpretation method DS-T-17 to receive and interpret a distribution transport representation DT-T-2 from the client node CN via the distribution transport channel DT-T-1. The interpretation of the distribution transport representation DT-T-2 may e.g. imply decrypting, decoding or plainly reading to result in the distribution system DS obtaining the signal representation SG-A-1 and the signal distribution label SG-T-2. The interpretation may preferably involve decryption at the transport layer, but will in preferred embodiments not be able to access the content of the signal representation SG-A-1, i.e. the signal SG.

The distribution system signal representation switching method DS-T-34 mentioned above, further manages that the signal representation SG-A-1 received from the client node is forwarded to the appropriate signal node SN, as explained in more detail below. The distribution system signal representation switching method DS-T-34 also manages to forward signal representations SG-A-1 received from a signal node SN to one or more appropriate client nodes CN by means of a distribution system distribution transport representation method DS-T-18. This method establishes a distribution transport representation DT-T-2 from a signal representation SG-A-1 received from a signal node SN and a signal distribution label SG-T-2 related to the respective client node CN, and conveys the distribution transport representation DT-T-2 to the client node CN on the distribution transport channel DT-T-1.

The distribution system DS parts of FIGS. 2a and 2b are shown in combination in FIG. 2c. It shows the distribution system DS comprising a distribution system identity register DS-A-18, which among other comprises signal node identifications SN-A-23 and client node identifications CN-A-16.

Also shown in FIG. 2c is the distribution system signal representation switching method DS-T-34 mentioned above, and managing the transport representation and interpretation methods for communicating with the signal nodes and client nodes at the transport layer.

As shown, an injection transport representation IT-T-2 may be received at the distribution system DS from a signal node SN via an injection transport channel IT-T-1, be interpreted into a signal representation SG-A-1 and a signal injection label SG-T-4 by the distribution system injection transport representation interpretation method DS-T-24, be switched to one or more appropriate client nodes CN by the distribution system signal representation switching method DS-T-34 on the basis of the signal injection label SG-T-4, be changed into a distribution transport representation DT-T-2 comprising the signal representation SG-A-1 and now a respective signal distribution label SG-T-2, and conveyed to the respective client nodes CN via the distribution transport channel DT-T-1.

For the opposite signal flow, a distribution transport representation DT-T-2 may be received at the distribution system DS from a client node CN via a distribution transport channel DT-T-1, be interpreted into a signal representation SG-A-1 and a signal distribution label SG-T-2 by the distribution system distribution transport representation interpretation method DS-T-17, be switched to an appropriate signal node SN by the distribution system signal representation switching method DS-T-34 on the basis of the signal distribution label SG-T-2, be changed into an injection transport representation IT-T-2 comprising the signal representation SG-A-1 and now a respective signal injection label SG-T-4, and conveyed to the respective signal node SN via the injection transport channel IT-T-1.

In a preferred embodiment, a time synchronization service is provided in the signal communication system SCS, which may be a public time service, preferably a trusted or government NTP server, or a specific service included in the distribution system DS, or provided by a specific signal node SN, to distribute a system time, preferably as a master for which local time can be derived for various entities and users.

Switching, FIGS. 3, 4a, 4b, 5, 6

FIG. 3 illustrates a preferred embodiment where the distribution system further comprises a distribution system switching control register DS-T-45 comprising a number of distribution system signal representation switching parameter records DS-T-35 to be used by the distribution system signal representation switching method DS-T-34 when switching signal representations SG-A-1 between signal nodes SN and client nodes CN.

Each distribution system signal representation switching parameter record DS-T-35 comprises a signal injection label SG-T-4 and one or more associated signal distribution labels SG-T-2. In a preferred embodiment, the distribution system DS, for example by means of the distribution system identity register DS-A-18, also comprises a list of which signal injection labels SG-T-4 are associated with which signal node identifications SN-A-23, and which signal distribution labels SG-T-2 are associated with which client node identifications CN-A-16. In other words, the distribution system is able to receive a particular signal representation SG-A-1 labelled with a specific signal injection label SG-T-4 from a specific signal node SN and switch the same signal representation labelled with a specific, corresponding signal distribution label SG-T-2 to a specific, corresponding client node CN, and vice versa.

In the example of FIG. 3, a first distribution system signal representation switching parameter record DS-T-$35_1$ indicates a correspondence between the specific signal injection label SG-T-41 and the specific signal distribution label SG-T-$2_1$ so that when the distribution system for example receives a distribution transport representation DT-T-2 comprising a signal representation SG-A-1 with the specific signal distribution label SG-T-$2_1$, the distribution system signal representation switching method DS-T-34 may look up the specific distribution system signal representation switching parameter record DS-T-$35_1$ and initiate an establishment of an injection transport representation IT-T-2 with the signal representation SG-A-1 and the particular signal injection label SG-T-$4_1$ referred to in the distribution system signal representation switching parameter record DS-T-$35_1$, and the established injection transport representation IT-T-2 can then be forwarded to the signal node SN associated with the particular signal injection label SG-T-$4_1$.

Further in the example of FIG. 3, another distribution system signal representation switching parameter record DS-T-$35_2$ indicates a correspondence between the specific signal injection label SG-T-$4_2$ and two specific signal distribution labels SG-T-$2_2$ and SG-T-$2_m$ so that when the distribution system for example receives an injection transport representation IT-T-2 comprising a signal representation SG-A-1 with the specific signal injection label SG-T-$4_2$, the distribution system signal representation switching method DS-T-34 may look up the specific distribution system signal representation switching parameter record DS-T-$35_2$ and initiate an establishment of two distribution transport representations DT-T-2, both with the signal representation SG-A-1, but one of them with the particular signal distribution label SG-T-2$_2$ and the other with the particular signal distribution label SG-T-2$_m$. In a similar fashion, a further distribution system signal representation switching parameter record DS-T-35$_3$ indicates a correspondence between the specific signal injection label SG-T-4$_3$ and a number of specific signal distribution labels SG-T-2$_j$, SG-T-2$_k$ and SG-T-2$_n$.

In a preferred embodiment, the distribution system DS is configured to perform a distribution system signal representation switching parameter record registration method DS-T-37 to maintain the distribution system switching control register DT-T-45 by configuring the distribution system signal representation switching parameter records DS-T-35. An example is illustrated in FIG. 4a, wherein a new distribution system signal representation switching parameter record DS-T-35$_2$ is inserted into the distribution system switching control register DT-T-45. As the switch control of the distribution system is based on the distribution system switching control register DT-T-45, the new distribution system signal representation switching parameter records DS-T-35$_2$ may enable switching between injection transport representations IT-T-2 and distribution transport representations DT-T-2 configured in the regarded distribution system signal representation switching parameter record DS-T-35 by means of corresponding signal injection label SG-T-4 and signal distribution labels SG-T-2. Preferably, the distribution system signal representation switching parameter record registration method DS-T-37 may also be configured to add a further signal distribution label SG-T-2 to an already existing distribution system signal representation switching parameter record DS-T-35, thereby adding another specific client node to communicate a specific signal with a specific signal node.

Further, in a preferred embodiment, the distribution system DS is configured to perform a distribution system signal representation switching parameter record deregistration method DS-T-36 to maintain the distribution system switching control register DT-T-45 by re-configuring the distribution system signal representation switching parameter records DS-T-35. An example is illustrated in FIG. 4b, wherein a specific distribution system signal representation switching parameter record DS-T-35$_3$ is deleted from the distribution system switching control register DT-T-45. As the switch control of the distribution system is based on the distribution system switching control register DT-T-45, it is thereby no longer possible to switch between injection transport representations IT-T-2 and distribution transport representations DT-T-2 configured in the regarded distribution system signal representation switching parameter record DS-T-35$_3$ by means of corresponding signal injection label SG-T-4 and signal distribution labels SG-T-2. Preferably, the distribution system signal representation switching parameter record deregistration method DS-T-36 may also be configured to delete a specific signal distribution label SG-T-2 from a distribution system signal representation switching parameter record DS-T-35 without deleting the entire record, provided there are still at least one signal distribution label SG-T-2 remaining in the record, thereby preventing communication of a specific signal between a specific signal node and a specific client node.

In other words, when an agreement is entered for a client node CN to monitor or control a certain signal SG of a certain signal node SN, a corresponding relationship is inserted in the distribution system switching control register DT-T-45 as a distribution system signal representation switching parameter record DS-T-35, for example by means of the distribution system signal representation switching parameter record registration method DS-T-37. And likewise, when an agreement is ended regarding communication of a specific signal between a specific signal node SN and a specific client node CN, a corresponding relationship represented by a specific distribution system signal representation switching parameter record DS-T-35 is removed from the distribution system switching control register DT-T-45, for example by means of the distribution system signal representation switching parameter record deregistration method DS-T-36. One advantage thereby in a preferred embodiment is, that the signal nodes are relieved from the task of considering which client nodes should receive or are allowed to receive a particular monitoring signal, or which client nodes can or are allowed to apply a particular control signal to the signal node. Instead, it is the distribution system's task, regardless that the distribution system has no access to the signals SG themselves.

Because of the coding schemes of preferred embodiments of the invention, it will not be possible from outside, even with monitoring of network packets, to determine definitely, which signal nodes are transmitting which signals, and which client nodes subscribes to which signals from which signal node, and vice versa. A successful attack on the distribution system of any depth, even complete takeover, will in preferred embodiments due to the design of the signal communication system SCS of the invention, not give access to the transported signal values; in worst case only the switching parameter records telling which client nodes are interested in which kinds of signals of which signal nodes— not the signal values themselves.

FIG. 5 illustrates an embodiment comprising quality of service (QoS) aspects. The distribution system switching control register DS-T-45 of the distribution system DS comprises one or more distribution system signal transport classifiers DS-T-49 and/or one or more distribution system operational classifiers DS-T-51.

The distribution system signal transport classifiers DS-T-49 may for example be classifiers accounting for volume or frequency of signal representations SG-A-1 through the signal communication system SCS. Such measurements may be used for resource allocation, load balancing, scaling, billing, etc.

The distribution system operational classifiers DS-T-51 may for example be classifiers accounting for security events, non-delivering events or unavailability events happening in the signal communication system SCS, and may for example facilitate fault detection, finding bottlenecks, documenting the reliability of the signal communication system, penalize or block non-compliant nodes, etc.

FIG. 6 illustrates a special ability of the distribution system signal representation switching method DS-T-34 in a preferred embodiment. As described above, the system signal representation switching method uses the distribution system switching control register DS-T-45 with distribution system signal representation switching parameter records DS-T-35 to switch for example injection transport representations IT-T-2 to distribution transport representations DT-T-2 based on corresponding signal injection labels SG-T-4 and signal distribution labels SG-T-2. Further, as described above, one signal injection label SG-T-4 associated with one signal node SN may be associated with several different signal distribution labels SG-T-2, associated with the same or different client nodes CN. Proceeding with the example of FIG. 3, in particular the specific distribution system signal representation switching parameter record DS-T-35$_3$, the distribution system DS in the example of FIG. 6 receives an injection transport representation IT-T-2, which when interpreted turns out to comprise the specific signal injection label SG-T-$4_3$, which in the example of FIG. 3 is associated with three different signal distribution labels SG-T-$2_j$, SG-T-$2_k$ and SG-T-$2_n$. In a preferred embodiment, the distribution system signal representation switching method DS-T-34 is configured to copy the specific signal representation SG-A-11 of the injection transport representation IT-T-2 to each of the client nodes $CN_1$, $CN_2$ and $CN_3$ associated with each of the signal distribution labels SG-T-$2_j$, SG-T-$2_k$ and SG-T-$2_n$ corresponding to the signal injection label SG-T-$4_3$.

In other words, the distribution system signal representation switching method DS-T-34 is configured to initiate establishment of several distribution transport representations, in this example DT-T-21, DT-T-$2_2$ and DT-T-23, based on the same single signal representation, in this example SG-A-11, when discovering a one-to-many relationship in the respective distribution system signal representation switching parameter record DS-T-35. This feature facilitates an advantageous signal communication system SCS where a signal node SN only have to send a specific signal SG once, regardless of how many client nodes CN are subscribing to that signal, as the copying of the signal is performed by the distribution system DS, regardless of the fact that the distribution system in a preferred embodiment does not have access to the signal SG.

The copy functionality of the distribution system signal representation switching method DS-T-34 may for example comprise establishing the relevant number of distribution transport representations DT-T-2 based on the same signal representation SG-A-1 and different signal distribution labels SG-T-2. In another embodiment, the copy functionality may involve copying the injection transport representation IT-T-2 in the relevant number, and then replace the signal injection label SG-T-4 in each of the copies with different signal distribution labels SG-T-2 to establish distribution transport representations DT-T-2.

A system designed for communication of physical signals according to embodiments of the invention may have relatively low requirements to the involved signal nodes, at least with respect to maintenance of software residing and operating in the signal nodes. Thereby is achieved that signal nodes with relatively restricted functional abilities compared to conventional network connected signal nodes is achieved by the present invention. This may also be understood in a slightly abstract level as a conceptual "divide and rule" implementation in the sense that the signal nodes of the invention primarily are concerned with the task of establishing the signal representations on the basis of a converted physical property and transmitting this signal representation to one or relatively few distribution systems DS, optionally and preferably in a coded way so that a recipient, a client node CN, is able to receive a signal representation which is not read, tampered with or known by others. The signal node may thus be solely configured for obtaining the required signal and the local software and hardware may be focused on this task, whereas the distribution system in effect takes responsibility for the determining of relevant client nodes and the secure and reliable distribution to them and only them. By this design may also be achieved, in a preferred embodiment, that the signal nodes are not being known by other parties than the distribution system. In other words, for a preferred embodiment: the client nodes do receive signals but cannot contact or reveal the originating signal nodes; the signal nodes do transmit signals but cannot contact or reveal the receiving client nodes; the distribution system knows both the signal node and the client node, but cannot read or reveal the signal; and network observers can neither relate signal types or signal nodes to client nodes, or read the signals.

A conceptual way of describing this functionality is that the main purpose of signal nodes of the system is to handle signals and signal representations and communicate these with predefined distribution systems, whereas the main purpose of the distribution system is to orchestrate the distribution of the signal representations to and from signal nodes and client nodes.

This "dual simplification" is not only advantageous for the purpose of establishing a secure communication as such; it is also efficient in the sense that the energy applied for the purpose of establishing the efficient communication may be centralized or even reduced when considering the total energy consumption. This is e.g. due to the fact that the processing applied for security purposes in prior art signals nodes are not only time- and/or processor-consuming but also energy consuming, and the applied energy does not contribute to the overall functionality of the end-to-end communication system. It is a well-known fact that e.g. conventional computers applied for secure distribution of converted signals are very often heavily restricted with respect to performance due to firewall, anti-virus, inefficient updating of the security systems, etc. Besides the optimization of system-wide energy consumption, the inherent simplification that a signal node according to an embodiment of the invention is very operationally restricted with respect to orchestration of the distribution of signals from the signal node has the resulting effect that the signal node is basically difficult to manipulate, but it also implies that an optional success in relation to manipulation will have no or little effect in the sense that the distribution is basically handled by the central distribution system. A successful manipulation or hacking of a signal node may thus at maximum have the result that the signal representation is not relayed to the intended recipient, i.e. client node. Moreover, such malfunctioning may relatively easily and quickly be detected centrally as such manipulation or hacking may be detected as non-relayed signal representations. In a preferred embodiment, it is thereby not possible to manipulate a signal node even with invasive methods to cause a signal representation to be transmitted to the wrong recipient.

Application Examples, FIGS. 7, 8a, 8b, 8c, 9a, 9b, 10, 11, 12, 13, 14, 15

FIG. 7 illustrates a signal communication system according to an embodiment of the present invention. In the illustrated embodiment, the signal communication system is geographically distributed, with a distribution system DS, a number of signal nodes $SN_1$, $SN_2$, $SN_3$, and a client node CN located at very distant geographical locations. In addition, a client node operating entity CNOE, e.g. a user or data processing company, is illustrated at a different location than the client node CN. It is illustrated that a signal representation SG-A-1 is communicated between one of the signal nodes $SN_1$ and the client node CN via the distribution system DS. It is noted, that the widely spaced geographic locations in the illustrated embodiment are for illustrating the versatility of the present invention. In other embodiments, the geographical distribution of a signal communication system may be a singly country or city, or the system may be distributed within an apartment building, an office building or a production facility, or in a single room. In other embodiments, the geographical distribution may be wide, but the distribution constrained to facilities of a single, e.g. international, organization. In an embodiment, the signal node(s) are located close or relatively close compared to a number of widely distributed client nodes. This may for example be applied for distributing measurements of physical properties of a single relevant location, to several different client nodes around the world, or allowing control of physical properties at a single location from several locations. In an embodiment, the signal nodes are widely distributed geographically, while client node(s) are located relatively closer, e.g. applied in a system for monitoring physical properties of several different locations from one location, or controlling physical properties at several different locations from one location.

FIGS. 8a, 8b, 8c, 9a and 9b illustrate examples of closed loop control configurations enabled by embodiments of a signal communication system of the present invention. In FIG. 8a a client node CN comprises a client node application controller CN-A-41 and a client node electrical actuator CN-A-38 for controlling or regulating a physical property PP. A signal node SN with a signal node physical unit sensor SN-A-35 converts the physical property PP to a signal, which is transmitted to the client node CN, via a signal communication system SCS and distribution system DS in accordance with the invention described herein. The client node CN and its client node application controller CN-A-41 is configured to use the signal from the signal node as feedback to the controlling or regulation of the physical property PP. A client node operating entity CNOE may be inputting parameters, control aims, regulation constraints, etc. The client node CN and signal node SN may in the illustrated embodiment form a closed loop control system.

Instead of having an actuator itself, the client node CN may in an embodiment transmit a control signal to a signal node SN having a signal node electrical actuator SN-A-20, as illustrated in FIG. 8b. Here, a control signal is transmitted via a signal communication system SCS and distribution system DS in accordance with the invention described herein from the client node application controller CN-A-41 to a signal node electrical actuator SN-A-20, thereby affecting a physical property PP, and a signal node physical unit sensor SN-A-35 of another signal node measures, senses or detects the physical property PP and transmits it via the signal communication system SCS and distribution system DS in accordance with the invention described herein as feedback to the client node application controller CN-A-41.

FIG. 8c illustrates that the signal node electrical actuator SN-A-20 and the signal node physical unit sensor SN-A-35 may be incorporated in a single signal node SN being implemented to receive as well as transmit signals SG via the signal communication system SCS and distribution system DS in accordance with the invention described herein.

Control loops established by signal nodes and client nodes of the present invention may be applied for various purposes, and generally in all applications of controlling or regulating physical properties. In various embodiments, the controlled physical property may be the same or a different physical property than the physical property being monitored by the signal node SN.

For example, the signal node SN in the feedback loop may indicate the filling level or flow of a physical capacity, anything from level of a fluid in a container or energy in an energy storage, to amount of vehicles in a parking lot or on a highway, and the client node actuator in the forward path may comprise a valve, pump or switch to directly control filling or flow, or a signal, e.g. display, lights or a sign, to indirectly control filling or flow, e.g. of cars entering and leaving a parking lot.

For example, the signal node SN in the feedback loop may indicate a simple measurement of basic physical properties such as temperature, pressure, light, etc., and the client node actuator may comprise means that directly or indirectly changes such property, e.g. a heater, thermostat, pump, lamp, etc.

For example, the signal node SN in the feedback loop may detect unavailability of a physical resource, e.g. by using a level sensor, a presence detector, a counter, etc., and the client node application controller may provide for resupplying the physical resource when unavailable.

FIG. 9a illustrates a more specific example of a closed loop control system of a thermostatic radiator valve TRV implemented by a signal communication system of the present invention. The signal node SN comprises a signal node physical unit sensor SN-A-35 which is a temperature sensor, for example for measuring room temperature. The measured values are transmitted via the signal communication system SCS to a client node CN subscribing to the signal from the particular signal node. The client node comprises a client node application controller CN-A-41 comprising the logic of a thermostatic control system to cause an increase or decrease of heating in accordance with a measured temperature being below or above a set temperature value. The client node application controller CN-A-41 receives the signal SG with the measured room temperature from the signal node SN and compares it to a set temperature received from a client node operating entity CNOE, e.g. a tenant living in the particular room, or an indoor climate control system of an office building. Based on the comparison result, the client node application controller CN-A-41 controls a client node actuator CN-A-38 to open or close a radiator valve, thereby controlling the physical property PP of temperature in the room. The control system will reach a balance when the room temperature reaches the set temperature.

FIG. 9b illustrates an alternative embodiment using the principle of FIG. 8c above, where a signal node SN enabled to both send and receive signals are used in a thermostatic radiator valve solution to measure room temperature and operate a valve for hot water flow through a radiator. A client node CN receives the measured temperature through the signal communication network SCS, determines whether to turn heating up or down, and uses the signal communication system to forward control signals to the signal node actuator in accordance therewith.

Using the signal communication system of the present invention for the sensing and feedback transmission advantageously allows for example wireless connections for freedom and optimization of location, technology and design of valve and temperature sensor, respectively, while making it impossible for data intruders to inject false feedback data or break privacy of measured data. Further, the use of the signal communication system makes it possible to distribute the measured data for more than one client node, e.g. for different purposes such as local temperature regulation and remote monitoring of the indoor climate.

FIGS. 10-11 illustrate examples of open loop control configurations enabled by embodiments of a signal communication system of the present invention. FIG. 10 illustrates a client node CN comprising a client node application controller CN-A-41 operating on input or settings from, e.g., a client node operating entity, and establishing a control signal SG related to a physical property PP, accordingly. Via the signal communication system of the invention, the control signal SG is sent to the relevant signal node SN of that particular signal SG. The signal node comprises a signal node electrical actuator SN-A-20 for affecting the physical property PP on the basis of the received signal SG, thereby forming an open loop control system, e.g. a remote control. The illustrated embodiment may also form part of a closed loop control system by establishing a feedback between the physical property PP and the client node operating entity or client node application controller CN-A-41.

FIG. 11 illustrates an example of an open loop remote control system according to an embodiment of the invention. A signal node SN comprises a signal node electrical actuator SN-A-20 for controlling blinds of a window, thereby affecting a physical property PP, e.g. light and/or heat transmission through the window. A client node CN is via an embodiment of the signal communication system of the present invention registered to transmit control signals SG to the signal node SN. A client node operating entity CNOE, e.g. a user of the room, may control the client node CN to request the signal node to open or close the blinds. Further, a client node application controller of the client node may in an embodiment be set up to automatically request the signal node to open or close the blinds in dependency of a condition, e.g. a clock time, e.g. always close blinds at evening, and open at morning. Further, the client node may receive feedback, e.g. from a light sensor, temperature sensor, etc., and programmed accordingly so that blinds are also closed during daytime in case of direct sunlight or excessive heating. In this embodiment, the signal communication system protects the privacy of regarded users of the room, as the signal node cannot be manipulated to open or close the blinds by any unauthorized access.

FIGS. 12-13 illustrate examples of sensor or measurement configurations enabled by embodiments of a signal communication system of the present invention. In FIG. 12 a signal node SN comprises a signal node physical unit sensor SN-A-35 for converting a physical property PP into a signal SG. A client node CN subscribes to the particular signal form the particular signal node via a signal communication system SCS and distribution system DS in accordance with the invention described herein. The client node CN is configured to make the received signal or a processed result thereof available to a client node operating entity CNOE. The signal node SN and client node CN via the signal communication system thereby forms a monitoring or feedback system.

Monitoring or feedback systems by signal nodes and client nodes of the present invention may be applied for various purposes, and generally in all applications of monitoring physical properties or controlling on the basis of physical properties. The client node may just make the signal available for further use by the client node operating entity, or may comprise a client node application controller CN-A-41, actuator CN-A-38, display CN-A-17, etc., to process and act on the received signal. In various embodiments, the signal node SN and client node CN may be physically implemented in one box, or be located close to each other, or used for monitoring or controlling at geographically distant locations.

For example, the physical property PP measured or sensed by signal node SN may be a basic physical property such as temperature, proximity, pressure, light, etc., or it may be more complex detection where the detected physical property represents a state or level of a system, e.g. filling level or flow of a physical capacity, detection of a position of a mechanical or electrical switch or selector, detection of magnet force, electrical charge, acoustics, e.g. ultrasound, impulses, etc., indicative of a physical condition.

FIG. 13 illustrates a more specific example of a monitoring system of a temperature sensor implemented by a signal communication system of the present invention. The signal node SN comprises a signal node physical unit sensor SN-A-35 which is a temperature sensor, for example for measuring temperature of an object or environment. The measured values are transmitted via the signal communication system SCS to a client node CN subscribing to the signal from the particular signal node. The client node comprises a client node signal data interface CN-A-15 for outputting the measured temperature. The client node signal data interface CN-A-15 may for example be a web server or web service for allowing browser access to the measured temperature, or a client node local interface CN-A-17, e.g. a display, as described in further detail below, for immediate display of the received temperature value.

Using the signal communication system of the present invention for the sensing and feedback transmission advantageously allows for example wireless connections for freedom and optimization of location, technology and design of sensors, while making it impossible for data intruders to inject false measurement data or break privacy of measured data. Further, the use of the signal communication system makes it possible to distribute the measured data for more than one client node, e.g. for different purposes such as both local and remote monitoring.

FIGS. 14-15 illustrate examples of distributed sensor configurations and application thereof enabled by embodiments of a signal communication system of the present invention. As illustrated in FIG. 14, a client node CN may subscribe to signals established by signal node physical unit sensors SN-A-35 of several signal nodes SN. This concept may also be applied in closed loop regulation as described above, e.g. with the one controller basing the regulation on feedback from several sensors, or e.g. with the one controller regulating several properties or locations based on feedback from several sensors.

FIG. 15 illustrates an example of a practical application of a distributed sensor configuration according to an embodiment of the invention. In the illustrated example, three heat cost allocators $HCA_1$, $HCA_2$ and $HCA_3$ are implemented as signal nodes with signal node physical unit sensors SN-A-35 determining relative heat output of individual radiators. A heat value accumulator $\Sigma$ implemented as a client node subscribes to the heat value readings from the individual heat cost allocators HCA.

Due to the relative nature of heat cost allocation schemes, the individual heat values are not individually usable by themselves. When evaluated against the total sum of heat values from all individual heat cost allocators of a building, a relative heat consumption can be determined for each radiator. If further comparing these relative values with an absolute total consumption of the building, e.g. from a main consumption meter, such as a main heat meter or total absolute heating costs for the building, an absolute value of consumption and/or cost can be calculated for each heat cost allocator HCA.

In an embodiment, the heat cost allocators HCA further comprise a display and a client node for subscribing to calculated absolute consumption or cost values calculated by the heat value accumulator $\Sigma$ or client node operating entity CNOE, in which case the heat value accumulator $\Sigma$ also implements a signal node to transmit the calculated values to the heat cost allocators for display. In such an embodiment, the heat cost allocators comprising both a signal node and a client node may be hybrid signal client nodes HY-A-2 as described in more detail below. In an embodiment, instead of each heat cost allocator receiving cost values as client nodes, one display client node is provided in an apartment or billing unit for receiving and displaying the absolute values altogether for all heat cost allocators HCA associated with that apartment or billing unit.

Network, FIGS. 16, 17, 18

FIG. 16 illustrates an embodiment of a signal communication system showing details of a network layer. In this example and in accordance with a preferred embodiment, a number of signal communication system entities SCS-A-$1_1$ to SCS-A-$1_5$ are comprised in a signal communication system network SCS-N-5. At least one of the signal communication system entities SCS-A-$1_1$ is for example a signal node SN, and at least one of the signal communication system entities SCS-A-$1_2$ is for example a distribution system DS, as illustrated. A further of the signal communication system entities SCS-A-$1_3$ may preferably be a client node CN. The signal communication system entities SCS-A-1 comprise a signal communication system entity network interface SCS-N-3 to interface a signal communication system entity network SCS-N-1, which may be the same or different signal communication system entity networks for a number of the signal communication system entities. In the example of FIG. 16, four of the signal communication system entities SCS-A-$1_1$ to SCS-A-$1_4$ are connected to the same signal communication system entity network SCS-N-1. The signal communication system entity network SCS-N-1 may in various embodiments advantageously comprise or be connected to the Internet.

As also illustrated, the signal communication system entity network interfaces SCS-N-3 may be interfaces to different network technologies, for example different wireless and wired technologies, and a signal communication system entity SCS-A-1 may comprise several signal communication system entity network interfaces SCS-N-3 to interface several networks and/or using several different technologies. Different network technologies employed may for example comprise TCP/IP protocols such as IPv4, IPv6, various personal area networks PAN, e.g. Bluetooth or ZigBee, wireless network technologies under the WiFi label, i.e. based on IEEE 802.11 specifications, various Low-Power Wide-Area Network LPWAN technologies, e.g. NarrowBand IoT NB-IOT, LoRa-based technologies, various machine type communications, e.g. based on classical telecommunication networks such as LTE, GPRS, 3G, 4G, 5G, or LTE advanced for machine type communication LTE-MTC, etc., or other wired or wireless platforms.

Further illustrated in FIG. 16, and in accordance with the above description, a signal communication system entity SCS-A-1 when transmitting a signal SG establishes a signal representation SG-A-1 at an application layer level, which is represented as a signal communication system transport representation SCS-T-1 at a transport layer level, e.g. an injection transport representation IT-T-2 in the signal node's case. To add details of the network layer level to the description, the signal communication system transport representation SCS-T-1 is turned into a signal communication system network representation SCS-N-7, e.g. a network packet, for the network layer level. This may preferably be performed by a signal communication system network representation method SCS-N-8, which is arranged to establish a signal communication system network representation SCS-N-7 comprising the signal communication system transport representation SCS-T-1 and appropriate header $H_N$ and footer $F_N$ for the respective network technology and topology. For receiving, layers are handled in the opposite order, involving a signal communication system network representation interpretation method SCS-N-9 to interpret a signal communication system network representation SCS-N-7 to provide a signal communication system transport representation SCS-T-1.

In a preferred embodiment, each signal communication system entity SCS-A-1 comprises a signal communication system network identification SCS-N-2 to be used for addressing and/or for establishing the signal communication system network representations SCS-N-7, e.g. to provide one or more of integrity control, authentication and encryption at the network layer. Likewise, in preferred embodiments, each signal communication system entity SCS-A-1 comprises a signal communication system transport identification SCS-T-2 to be used for addressing and/or establishing the signal communication system transport representation SCS-T-1, e.g. to provide one or more of integrity control, authentication and encryption at the transport layer.

Conveying a transport representation via a network representation through a network may comprise arranging the transport representation in one or more network packets in accordance with the respective network technology and standard of the network, for example an IP packet, for example by adding a network header and footer specifying packet type, packet size, network addresses, e.g. IP addresses, etc. In other words, a number of transport representations may result in a lower or, typically, higher number of network representations to comply with respective network standards, best practices or local or immediate requirements, and the signal communication system network representation and interpretation methods SCS-N-8, SCS-N-9, are arranged to manage for example dividing transport representations into several network representations or forming one transport representation from a number of network representations. Similar mechanisms may in various embodiments apply also to the transformation between signal representations SG-A-1 and signal communication system transport representations SCS-T-1.

It is further noted, that a network path between two signal communication system entities SCS-A-1, e.g. between a signal node and a distribution system, may comprise any number of intermediary network nodes like routers, switches, bridges, gateways, etc., and may comprise several different routes to take between two signal communication system entities. This routing is preferably managed by conventional technologies.

FIG. 17 illustrates an embodiment, where two signal communication system entities SCS-A-1, e.g. a signal node SN and a distribution system DS, who are communicating signal communication system network representations SCS-N-7 in practice may be referred to as a signal communication system sub-network SCS-N-6 as indicated by the dashed, bold line. The two signal communication system entities SCS-A-1 of such a sub-network SCS-N-6 may preferably address the signal communication system network interface SCS-N-3 of each other directly, e.g. by means of or related to the signal communication system network identifications SCS-N-2. Also the sub-network SCS-N-6 may comprise different network technologies and network equipment, e.g. a gateway or system of gateways to enable connection between a signal node SN with Low-Power Wide-Area Network LPWAN technology, e.g. NarrowBand IoT NB-IOT, with a distribution system DS physically being implemented in a server cluster connected to a public wired network PWN, e.g. the Internet via optical fiber-based network technology. A sub-network SCS-N-6 may for example also preferably be established between a distribution system DS and a client node CN by means of a gateway or system of gateways to enable connection between the described distribution system DS and a client node CN accessing the Internet by means of a GPRS, UMTS, CDMA or LTE mobile data connection of a smartphone.

FIG. 18 illustrates an embodiment in more details in correspondence with the embodiments described above. A signal communication system entity network SCS-N-1 is connected to a signal node SN, a distribution system DS and a client node CN via signal communication network entity interfaces SCS-N-3. As the signal node SN and distribution system DS are addressing each other directly, they form a signal communication system sub-network SCS-N-6, and the same is true for the distribution system DS and the client node CN.

Considering the case where a physical property PP is measured by a signal node physical property method SN-A-34 to form a signal SG which should be transferred to the client node CN, the signal node SN applies the signal node signal representation method SN-A-40 to form a signal representation SG-A-1 of the signal SG. The signal node signal representation method SN-A-40 uses a signal node signal representation property register SN-A-44 with signal node signal representation properties SN-A-46 to form the signal representation SG-A-1. These signal representation properties may for example define rules for formatting, coding and/or cryptographic measures to apply at the application layer level to the signal SG to establish a signal representation SG-A-1.

Subsequently, a signal node injection transport representation method SN-T-9 of the signal node SN is arranged to provide an injection transport representation IT-T-2, also referred to as a signal communication system transport representation SCS-T-1, from the signal representation SG-A-1 on the basis of signal node injection transport representation properties SN-T-10 of a signal node injection transport representation property register SN-T-6, for example defining rules for formatting, coding and/or cryptographic measures to apply at the transport layer level.

Finally, before leaving the signal node SN, a signal communication system network representation method SCS-N-8 is arranged to make the injection transport representation IT-T-2 into a signal communication system network representation SCS-N-7.

The signal communication system network representation SCS-N-7 is transmitted through the signal node-distribution system sub-network SCS-N-6 and received at the distribution system DS by a signal communication system network representation interpretation method SCS-N-9 which is arranged to interpret the signal communication system network representation SCS-N-7 into the injection transport representation IT-T-2. As described above, e.g. with reference to FIGS. 2a-2c, the injection transport representation IT-T-2 is interpreted by the distribution system injection transport representation interpretation method DS-T-24, switched to the correct signal distribution label SG-T-2 by the distribution system signal representation switching method DS-T-34 on the basis of the signal injection label SG-T-4 and distribution system signal representation switching parameter records DS-T-35, and provided as a distribution transport representation DT-T-2 by the distribution system distribution transport representation method DS-T-18.

The distribution system injection transport representation interpretation method DS-T-24 uses distribution system injection transport representation properties DS-T-26 (shown in FIG. 30) of a distribution system injection transport representation property register DS-T-23 (shown in FIG. 30) to interpret the injection transport representation IT-T-2, and the distribution system distribution transport representation method DS-T-18 uses distribution system distribution transport representation properties DS-T-19 (shown in FIG. 30) of a distribution system distribution transport representation property register DS-T-16 (shown in FIG. 30) to provide the distribution transport representation DT-T-2. The distribution system injection transport representation properties DS-T-26 mirrors or likewise relates to the signal node injection transport representation properties SN-T-10 as they are used in encoding/decoding, possibly including formatting and/or cryptographic measures, to establish correspondence between the signal node and distribution system. Correspondingly, the distribution system distribution representation properties DS-T-19 mirrors or likewise relates to client node distribution transport representation properties CN-T-9 as they are used in encoding/decoding, possibly including formatting and/or cryptographic measures, to establish correspondence between the client node and distribution system.

The distribution system DS establishes a corresponding signal communication system network representation SCS-N-7 by a signal communication system network representation method SCS-N-8, and transmits it via a distribution system-client node sub-network SCS-N-6 to the client node CN, where it is received and interpreted into a distribution transport representation DT-T-2, also referred to as a signal communication system SCS-T-1, by a signal communication system network representation interpretation method SCS-N-9 of the client node CN.

In conformity with the process through the signal node SN, the client node CN uses a client node distribution transport representation interpretation method CN-T-7 to provide the signal representation SG-A-1 from the distribution transport representation DT-T-2 based on client node distribution transport representation properties CN-T-9 of a client node distribution transport representation property register CN-T-5, for example defining rules for formatting, coding and/or cryptographic measures necessary to interpret representations at the transport layer level.

Further, the client node CN uses a client node signal representation interpretation method CN-A-24 to provide the signal SG from the signal representation SG-A-1 based on client node signal representation properties CN-A-32 of a client node signal representation property register CN-A-31, for example defining rules for formatting, coding and/or cryptographic measures necessary to interpret representations at the application layer level. The client node signal representation properties CN-A-32 mirrors or likewise relates to the signal node signal representation properties SN-A-46 as they are used in encoding/decoding, possibly including formatting and/or cryptographic measures, to establish correspondence between the signal node and client node.

Also indicated in FIG. 18 are corresponding layers shown by horizontal lines. Thereby, it is clear that the signal node SN, distribution system DS and client node CN all apply respective methods and properties at the network layer level with corresponding representation and interpretation methods SCS-N-8, SCS-N-9 and the transport layer level with corresponding representation and interpretation methods SN-T-9, DS-T-24, DS-T-18, CN-T-7, and corresponding transport representation property registers SN-T-6, CN-T-5 (not shown for the distribution system for simplicity). However, which is also clear, is that in a preferred embodiment, only the signal node SN and client node CN comprises signal representation and interpretation methods SN-A-40, CN-A-24, with corresponding signal representation property registers SN-A-44, CN-A-31. In other words, the distribution system DS does not include an application layer with respect to signal communication, and is thereby not able perform interpretation or representation of a signal SG. Thereby a secure end-to-end communication of signals SG are established between the signal node SN and client node CN.

It is noted, that various embodiment may as part of the network layer comprise network components between the signal node and distribution system, and between the distribution system and client node, comprising network representation and interpretation methods to re-package and relay network representations SCS-N-7, without disclosing any of signals SG, signal representations SG-A-1 or injection- or distribution transport labels SG-T-4, SG-T-2, to such intermediary network components, as such components will lack the transport representation properties to decode the injection- or distribution transport representations IT-T-2, DT-T-2.

In the case where a control signal SG is established by a client node CN and should be transmitted to a signal node SN to affect a physical property PP, the principles described with reference to FIG. 18 still applies, mutatis mutandis, as described above, for example with reference to FIGS. 2*a*-2*c*, thereby establishing an end-to-end communication of signals SG between a client node CN and a signal node SN. Where several client nodes CN should receive a signal SG from one signal node SN, the distribution system may perform a copying of the signal and appropriate establishment of an individual distribution transport representation DT-T-2 based on individual distribution system distribution transport representation properties DS-T-19 for each client node CN, in accordance with the description above with reference to e.g. FIG. 6.

The establishment of a signal representation SG-A-1 from a signal SG by the signal node signal representation method SN-A-40 or the client node signal representation method CN-A-25 may preferably include establishment of a signal representation integrity protection tag SG-A-2, for example as a digital signature. The signal representation SG-A-1 may further preferably comprise a signal representation authentication tag SG-A-3 designating the originator of the signal representation SG-A-1, and which may also preferably be established as a digital signature. The digital signature of the signal representation SG-A-1 may preferably be established on the basis of a signal node authentication identity SN-A-52, or client node authentication identity CN-A-39, respectively, for example a private key of the signal node or client node, respectively. The signal representation interpretation method of the opposite part, i.e. the client node or signal node, respectively, may comprise a method to verify the signal representation integrity protection tag SG-A-2 and/or signal representation authentication tag SG-A-3, e.g. a digital signature, e.g. by using a signal node authentication identification SN-A-53 or a client node authentication identification CN-A-40, e.g. the other public key of an asymmetric cryptography key pair.

The signal node SN and client node CN may comprise methods to establish, manage and negotiate the signal representation properties SN-A-46, CN-A-32 with each other.

In a preferred embodiment, the signal nodes SN are implemented as undiscoverable on the network. They can thereby not be contacted directly without first revealing themselves, or by being revealed by alternative communication routes. As a distribution system DS, for example, may thereby not actively discover a new signal node SN on the network, the signal node SN is preferably by design provided to address one or a few dedicated distribution systems DS.

In a preferred embodiment, the signal nodes SN are implemented as non-responsive network nodes in the sense, that they initiate all communication to and from them, and do not respond to direct enquiries from other nodes. Thereby the signal nodes SN are not allowed to, or even more simply does not implement any methods to, receive a signal except as a response to its own inquiry, and the signal nodes SN in a preferred embodiment may thus transmit an inquiry to the distribution system DS in order to request transmission of any injection transport representations IT-T-2 buffered at the distribution system DS. The signal node injection transport response method SN-T-5 of the signal node SN may for example be arranged to request a transfer of an injection transport representation IT-T-2 from a distribution system DS. In this embodiment, the distribution system DS comprises or has access to an output buffer or other storage functionality to maintain injection transport representations IT-T-2 for each signal node SN until actively picked up by the relevant signal node SN or a timer expires or the storage capacity is exceeded. As the signal nodes SN are typically battery driven and/or optimized for power management, their pickup frequency may be rather low, for example be minutes, hours, days or even weeks, depending on their purpose and application of the received signals. Designing the structure of the system this way, making it impossible to contact the signal node directly, significantly reduces the requirements for security measures at the signal node SN. The pickup request from the signal node SN to the distribution system DS may in various embodiments be a simple, generic request, in the extreme case simply being an empty message, or it may comprise parameters or information, e.g. about only picking up specific types of information.

In an embodiment the signal node injection transport request method SN-T-7 or other functionality of the signal node SN is configured to determine a local energy budget and schedule transmission of said injection transport representation IT-T-2 on the basis thereof. Due to the signal nodes SN typically being battery driven and/or optimized for power management, they may advantageously schedule transmissions, for example sending of injection transport representations to the distribution system or picking up injection transport representations from the distribution system, for the least energy consuming communication. Factors to include in the scheduling may for example comprise availability of network resources and network routes, distances, expected or measured data traffic congestion times, transmission costs, etc. In some embodiments the grouping of transmissions and/or invoking a sleep mode at regular intervals may be acceptable and consume less energy. In some embodiments, the scheduling of transmissions may include the possibility of cancelling or rejecting a transmission, for example in case of low remaining battery. The signal node SN may in a preferred embodiment be configured to provide the injection transport representation IT-T-2, and thereby its signals SG, isochronously or according to a predefined schedule.

Signal Node, FIGS. 19, 20, 21, 22

Figure 19:
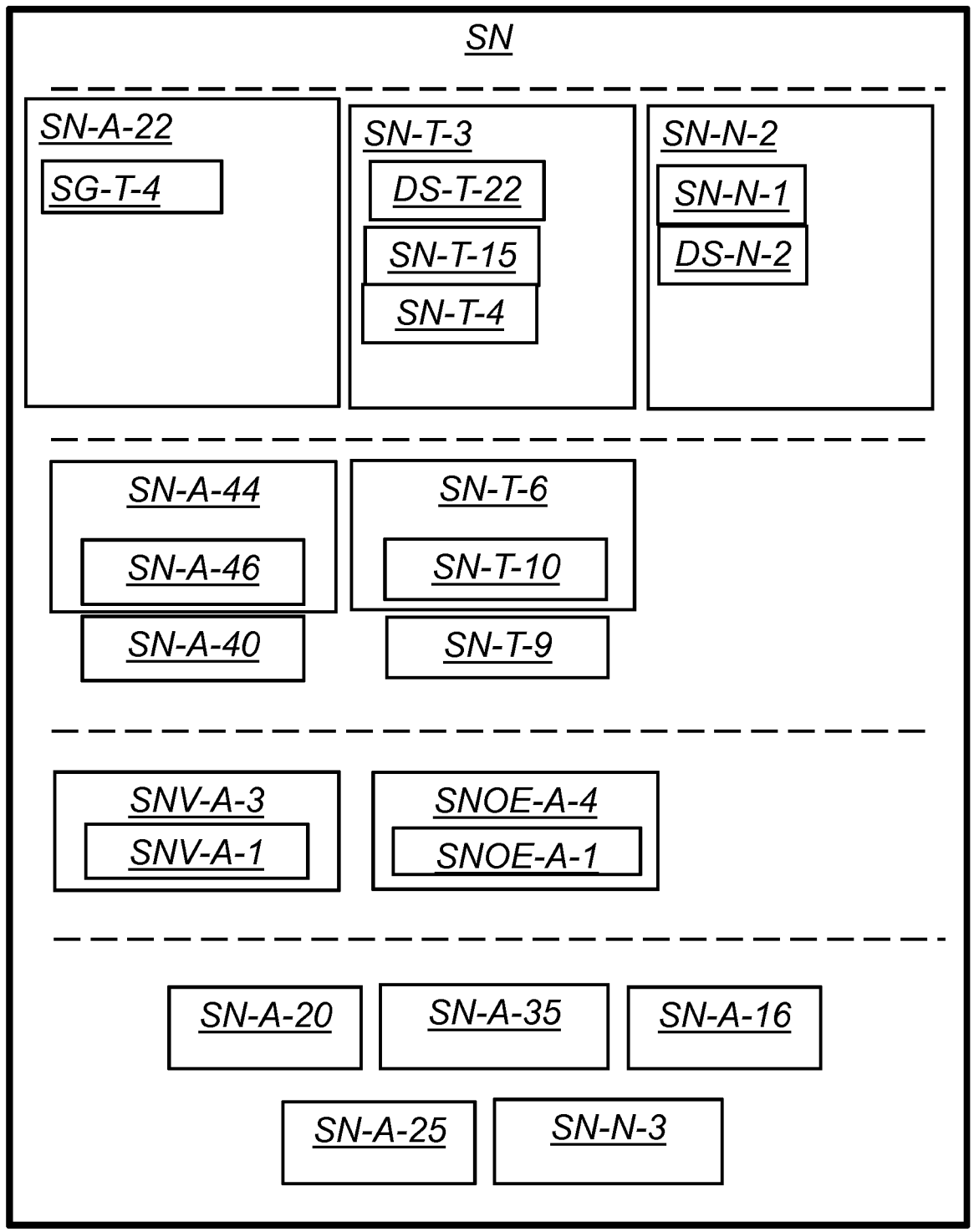

FIG. 19 illustrates an embodiment of a signal node SN with the various components, interfaces, stored information and implemented methods described herein.

The illustrated signal node SN is explained in hardware and software for outbound transmission of a signal representation SG-A-1 to an associated distribution system DS. The signal node SN may also be configured as inbound unidirectional, i.e. configured for receipt of a signal representation SG-A-1 from an associated distribution system DS. The signal node may also be configured as bi-directional in compliance with the present embodiment and the principles laid out in the description.

The illustrated embodiment shows signal node electrical actuator SN-A-20, signal node physical unit sensor SN-A-35 and a signal node data interface SN-A-16. The signal node data interface SN-A-16 is established for communication with external units, such as actuators, sensors, etc. It is noted that a signal SN according to other embodiments of the invention may comprise any combination of the above mentioned signal node electrical actuator SN-A-20, signal node physical unit sensor SN-A-35 and signal node data interface SN-A-16 depending on the desired use or design of the signal node in question.

The illustrated signal node comprises three registers, a signal node identity register SN-A-22, a signal node injection transport identity register SN-T-3 and a signal node network identity register SN-N-2.

The signal node identity register SN-A-22 may comprise a signal injection label SG-T-4 related to the signal type produced by the relevant signal node besides the described register content described in relation to FIG. 40. The signal injection label SG-T-4 should in effect describe or be somehow related to the type of the signal produced by the signal node, thereby facilitating that the distribution system DS may use this label as a basis for switching to relevant client nodes. In other words, the subsequent switching in a distribution system associated with the signal node may thereby switch based on a signal content description instead of e.g. an address designating the desired recipient, i.e. a client node. This is also advantageous in the sense that a relatively simple label may in effect end up being addressed and forwarded to a large number of recipients as the multiplexing or the addressing of a large number of clients nodes is performed by the associated distribution system DS. A small set of labels being used by a signal node and being represented by a few bits may thus lead to less energy consumption by the signal nodes.

The signal node injection transport identity register SN-T-3 may e.g. be implemented as described in relation to FIG. 40. The present signal node injection transport identity register SN-T-3 stores a, preferably private, signal node injection transport identity SN-T-15 and a corresponding signal node injection transport identification SN-T-4. The signal node transport identification register SN-T-3 further comprises a distribution system injection transport identification DS-T-22 for communication with a distribution system on the transport layer level.

The signal node SN moreover comprises a number of signal node network interfaces SN-N-3, e.g. for communicating with an associated the distribution system DS.

For such purpose, the signal node comprises a signal node network identity register SN-N-2. The signal node network identity register SN-N-2 comprises a signal node network identification SN-N-1 of a signal node SN and a distribution system injection network identification DS-N-2 of a corresponding distribution system DS.

As an example the signal node network identification SN-N-1 may e.g. comprise the IP address of the signal node SN and the distribution system injection network identification DS-N-2 may e.g. comprise the IP address of an associated distribution system DS.

The signal node SN may moreover comprise a signal node signal representation property register SN-A-44 and this register contains signal node signal representation properties SN-A-46 which is used by the signal node signal representation method SN-A-40 to form the signal representation SG-A-1.

The signal node SN also comprises a signal node injection transport representation property register SN-T-6 and the signal node injection transport representation property register SN-T-6 comprises signal node injection transport representation properties SN-T-10.

A signal node injection transport representation method SN-T-9 of the signal node SN is arranged to provide an injection transport representation, also referred to as a signal communication system transport representation, from the signal representation SG-A-1 on the basis of the signal node injection transport representation properties SN-T-10 of the signal node injection transport representation property register SN-T-6, for example defining rules for formatting, coding and/or cryptographic measures to apply at the transport layer level.

The signal node SN may moreover comprise a signal node vendor register SNV-A-3 comprising a signal node vendor identification SNV-A-1 identifying a signal node vendor SNV. The signal node vendor identification SNV-A-1 may for example be used to authenticate and authorize software coming from the signal node vendor SNV.

The signal node SN may moreover comprise a signal node operator register SNOE-A-4 comprising a signal node operating entity identification SNOE-A-1 identifying a signal node operating entity SNOE. The signal node operating entity SNOE may e.g. relate to the legal person or a legal entity operating the signal node SN. As specific illustrative examples, such legal operating entity SNOE may refer to an owner of rain sensors being signal nodes, a person offering a temperature sensor being a signal node, etc.

The signal node SN further preferably comprises a signal node local interface SN-A-25, preferably comprising a display or other indicator means, and may in some embodiments also comprise input means, e.g. a button, a keyboard, etc. The signal node local interface SN-A-25 may be controlled by a signal node local interface method SN-A-26.

Figure 21:
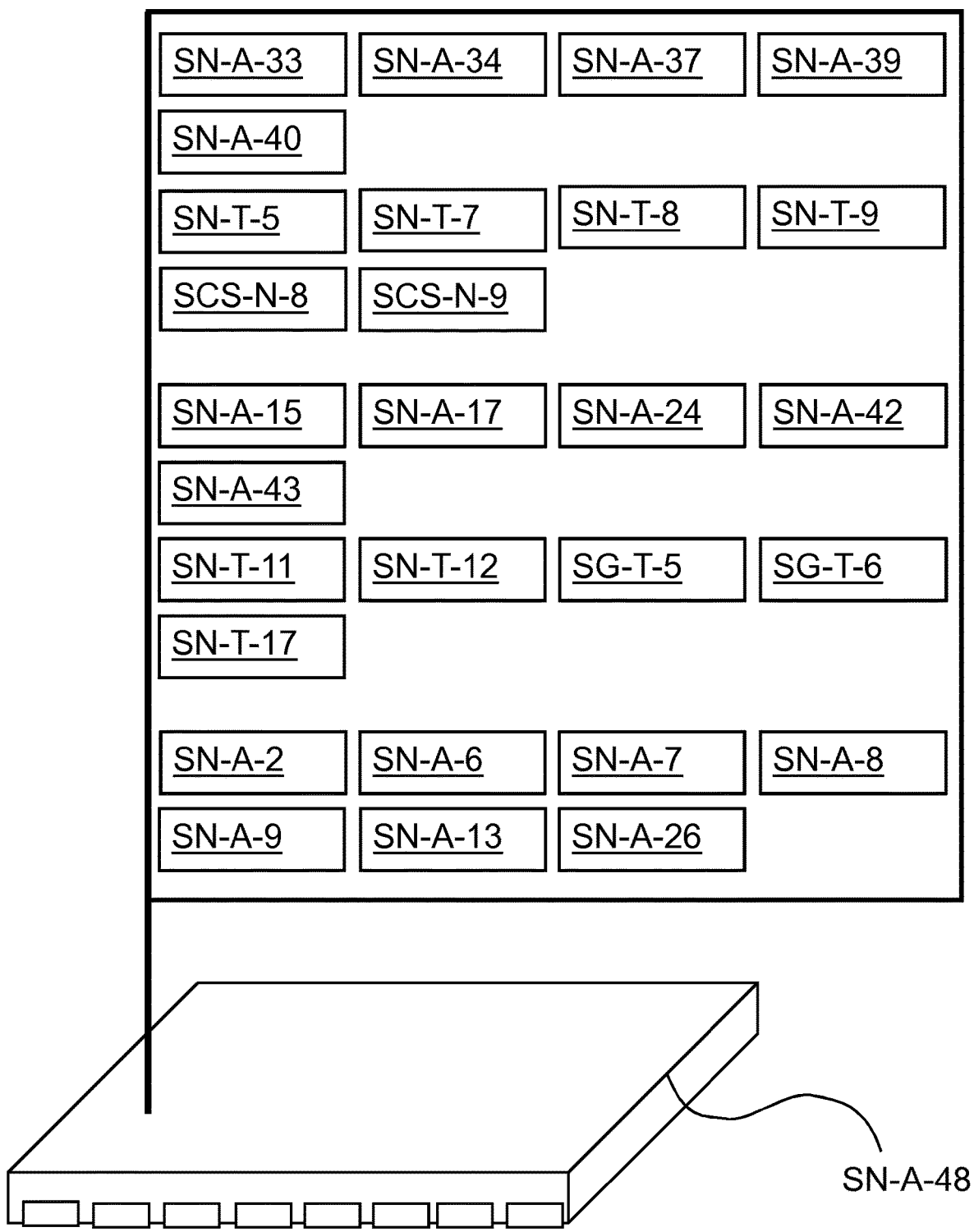
Figure 22:
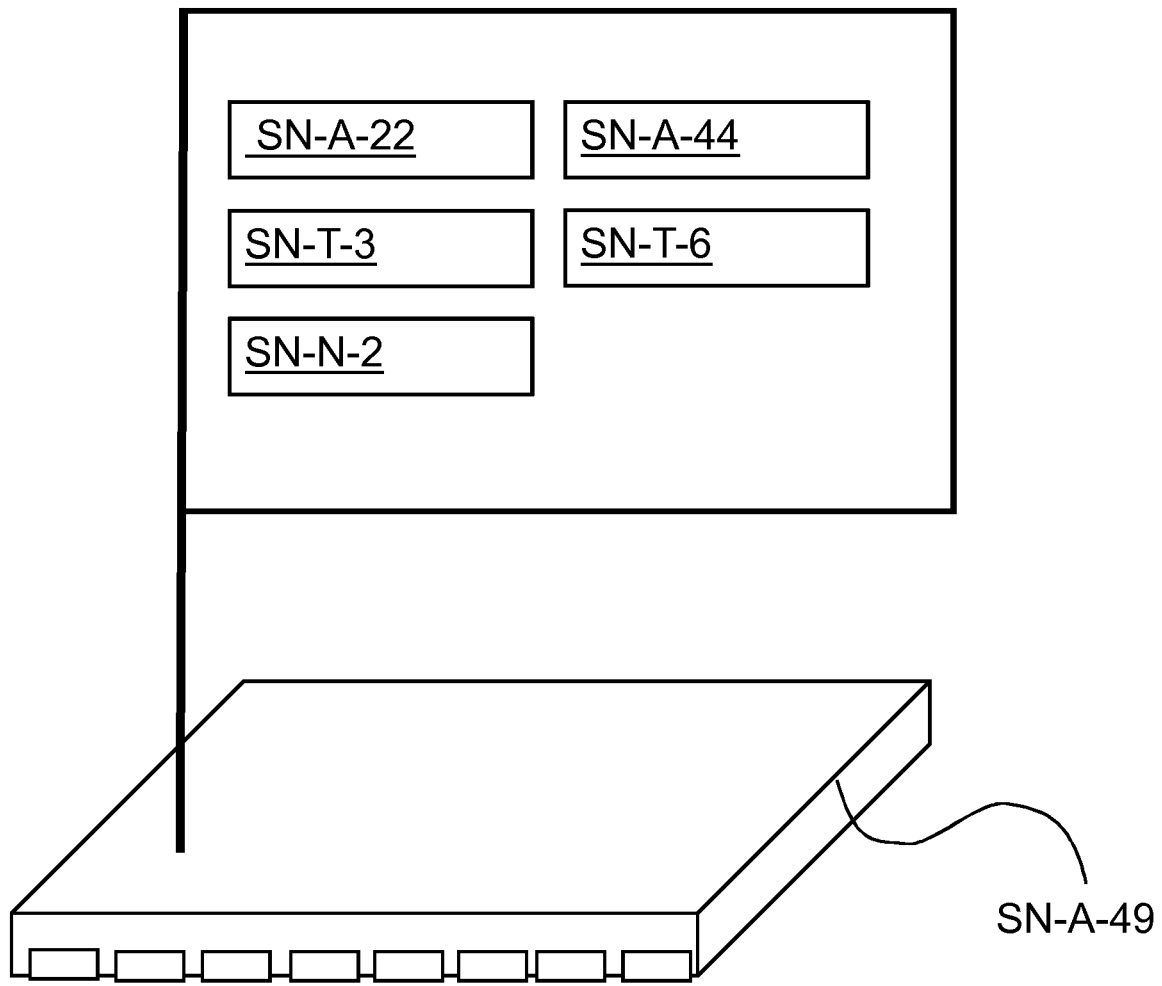

The illustrated signal node SN further operates according to the relevant methods of FIG. 21 while using the likewise registers illustrated in FIG. 22. The above-described processes and the necessary registers may be executed by appropriate hardware, integrated in one or several cooperating units, such as memories and signal processors.

Figure 20:
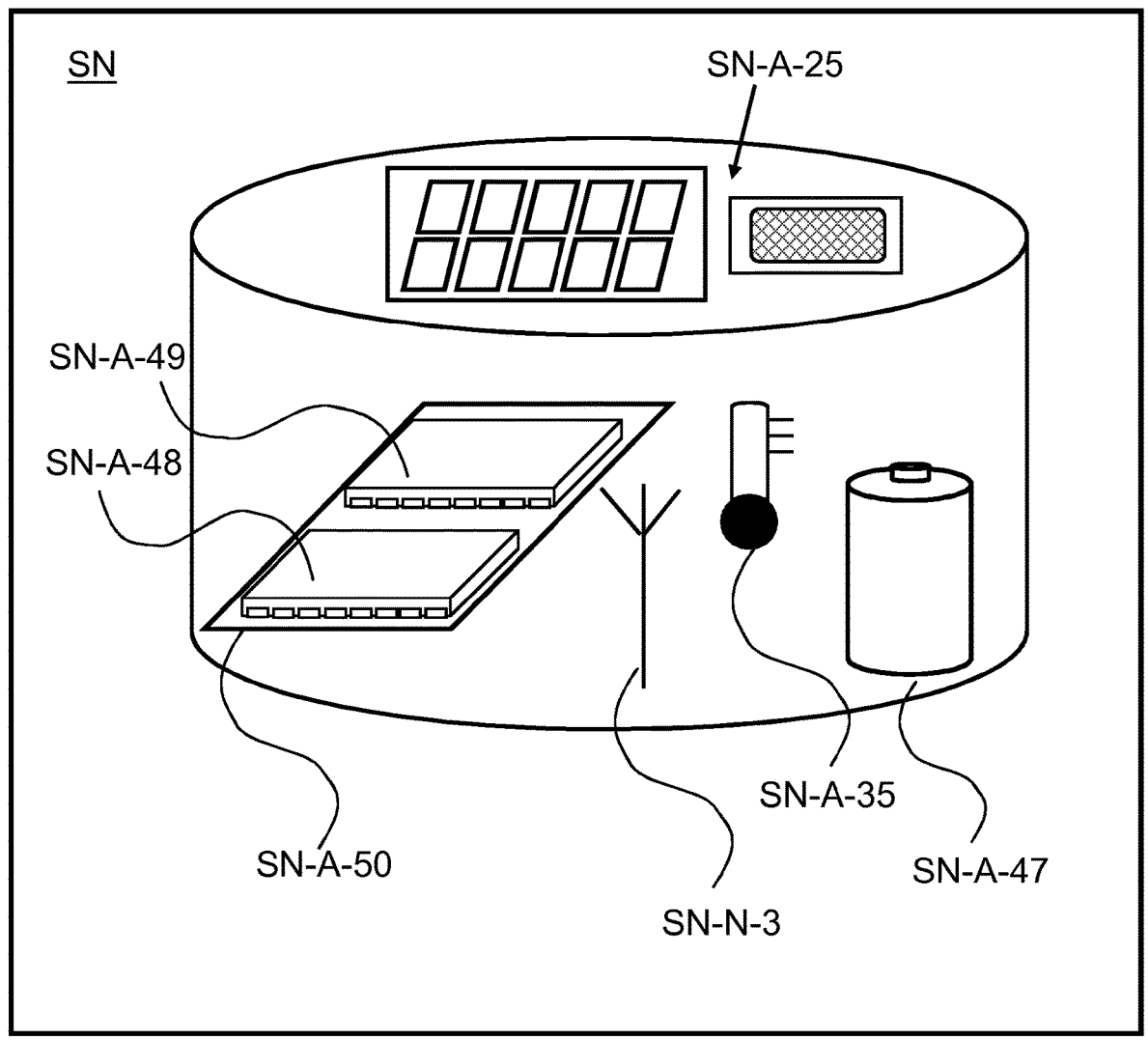

FIG. 20 illustrates an embodiment of a signal node SN of a signal communication system according to the invention. The signal node SN comprises one or more signal node physical unit sensor SN-A-35, for example a transducer in the sense of any means for converting between physical energies. In an alternative embodiment, the signal node further or instead comprises one or more signal node electrical actuators SN-A-20. The signal node SN may comprise sensor or actuator support circuitry, e.g. amplifiers, filters, signal processors, power supplies, actuator drivers, A/D- or D/A-converters, mechanical support functionality or structures, etc.

The signal node SN further comprises a signal node processor SN-A-48, a signal node memory SN-A-49, a number of signal node network interfaces SN-N-3, e.g. for communicating with the distribution system DS, and a signal node battery SN-A-47, or any other power supply. The signal node processor SN-A-48 and signal node memory SN-A-49 may advantageously be implemented as a signal node embedded system SN-A-50, for example in form of a System-on-Chip SoC, or the like.

The signal node SN further preferably comprises a signal node local interface SN-A-25, preferably comprising a display or other indicator means, and may in some embodiments also comprise input means, e.g. a button, a keyboard, etc.

Various advantageous embodiments of signal nodes may further comprise as separate components or as part of the signal node processor and memory, or as an external unit, e.g. dedicated security hardware for processing cryptography and certificates, a signal processor for preprocessing the signal before transmission or application to the transducer, and/or for preparing different versions, formats, qualities, etc., of the signal. The signal node processor SN-A-48, which may be implemented as one processor component or a system of processors, is preferably configured to control the data gathering and/or control of the signal node physical unit sensor SN-A-35, or a signal node electrical actuators SN-A-20, and control the transmission and/or receipt via the communication interface SN-N-3.

Any suitable integrated circuit, e.g. a microprocessor, a central processing unit, a digital signal processor, or dedicated/customized devices such as FPGAs, ASICs, etc., may implement the signal node processor SN-A-48. The signal node processor SN-A-48 may for many useful applications advantageously be implemented by hardware having integrated peripherals, e.g. A/D-converters, D/A-converters, memory, clocking, communication interfaces, etc. A signal node memory SN-A-49 is provided for storing signal node properties and identifications, various registers and data as described above. Further, the signal node memory SN-A-49 may be used for temporary or long term data storage or logging of measured signal values or received control signals, responses or error messages, etc. The signal node memory may be distributed in a number (including zero) of read-only parts and a number of rewritable parts, and may be distributed among and/or integrated in any integrated circuitry used for example for signal node processor SN-A-48, etc.

As mentioned above, a signal node SN may be categorized as an input signal node for converting from physical properties to signals, e.g. for measuring a property, an output signal node for converting signals to physical properties, e.g. for controlling a property, or a combination thereof. For input signal nodes, the transducer may e.g. be a simple sensor, e.g. a temperature-, strain- or light-sensitive component such as for example a PTC resistor, a strain gauge, a photodiode, an acoustic sensor such as a microphone, e.g. a speech sensor, etc., or a knob, a switch, a selector, or other simple input means. Also more advanced transducers, meters or input devices may be used for converting physical properties to a signal, for example an ultrasonic flow meter, a pollution meter, a smoke detector, etc. For output signal nodes, the transducer may e.g. be a directly or indirectly electrically controlled actuator, e.g. for changing the state of a mechanical arrangement, e.g. a window opener, a water valve, a locking mechanism, an electrical circuit e.g. a motor, a heater, a light source, a loudspeaker, various kinds of indicators, etc.

The signal node network interface SN-N-3 may, though depicted as an antenna, be any kind of communication interface suitable for exchanging injection transport representations with a distribution system according to the invention. In various preferred embodiments, the communication interface supports one or more common standards or implementations of at least layers 1-4 of the OSI model, i.e. the physical, link, data and transport layers, in order to utilize commonly available private or public networks and communication channels for transporting information between signal nodes and distribution system, possibly via a number of routers, relays, access points or other networking units. With the Internet currently being a very common, available and accessible communication medium, a communication interface supporting transport over the Internet is currently preferred, e.g. in accordance with a TLS and TCP/IP or UDP/IP protocol suite. For the physical transport, one or more commonly supported and available technologies such as currently various LPWAN, IEEE 802.11, GPRS, LTE, ZigBee, Bluetooth, etc., are preferably implemented in the communication interface, and the low-level technologies may of course change along the route from between the signal node and the distribution system, for example having the signal node network interface SN-N-3 transmitting IP packages through a low-power IEEE 802.11ah WiFi connection to an Internet-connected router, transforming the communication to an optical fiber link to another router, which transforms the communication to a twisted pair connection to a node of the distribution system. The skilled person within computer communication would know how to implement a communication interface for transport of injection transport representations for commonly available or proprietary infrastructure, and would know how to adapt this to future common communication standards, which are thereby also within the scope of the present invention.

The signal node battery SN-A-47 or other power supply may comprise any means for providing at least the necessary amount of energy to the various components of the signal node SN for the signal conversion and communication to function. Preferably, the kind and size of power supply is determined in accordance with the kind of signal node and probable or worst case use scenario. For example, input signal nodes expected to deliver data at a high data rate and/or wirelessly over a long distance, or output signal nodes operating actuators with high power consumption may preferably be implemented with mains powered power supply for reliable operation. As another example, input signal nodes with simple sensors and a low expected data rate, e.g. less than one signal value per minute, and an optimized communication interface, e.g. according to low-power wireless standards, e.g. LPWAN, may preferably be implemented with a battery powered power supply for high flexibility and easy installation of the signal node. Other examples may comprise powering the signal node by energy harvesting technology based on e.g. photovoltaics, thermoelectrics, piezoelectrics or magnetic induction, etc., as recognized by the skilled person, depending on a typical use and location of a particular signal node, and preferably combined with a rechargeable energy storage device such as, e.g., a battery, e.g. a lithium-ion battery, or a capacitor. For example, a signal node installed at a location exposed to sunlight several hours a day may depending on its requirements have its entire energy demand covered by a small photovoltaic panel, preferably implemented to recharge a battery or capacitor to preserve energy for dark hours. Other energy harvesting examples are e.g. signal nodes mounted on or near to moving, reciprocating or vibrating objects and being powered by piezoelectric material or magnetic induction, or signal nodes installed in hot places, e.g. in or on a boiler, heat pipe, motor, sun-heated object, etc., and being powered by a thermoelectric generator, etc. Examples of power supplies also include combinations of the above-mentioned types of power supplies and other suitable power supplies, e.g. a fuel cell producing electric power from a hydrogen fuel, a dynamo with crank handle for recharging a battery by hand, etc.

In various advantageous embodiments, the signal nodes comprise a dedicated security chip or other integrated or stand-alone security hardware for optimized and secure execution of security algorithms such as, e.g., encryption and authentication. In a preferred embodiment, the security hardware manages the main processing according to the signal node signal representation method SN-A-40 and the signal node injection transport representation method SN-T-9, which preferably involves cryptographic processes as described in more detail below.

The signal node SN may comprise a signal processor, e.g. a separate component or as part of the signal node processor SN-A-48, for supporting the data gathering, preprocessing the signal, etc., e.g. by doing sampling, amplification, filtering, down-sampling, formalizing, interpreting, compression, etc. The signal processor may be analog or digital or there may be signal processing performed in both analog and digital domains. The processing may be necessary or significant for the conversion from physical property to a meaningful signal according to a standard or specification, and/or it may be used for producing versions with different qualities, data rates, resolution, etc., of a signal. For example, a temperature sensing signal node may comprise a signal node physical unit sensor SN-A-35 being a temperature-sensitive resistor and a few electronic components configured to cause a voltage to vary with the ambient temperature. The varying voltage may be sampled, low-pass filtered and converted to corresponding temperature values based on, e.g., the Celsius scale. The resulting digital values directly indicating temperature with respect to a common scale and unit may be considered the signal SG and be transmitted to a number of client nodes in accordance with a signal communication system of the present invention. Likewise, for an output signal node, analog and/or digital signal processing may be applied to appropriately operate, e.g. a signal node electrical actuator SN-A-20, on the basis of a received control signal SG.

The signal processor may, as mentioned above, comprise both analog and/or digital processing means, implemented with discrete or integrated components. For example, a digital signal processor DSP may be utilized, or any suitable integrated circuit, e.g. a microprocessor or a central processing unit, or dedicated/customized devices such as FPGAs, ASICs, etc. In an embodiment, the signal processor may advantageously be implemented by the same processing hardware implementing the signal node processor SN-A-48, possibly as part of a signal node embedded system SN-A-50.

In various alternative embodiments, the signal node physical unit sensor SN-A-35 and/or signal node electrical actuator SN-A-20, possibly together with support circuitry, may be implemented physically separate from the rest of the signal node SN and may be connected to the remaining components by wire or wirelessly. Separating the sensor or actuator from the rest of the signal node may be relevant in several applications, for example to facilitate easy replacement of transducer or signal node in case of faults, to allow custom choice among a number of transducers compatible with the signal node, to enable mounting the transducer, e.g. a small temperature sensor, in a tight spot or in a harsh environment, to simplify mounting of clumsy, heavy or big transducers, e.g. heavy duty actuators, etc., to allow for optimizing transducer location for the signal conversion while optimizing the signal node location with focus on communication and/or power supply, e.g. energy harvesting, etc.

In various alternative embodiments, the signal node network interface SN-N-3 may be implemented physically separate from the rest of the signal node SN and may be connected to the remaining components by wire or wirelessly. Separating the signal node network interface SN-N-3 from the rest of the signal node may be relevant in several applications, for example to facilitate easy replacement of communication interface or signal node in case of faults, to allow custom choice among a number of communication interfaces compatible with the signal node, e.g. for providing different communication technologies, to allow for optimizing communication interface location to e.g. best wireless conditions while optimizing the signal node location with focus on data gathering, etc.

The signal node SN is preferably a dedicated implementation for its specific purpose, but may in alternative embodiments be fully or partly implemented in and sharing some of the hardware with for example a general purpose computer, a server, a smartphone or tablet computer, a networking device such as a router, control or monitoring units of, e.g., cars, trucks, trains or airplanes, industrial controllers, entertainment systems, e.g. home theaters or smart-TVs, smart home or smart city controllers, etc. For example, one or more signal nodes, except the transducers, may be implemented in one controller, e.g. in a computer or a smart home system, with the relevant transducers being remotely mounted at appropriate data acquisition or control locations.

FIG. 21 illustrates an embodiment of a signal node processor SN-A-48, being arranged by software and/or hardware to perform several methods relating directly to the communication of signals comprising preferably at least the described signal node physical property method SN-A-34, signal node signal representation method SN-A-40, signal node signal representation interpretation method SN-A-39, signal node request method SN-A-37, signal node response method SN-A-33, signal node injection transport representation method SN-T-9, signal node injection transport representation interpretation method SN-T-8, signal node injection transport request method SN-T-7, signal node injection transport response method SN-T-5, signal communication system network representation method SCS-N-8 and signal communication system network representation interpretation method SCS-N-9.

Generally, the signal node processor SN-A-48 should execute the methods implemented according to the present embodiment and the signal node processor should communicate with suitably arranged data memory, such as the signal node memory SN-A-49 which is to be described subsequently. The general execution of methods in a signal node processor based on data stored in associated memory is well-known within the art.

The signal node physical property method SN-A-34 may e.g. convert uni- or bi-directionally between a physical property PP and one or more signals SN. This may e.g. be implemented unidirectionally with e.g. a sensor, such as signal node physical unit sensor SN-A-35 illustrated in relation to FIG. 20, sensing a temperature and converting this temperature into a corresponding signal, which may then be further processed by the signal node processor SN-A-48. The signal node physical property method SN-A-34 may also be implemented unidirectionally where a signal is converted into a physical property, e.g. by means of an actuator such as the signal node electrical actuators SN-A-20.

The signal node signal representation method SN-A-40 and the signal node signal representation interpretation method SN-A-39 are respectively executed in order to establish a signal representation SG-A-1 from a signal SG or establish a signal SG from a signal representation SG-A-1. Although both methods are described in the present embodiment in order to established as bi-directional version of a signal node processor SN-A-48 it is also possible within the scope of the invention to establish a unidirectional communication to or from the signal node and thereby omit the respective methods which are not required for the establishment of the relevant direction of communication.

According to an embodiment, the signal node SN is not configured for internally routing signals from inbound signals, e.g. temperature signals, to outbound signals, such as signal controlling an actuator directly within the signal node SN. The signal node SN is thus configured for providing signals and communicating these signals to an associated distribution system DS and/or optionally for receiving signal representations from the associated distribution system DS for the purpose of establishment one or more physical properties at the signal node end, integrated with the signal node SN or by communication with the signal node.

In other words, in case of a bi-directional signal node SN, the signal node should execute at least one implementation of the signal node signal representation method SN-A-40 and the signal node signal representation interpretation method SN-A-39 where communication of data between these two methods are only facilitated through communication via the distribution system DS.

In other words, in this implementation, the two methods; the signal node signal representation method SN-A-40 and the signal node signal representation interpretation method SN-A-39, cannot communicate data within the signal node SN and as the signal node SN externally are setup for communication of signals e.g. to client nodes CN only via the distribution system DS, routing of signal representations may be kept under the control of the switching distribution system DS.

The signal node request method SN-A-37 and the signal node response method SN-A-33 are established for the purpose of controlling the communication on an application level from and to the signal node SN, respectively. These methods are therefore focused on communication with other client nodes CN.

The signal node injection transport representation method SN-T-9, signal node injection transport representation interpretation method SN-T-8, signal node injection transport request method SN-T-7, signal node injection transport response method SN-T-5, signal communication system network representation method SCS-N-8 and signal communication system network representation interpretation method SCS-N-9 are established for the purpose of establishing a communication to and from the distribution system DS, i.e. in the present embodiment on a transport level.

The signal node processor SN-A-48 is further preferably arranged to perform methods relating to supporting the communication of signals SG, comprising a signal node signal representation property interface method SN-A-42, a signal node signal representation property method SN-A-43, which on an application level facilitates a communication between the signal node SN and optionally many client nodes CN.

In the present embodiment a secure communication on a transport level between the signal node SN and the distribution system DS on a transport level is further facilitated by the methods; a signal node injection transport representation property interface method SN-T-11, a signal node injection transport representation property method SN-T-12 and a signal injection label generation method SG-T-5 or a signal injection label receive method SG-T-6. The signal representation properties in this relation is in practice technically facilitating a mutual understanding on signal format etc.

Methods may likewise be provided for the purpose of identity verification on both application and transport level. These methods include a signal node distribution system identity verification method SN-A-17, a signal node client node identity verification method SN-A-15, a signal node distribution system injection transport identity verification method SN-T-17 and a signal node identification transmit method SN-A-24.

The signal node processor SN-A-48 is further preferably arranged to perform methods relating to commissioning of the signal node SN in a signal communication system SCS, comprising a signal node local interface method SN-A-26, a signal node commissioning method SN-A-13, a signal node commissioning confirmation transmission method SN-A-2, a signal node commissioning identification message confirmation receive method SN-A-6, a signal node commissioning identification message generation method SN-A-7, a signal node commissioning identification message indication method SN-A-8 and a signal node commissioning identification message verification method SN-A-9.

Commissioning of the signal node SN is described further with reference to FIG. 37 and FIG. 38.

The signal node processor SN-A-48 may e.g. be implemented in the embodiment of FIG. 20.

It should be noted that the different methods executed by the signal node processor SN-A-48 are automatic and it is also noted that methods implemented may be performed serially or in parallel depending on the required interaction between the different methods. It is also noted that the topology of the signal node processor SN-A-48 may be any desirable structure as long as the methods are executable according to the provisions according to the invention.

FIG. 22 illustrates an embodiment of a signal node memory SN-A-49, being arranged by software and/or hardware to store various kinds of information relating to the communication of signals, comprising preferably at least the described signal node identity register SN-A-22, signal node signal representation property register SN-A-44, signal node injection transport identity register SN-T-3, signal node injection transport representation property register SN-T-6 and signal node network identity register SN-N-2. The embodiment may e.g. be implemented in relation to execution of the methods configured in the signal node processor SN-A-48 of FIG. 21.

Client Node, FIGS. 23, 24, 25, 26

Figure 23:
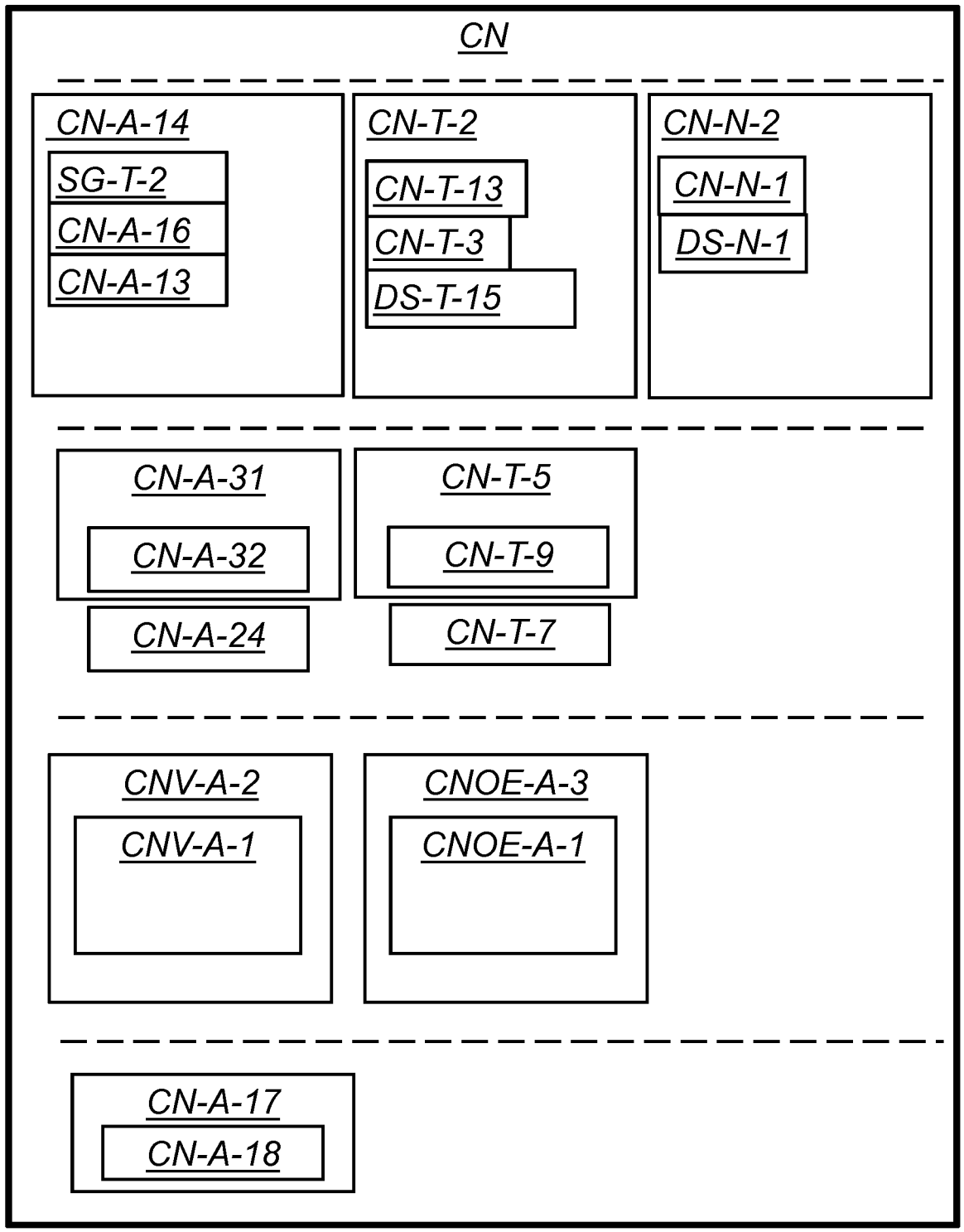

FIG. 23 illustrates an embodiment of a client node CN with the various components, interfaces, stored information and implemented methods described herein.

The illustrated client node CN is explained in hardware and software for inbound receipt of a signal representation SG-A-1 from an associated distribution system DS. The client node CN may also be configured as outbound unidirectional, i.e. configured for transmission of a signal representation SG-A-1 to an associated distribution system DS. The client node may also be configured as bi-directional in compliance with the present embodiment and the principles laid out in the description.

The illustrated client node CN may to a large degree be understood when considering the implementation of a signal node SN insofar the below described design is be able to receive and interpret a signal representation directed to the client node from the associated distribution system DS. Thus most of the below description may be deduced from the overall description of the signal node SN, the distribution system DS and the overall system as such in terms of design and functionality.

The client node CN comprises a client node identity register CN-A-14, a client node distribution transport identity register CN-T-2 and client node network identity register CN-N-2.

The client node identity register CN-A-14 comprises a client node identification CN-A-16, e.g. a certificate, corresponding to the client node identity CN-A-13 which may also be contained in a client node identity register CN-A-14, e.g., as a private key identifying the client node internally. The client node identity register CN-A-14 also comprise one or more signal distribution labels SG-T-2 used as handles for the respective signals that the client node is able to manage, i.e. send and/or receive.

In other words, the client node identity register CN-A-14 manages data to be able to identify the client node CN itself and each of its signals SG.

The client node distribution transport identity register CN-T-2 comprises a client node distribution transport identity CN-T-13, a corresponding client node distribution transport identification CN-T-3 and a distribution system distribution transport identification DS-T-15 being associated with the distribution system distribution transport identity DS-T-13 stored in the associated distribution system DS.

The client node network identity register CN-N-2 comprises a client node network identification CN-N-1 of the client node CN and a distribution system distribution network identification DS-N-1 of the distribution system DS associated with the client node CN.

The client node CN moreover comprises a client node signal representation property register CN-A-31 and a client node distribution transport representation property register CN-T-5.

The client node signal representation property register CN-A-31 comprising client node signal representation properties CN-A-32 being used in providing and receiving signal representations. In terms of receiving signal representations in the present embodiment the client node is configured to perform a client node signal representation interpretation method CN-A-24.

The client node distribution transport representation property register CN-T-5 comprises client node distribution transport representation properties CN-T-9 cooperating with a client node distribution transport representation interpretation method CN-T-7 for the purpose of providing a signal representation from a distribution transport representation.

Moreover, the client node CN comprises a client node vendor register CNV-A-2 comprising a client node vendor identification CNV-A-1 identifying a client node vendor. The vendor may e.g. be the manufacturer of the client node CN.

The client node CN may moreover comprise a client node operator register CNOE-A-3 comprising a client node operating entity identification CNOE-A-1 identifying a client node operating entity CNOE. The client node operating entity CNOE may e.g. relate to the legal person or a legal entity operating the client node CN. As specific illustrative examples, such legal operating entity CNOE may refer to a tenant in an apartment being provided with a client node CN in the form of a software app to monitor heat consumption, or a smart city service provider having a city surveillance system implementing a client node CN to gather data from sensor signal nodes and send control signals to control signal nodes around the city, etc. Moreover, the client node CN is configured with a client node local interface method CN-A-18 related to a client node local interface CN-A-17. The client node local interface CN-A-17 is configured to be communicatively coupled to an associated client node operating entity.

Moreover, the client node CN is configured in software and hardware for executing the relevant methods of FIG. 25 while using the likewise relevant registers of FIG. 26.

Figure 24:
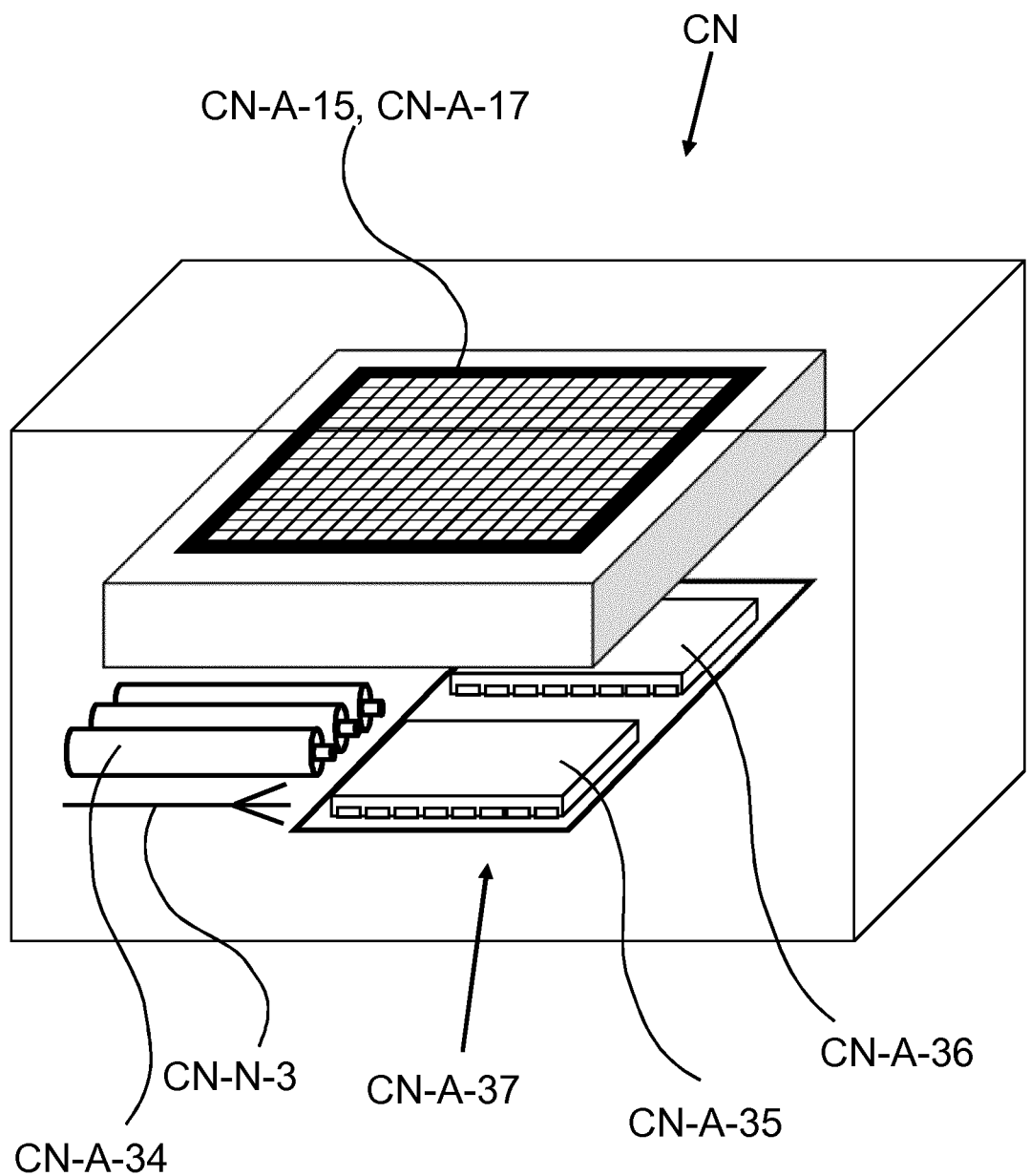

FIG. 24 illustrates an embodiment of a client node CN of a signal communication system according to the invention. The client node CN comprises a client node processor CN-A-35, a client node memory CN-A-36, a number of client node network interfaces CN-N-3, e.g. for communicating with the distribution system DS, and a client node battery CN-A-34, or any other power supply. The client node processor CN-A-35 and client node memory CN-A-36 may advantageously be implemented as a client node embedded system CN-A-37, for example in form of a System-on-Chip SoC, or the like.

The client node CN further preferably comprises a client node signal data interface CN-A-15, for machine communication or human communication of signals, and a client node local interface CN-A-17, preferably comprising a display or other indicator means, and may in some embodiments also comprise input means, e.g. a button, a keyboard, etc. In the present example, a touchscreen CN-A-15, CN-A-17 forms both the client node signal data interface CN-A-15 and the client node local interface CN-A-17. In other embodiments, the client node CN may further or alternatively comprise a client node signal data interface CN-A-15 for machine-type communication, e.g. using the client node network interface CN-N-3, other hardware interfaces, e.g. one or more digital or analog input or output ports, a software interface when the client node is embedded in a system with other applications and shared memory bus, e.g. a general purpose computer, smartphone, etc., etc.

The client node CN may further comprise a client node application controller CN-A-4$_1$ for processing signals SG received from one or more signal nodes SN and perform an action or output processed data accordingly, or for processing user input or other data and determine a signal SG to be established and transmitted to one or more signal nodes SN. For performing an action the client node CN may comprise a client node electrical actuator CN-A-38 to be controlled by or in response to a received signal SG, preferably by the client node application controller CN-A-4$_1$. The electrical actuator may be implemented in the client node CN or being connected to an interface, e.g. the client node signal data interface CN-A-15.

In an embodiment, the client node CN comprises a user interface for display and/or control by a user, for example a web-based interface, e.g. web browser or a mobile device app. In the same or another embodiment, the client node CN may itself be a web server or other server serving the received signals or derivatives thereof to its own clients or serving its own clients with control options for one or more signal nodes SN.

In various embodiments a client node CN may be any device capable of communicatively couple to the distribution system DS and communicate distribution transport representations DT-T-2 with the distribution system DS. Hence, the client node CN may, e.g., form part of a general purpose computer, a server, a smartphone or tablet computer, a networking device such as a router, control or monitoring units of, e.g., cars, trucks, trains or airplanes, industrial controllers, entertainment systems, e.g. home theaters or smart-TVs, smart home or smart city controllers, etc. For example, the client node CN may be implemented as an app in a tablet computer, a web server, an automatic data aggregation system, etc.

The client node comprises an interface CN-N-3 to be communicatively coupled, e.g. via the Internet, a local area network or a telecom network, etc., to the distribution system DS. The interface may, for example, be a network interface such as for example wired network interface card, a wireless network interface, e.g. LPWAN, WiFi, Bluetooth, etc.

The client node CN may comprise appropriately configured software and/or hardware, for example a dedicated security chip or suitable software for performing or supporting cryptographic functions of the client node, as described in more detail below.

In various embodiments, client nodes may comprise further or alternative functionality and application with regard to the system.

Embodiments of the present invention may apply different ways or combinations thereof for the client node or a client node user to discover available signals and to subscribe or otherwise request receiving such signals. For example, a user knowing about a signal node, or at least the availability of a certain signal, the distribution system and the client node may use this information to setup requests or subscriptions at the client node or at the distribution system. In various other embodiments the client node, a user, a managing node, etc., may be inquiring or browsing a catalog or search engine, for example a catalog system CS as described below, for signals of interest.

FIG. 25 illustrates an embodiment of a client node processor CN-A-35, being arranged by software and/or hardware to perform several methods relating directly to the communication of signals comprising preferably at least the described client node signal representation method CN-A-25, client node signal representation interpretation method CN-A-24, client node request method CN-A-22, client node response method CN-A-20, client node distribution transport representation method CN-T-8, client node distribution transport representation interpretation method CN-T-7, client node distribution transport request method CN-T-6, client node distribution transport response method CN-T-4, signal communication system network representation method SCS-N-8 and signal communication system network representation interpretation method SC S-N-9.

The client node processor CN-A-35 is further preferably arranged to perform methods relating to supporting the communication of signals, comprising a client node signal representation property interface method CN-A-29, a client node signal representation property method CN-A-30, a client node distribution transport representation property interface method CN-T-10, a client node distribution transport representation property method CN-T-11, a signal distribution label generation method SG-T-7, a signal distribution label receiving method SG-T-3, a client node distribution system identity verification method CN-A-12, a client node signal node identity verification method CN-A-26, a client node identification transmit method CN-A-33 and a client node distribution system distribution transport identity verification method CN-T-12.

The client node processor CN-A-35 is further preferably arranged to perform methods relating to commissioning of the client node CN in a signal communication system SCS, comprising a client node local interface method CN-A-18, a client node commissioning method CN-A-9, a client node commissioning confirmation transmission method CN-A-11, a client node commissioning identification message confirmation receive method CN-A-4, a client node commissioning identification message generation method CN-A-5, a client node commissioning identification message indication method CN-A-6 and a client node commissioning identification message verification method CN-A-8.

FIG. 26 illustrates an embodiment of a client node memory CN-A-36, being arranged by software and/or hardware to store various kinds of information relating to the communication of signals, comprising preferably at least the described client node identity register CN-A-14, client node signal representation property register CN-A-31, client node distribution transport identity register CN-T-2, client node distribution transport representation property register CN-T-5 and client node network identity register CN-N-2.

Hybrid Nodes

In an embodiment, the client node CN is physically located together with one or more signal nodes SN, possibly even integrated in the same box and possibly sharing resources such as power supply, etc. In such an embodiment of a hybrid signal client node HY-A-2, the client node part may comprise, e.g., a display for displaying information received from one or more of the local signal nodes SN, the information being based on signals received from the signal nodes SN via the distribution system DS, or a controller for controlling one or more of the local signal nodes SN by control signals transmitted via the distribution system DS. In an embodiment, a client node CN is located together with at least one input signal node and at least one output signal node, the input signal node being configured to perform measurements, e.g. temperature, air quality or traffic monitor, the output signal node being configured to affect the environment, e.g. controlling a heat valve, a window opener or a traffic light, respectively, and the client node being configured to receive the measurement signal from the input signal node, perform evaluation thereof, determine an appropriate control action, and transmit a corresponding control signal to the output signal node. By requiring the signals to be transmitted via the distribution system DS even for local or even integrated signal nodes and client nodes, is enabled the options of performing central managing of signals and policy enforcement, monitoring of signal traffic, allowing further client nodes to subscribe to the signals, etc., while still not requiring much from especially the signal nodes with regard to network security, privacy, etc., as these tasks are inherently solved by the structural design according to the invention and by the decoupling of meta information between transport representations happening at the distribution system.

Likewise, other embodiments with combinations of nodes of the signal communication system SCS have various useful applications. For example, a hybrid signal distribution node HY-A-4 may be a physical device comprising both one or more signal node SN parts and a distribution system DS part, thereby providing a one-box solution for input or output regarding physical properties and distribution of signals to and from one or more remote client nodes CN. In another example embodiment, a hybrid client distribution node HY-A-1 may be a physical device comprising at least one client node CN part and a distribution system DS part, thereby making it possible to provide a one-box client solution both handling centralized and secure communication with remote sensor and/or actuator signal nodes SN. In a further embodiment, a hybrid signal distribution client node HY-A-3 is a one box solution comprising all the roles of signal nodes, distribution system and client nodes, thereby providing a self-contained, secure system for example for home automation or local closed-loop control systems, which may however also provide access to and from remote signal nodes and client nodes according to the invention.

Catalog System, FIGS. 27, 28

Preferred embodiments of signal communication systems SCS of the present invention comprises or is connected to a catalog system CS. As the other parties such as signal nodes, distribution systems and client nodes for security purposes and resource reduction are preferably highly shielded against discovery, one task for the catalog system CS is to facilitate that users (humans and/or machines) can obtain information about available signals, i.e. signal node features, e.g. sensor data or control signals, that the user may be interested in subscribing to. Users may also be referred to as client node operating entities CNOE. In various embodiments, the catalog system CS may also play a role in the commission of new signal nodes SN in the signal communication system SCS. In various embodiments, the degree of information about a certain signal and signal node regarding e.g. existence, type, location, operator, vendor, etc. may be controlled by controlling the catalog system CS, possibly with different accessibility of information for different catalog system CS visitors.

The catalog system CS is communicating with the distribution system DS in order to facilitate an advantageous and efficient establishment of signal flow through the system. The catalog system is not mandatory as such according to the overall provisions of the invention but it represents an advantageous setup which may efficiently form the basis for an effective and well-functioning technical system for signal communication.

The catalog system CS may for example be a system, e.g. a web server, which is available for web-publishing of data availing a client node operating entity CNOE to select a relevant signal SG to be acquired for communication to and/or from a particular client node CN related to the client node operating entity CNOE.

In other words, the catalog system CS is, in a preferred embodiment, basically a practical implementation of how to obtain a common understanding between the signal nodes SN and the client nodes CN with respect to what a user is expecting to be received at the client node CN. In the present context a user may thus access publicly available or restricted data from a catalog system CS and communicate with the distribution system DS directly or via a suitable configuration system, possibly through the catalog system CS, and have a corresponding distribution system signal representation switching parameter record DS-T-35 registered to begin receiving or sending signals SG accordingly.

The information published through the catalog system CS may thus provide the initiation of a safe synchronized transmission of data between the signal nodes SN and the client nodes CN of the system by means of the distribution system DS. The catalog system CS may therefore advantageously be accessible by means of common web technology by means of which a user may select and agree the data to be received at the client node CN.

The catalog system CS is therefore basically a public and/or restricted platform through which optional users, e.g. client node operating entities CNOE may obtain information about services available via the signal communication system SCS. The catalog system CS may be used for commercial offering of access to signals or as a brokerage or advertisement platform to initiate business between signal node operating entities SNOE and client node operating entities CNOE. The operational means of the catalog system CS may be obtained by the catalog system itself or may be integrated in a commercial platform offering IT services, like an app shop or web shop. In an embodiment, the catalog system is integrated in a search engine or catalog platform, e.g. like a web search engine or like a domain name server (DNS) catalog system. An appropriate interface may moreover cooperate with the catalog system CS in order to facilitate a specific configuration chosen and agreed to by the user. It is understood, that the possible technical implementations of such a system are numerous.

The available signal nodes SN and their available signals SG may optionally form part of a contract between the respective signal node operating entities SNOE and each client node operating entity CNOE, but from a technical point of view, the important technical goal is to set up rules according to which signals originating from signal nodes may be transmitted through the system in conformity with the agreements, the available signals, signal nodes and client nodes, and so that no signals may be transmitted without such conformity. This causes individual configurations which in preferred embodiments are handled in the distribution system switching control register DS-T-45, e.g. by the distribution system signal representation switching parameter records DS-T-35.

An important and advantageous option is obtained by centralizing the communication configuration at the distribution system DS in the sense that any configuration of data flow may be set, modified or terminated centrally without requiring updating the signal nodes SN or the client nodes CN. It also has the technical benefit that the information about the specific configuration of communication may be kept centrally without requiring that these details resides either at the signal nodes SN or at the client nodes CN.

The catalog system CS is basically serving as a publicly available and/or restricted reference to users or potential users, i.e. client node operating entities CNOE, by means of which data may be technically exchanged. The nature of the data made available through the catalog system is in a preferred embodiment data describing the available signals technically, optionally with reference to location of the signal nodes or where relevant signals are obtained, conditions related to the signal nodes for transfer of the available data, conditions for the commercial and/or legal use of the signals, technical nature of the available data such as format, bit resolution, etc., available timing information, e.g. intervals, of updating of the signals, etc.

It should be noted that the distribution system signal representation switching parameter records DS-T-35 of the distribution system DS are preferably non-public in the sense that the catalog system CS is preferable merely applied for the purpose of showing optional users the optional technical framework available. The distribution system signal representation switching parameter records DS-T-35 are preferably based on the information available in the catalog system CS, but the underlying logic residing in the distribution system signal representation switching parameter records DS-T-35 is hidden and only deployed within the distribution system. This may for example mean, that in a preferred embodiment, neither the client node CN, nor the client node operating entity CNOE, will get to know the identity, network address, owner or other private information about a signal node SN from which signals SG are received or to which signals SG are sent for control. Similarly, the signal node SN will preferably neither get to know any of that kind of information about the client node CN.

The signal type preferably indicated by a signal injection label SG-T-4 or signal distribution label SG-T-2, may advantageously, but not necessarily, refer or relate to a signal type which is published by the catalog system CS. The information provided by indicating a signal type or signal identification may for example refer to category and specifications such as, e.g. a signal conveying a temperature in Celsius at a given sample rate, or a signal conveying a window opener control parameter indicating a position in percent between closed and fully open which the window is requested to move to. The signal injection or distribution label, or other information from the signal node SN and/or e.g. from a signal node operating entity SNOE, signal node vendor SNV or distribution system operating entity DSOE, may comprise conditions for delivery, such as for example geographical location or distance of the client node, available bandwidth for specific or groups of client nodes, optional billing, conditions of integrity, privacy and IT security, functional safety, certification and verification conditions of a signal node, technical considerations regarding configuration with other signal nodes, etc.

As indicated and explained above, the catalog system CS may therefore serve as a technical way of providing sufficient information to an optional client node CN and/or client node operating entity CNOE, thereby availing that the user, be it machine or human, may, based on this information, establish the required data communication. This establishment is thus logically referring to the information provided in the catalog system CS which may be used broadly to publish the available signals of a number of different signal nodes. The reference to a central distribution system DS nevertheless also avails that the distribution system DS, or the signal nodes SN, are able to establish and direct signal representations SG-A-1 to specific client nodes by associating additional descriptive data to the signal representation thereby ensuring that a client node CN is not only receiving the requested data, i.e. signal representations, but also that the client node is technically able to process and interpret the incoming signal representations in order to (re)generate valid signals on the basis of incoming signal representations corresponding to the originally generated signals at the originating signal node. Furthermore, these additional descriptive data facilitate that the receiving client node CN is technically able to apply the regenerated signals and automatically apply these data for further processing by computing equipment comprised in the client node CN or communicating with the client node CN. An example of such further information may in respect of the latter as an example include information that the received data is a sample value of a temperature measured in Celsius having a certain resolution, etc.

Such further information may originate partly or mainly from the signal node SN itself, but the necessary data may also be added along the transmission path, e.g. at the distribution system DS. A way to avoid that all information must be transmitted is partly to have the information available in the distribution system together with the information for switching the signal representations, thereby making it possible to receive data and then add the conceptual meaning centrally at the distribution system.

FIG. 27 illustrates features of an embodiment of a catalog system CS not shown on the drawings referred to in the below description. The catalog system CS preferably comprises a catalog system signal label register CS-T-28 holding the catalog system records CS-A-22 described below, e.g. with reference to FIG. 35. An embodiment of the catalog system CS may comprise a catalog system signal node catalog label generation method CS-T-30 for generating signal node catalog labels SN-T-1 as an alternative to the distribution system catalog label generation method DS-T-7 of the distribution system DS described below with reference to FIG. 34.

For secure communication with a distribution system DS, the catalog system CS may preferably comprise structure, methods and properties approximating the general communication method of the distribution system DS described below with reference to FIGS. 29-30. Hence, the catalog system CS may comprise catalog system distribution system data CS-A-9 which are converted to and/or from catalog system distribution system data representations CS-A-12 by a catalog system distribution system data representation method CS-A-14 and a catalog system distribution system data representation interpretation method CS-A-13 using catalog system distribution system data representation properties CS-A-37 of a catalog system distribution system data representation property register CS-A-16, which are maintained by a catalog system distribution system data representation property method CS-A-11 and a catalog system distribution system data representation property interface method CS-A-10. The catalog system distribution system data representations CS-A-12 may be converted to and/or from catalog system distribution system transport representations CS-T-16 by a catalog system distribution system transport representation method CS-T-23 and a catalog system distribution system transport representation interpretation method CS-T-17 using catalog system distribution system transport representation properties CS-T-15 provided by a catalog system distribution system transport representation property method CS-T-19 and a catalog system distribution system transport representation property interface method CS-T-18. The catalog system distribution system transport representations CS-T-16 may be transmitted to or received from a distribution system DS by a catalog system distribution system transport representation transmit method CS-T-21 and a catalog system distribution system transport receive method CS-T-20. To manage identifications in regard of communication with distribution system DS, the catalog system may comprise a catalog system distribution system identification verification method CS-A-18, a catalog system distribution system transport identification verification method CS-T-22 and a distribution system transport identification DS-T-46.

For secure communication with a client node operating entity CNOE, the catalog system CS may preferably comprise structure, methods and properties approximating the general communication method of the distribution system DS described below with reference to FIGS. 29-30. Hence, the catalog system CS may comprise catalog system client node operating entity data CS-A-34 which are converted to and/or from catalog system client node operating entity data representation CS-A-4 by a catalog system client node operating entity data representation method CS-A-6 and a catalog system client node operating entity data representation interpretation method CS-A-5 using catalog system client node operating entity data representation properties CS-A-7 of a catalog system client node operating entity data representation property register CS-A-8, which are maintained by a catalog system client node operating entity data representation property method CS-A-3 and a catalog system client node operating entity data representation property interface method CS-A-2. The catalog system client node operating entity data representation CS-A-4 may be converted to and/or from catalog system client node operating entity transport representations CS-T-4 by a catalog system client node operating entity transport representation method CS-T-6 and a catalog system client node operating entity transport representation interpretation method CS-T-5 using catalog system client node operating entity transport representation properties CS-T-3 provided by a catalog system client node operating entity transport representation property method CS-T-9 and a catalog system client node operating entity transport representation property interface method CS-T-8. The catalog system client node operating entity transport representation CS-T-4 may be transmitted to or received from a client node operating entity CNOE by a catalog system client node operating entity transport representation transmit method CS-T-10 and a catalog system client node operating entity transport representation receive method CS-T-11. To manage identifications in regard of communication with client node operating entity CNOE, the catalog system may comprise a catalog system client node operating entity transport identification verification method CS-T-14 and a client node operating entity transport identification CNOE-T-2.

The catalog system CS may further comprise a catalog system network interface CS-N-1 for connecting to the signal communication system network SCS-N-5, and a catalog system network identity register CS-N-2 with a catalog system network identification CN-N-3 to be addressable on the signal communication system network SCS-N-5.

FIG. 28 illustrates communicative couplings to the catalog system CS in a preferred embodiment of a signal communication system SCS. The catalog system CS communicates with a catalog system vendor CSV, at least during its manufacture or commissioning, through a catalog system vendor channel CSV-T-1, and with a catalog system operating entity CSOE, through a catalog system operating entity channel CS-T-24. The catalog system operating entity CSOE may be an individual entity or the same entity, technically and/or legally, as the distribution system operating entity DSOE.

The catalog system CS communicates with the distribution system DS through a distribution system catalog system channel DS-T-10. This communication may for example comprise information about signals and associated information, e.g. signal types, etc., gathered by the distribution system or distribution system operating entity and sent to the catalog system for publication. In various embodiments the communication between catalog system CS and distribution system DS may also comprise information about client nodes attempting to register a subscription to a signal. In other embodiments, such registration information is handled outside the catalog system directly between distribution system and client node or client node operating entity, and the catalog system is only used to find relevant signals.

The catalog system CS may further be communicating with one or more of client nodes CN and client node operating entities CNOE. The basic feature of the catalog system CS is to avail information about available signals so that they can be subscribed to by client nodes CN or client node operating entities CNOE. However, in various embodiments, it may be the client node CN itself, or a client node operating entity CNOE, e.g. a user, or even another party, which performs the search, lookup or other enquiry with the catalog system CS to discover or select a relevant signal. The client node CN may in an embodiment be communicating with the catalog system CS via a catalog system client node channel CS-T-38, whereas the client node operating entity CNOE in an embodiment may be communicating with the catalog system CS via a catalog system client node operating entity channel CS-T-2.

For example, a client node operating entity CNOE, e.g. a human user such as e.g. a tenant of an apartment, may use the catalog system CS to search for a signal SG providing temperature information about his apartment, and may via the catalog system or directly with the distribution system in various embodiments, enter a registration to have his client node CN, e.g. a software app at a tablet computer, receive that signal SG onwards.

In another example, a client node CN, e.g. a software package at a web server, may be arranged to regularly search the catalog system CS for new temperature signals relating to a specific geographic area, e.g. a city or country, and on behalf of its client node operating entity CNOE, register to receive these new signals at the client node CN, so that data received thereby can be processed, combined and served by the web server of the client node CN to its web clients.

In another example, a client node operating entity CNOE, e.g. a guard of a public building, may use the catalog system CS to lookup signals relating to signal nodes SN being electronic door locks of the public building and register with the distribution system DS, possibly by a request feature of catalog system, to use control signals of the client node CN for the electronic door locks of the signal nodes SN. Then the guard may use the client node CN, e.g. a building surveillance and control system, to transmit control signals SG to the door lock signal nodes SN at the relevant opening time on workdays to unlock doors, and each day at closing time to lock doors.

The catalog system CS may in an embodiment also be communicating with a signal node operating entity SNOE via a catalog system signal node operating entity channel CS-T-31, e.g. in an embodiment where the relevant information about signals SG from signal nodes SN are provided by the signal node operating entity SNOE, e.g. signal node's user or owner directly, instead of or in addition to via the distribution system DS.

Embodiments of functionalities of the catalog system CS are described in more detail below, e.g. regarding how information about a signal SG may be established in the catalog system CS, how a client node operating entity CNOE may search for signals SG in the catalog system CS, and how an embodiment of the catalog system CS may aid in the registration of a distribution system signal representation switching parameter record DS-T-35 in the distribution system DS.

In an embodiment, a hybrid distribution catalog node HY-A-5 may be a physical device or server hardware or software structure arranged to comprise a distribution system DS part and a catalog system CS part.

Distribution System, FIGS. 29, 30, 31a, 31b, 32

The distribution system DS manages according to the invention as described above and in more detail below the switching of preferably non-addressed signal representations SG-A-1 between relevant signal nodes SN and client nodes CN according to distribution system signal representation switching parameter records DS-T-35. The distribution system DS should therefore be directly or indirectly accessible via networks for the signal nodes SN and client nodes CN. In a preferred embodiment, at least one of the networks involved in this communication comprises the Internet, but other public or private networks of various technologies may also be involved in addition or instead.

The distribution system DS may in embodiments of the invention comprise one or more specific dedicated or shared computing resources. In alternative embodiments, the distribution system DS may be cloud-based. In other embodiments, the distribution system DS may be implemented e.g. in a general purpose computer, a tablet computer or a dedicated embedded system with one or more network interfaces. As mentioned, the distribution system DS may be implemented separately from the other components of the signal communication system SCS, or be implemented together with e.g. a catalog system CS and/or an identity register IR to consolidate the central components, or for example be implemented together with a number of signal nodes SN and client nodes CN as a simple and secure ready-to-use one-box-solution not requiring further components.

The distribution system DS comprises one or more signal communication system network interfaces SCS-N-3 to communicatively couple to at least a signal node SN and a client node CN, preferably at least partly via commonly available infrastructure such as the Internet or a local area network LAN. The distribution system DS further comprises or have access to memory, e.g. for holding the distribution system switching control register DS-T-45, comprising the information and rules, comprising the distribution system signal representation switching parameter records DS-T-35, useful for the distribution system DS to receive injection transport representations IT-T-2 from signal nodes SN and distribute their content by distribution transport representations DT-T-2 to client nodes CN, or vice versa.

The distribution system DS also comprises processing means for controlling the distribution based on the information contained in the memory and information received with the transport representations, including in some embodiments as described above decryption and encryption of transport representations according to the distribution system injection transport representation properties DS-T-26 and distribution system distribution transport representation properties DT-T-3. In some embodiments dedicated security hardware is comprised by the distribution system to handle security tasks such as cryptography, certificates, etc. The distribution system DS also comprises a power supply, and one or more user interfaces or control interfaces. As the distribution system DS is accessible, at least addressable, and preferably so even by common communication infrastructure such as e.g. the Internet, user interfaces may preferably be implemented as a web server of the distribution system, thereby allowing browser-based monitoring and management of the distribution system from devices connected to the infrastructure, preferably subject to authentication. Different user interfaces, i.e. having different options, may be presented to different users, e.g. in accordance with their roles, e.g. a signal node operating entity SNOE or a distribution system operating entity DSOE.

As described above, the distribution system DS may preferably be implemented by server hardware or network device hardware, including for example a dedicated server or a shared server, or distributed among several physical servers or, e.g. network routers, for e.g. redundancy, capacity or local presence purposes, etc. The distribution system DS may thus comprise one or more distribution system nodes interconnected to perform the task of the distribution system DS. In a distributed distribution system DS with two or more distribution system nodes, the nodes may be located physically close, typically if the reason for having more nodes is redundancy or capacity, or physically remote, e.g. scattered geographically throughout a city, country, region or worldwide, typically if the reason for more nodes is local presence, which may include local capacity and redundancy aspects, also. The skilled person will be well aware from the present description how to establish a hardware configuration and a physical network on which to base a distribution system DS according to the present invention, and will also be able to incorporate alternative hardware solutions and networking solutions in the future.

An embodiment of the invention comprises two or more distribution systems DS managing signals from the same signal node SN. Possible advantages for several different distribution systems DS may, e.g., be the possibility of having several different service providers, i.e. distribution system operating entities DSOE, each providing their own distribution system DS, or different domains of regulation, e.g. country-wise, or different communication platforms, e.g. different network technologies, etc. Different—or the same—client nodes CN, may be serviced by the different distribution systems DS. All distribution systems DS may, in an embodiment, handle signals from or to the same signal node SN.

An embodiment of the invention comprises two or more distribution systems DS each managing signals from an individual group of signal nodes SN, but serving the same client node CN. Advantages of this embodiment may be the same as described above, e.g. to enable several service providers to provide a distribution system service, to conform with different regulations or requirements, or to enable different technologies. One client node CN may register switching parameter records with different distribution systems DS to monitor or control different signal nodes SN, possibly only accessible from different service providers' distribution systems DS.

Figure 29:
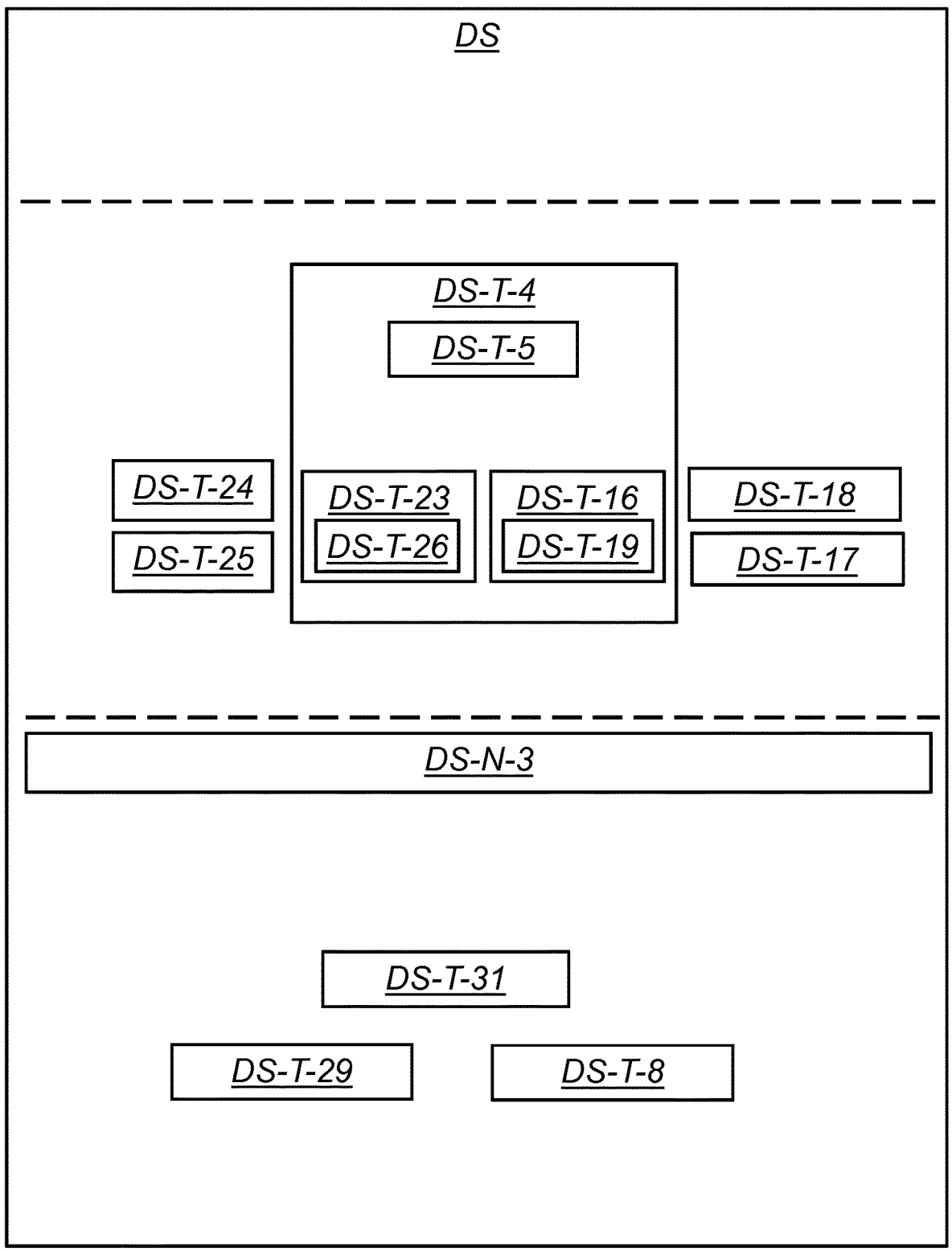

FIG. 29 illustrates an embodiment of a distribution system DS with the various components, interfaces, stored information and implemented methods described herein.

The illustrated distribution system DS is arranged to maintain a distribution system communication entity transport representation property register DS-T-4 comprising one or more distribution system communication entity transport representation properties DS-T-5.

The distribution system DS is configured in hardware and software for the execution of a distribution system injection transport representation interpretation method DS-T-24 which uses distribution system injection transport representation properties DS-T-26 of a distribution system injection transport representation property register DS-T-23 to provide a signal representation SG-A-1 from an injection transport representation IT-T-2, and for the execution of a distribution system distribution transport representation method DS-T-18 which uses distribution system distribution transport representation properties DS-T-19 of a distribution system distribution transport representation property register DS-T-16 to provide a distribution transport representation DT-T-2 from the signal representation SG-A-1.

The distribution system DS is further configured in hardware and software for the execution of a distribution system distribution transport representation interpretation method DS-T-17 which uses the distribution system distribution transport representation properties DS-T-19 of the distribution system distribution transport representation property register DS-T-16 to provide a signal representation SG-A-1 from a distribution transport representation DT-T-2, and for the execution of a distribution system injection transport representation method DS-T-25 which uses the distribution system injection transport representation properties DS-T-26 of the distribution system distribution transport representation property register DS-T-23 to provide an injection transport representation IT-T-2 from the signal representation SG-A-1.

The present embodiment may be implemented according to FIG. 18 for execution of the distribution system injection transport representation interpretation method DS-T-24 and the distribution system distribution transport representation method DS-T-18, and similarly for the distribution system distribution representation interpretation method DS-T-17 and the distribution system injection transport representation method DS-T-25.

The distribution system DS moreover comprises one or more distribution system network interfaces DS-N-3 being signal communication system entity network interfaces arranged to convey signal communication system network representations.

With reference to FIG. 34, where a method of communication has been described in relation to a distribution system DS implementing a signal injection label receive method DS-T-31, the present distribution system also features a distribution system catalog label receive method DS-T-8 and a distribution system signal distribution label receive method DS-T-29 for receiving the generated labels from the client node CN.

These two methods do also apply in relation to the method illustrated and explained in FIG. 34.

Figure 30:
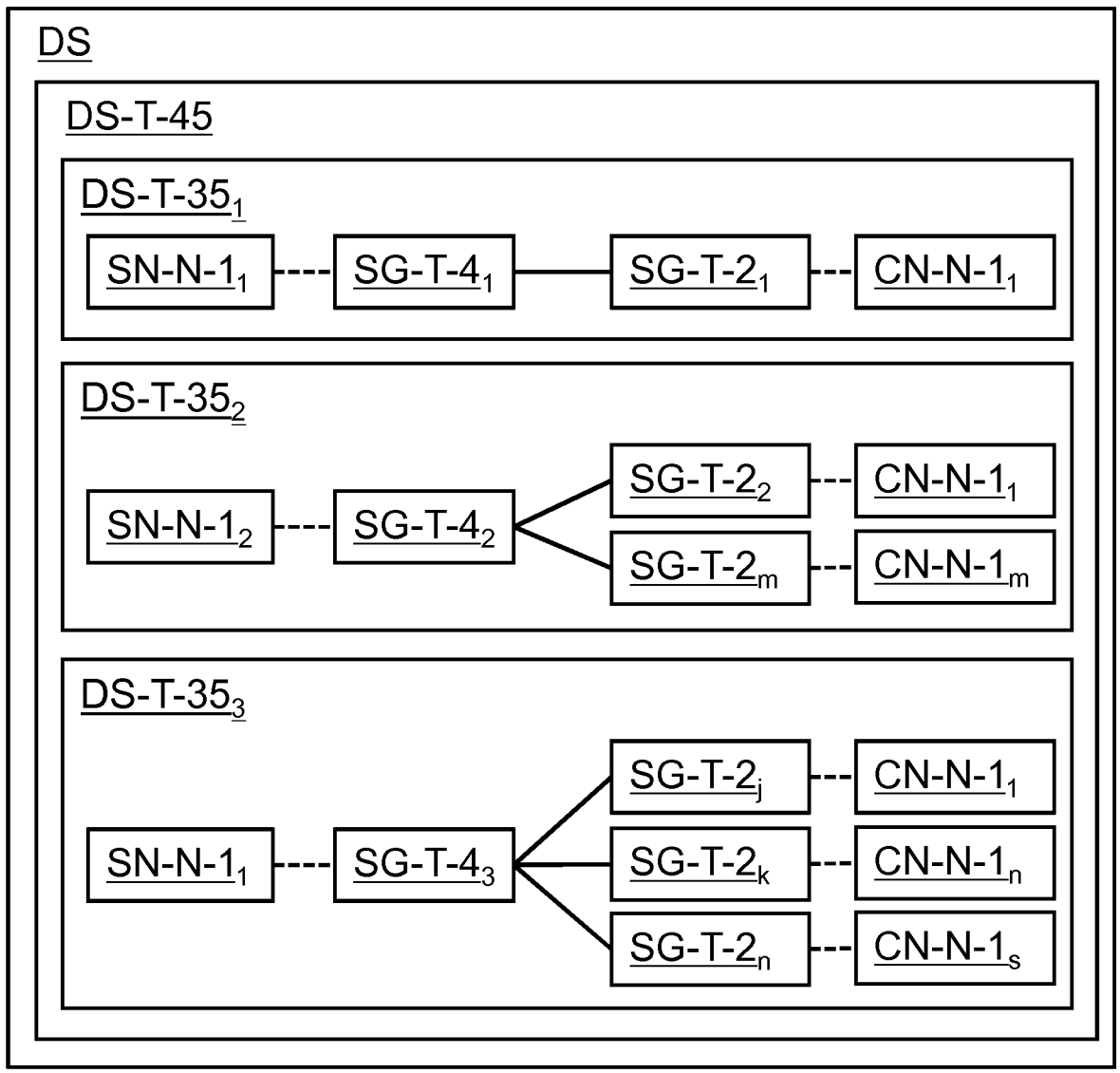

FIG. 30 illustrates an embodiment of a distribution system switching control register DS-T-45 of a distribution system DS. As described above, e.g. with reference to FIG. 3, the distribution system switching control register DS-T-45 comprises a number, in this example three, of distribution system signal representation switching parameter records DS-T-35$_1$, DS-T-35$_3$, and DS-T-35$_3$, and each of these distribution system signal representation switching parameters records DS-T-35 comprises a signal injection label SG-T-4 and one or more associated signal distribution labels SG-T-2. The association between signal injection labels SG-T-4 and signal distribution labels SG-T-2 is used to switch between injection transport representations IT-T-2 and distribution transport representations DT-T-2. As illustrated in FIG. 30, the distribution system signal representation switching parameters records DS-T-35 further preferably comprises signal node network identifications SN-N-1 related to signal injection labels SG-T-4 and client node network identifications CN-N-1 related to signal distribution labels SG-T-2.

For example, a first distribution system signal representation switching parameter record DS-T-35$_1$ comprises an association of a first signal injection label SG-T-4$_1$ with a first signal distribution label SG-T-21. Further, it comprises a relation of the first signal injection label SG-T-4$_1$ with a first signal node SN in terms of a first signal node network identification SN-N-1$_1$, and a relation of the first signal distribution label SG-T-2$_1$ with a first client node CN in terms of a first client node network identification CN-N-1$_1$. Thereby, when the distribution system signal representation switching method DS-T-34 has determined which signal distribution label SG-T-2 a certain signal representation SG-A-1 labelled with a certain signal injection label SG-T-4, or vice versa, should be switched to, it may also lookup a network identification to enable the distribution system DS to address the appropriate signal node SN or client node CN and the signal communication system network SCS-N-5 to route to it. The signal node network identifications SN-N-1 and client node network identifications CN-N-1 may for this purpose preferably comprise a network address, e.g. an IP address in an Internet Protocol-based network.

As a distribution system signal representation switching parameter record DS-T-35 may associate one signal injection label SG-T-4 to several signal distribution labels SG-T-2, the record may also comprise several network identifications. In the present example, the second distribution system signal representation switching parameter record DS-T-35$_2$ comprises an association of a second signal injection label SG-T-4$_2$ related with a second signal node network identification SN-N-1$_2$ with both a second and an m'th signal distribution label SG-T-2$_2$, SG-T-2$_m$. As illustrated in the example, the same client node CN may be related to several signal distribution labels SG-T-2, as the second signal distribution label SG-T-2$_2$ is related to the first client node network identification CN-N-1$_1$, i.e. the same client node CN as was included in the first distribution system signal representation switching parameter record DS-T-35$_1$.

Likewise, the same signal node SN may be related to several signal injection labels SG-T-2, i.e. one signal node SN availing several signals SG or versions of a signal, for example both input and output signals. As illustrated in the third distribution system signal representation switching parameter record DS-T-35$_3$, the third signal injection label SG-T-4$_3$ is related to the first signal node network identity SN-N-1$_1$ which was also related to the first signal injection label SG-T-4$_1$ in the first distribution system signal representation switching parameter record DS-T-35$_1$. Also the first client node is again subscribing to this third signal by the j'th signal distribution label SG-T-2$_j$.

In an embodiment, an association to signal nodes SN and client nodes CN may also be comprised in the distribution system identity register DS-A-18, and/or in the distribution system transport identity register DS-T-47. In these registers may preferably be comprised identifications for the application level and transport level, instead of or in addition to the signal node and client node network identifications SN-N-1, CN-N-1.

The signal node network identification SN-N-1 and client node network identification CN-N-1, also generally referred to as signal communication system network identifications SCS-N-2, and the establishment of signal communication system network representations SCS-N-7 from the injection transport representations IT-T-2 and distribution transport representations DT-T-2, generally referred to as signal communication system transport representations SCS-T-1, are described above in more detail, for example with reference to FIGS. 16-18.

FIGS. 31a and 31b illustrates an embodiment of general communication and identification management in the distribution system DS. FIG. 31a thus illustrates a secure communication in general of distribution system communication data DS-A-1 between the distribution system DS and a distribution system communication entity DS-A-2, the latter e.g. being a distribution system operating entity DSOE, a distribution system vendor DSV, a signal node SN, a signal node operating entity SNOE, a signal node vendor SNV, a client node CN, a client node operating entity CNOE, a client node vendor CNV, a catalog system CS, a catalog system operating entity CSOE or a catalog system vendor CSV. The distribution system communication data DS-A-1 may for example be data relating to configuration, identifications, labels, properties, commissioning, subscription changes, inquiries, etc.

Considering communication of distribution system communication data DS-A-1 going from the distribution system DS to the distribution system communication entity DS-A-2, a distribution system data representation method DS-A-14 establishes a distribution system data representation DS-A-12 on the basis of distribution system data representation properties DS-A-15 from a distribution system data representation property register DS-A-16, for example defining rules for formatting, coding and/or cryptographic measures to apply at the application layer level. This may for example be implemented as described above for the signal node signal representation property register SN-A-44 with signal node signal representation properties SN-A-46 with reference to FIG. 18.

The distribution system DS may comprise a distribution system data representation property method DS-A-11 for generating distribution system data representation properties DS-A-15, and/or a distribution system data representation property interface method DS-A-10 for negotiating them with the distribution system communication entity DS-A-2.

The established distribution system data representation DS-A-12 is then used by a distribution system communication entity transport representation method DS-T-12 to form a distribution system communication entity transport representation DS-T-40 on the basis of distribution system communication entity transport representation properties DS-T-5 from a distribution system communication entity transport representation property register DS-T-4, for example defining rules for formatting, coding and/or cryptographic measures to apply at the transport layer level. This may for example be implemented as described above for the signal node injection transport representation properties SN-T-10 of a signal node injection transport representation property register SN-T-6 with reference to FIG. 18.

The distribution system communication entity transport representation DS-T-40 may now be transported to the distribution system communication entity DS-A-2 on a distribution system communication channel DS-T-1.

For distribution system communication data DS-A-1 being received on the distribution system communication channel DS-T-1, the received distribution system communication entity transport representation DS-T-40 is processed in the opposite direction, where the distribution system communication entity transport representation DS-T-40 is decoded to a distribution system data representation DS-A-12 by a distribution system communication entity transport representation interpretation method DS-T-41 on the basis of distribution system communication entity transport representation properties DS-T-5 as described above, here just used the opposite way. The distribution system data representation DS-A-12 is then decoded to distribution system communication data DS-A-1 by a distribution system data representation interpretation method DS-A-13 on the basis of distribution system data representation properties DS-A-15.

In the distribution system communication entity DS-A-2, the decoding of received distribution system communication entity transport representation DS-T-40 to distribution system communication data DS-A-1, or coding of distribution system communication data DS-A-1 to distribution system communication entity transport representation DS-T-40 may preferably be performed in the same way as described above for the distribution system DS.

The transport on the distribution system communication channel DS-T-1 may for example be performed using a distribution system network interface DS-N-3 in accordance with technologies described above for other network interfaces of the embodiments of the invention, and based on network addresses, e.g. IP addresses for an Internet Protocol-based system, from distribution system network identity register DS-N-4.

Further elaboration on application of cryptography in the representation methods and representation interpretation methods are provided below.

FIG. 31b illustrates general management of identifications of distribution system communication entities DS-A-2 in the distribution system DS. The identifications may for example advantageously be used for the secure, general communication described above with reference to FIG. 31a, and are also used in the more specific embodiments described above regarding for example communication of injection transport representations IT-T-2 and distribution transport representations DT-T-2 with signal nodes SN and client nodes CN as described above.

The distribution system DS comprises a distribution system identity register DS-A-18 holding the distribution system's own distribution system identity DS-A-17 and a distribution system identification DS-A-19 corresponding thereto. The distribution system identity register DS-A-18 further comprises distribution system communication entity identifications DS-A-31 corresponding to various distribution system communication entities DS-A-2.

To manage the distribution system communication entity identifications DS-A-31 is provided a distribution system communication entity identification receive method DS-A-4 for receiving distribution system communication entity identifications DS-A-31 from distribution system communication entities DS-A-2. Further is provided a distribution system communication entity identification verification method DS-A-5, which may for example use an identity register IR, for example as described below, to verify distribution system communication entity identifications DS-A-31. Further is preferably provided a distribution system communication entity identification verification transmit method DS-A-6, which may transmit a verification result to a distribution system communication entity DS-A-2, thereby for example enabling the distribution system DS to perform verification of identifications on behalf of other entities and report the result to them. Further is preferably provided a distribution system communication entity identification transmit method DS-A-32 for transmitting a distribution system communication entity identification DS-A-31 to a distribution system communication entity DS-A-2, e.g. for facilitating secure communication between other parties or in connection with initializing the signal communication of the present invention.

The distribution system DS further comprises a distribution system transport identity register DS-T-47 for facilitating the same on the transport layer level as described above with the distribution system identity register DS-A-18 of the application layer level. Hence, the distribution system transport identity register DS-T-47 comprises a distribution system transport identity DS-T-50 being the distribution system's own identity at the transport layer level, and a corresponding distribution system transport identification DS-T-46. It further comprises distribution system communication entity transport identifications DS-T-2, being transport layer level identifications of distribution system communication entities DS-A-2.

The transport layer level identification management may comprise the same methods as described above for the application layer level. In the example, only a distribution system communication entity transport identification verification method DS-T-3 for verifying received identifications is illustrated.

The distribution system communication entities DS-A-2 each comprises a corresponding structure. In the illustrated example is shown a distribution system communication entity identity DS-A-3 being the distribution system communication entity's DS-A-2 own identity at the application layer level, a corresponding distribution system communication entity identification DS-A-31, a distribution system identification DS-A-19 being an identification of the distribution system DS, and for the transport layer level a distribution system communication entity transport identification DS-T-2.

The identities, identifications and methods for verification, etc., are described in more detail below, with reference to FIGS. 39, 40, 41a and 41b. Further elaboration on application of cryptography in the representation methods and representation interpretation methods are provided below.

FIG. 32 illustrates communicative couplings to the distribution system DS in a preferred embodiment of a signal communication system SCS. The distribution system DS may be communicating with a number of distribution system communication entities DS-A-2 via distribution system communication channels DS-T-1. More specifically, some of the distribution system communication entities DS-A-2 and distribution system communication channels DS-T-1 are described here for an embodiment of the invention. The distribution system DS may for example communicate with a distribution system vendor DSV, for example during its manufacture or commissioning, through a distribution system vendor channel DSV-T-1, and with a distribution system operating entity DSOE, through a distribution system operating entity channel DSOE-T-1. The distribution system operating entity DSOE may also be referred to as a service provider or operator of the distribution system.

As mentioned above, the catalog system CS communicates with the distribution system DS through a distribution system catalog system channel DS-T-10. This communication may for example comprise information about signals and associated information, e.g. signal types, etc., gathered by the distribution system or distribution system operating entity and sent to the catalog system for publication. In various embodiments the communication between catalog system CS and distribution system DS may also comprise information about client nodes attempting to register a subscription to a signal. In other embodiments, such registration information is handled outside the catalog system directly between distribution system and client node or client node operating entity, and the catalog system only used to find relevant signals.

Besides communicating with the client nodes CN via the distribution transport channel DT-T-1, the distribution system DS may further be communicating with one or more of client node operating entities CNOE and client node vendors CNV. In various embodiments, it may be the client node CN itself, the client node operating entity CNOE, e.g. a user, or possibly the client node vendor CNV, which requests registration or subscription in the distribution system DS with respect to a client node CN. The distribution system DS may in an embodiment be communicating with the client node operating entity CNOE via a distribution system client node operating entity channel DS-T-9 and with the client node vendor CNV via a client node vendor channel CNV-T-1. The distribution system DS may for example be communicating with the client node vendor CNV during manufacture or commissioning of the client node CN, and with the client node operating entity CNOE directly or indirectly about registration or deregistration of agreements and wanted signals, and during commissioning.

Also, besides communicating with the signal nodes SN via the injection transport channel IT-T-1, the distribution system DS may further be communicating with one or more of signal node operating entity SNOE and signal node vendors SNV. In an embodiment the signal node vendor SNV or signal node operating entity SNOE may be sharing relevant information about signals SG from signal nodes SN with the distribution system DS, or be able to set accessibility options for the signals or monitor the utilization of the signal node SN. The distribution system DS may in an embodiment be communicating with the signal node operating entity SNOE via a distribution system signal node operating entity channel DS-T-33 and with the signal node vendor SNV via a signal node vendor channel SNV-T-1. The distribution system DS may for example be communicating with the signal node vendor SNV during manufacture or commissioning of the signal node SN, and with the signal node operating entity SNOE during commissioning, and for monitoring purposes.

Embodiments of functionalities of the distribution system DS are described in more detail below, e.g. regarding commissioning of signal nodes SN in the signal communication system SCS, regarding how information about a signal SG may be established in a catalog system CS, how a client node operating entity CNOE may get a distribution system signal representation switching parameter record DS-T-35 registered in the distribution system DS, and how corresponding switching of signal representations SG-A-1 is performed.

Signal Injection Labels and Signal Distribution Labels, FIG. 33

A preferred embodiment of the invention involves that the only explicit address specification of client nodes CN and signal nodes SN are defined in the distribution system DS. This feature has the technical implication that the individual signal nodes and client nodes are bound to transmit signal representations SG-A-1 via the distribution system DS instead of transmitting these data directly from peer to peer. In other words, the individual signals nodes SN and client nodes CN only comprises and transmits data sufficient for the distribution system DS to determine relevant address information by means of the distribution system signal representation switching parameter records DS-T-35.

This non-explicit addressing of client nodes by the signal nodes, and vice versa, evidently requires a central logic as described above, but also facilitates that the signal nodes and client nodes may deliver a reduced level of information in that they basically invoke a transmission without identifying the receiving client node or signal node. Consequently, the signal nodes may not require maintenance of recipient information and recipient rights locally in the individual signal nodes.

As described above, distribution of signal representations SG-A-1 in embodiments of a signal communication system according to the invention is therefore based on mapping between signal injection labels SG-T-4 and signal distribution labels SG-T-2. The signal injection labels SG-T-4 and signal distribution labels SG-T-2 are handles to the various signals SG. To enable the distribution system DS to distribute the signal representations SG-A-1, they are transmitted to and from signal nodes SN together with or including a signal injection label SG-T-4, as described above. A signal injection label SG-T-4 may in various embodiments be simple serial numbers or codes containing no further information, or comprise a signal type, signal identity, or other further information about the signal and/or the signal node. Transmissions of signal representations SG-A-1 to and from client nodes CN comprise a signal distribution label SG-T-2, which may likewise be a simple serial number or code containing no further information, or comprise a signal type, signal identity, or other further information about the signal and/or the client node. In an embodiment, the signal injection label SG-T-4 and/or signal distribution label SG-T-2 may also comprise an identification of the signal node SN or client node CN, respectively. Such identification may be used for cryptographic purposes, e.g. authentication or integrity protection, and does not necessarily include information about the node's location, address, owner, type, etc.

The signal injection label SG-T-4 and/or signal distribution label SG-T-2 associated with transmitted signal representations may thus be sufficient to facilitate an automatic transmission of signal representations through the distribution system, as the distribution system may use this label to identify unambiguously the relevant distribution system signal representation switching parameter record DS-T-35 and apply it to establish the correct addressee(s) of the signal representation and also to optionally relay or attach further relevant information to the signal representation enabling the receiver to understand and apply the received signal representation correctly.

The signal type preferably indicated by a signal injection label SG-T-4 or signal distribution label SG-T-2, may advantageously, but not necessarily, refer or relate to a signal type which is published by the catalog system CS. The information provided by indicating a signal type or signal identification may for example refer to category and specifications such as, e.g. a signal conveying a temperature in Celsius at a given sample rate, or a signal conveying a window opener control parameter indicating a position in percent between closed and fully open which the window is requested to move to. The signal injection or distribution label, or other information from the signal node SN and/or e.g. from a signal node operating entity SNOE, signal node vendor SNV or distribution system operating entity DSOE, may comprise conditions for delivery, such as for example geographical location or distance of the client node, available bandwidth for specific or groups of client nodes, optional billing, conditions of integrity, privacy and IT security, functional safety, certification and verification conditions of a signal node, technical considerations regarding configuration with other signal nodes, etc.

In an embodiment, the signal node SN generates signal injection label(s) SG-T-4 for its own signal(s) SG by means of a signal injection label generation method SG-T-5. The signal node may preferably store the signal node injection labels SG-T-4 in the signal node identity register SN-A-22 as described above. In this embodiment, the distribution system DS comprises a distribution system signal injection label receive method DS-T-31 for receiving the generated labels from the signal node SN, and preferably storing them with the associated signal node identifications SN-A-23 in a distribution system identity register DS-A-18.

In an embodiment, the client node CN generates signal distribution label(s) SG-T-2 for the signals SG it subscribes to, by means of a signal distribution label generation method SG-T-7. The client node may preferably store the signal distribution labels SG-T-2 in the client node identity register CN-A-14 as described above. In this embodiment, the distribution system DS comprises a distribution system signal distribution label receive method DS-T-29 for receiving the generated labels from the client node CN, and preferably storing them with the associated client node identifications CN-A-16 in a distribution system identity register DS-A-18.

In an embodiment as illustrated in FIG. 33, the distribution system DS is arranged to generate signal injection labels SG-T-4 and/or signal distribution labels SG-T-2. Thereby the distribution system may control a convention of naming, coding, information, etc., for signal labels, and ensure uniqueness of all labels. The distribution system DS may comprise a distribution system signal injection label generation method DS-T-30 for generating signal injection labels SG-T-4 and storing them in the distribution system identity register DS-A-18 together with their associated signal node identification SN-A-23. The distribution system DS may further or instead comprise a distribution system signal distribution label generation method DS-T-32 for generating signal distribution labels SG-T-2 and storing them in the distribution system identity register DS-A-18 together with their associated client node identification CN-A-16.

As described above, e.g. with reference to FIG. 3 and FIG. 6, the distribution system DS uses a distribution system signal representation switching method DS-T-34 and distribution system signal representation switching parameter records DS-T-35 to determine how an injection transport representation IT-T-2 comprising among others a signal injection label SG-T-4 should be switched to a distribution transport representation DT-T-2 comprising among others a signal distribution label SG-T-2, or vice versa. As described in more detail above, the switching and distribution is based on the associated signal injection labels SG-T-4 and signal distribution labels SG-T-2, e.g. stored in the distribution system signal representation switching parameter records DS-T-35, and associations of signal injection labels SG-T-4 with signal nodes SN and signal distribution labels SG-T-2 with client nodes CN, e.g. stored in the distribution system identity register DS-A-18, and/or associations of signal injection labels SG-T-4 with signal nodes SN and signal distribution labels SG-T-2 with client nodes CN, e.g. stored in the distribution system identity register DS-A-18.

In embodiments where the distribution system DS generates signal labels, the signal nodes SN may comprise signal injection label receive methods SG-T-6 to receive the generated signal injection labels SG-T-4 from the distribution system DS and store them in the signal node identity register SN-A-22 as handles for the respective signals SG. Likewise, the client nodes CN may comprise signal distribution label receive methods SG-T-3 to receive the generated signal distribution labels SG-T-2 from the distribution system DS and store them in the client node identity register CN-A-14 as handles for the respective signals SG.

The catalog system CS preferably uses signal node catalog labels SN-T-1 corresponding to individual signals SG for presenting signals, referring to signals or identifying signals in the catalog system CS. The signal node catalog labels SN-T-1 are preferably different from the signal node injection labels SG-T-4 for security reasons. The signal node catalog labels SN-T-1 may convey more information about signals and signal nodes than the signal injection labels SG-T-4, as the latter are in preferred embodiments primarily aimed at correct distribution without disclosing information, whereas the signal node catalog labels SN-T-1 are aimed at publishing information about available signals.

The signal node catalog labels SN-T-1 may be generated by the signal node SN and availed to the catalog system CS directly or via the distribution system DS. In a preferred embodiment, the signal node catalog labels SN-T-1 are generated by the distribution system DS, for example on the basis of signal injection labels, by a distribution system catalog label generation method DS-T-7. The signal node catalog labels SN-T-1 may in an embodiment be generated by the catalog system CS by a catalog system signal node catalog label generation method CS-T-30 and received by the distribution system DS by a distribution system catalog label receive method DS-T-8. The distribution system DS should preferably comprise a register mapping between signal node catalog labels SN-T-1 and corresponding signal injection labels SG-T-4 and signal distribution labels SG-T-2, to be able to establish distribution system signal representation switching parameter records DS-T-35 on the basis of signal node catalog labels SN-T-1.

The catalog system CS preferably comprises a catalog system signal label register CS-T-28 for catalog system records CS-A-22 storing signal node catalog labels SN-T-1 and/or related signal node catalog names SN-A-14, preferably together with signal node catalog descriptions SN-A-3 with a short or longer description of the associated signal, signal node, and related information.

Catalog System Insert, Search and Subscribe, FIGS. 34, 35

FIG. 34 is a sequence diagram illustrating an embodiment of publishing the availability of a signal via the catalog system. In this embodiment a signal node SN first performs a signal injection label generation method SG-T-5 to generate a signal injection label SG-T-4 as a handle for the respective signal SG. The signal node transmits the signal injection label SG-T-4 to the distribution system DS where it is received by a distribution system signal injection label receive method DS-T-31. In an alternative embodiment, as described above, the distribution system DS generates the signal injection label SG-T-4 by a distribution system signal injection label generation method DS-T-30, and sends it to the signal node for reference.

Based on the signal injection label SG-T-4, the distribution system DS performs a distribution system catalog label generation method DS-T-7 to generate a signal node catalog label SN-T-1 associated with the respective signal. The distribution system DS creates a catalog system record CS-A-22 comprising the signal node catalog label SN-T-1 and preferably further information about the respective signal, such as for example a signal node catalog name SN-A-14 and/or a signal node catalog descriptions SN-A-3. The catalog system record CS-A-22 is transmitted to the catalog system CS where it is received and stored in a catalog system signal label register CS-T-28 by a catalog system record receive method CS-A-27. In an alternative embodiment, the catalog system generates the catalog system record CS-A-22 and/or signal node catalog label SN-T-1 based on information about a signal received from the distribution system DS or directly from the signal node SN, signal node vendor SNV or signal node operating entity SNOE.

When the catalog system record CS-A-22 related to a specific signal SG of a specific signal node SN has been stored in the catalog system CS it may be searched for, discovered, browsed, inquired, retrieved, and/or subscribed to by client nodes CN and/or client node operating entities CNOE, for example as described below.

FIG. 35 is a sequence diagram illustrating an embodiment of discovering availability of a signal via the catalog system and subscribing to the signal with the distribution system. As described above, a catalog system record CS-A-22 with information about a particular signal is stored in the catalog system CS, e.g. received from the distribution system DS by a catalog system record receive method CS-A-27. In an embodiment with several signals from several signal nodes, e.g. many thousands of signals from thousands of signal nodes, the catalog system may comprise many thousands of catalog system records CS-A-22.

A client node operating entity CNOE, e.g. a person or a machine, may now use the catalog system CS to search for one or more signals of interest. The client node operating entity CNOE may for example be a landlord using the signal node communication system of the present invention to collect consumption data of tenants, and now looking for receiving heat consumption signals from a specific signal node of a newly installed apartment. The client node operating entity CNOE may for example be a traffic monitoring center using the signal node communication system of the present invention to monitor congestion and controlling traffic lights at heavily trafficked junctions, and now wanting to find all relevant signals available in a specific part of the city. The client node operating entity CNOE may for example be a geology researcher wanting to find all seismological signals from a particular continent available in the signal communication system. The client node operating entity CNOE may for example be a smartphone app searching for the nearest outdoor temperature sensor signal to its current location to show to its user.

The client node operating entity CNOE sends a catalog system record request CS-A-23 containing catalog system record request parameters CS-A-24 to the catalog system CS where it is received by a catalog system record request receive method CS-A-25. The catalog system record request parameters CS-A-24 may comprise search or lookup parameters, for example signal node catalog keywords SN-A-11 to search for in signal node catalog labels SN-T-1, signal node catalog names SN-A-14 and/or signal node catalog descriptions SN-A-3. The lookup parameters may also comprise filter values for narrowing the search to specific types of signals, locations of signal nodes, conditions for availability, e.g. costs or requirements, signal update frequency, precision, etc. The parameters may also comprise a specific signal node catalog label SN-T-1 or other specific reference for attempting to looking up a specific signal or signals from a specific signal node. As understood by the skilled person numerous methods and algorithms for searching for records in a database are known and therefore not elaborated further here.

The catalog system CS performs a catalog system record request response method CS-A-26 to respond to the client node operating entity CNOE with catalog system records CS-A-22 being the result of the lookup in accordance with the catalog system record request parameters CS-A-24. The client node operating entity CNOE may evaluate the result and possibly adjust the catalog system record request CS-A-23 to retrieve a new set of catalog system records CS-A-22.

When the client node operating entity CNOE has decided on a signal to subscribe to, it sends a catalog system switching request CS-T-40 to a catalog system switching request receive method CS-T-33 of the catalog system CS. The catalog system switching request CS-T-40 may for example comprise a signal node catalog label SN-T-1 or other reference to the desired signal. The catalog system CS proceeds by performing a catalog system switching link request method CS-T-27 which sends a request to the distribution system DS for a reference or link in accordance with the identified signal, e.g. by forwarding the signal node catalog label SN-T-1 or another reference known between the distribution system DS and catalog system CS.

A catalog system switching link receive method CS-T-29 at the catalog system CS receives the requested signal node distribution system reference SN-A-18, and a catalog system switching request response method CS-T-32 forwards the received signal node distribution system reference SN-A-18 to the client node operating entity CNOE.

As the distribution system DS in a preferred embodiment for security reasons is not generally accessible for spontaneous requests, the catalog system CS obtains a special reference or link, e.g. a uniform resource locator (URL), possibly with added querystring with coded information for authenticity reasons, which the client node operating entity CNOE can use to contact the distribution system DS. In other words, in a preferred embodiment, only the distribution system may process subscription requests, but only the catalog system may be available for general, e.g. public, signal discovery. Thereby is required a way to pass subscription requests to the distribution system. In the present embodiment, as described, this may be achieved by passing special links to the distribution system, allowing the potential subscriber to contact the distribution system directly. In an embodiment, the catalog system may further function as proxy for the subscription process also, or even perform it. In an embodiment, e.g. a small scale signal communication system with only one or a few, known users, or a controlled environments such as a closed IT system of an organization, the client node operating entities may be allowed to contact the distribution system directly for subscribing to specified signals without the signal node distribution system reference passed by the catalog system.

In the embodiment of FIG. 35, the client node operating entity CNOE now uses the provided signal node distribution system reference SN-A-18 to contact the distribution system DS to enter into an agreement about the respective signal SG. The distribution system DS may just accept the request without further considerations, or in preferred embodiments, evaluate the request with respect to client node operating entity CNOE, client node CN, properties of requested signal SG, estimated distribution costs related to signal distribution in accordance with the request, etc. The evaluation phase may have further steps, and may for example comprise a negotiation phase, information exchange phase, etc., for setting up the subscription with required and/or optional parameters. Among other things, the distribution system DS should at some point receive a network address or other contact information for the particular client node CN that the client node operating entity CNOE wants the signal SG to be delivered to, and which can be stored as client node identification CN-A-16 in the distribution system identity register DS-A-18.

When an agreement has been entered, the distribution system DS performs the distribution system signal distribution label generation method DS-T-32 to generate a signal distribution label SG-T-2 associated with the respective signal SG, and the performs a distribution system signal representation switching parameter record registration method DS-T-37 to establish and store a distribution system signal representation switching parameter record DS-T-35 in the distribution system switching control register DS-T-45. The distribution system signal representation switching parameter record DS-T-35 comprises as mentioned above, a mapping of signal injection labels SG-T-4 and signal distribution labels SG-T-2, to use in the switching of signals between signal nodes SN and client nodes CN.

Finally, the distribution system sends the generated signal distribution label SG-T-2 to the client node CN, where it is received by the signal distribution label receive method SG-T-3. The setup of a communication between the distribution system DS and the client node CN may preferably comprise further steps, e.g. related to authentication, e.g. two-factor authentication, exchange of cryptographic properties, e.g. public keys, etc.

In an alternative embodiment, the client node CN generates the signal distribution label SG-T-2 and sends it to the distribution system DS for storing in the distribution system signal representation switching parameter record DS-T-35 for use in the switching.

Switching, FIG. 36

FIG. 36 is a sequence diagram illustrating the switching performed at the distribution system DS when a signal SG is transmitted from a signal node SN to a client node CN. The same applies to signals transmitted from a client node CN to a signal node SN, mutatis mutandis.

As described above, the signal node SN establishes an injection transport representation IT-T-2 comprising a signal representation SG-A-1 and a signal injection label SG-T-4 being a handle of the respective signal SG. The injection transport representation IT-T-2 is transported to the distribution system DS on an injection transport channel IT-T-1. The distribution system DS performs a distribution system injection transport representation interpretation method DS-T-24 to interpret the injection transport representation IT-T-2 primarily to discover the signal injection label SG-T-4.

On the basis of associated signal injection labels SG-T-4 and signal distribution labels SG-T-2 stored in distribution system signal representation switching parameter record DS-T-35 of the distribution system DS, a distribution system signal representation switching method DS-T-34 determines which signal distribution label(s) SG-T-2 should be used for transporting the signal representation SG-A-1 to client node(s) CN. The relevant signal distribution label(s) SG-T-2 are associated with the relevant client node(s) CN, for example in a distribution system identity register DS-A-18 or in the distribution system signal representation switching parameter records DS-T-35.

When it has been determined which signal distribution labels SG-T-2 and, preferably, thereby which client node(s) CN the signal representation SG-A-1 should be transmitted to, a distribution system distribution transport representation method DS-T-18 establishes a distribution transport representation DT-T-2 comprising the signal representation SG-A-1 and the corresponding signal distribution label SG-T-2 for each client node CN.

The distribution transport representation(s) DT-T-2 are transmitted to the relevant client nodes CN from the distribution system on the distribution transport channel DT-T-1. At the client node CN, the distribution transport representation DT-T-2 is interpreted to the signal representation SG-A-1 and the signal distribution label SG-T-2, and then the signal representation SG-A-1 is interpreted to a signal SG, which is processed, e.g. made available to a client node operating entity CNOE.

Commissioning, FIGS. 37, 38

A new signal node SN may be registered in the signal communication system SCS in various ways. In an embodiment, it is manually registered in the distribution system identity register DS-A-18, and the distribution system DS is manually registered in the signal node identity register SN-A-22. In an embodiment, the signal node SN upon connection to a signal communication system network SCS-N-5 contacts the distribution system DS at a preconfigured address or a discoverable address and gets registered.

In a preferred embodiment, in order to maintain integrity and authentication, e.g. to avoid fraud of signal nodes or breach of data privacy, the signal node SN is not able to register itself with a distribution system DS without further confirmation or authentication as supporting evidence.

Such an embodiment is illustrated in FIG. 37. It is a sequence diagram illustrating a signal node commissioning method SN-A-13 according to a preferred embodiment of the invention. In this embodiment, the signal node SN comprises a signal node local interface SN-A-25, e.g. a display. Information on the signal node local interface SN-A-25 will only be available locally, and a person or machine being able to forward information from the signal node local interface SN-A-25 must therefore be present at the location of the signal node SN. This aspect is utilized by the commissioning method of the present embodiment by requiring a signal node operating entity SNOE to read information on the display and type it in to an interface of the distribution system DS, which sends it to the signal node SN for verification that it was in fact the information shown on the display, whereby it is confirmed as reasonably probable that the signal node operating entity SNOE is actually registering a signal node SN of his or her possession or management.

In more detail, the commissioning starts with the signal node SN using a signal node commissioning identification message generation method SN-A-7 to generate a signal node commissioning identification message SN-A-4, which may be a word, a PIN code, e.g. 6 or 8 digits, a sequence of letters and numbers, a picture, e.g. a QR code, etc. The signal node commissioning identification message SN-A-4 is preferably random or pseudo random i.e. practically unpredictable, or comprises a combination of random information and information about the signal node SN, e.g. a network address, serial number, etc.

The signal node SN uses a signal node commissioning identification message indication method SN-A-8 to display the signal node commissioning identification message SN-A-4 on the signal node local interface SN-A-25. The message may in various embodiments be displayed, or generated and displayed upon user interaction, e.g. pushing a button, or automatically at first connection to a network. The message may be shown until commissioning is finished, or only for a limited time, requiring a new interaction to be displayed again if commissioning did not take place the first time.

A signal node operating entity SNOE, e.g. an owner, user, administrator or service technician installing the signal node SN, is thereby able to read the signal node commissioning identification message SN-A-4 on the signal node local interface SN-A-25, provided he or she is locally present. In an embodiment the signal node operating entity SNOE may be a machine, e.g. a computer, e.g. a home automation controller, process controller, data acquisition hub, etc., and the signal node local interface may be a machine to machine communication interface for local communication.

According to the present embodiment, the signal node operating entity SNOE uses an interface of the distribution system DS, e.g. a website, to input the signal node commissioning identification message SN-A-4 to the distribution system DS. The distribution system DS interface may for example be a signal node registration website or a signal node administration app for a smartphone, for registering various details about the signal node and signal node operating entity, e.g. name, address, location of signal node, user account of the signal communication system, etc. In an embodiment, the interface is only used to input the signal node commissioning identification message SN-A-4.

The distribution system DS transmits a signal node commissioning identification message confirmation SN-A-5 to the signal node SN where it is received by a signal node commissioning identification message confirmation receive method SN-A-6. The signal node commissioning identification message confirmation SN-A-5 may simply be a copy of the signal node commissioning identification message SN-A-4, or it may be derived from it, or comprise more information in addition to it. The distribution system DS may have received sufficient information to be able to transmit to the signal node SN, e.g. a network address, from the signal node operating entity SNOE, from the signal node commissioning identification message SN-A-4, from the signal node SN itself upon first connection to the network, or by other means.

The signal node SN performs a signal node commissioning identification message verification method SN-A-9 to verify whether the signal node commissioning identification message confirmation SN-A-5 received from the distribution system DS is identical to, or derived from, the signal node commissioning identification message SN-A-4 which was shown on the signal node local interface SN-A-25. Disregarding typing errors, which may be discovered by allowing a new attempt to register, an erroneous signal node commissioning identification message confirmation SN-A-5 means that the signal node operating entity SNOE attempting to commission the signal node SN is not locally present at the location of the signal node SN, and thereby could be anyone. On the other hand, a correct signal node commissioning identification message confirmation SN-A-5 means that the person trying to register the signal node is highly likely located at the same place as the signal node as he typed the right code, and thereby is most probably allowed to do so, and thereby also most probably acknowledge the commissioning of the specific signal node. In other words, for most practical purposes, the present embodiment offers a sufficiently reliable and secure commissioning method.

After having verified whether the received signal node commissioning identification message confirmation SN-A-5 is acceptable or not, the signal node SN responds to the distribution system by a signal node commissioning confirmation transmission method SN-A-2 whereby a signal node commissioning confirmation SN-A-1 is sent to the distribution system DS.

If the signal node commissioning confirmation SN-A-1 is acceptable, the signal node SN may be approved by the distribution system DS.

After the approval, various information may in a preferred embodiment be exchanged between the signal node SN and distribution node DS, e.g. exchange of signal node identification SN-A-23 and distribution node identification DS-A-19, exchange of signal node injection transport identification SN-T-4 and distribution system injection transport identification DS-T-22, exchange of signal node injection transport representation properties SN-T-10 and distribution system injection transport representation properties DS-T-26, etc. The various information exchanged may also comprise signal injection labels SG-T-4 and signal node catalog labels SN-T-1.

In an alternative embodiment, the signal node SN generates the signal node commissioning identification message SN-A-4 and transmits it to the distribution system DS as well as displays it on the signal node local interface SN-A-25, whereby the distribution system DS may perform the verification.

In an alternative embodiment, the distribution system DS generates an identification message and transmits it to the signal node SN, which displays it on the signal node local interface. The distribution system DS verifies whether the signal node operating entity SNOE is then able to type in the message displayed on the signal node display.

A new client node CN may be registered in the signal communication system SCS in various ways, similar to the signal node SN or differently. In an embodiment, it is manually registered in the distribution system identity register DS-A-18, and the distribution system DS is manually registered in the client node identity register CN-A-14. In an embodiment, the client node CN upon connection to a signal communication system network SCS-N-5 contacts the distribution system DS at a preconfigured address or a discoverable address and gets registered.

In a preferred embodiment, in order to maintain integrity and authentication, e.g. to avoid fraud or breach of data privacy, the client node CN is not able to register itself with a distribution system DS without further confirmation or authentication as supporting evidence.

Such an embodiment is illustrated in FIG. 38. It is a sequence diagram illustrating a client node commissioning method CN-A-9 according to a preferred embodiment of the invention. In this embodiment, the client node CN comprises a client node local interface CN-A-17, e.g. a display. Information on the client node local interface CN-A-17 will only be available locally, and a person or machine being able to forward information from the client node local interface CN-A-17 must therefore be present at the location of the client node CN. This aspect is utilized by the commissioning method of the present embodiment by requiring a client node operating entity CNOE to read information on the display and type it in to an interface of the distribution system, which sends it to the client node for verification that it was in fact the information shown on the display, whereby it is confirmed as reasonably probable that the client node operating entity CNOE is actually registering a client node CN of his or her possession or management.

In more detail, the commissioning starts with the client node CN using a client node commissioning identification message generation method CN-A-5 to generate a client node commissioning identification message CN-A-2, which may be a word, a PIN code, e.g. 6 or 8 digits, a sequence of letters and numbers, a picture, a QR code, etc. The client node commissioning identification message CN-A-2 is preferably random or pseudo random i.e. practically unpredictable, or comprises a combination of random information and information about the client node CN, e.g. a network address, serial number, etc.

The client node CN uses a client node commissioning identification message indication method CN-A-6 to display the client node commissioning identification message CN-A-2 on the client node local interface CN-A-17. The message may in various embodiments be displayed, or generated and displayed upon user interaction, e.g. pushing a button, or automatically at first connection to a network. The message may be shown until commissioning is finished, or only for a limited time, requiring a new interaction to be displayed again if commissioning did not take place the first time.

A client node operating entity CNOE, e.g. an owner, user, administrator or service technician attempting to connect the client node CN to the distribution system, is thereby able to read the client node commissioning identification message CN-A-2 on the client node local interface CN-A-17, provided he or she is locally present. In an embodiment the client node operating entity CNOE may be a machine, e.g. a computer, e.g. a web server, home automation controller, process controller, data acquisition hub, etc., and the client node local interface may be a machine to machine communication interface for local communication.

According to the present embodiment, the client node operating entity CNOE uses an interface of the distribution system DS, e.g. a website, to input the client node commissioning identification message CN-A-2 to the distribution system DS. The distribution system DS interface may for example be a client node registration website or a client node administration app for a smartphone, for registering various details about the client node and client node operating entity, e.g. name, address, location of client node, user account of the signal communication system, etc. In an embodiment, the interface is only used to input the client node commissioning identification message CN-A-2. In an embodiment, an interface of the catalog system CS is used instead.

The distribution system DS transmits a client node commissioning identification message confirmation CN-A-3 to the client node CN where it is received by a client node commissioning identification message confirmation receive method CN-A-4. The client node commissioning identification message confirmation CN-A-3 may simply be a copy of the client node commissioning identification message CN-A-2, or it may be derived from it, or comprise more information in addition to it. The distribution system DS may have received sufficient information to be able to transmit to the client node CN, e.g. a network address, from the client node operating entity CNOE, from the client node commissioning identification message CN-A-2, from the client node CN itself upon first connection to the network, or by other means.

The client node CN performs a client node commissioning identification message verification method CN-A-8 to verify whether the client node commissioning identification message confirmation CN-A-3 received from the distribution system DS is identical to, or derived from, the client node commissioning identification message CN-A-2 which was shown on the client node local interface CN-A-17. Disregarding typing errors, which may be discovered by allowing a new attempt to register, an erroneous client node commissioning identification message confirmation CN-A-3 means that the client node operating entity CNOE attempting to commission the client node CN is not locally present at the location of the client node CN, and thereby could be anyone. On the other hand, a correct client node commissioning identification message confirmation CN-A-3 means that the person trying to register the client node is highly likely located at the same place as the client node as he typed the right code, and thereby is most probably allowed to do so, and thereby also most probably acknowledge the commissioning of the specific client node. In other words, for most practical purposes, the present embodiment offers a sufficiently reliable and secure commissioning method.

After having verified whether the received client node commissioning identification message confirmation CN-A-3 is acceptable or not, the client node CN responds to the distribution system by a client node commissioning confirmation transmission method CN-A-11 whereby a client node commissioning confirmation CN-A-1 is sent to the distribution system DS.

If the client node commissioning confirmation CN-A-1 is acceptable, the client node CN may be approved by the distribution system DS.

After the approval, various information may in a preferred embodiment be exchanged between the signal node CN and distribution node DS, e.g. exchange of client node identification CN-A-16 and distribution node identification DS-A-19, exchange of client node distribution transport identification CN-T-3 and distribution system distribution transport identification DS-T-15, exchange of client node distribution transport representation properties CN-T-9 and distribution system distribution transport representation properties DT-T-3, etc. The various information exchanged may also comprise signal distribution labels SG-T-2.

In an alternative embodiment, the client node CN generates the client node commissioning identification message CN-A-2 and transmits it to the distribution system DS as well as displays it on the client node local interface CN-A-17, whereby the distribution system DS may perform the verification.

In an alternative embodiment, the distribution system DS generates an identification message and transmits it to the client node CN, which displays it on the client node local interface. The distribution system DS verifies whether the client node operating entity is then able to type in the message displayed on the client node display.

Identity Register, FIGS. 39, 40, 41a, 41b

As described above, the signal node SN, the distribution system DS and the client node CN may preferably use public key cryptography to protect the communication and/or to share keys for symmetric encryption. In various, preferred embodiments, the parties communicating with each other, e.g. a signal node and the distribution system, or the distribution system and a client node, may also be required to be able to authenticate or verify each other's identity. In preferred embodiments, such authentication or the like is applied differently, for example with separate keys, at several layers, for example at the application layer, the transport layer and the network layer, or a sub-set of them. In various, preferred embodiments, the authorization of a party to participate in the communication may be revocable, e.g. at expiry of contract, making it necessary to be able to verify the authorization of another party.

In order to facilitate tools for meeting these trust concerns and requirements, embodiments of the present invention preferably comprise an identity register IR, for example comprising in full or partially a public key infrastructure, PKI, allowing certification of parties, and subsequently verification and revocation of certification. The identity register IR may thus be an integrated singular entity, or it may be distributed geographically and/or functionally, even distributed to one or more of the parties, e.g. to the distribution system DS. The public key infrastructure may for example be based on or simply be one of the conventional or future common approaches, as for example the certificate authority approach, the web of trust approach, the simple PKI approach or the blockchain-based PKI approach. In preferred embodiments, the identity register IR involves a trusted third party, e.g. one of the commercial certificate authorities, a governmental organization, or the distribution system DS itself if trusted by all parties. The trusted third party may preferably be given the tasks of issuing digital certificates to the parties or at least verifying self-signed digital certificates, maintaining registers of valid and revoked digital certificates, and respond to requests for verification or revocation of the digital certificates. The digital certificates certify the relation between a public key and a party, for example a signal node identification SN-A-23 and a signal node identity SN-A-21 of a signal node SN.

For example, a specific signal node's SN digital certificate certifies that an entity which is able to decrypt a message encrypted based on the signal node identification SN-A-23, e.g. public key associated with the digital certificate, must be trusted as being that specific signal node SN.

Only that specific signal node SN is in possession of that unique signal node identity SN-A-21, e.g. private key, which works with the public key of that specific digital certificate. Authentication can therefore be performed by verifying with the identity register IR the association of a specific party with a certain public key, i.e. identification, and then challenge that specific party to decrypt a small message that was encrypted based on their public key, or encrypt a small message, which can then only be decrypted based on their private key, i.e. identity. Integrity and privacy of signals can be achieved by using the recipient's public key for encryption, thereby requiring the recipient's own private key for successful decryption. Preferably all of signal nodes, distribution systems, and client nodes, communicate with the identity register IR to register themselves, receive certificates and verify the identity of the other parties. It is noted, that the identity register IR may comprise more than one service provider. For example, in an embodiment, one or more of the parties, e.g. a signal node, a distribution system or a client node, may use a different certificate authority than one or more of the other parties, e.g. another signal node, for their own digital certificate, as long as each party trusts all the relevant certificate authorities for its communication.

FIG. 39 illustrates an embodiment of a signal communication system SCS with an identity register IR, a number of signal nodes SN, a number of client nodes CN, a distribution system DS and a catalog system CS. In accordance with the above description, each of the signal communication system entities preferably comprises a number of identifications IN-A-1 of different categories, for communication at different layers or with different parties. For example, each of the signal communication system entities preferably comprises an entity identification EN-A-1, an entity transport identification EN-T-1 and a signal communication system network identification SCS-N-2. The identity register IR comprises a number of such identifications of the system entities, preferably all identifications used in the system. In a preferred embodiment, the identity register IR generates or facilitates the generation of the identifications used throughout the system, and thereby knows them all.

In the more specific embodiment illustrated in FIG. 39, the identity register IR is illustrated as comprising an identity register identity IR-A-7 and a corresponding identity register identification IR-A-1. These two properties are used in authenticating the identity register to other entities, and for integrity protection and encryption of communication with the identity register IR. In one embodiment, the identity register identity IR-A-7 may comprise a private key and the identity register identification IR-A-1 a public key of a key pair associated with an asymmetric cryptography system. The padlock in FIG. 39 illustrates the identity that is kept private in a preferred embodiment.

Among the identifications IN-A-1 stored by the identity register IR, may for example as illustrated in FIG. 39, be a distribution system identification DS-A-19, which may for example be a public key of an asymmetric cryptography system applied by the distribution system DS. Likewise, other identifications, possibly represented by public keys, may be a number of signal node identifications SN-A-23 corresponding to the signal nodes SN in the system, a number of client node identifications CN-A-16 corresponding to the client nodes CN in the system, and a catalog system identification CS-A-33. For the transport layer, the identity register IR may for example comprise a distribution system injection transport identification DS-T-22 and a distribution system distribution transport identification DS-T-15, both belonging to the identification sub-category of distribution system transport identifications DS-T-46. The identity register IR for example further comprises a number of signal node injection transport identifications SN-T-4, a number of client node distribution transport identifications CN-T-3, and a catalog system transport identification CS-T-34.

The identity register IR preferably also stores further identifications IN-A-1, for example signal communication system network identifications SCS-N-2 for the network layer communication, signal node operating entity identifications SNOE-A-1, client node operating entity identifications CNOE-A-1, distribution system operating entity identifications DSOE-A-3, catalog system operating entity identifications CSOE-A-1, signal node vendor identifications SNV-A-1, client node vendor identifications CNV-A-1, etc., etc.

The identity register IR does in an embodiment comprise an identity verifying signal communication system entity IV-A-1, for use by the various signal communication system entities, e.g. signal node SN, client node CN, etc. to enquire about the validity of identifications received from other entities. This is facilitated by an identity register identification validation method IR-A-4 to confirm or reject the validity of an identification, for example by confirming that the identification is properly signed by the identity register IR and not on a revocation list, or by relaying the validation request to, e.g., a certificate authority.

In an embodiment where the identity register IR participates in generation of identifications IN-A-1 for the various entities, the identity register may comprise an identity register identity representation receiving method IR-A-2 which is used by the identity register IR to receive an identity representation ID-A-2 from an entity, e.g. from a signal node, etc. The identity representation ID-A-2 may for example be a serial number, a name, a network address or URL, a domain name, etc., for machine-type entities, or a passport, ID card, name and address, etc., for a person-type entity. The identity representation ID-A-2 may alternatively be a previously issued identification, e.g. a digital certificate, from the identity register or another certificate authority trusted by the identity register.

The identity register IR further in a preferred embodiment comprises an identity register identity representation verification method IR-A-3 for verifying the received identity representation ID-A-2. In a preferred embodiment, it does this against one or more identity properties ID-A-1 being different from said identity representations ID-A-2. The identity properties ID-A-1 may for example be a PIN-code, a password, a digital key, a second identity representation of a different type, etc. Preferably, the identity properties ID-A-1 are received in a different way than the identity representation ID-A-2, for example via two-factor authentication, etc.

To generate the new identification IN-A-1 for the requesting entity, the identity register IR may in a preferred embodiment comprise an identity register identification generating method IR-A-6. This method is arranged to generate identifications IN-A-1 from the received identity representations ID-A-2, for example by generating and signing a digital certificate comprising a public key in the name of the requesting entity. The identity register IR preferably stores the generated identification at itself, and preferably transmits it to the requesting entity.

FIG. 40 illustrates and embodiment of a signal communication system according to the invention further relating to the identifications. Illustrated are a signal node SN, a client node CN, a distribution system DS and a catalog system CS, all connected to the identity register IR. The identity register IR comprises an identity verifying signal communication system entity IV-A-1 as described above. Each entity comprises a number of identifications IN-A-1, whereof several are also stored in the identity register IR as described above. As in FIG. 39, padlocks indicate identities, which are kept private in a preferred embodiment, e.g. private keys for asymmetric cryptography systems.

The signal node SN has a signal node identity register SN-A-22 storing a signal node identity SN-A-21 with a corresponding signal node identification SN-A-23. As described above, the signal node identification SN-A-23 is preferably stored also in the identity register. The signal node identity register further comprises a number of client node identifications CN-A-16 and a distribution system identification DS-A-19. Thereby the signal node is able to authenticate, integrity protect, encrypt, etc., communication with the client node CN and distribution system DS.

On the transport layer level, the signal node SN further has a signal node transport identification register SN-T-3 storing a, preferably private, signal node injection transport identity SN-T-15 and a corresponding signal node injection transport identification SN-T-4. The signal node transport identification register SN-T-3 further comprises a distribution system injection transport identification DS-T-22 for communication with a distribution system DS on the transport layer level.

The signal node SN preferably comprises more identifications, e.g. for the network layer communication, which are not shown due to complexity of the drawings.

All the identification stored in the signal node may preferably also be stored in the identity register IR, as illustrated in FIG. 39. The identities, which are marked with padlocks for illustration, are preferably private, and only stored in the signal node SN.

The client node CN shown in FIG. 40 may in an embodiment, with respect to the identifications, be identical to the system node SN, mutatis mutandis. Hence, for example, the signal node SN and client node CN knows each other's identifications and may use them for mutual, private communication, e.g. the transmittal of signals SG in the system. When any of them has to validate the other's identification, the identity register is inquired about that identification. The same is generally the case for the catalog system CS, which however in the illustrated embodiment only stores distribution system identifications DS-A-19 and distribution system transport identifications DS-T-46, besides its own identity and identification.

The distribution system DS is also shown according to the same principles with a distribution system identity register DS-A-18 comprising its own distribution system identity DS-A-17 and corresponding distribution system identification DS-A-19. Further on the application layer level, the distribution system identity register DS-A-18 comprises a number of distribution system communication entity identifications DS-A-31, of which some below to the special categories of signal node identifications SN-A-23, client node identifications CN-A-16 and catalog system identifications CS-A-33.

Also on the transport layer level, the distribution system DS comprises a distribution system transport identity DS-T-47 comprising a distribution system transport identity DS-T-50 and a corresponding distribution system transport identification DS-T-46. In an embodiment the distribution system DS comprises a different identity and identification for the signal node communication DS-T-20, DS-T-22 and the client node communication DS-T-13, DS-T-5. The distribution system DS further, preferably, comprises distribution system communication entity transport identifications DS-T-2, of which some may be of specific categories such as signal node injection transport identifications SN-T-4, etc.

As mentioned above, the various entities may preferably comprise more identities and identifications, for example regarding network layer communications which due to complexity is not shown, and for example, different identifications may be used for authentication and encryption, or identifications be used at the application layer level for the entity itself and its signal representation. In a preferred embodiment several other entities, as exemplified above, e.g. operating entities, vendors, etc., are also part of the signal communication system and each be related with a number of identities and identifications.

FIG. 41A illustrates an embodiment of the identity register's service for registration of identifications, i.e. for example as a public key infrastructure certification authority. In this example, the signal node SN is arranged with or has access to a signal communication system entity identification generating method SCS-A-3, e.g. implemented in a security hardware of the signal node SN, or provided by the signal node vendor SNV, to generate a pair of signal node identity SN-A-21 and signal node identification SN-A-23 associated with the particular signal node SN. In a preferred embodiment the signal communication system entity identification generating method SCS-A-3 generates identity/identification pairs according to an asymmetric cryptography system, so that for example, as mentioned above, the signal node identity SN-A-21 is a private key and the signal node identification SN-A-23 is a corresponding public key. In an alternative embodiment, the key pair is generated by a trusted third party authority.

When the key pair has been obtained, the signal node SN sends a request to the identity register IR to issue a certificate based on an identity representation ID-A-2, and the identity register IR employs an identity register identity representation receiving method IR-A-2 to receive the identity representations ID-A-2 as described above. In this example, the identity representation ID-A-2 may preferably be a public key, preferably the generated signal node identification SN-A-23.

The identity register IR further comprises an identity register identity representation verification method IR-A-3 which is used to validate the identity representations. The range of verification applied may depend on a desired certificate validation class, e.g. ranging from simply proofing ownership of a corresponding private key, to a validation by a trusted human being based on a physical or biometric property of the requester. Various classes of validation are well-established, and the skilled person is thereby able to implement a desired validation class in an embodiment of the invention. As an example, in a preferred embodiment, the identity register identity representation verification method IR-A-3 performs two validation points. As one validation point, the identity register IR exchanges a challenge message with the signal node SN, the challenge message e.g. being encrypted by the identity register IR using the signal node identification SN-A-23 so that proper decryption by the signal node SN will prove possession of the corresponding signal node identity SN-A-21. As another validation point the identity register IR receives a verifiable identity property ID-A-1, e.g. through a different channel than the identity representation ID-A-2. The identity property ID-A-1 may in the case of a signal node SN for example be a code printed physically at the signal node housing or given to the signal node operating entity SNOE by the signal node vendor SNV, e.g. on a proof of purchase, or it may preferably as shown in FIG. 41A be a confirmation by a party who is already trusted, e.g. a signal node vendor SNV already being trusted by the identity register IR.

If the verification succeeds, an identity register identification generating method IR-A-6 is employed to generate an identification, e.g. digital certificate with the public key, in this example the signal node identification SN-A-23, and the digital certificate is transmitted to the requesting entity, here the signal node SN. In a preferred embodiment where the signal node SN maintains distinct identities and identifications for its different layers or purposes, e.g. signal node identity, signal node injection transport identity and a signal node network identity, the signal node SN has to request the identity register several times to have all the identifications verified and digital certificates signing the associated public keys generated.

While the above is an illustration of an embodiment of the particular generation of a digital certificate to a signal node SN, the same functioning preferably applies to other entities of the signal communication system for getting identifications generated, e.g. for client nodes CN, distribution systems DS, catalog systems CS, and various operating entities and vendors, etc., related to the signal communication system SCS.

FIG. 41B illustrates how an entity may use the identity register to validate another entity's identification. In this example, during a setup phase, the signal node SN uses its signal node identification transmit method SN-A-24 to transmit its signal node identification SN-A-23 to a client node CN. The signal node identification SN-A-23 may, e.g., be a digital certificate signed by the identity register IR and comprising a public key associated with a private key being the signal node identity SN-A-21.

The client node CN should store the signal node identification SN-A-23 as described above with reference to FIG. 40, to facilitate it to e.g. validate the authenticity of received signals (e.g. measurements) assumedly originating from the signal node SN, and/or to facilitate it to e.g. integrity protect and encrypt signals (e.g. control signals) which the client node CN is going to communicate to the signal node SN.

However, before relying on the received signal node identification SN-A-23 for the above-mentioned purposes, the client node CN should verify that what it received is indeed an identification of the intended signal node SN. For this purpose, the client node CN has a client node signal node identity verification method CN-A-26. In the embodiment illustrated in FIG. 41B, the client node signal node identity verification method CN-A-26 involves sending the received signal node identification SN-A-23 or a relevant part of it to the identity register IR in its capacity of an identity verifying signal communication system entity IV-A-1. The identity register IR performs an identity register identification validation method IR-A-4 to confirm or reject the validity of the signal node identification SN-A-23, and returns the result to the client node signal node identity verification method CN-A-26 of the client node. Based on the result, the client node CN decides whether or not to trust and use the particular signal node identification SN-A-23.

The identity register identification validation method IR-A-4 may for example involve looking up the identification in a revocation list, e.g. looking up a digital certificate in a certificate revocation list (CRL), verifying the signature of the certificate, e.g. the identity register's own or another certificate authority's signature, comparing a hash or checksum of the identification with the version stored in the identity register IR itself according to FIG. 39, etc. Instead of transmitting the complete signal node identification SN-A-23 to the identity register IR, it may in various embodiments be sufficient to send a challenge message to the identity register IR using the signature of the identification to prove the signature, and/or send a hash or checksum of the identification or a part of it for the identity register IR to compare with its own version.

The above-described embodiment of validating of the particular generation of a digital certificate to a signal node SN preferably applies accordingly to any signal communication system entity having to validate a received identification of another entity, e.g. validating identifications between signal nodes SN, client nodes CN, distribution systems DS, catalog systems CS, and various operating entities and vendors, etc., related to the signal communication system SCS.

In an embodiment, a hybrid distribution identity node HY-A-6 may be a physical device or server hardware or software structure arranged to comprise a distribution system DS part and an identity register IR part.

In an embodiment, a hybrid distribution catalog identity node HY-A-7 may be a physical device or server hardware or software structure arranged to comprise a distribution system DS part, a catalog system CS part and an identity register IR part, thereby providing the entire management and control part of an embodiment of a signal communication system according to the present invention.

Cryptography

The set of signal representation methods SN-A-40, SN-A-39, CN-A-25, CN-A-24 of the application layer, the set of injection transport representation methods SN-T-9, SN-T-8, DS-T-25, DS-T-24 of the transport layer between signal node and distribution system, and the set of distribution transport representation methods CN-T-8, CN-T-7, DS-T-18, DS-T-17 of the transport layer between client node and distribution system, are preferably all different to advantageously obtain at least two layers of cryptography or encoding of the signals from the signal node to the client node, the different layers being readable to different nodes. The methods are preferably different in the sense that two different methods at least have different parameters, e.g. different cryptography keys. Different cryptography methods may also be applied, e.g. using symmetric encryption for one layer and asymmetric encryption for the other, using different asymmetric encryption algorithms for the two layers, etc. The different representation methods are preferably applied completely independently of each other, and may thereby be provided by completely different service providers for added adaptability and compatibility of the system. Further, the different nodes may be configured to support more than one of each relevant representation method for increased flexibility and compatibility with different peer configurations, different trust service providers, etc. For example, a distribution system DS may support a number of different types of injection transport representation methods for signal nodes of different configurations and a number of different types of distribution transport representation methods for client nodes of different configurations. Similarly, the signal nodes SN and/or the client nodes CN may support a number of different types of signal representation methods for use with different configurations of client nodes CN and/or signal nodes SN. Instead of supporting several different types of methods, nodes may also facilitate using different kinds of representation properties for the same method, thereby achieving different representations being established. The nodes should preferably support interpretation methods corresponding to their representation methods, or at least corresponding to their peers' representation methods.

In various advantageous embodiments, the signal nodes SN comprise a dedicated security chip or other integrated or stand-alone security hardware for optimized and secure execution of security algorithms such as, e.g., encryption and authentication. In a preferred embodiment, the security hardware manages the main processing according to the signal node signal representation method SN-A-40 and the signal node injection transport representation method SN-T-9, which preferably involves cryptographic processes, for example according to asymmetric cryptosystems, like e.g. RSA, elliptic curve cryptography (ECC), etc., or symmetric cryptosystems, like e.g. AES, 3DES, RC4, SHA, etc. Likewise, the client nodes CN, distribution system DS, catalog system CS, etc., may comprise dedicate security hardware to perform at least parts of the cryptography-related functions. In alternative embodiments the security functionality and algorithms are implemented in general purpose processors, e.g. a microprocessor or central processing unit operating the signal node. In some embodiments, the general purpose processor and dedicated security hardware are embedded in a System-on-Chip SoC or similar embedded configuration.

In various advantageous embodiments, the signal node injection transport representation method SN-T-9 and distribution system injection transport representation interpretation method DS-T-24, as for example in the embodiment shown in FIG. 18, may for example be based on an exchange of RSA or ECC public keys between the signal node SN and the distribution system DS and take place in accordance with the transport layer security (TLS) protocol widely supported by Internet-connected devices and software platforms. The signal node SN and distribution system DS may thereby establish a secure transport channel, the injection transport channel IT-T-1, using their respective private key and the other party's public key for encryption, decryption, authentication, integrity protection, etc. The same applies for the opposite signal direction, i.e. from distribution system DS to signal node SN, and for the transport layer communication between the distribution system DS and the client node CN.

The signal node signal representation method SN-A-40 and client node signal representation interpretation method CN-A-24, as for example in the embodiment shown in FIG. 18, may for example in a preferred embodiment be based on a symmetric key shared between the signal node SN and the client node CN, whereby the signal SG is encrypted by the signal node SN with the shared key and decrypted by the client node CN with the shared key. As the distribution system DS does not have the shared key only shared between the signal node SN and client node CN, the transport of the signal is protected against exposure between the signal node SN and the client node CN. For the exchange of the shared key itself during initialization, an asymmetric cryptographic method may be used by the signal node SN and the client node CN, possibly based on the same algorithms and keys as used by the signal node SN and client node CN for identification, respectively, or based on a separate set of keys.

Several alternatives based on known or future cryptography or coding techniques are available to the skilled person for establishing different encryption or coding of the injection transport representation and the signal representation, i.e. to achieve that the injection transport representation methods and signal representation methods are different with respect to coding and cryptographic features.

In some example embodiments, e.g. as described above, the signal representation methods SN-A-40, SN-A-39, CN-A-25, CN-A-24 of the application layer, may advantageously utilize a symmetrical encryption based on a shared key. If two or more client nodes CN subscribe to the same signal SG, they may in an embodiment be supplied with the same shared key so that the signal node SN only has to produce one signal representation using one shared key, which can be decrypted by all the client nodes CN having this shared key. The communication required between client nodes CN and signal nodes SN to negotiate or receive the shared key may advantageously be protected by asymmetrically encrypted channels so that none of the intermediate network devices, including the distribution system DS, can obtain the shared key, or may, in an embodiment, be shared by completely different communication channels, e.g. involving human interaction, telecom messaging, courier distribution, etc. In preferred embodiments, the possibility of a particular shared key existing in numerous client nodes CN, not being erased by previous subscribers, or even being leaked or stolen from a client node CN does not in itself immediately compromise the signal communication system SCS, as the distribution system DS manages the distribution of the signals so that distribution transport representations DT-T-2 are only transmitted to client nodes CN with currently valid distribution system signal representation switching parameter records DS-T-35, and according to distribution transport representation methods CN-T-8, CN-T-7, DS-T-18, DS-T-17 which are preferably individual for each client node CN at least in terms of parameters, and preferably based on asymmetric encryption based on individual client node distribution transport identifications CN-T-3. To reduce the risk that a compromised shared key leads to a compromised signal communication system, the shared key may advantageously be changed regularly, e.g. at regular intervals or each time a client node CN subscribes or unsubscribes from a signal channel. In a preferred environment, the distribution system DS maintains individual key pairs associated with each client node CN to envelope the encrypted content of signal nodes SN in a way that no client node CN can decrypt a message intended for a different client node.

List of references

| Abbreviation | Term |
| --- | --- |
| CN | client node |
| CN-A-1 | client node commissioning confirmation |
| CN-A-2 | client node commissioning identification message |
| CN-A-3 | client node commissioning identification message confirmation |
| CN-A-4 | client node commissioning identification message confirmation receive method |
| CN-A-5 | client node commissioning identification message generation method |
| CN-A-6 | client node commissioning identification message indication method |
| CN-A-8 | client node commissioning identification message verification method |
| CN-A-9 | client node commissioning method |
| CN-A-11 | client node commissioning confirmation transmission method |
| CN-A-12 | client node distribution system identity verification method |
| CN-A-13 | client node identity |
| CN-A-14 | client node identity register |
| CN-A-15 | client node signal data interface |
| CN-A-16 | client node identification |
| CN-A-17 | client node local interface |
| CN-A-18 | client node local interface method |
| CN-A-19 | client node response |
| CN-A-20 | client node response method |
| CN-A-21 | client node request |
| CN-A-22 | client node request method |
| CN-A-24 | client node signal representation interpretation method |
| CN-A-25 | client node signal representation method |
| CN-A-26 | client node signal node identity verification method |
| CN-A-27 | client node signal representation cryptographic key system |
| CN-A-29 | client node signal representation property interface method |
| CN-A-30 | client node signal representation property method |
| CN-A-31 | client node signal representation property register |
| CN-A-32 | client node signal representation properties |
| CN-A-33 | client node identification transmit method |
| CN-A-34 | client node battery |
| CN-A-35 | client node processor |
| CN-A-36 | client node memory |
| CN-A-37 | client node embedded system |
| CN-A-38 | client node electrical actuator |
| CN-A-39 | client node authentication identity |
| CN-A-40 | client node authentication identification |
| CN-A-41 | client node application controller |
| CN-N-1 | client node network identification |
| CN-N-2 | client node network identity register |
| CN-N-3 | client node network interface |
| CN-N-4 | client node wired communication link |
| CN-T-1 | client node distribution transport cryptographic key system |
| CN-T-2 | client node distribution transport identity register |
| CN-T-3 | client node distribution transport identification |
| CN-T-4 | client node distribution transport response method |
| CN-T-5 | client node distribution transport representation property register |
| CN-T-6 | client node distribution transport request method |
| CN-T-7 | client node distribution transport representation interpretation method |
| CN-T-8 | client node distribution transport representation method |
| CN-T-9 | client node distribution transport representation properties |
| CN-T-10 | client node distribution transport representation property interface method |
| CN-T-11 | client node distribution transport representation property method |
| CN-T-12 | client node distribution system distribution transport identity verification method |
| CN-T-13 | client node distribution transport identity |
| CNOE | client node operating entities |
| CNOE-A-1 | client node operating entity identification |
| CNOE-A-3 | client node operator register |
| CNOE-T-1 | client node operating entity channel |

-continued

List of references

| Abbreviation | Term |
|---|---|
| CNOE-T-2 | client node operating entity transport identification |
| CNV | client node vendor |
| CNV-A-1 | client node vendor identification |
| CNV-A-2 | client node vendor register |
| CNV-T-1 | client node vendor channel |
| CNV-T-2 | client node vendor transport identification |
| CS | catalog system |
| CS-A-2 | catalog system client node operating entity data representation property interface method |
| CS-A-3 | catalog system client node operating entity data representation property method |
| CS-A-4 | catalog system client node operating entity data representation |
| CS-A-5 | catalog system client node operating entity data representation interpretation method |
| CS-A-6 | catalog system client node operating entity data representation method |
| CS-A-7 | catalog system client node operating entity data representation properties |
| CS-A-8 | catalog system client node operating entity data representation property register |
| CS-A-9 | catalog system distribution system data |
| CS-A-10 | catalog system distribution system data representation property interface method |
| CS-A-11 | catalog system distribution system data representation property method |
| CS-A-12 | catalog system distribution system data representation |
| CS-A-13 | catalog system distribution system data representation interpretation method |
| CS-A-14 | catalog system distribution system data representation method |
| CS-A-16 | catalog system distribution system data representation property register |
| CS-A-18 | catalog system distribution system identification verification method |
| CS-A-22 | catalog system record |
| CS-A-23 | catalog system record request |
| CS-A-24 | catalog system record request parameter |
| CS-A-25 | catalog system record request receive method |
| CS-A-26 | catalog system record request response method |
| CS-A-27 | catalog system record receive method |
| CS-A-32 | catalog system identity register |
| CS-A-33 | catalog system identification |
| CS-A-34 | catalog system client node operating entity data |
| CS-A-36 | catalog system identity |
| CS-A-37 | catalog system distribution system data representation properties |
| CS-N-1 | catalog system network interface |
| CS-N-2 | catalog system network identity register |
| CS-N-3 | catalog system network identification |
| CS-T-2 | catalog system client node operating entity channel |
| CS-T-3 | catalog system client node operating entity transport representation properties |
| CS-T-4 | catalog system client node operating entity transport representation |
| CS-T-5 | catalog system client node operating entity transport representation interpretation method |
| CS-T-6 | catalog system client node operating entity transport representation method |
| CS-T-8 | catalog system client node operating entity transport representation property interface method |
| CS-T-9 | catalog system client node operating entity transport representation property method |
| CS-T-10 | catalog system client node operating entity transport representation transmit method |
| CS-T-11 | catalog system client node operating entity transport representation receive method |
| CS-T-14 | catalog system client node operating entity transport identification verification method |
| CS-T-15 | catalog system distribution system transport representation properties |
| CS-T-16 | catalog system distribution system transport representation |
| CS-T-17 | catalog system distribution system transport representation interpretation method |
| CS-T-18 | catalog system distribution system transport representation property interface method |
| CS-T-19 | catalog system distribution system transport representation property method |
| CS-T-20 | catalog system distribution system transport representation receive method |
| CS-T-21 | catalog system distribution system transport representation transmit method |
| CS-T-22 | catalog system distribution system transport identification verification method |
| CS-T-23 | catalog system distribution system transport representation method |
| CS-T-24 | catalog system operating entity channel |
| CS-T-25 | catalog system operating entity transport identifications |
| CS-T-27 | catalog system switching link request method |
| CS-T-28 | catalog system signal label register |
| CS-T-29 | catalog system switching link receive method |
| CS-T-30 | catalog system signal node catalog label generation method |
| CS-T-31 | catalog system signal node operating entity channel |
| CS-T-32 | catalog system switching request response method |
| CS-T-33 | catalog system switching request receive method |
| CS-T-34 | catalog system transport identifications |
| CS-T-35 | catalog system transport representation property register |
| CS-T-38 | catalog system client node channel |
| CS-T-39 | catalog system transport identity |
| CS-T-40 | catalog system switching request |
| CSOE | catalog system operating entity |
| CSOE-A-1 | catalog system operating entity identifications |
| CSV | catalog system vendor |
| CSV-A-1 | catalog system vendor identifications |
| CSV-T-1 | catalog system vendor channel |
| CSV-T-2 | catalog system vendor transport identifications |

-continued

List of references

| Abbreviation | Term |
|---|---|
| DS | distribution system |
| DS-A-1 | distribution system communication data |
| DS-A-2 | distribution system communication entities |
| DS-A-3 | distribution system communication entity identities |
| DS-A-4 | distribution system communication entity identification receive method |
| DS-A-5 | distribution system communication entity identification verification method |
| DS-A-6 | distribution system communication entity identification verification transmit method |
| DS-A-10 | distribution system data representation property interface method |
| DS-A-11 | distribution system data representation property method |
| DS-A-12 | distribution system data representation |
| DS-A-13 | distribution system data representation interpretation method |
| DS-A-14 | distribution system data representation method |
| DS-A-15 | distribution system data representation properties |
| DS-A-16 | distribution system data representation property register |
| DS-A-17 | distribution system identity |
| DS-A-18 | distribution system identity register |
| DS-A-19 | distribution system identification |
| DS-A-31 | distribution system communication entity identification |
| DS-A-32 | distribution system communication entity identification transmit method |
| DS-N-1 | distribution system distribution network identification |
| DS-N-2 | distribution system injection network identification |
| DS-N-3 | distribution system network interfaces |
| DS-N-4 | distribution system network identity register |
| DS-T-1 | distribution system communication channel |
| DS-T-2 | distribution system communication entity transport identification |
| DS-T-3 | distribution system communication entity transport identification verification method |
| DS-T-4 | distribution system communication entity transport representation property register |
| DS-T-5 | distribution system communication entity transport representation properties |
| DS-T-7 | distribution system catalog label generation method |
| DS-T-8 | distribution system catalog label receive method |
| DS-T-9 | distribution system client node operating entity channel |
| DS-T-10 | distribution system catalog system channel |
| DS-T-12 | distribution system communication entity transport representation method |
| DS-T-13 | distribution system distribution transport identity |
| DS-T-15 | distribution system distribution transport identification |
| DS-T-16 | distribution system distribution transport representation property register |
| DS-T-17 | distribution system distribution transport representation interpretation method |
| DS-T-18 | distribution system distribution transport representation method |
| DS-T-19 | distribution system distribution transport representation properties |
| DS-T-20 | distribution system injection transport identity |
| DS-T-22 | distribution system injection transport identification |
| DS-T-23 | distribution system injection transport representation property register |
| DS-T-24 | distribution system injection transport representation interpretation method |
| DS-T-25 | distribution system injection transport representation method |
| DS-T-26 | distribution system injection transport representation properties |
| DS-T-29 | distribution system signal distribution label receive method |
| DS-T-30 | distribution system signal injection label generation method |
| DS-T-31 | distribution system signal injection label receive method |
| DS-T-32 | distribution system signal distribution label generation method |
| DS-T-33 | distribution system signal node operating entity channel |
| DS-T-34 | distribution system signal representation switching method |
| DS-T-35 | distribution system signal representation switching parameter record |
| DS-T-36 | distribution system signal representation switching parameter record deregistration method |
| DS-T-37 | distribution system signal representation switching parameter record registration method |
| DS-T-40 | distribution system communication entity transport representation |
| DS-T-41 | distribution system communication entity transport representation interpretation method |
| DS-T-43 | distribution system communication entity transport representation property interface method |
| DS-T-44 | distribution system communication entity transport representation property method |
| DS-T-45 | distribution system switching control register |
| DS-T-46 | distribution system transport identification |
| DS-T-47 | distribution system transport identity register |
| DS-T-49 | distribution system signal transport classifiers |
| DS-T-50 | distribution system transport identity |
| DS-T-51 | distribution system operational classifiers |
| DSOE | distribution system operating entity |
| DSOE-A-2 | distribution system operating entity identification |
| DSOE-T-1 | distribution system operating entity channel |
| DSOE-T-2 | distribution system operating entity transport identification |
| DSV | distribution system vendor |
| DSV-A-1 | distribution system vendor identifications |
| DSV-T-1 | distribution system vendor channel |
| DSV-T-2 | distribution system vendor transport identification |
| DT-T-1 | distribution transport channel |
| DT-T-2 | distribution transport representation |
| DT-T-3 | distribution transport representation properties |

-continued

| List of references | |
|---|---|
| Abbreviation | Term |
| $F_N$ | footer |
| $H_N$ | header |
| HCA | heat cost allocator |
| HY-A-1 | hybrid client distribution node |
| HY-A-2 | hybrid signal client node |
| HY-A-3 | hybrid signal distribution client node |
| HY-A-4 | hybrid signal distribution node |
| HY-A-5 | hybrid distribution catalog node |
| HY-A-6 | hybrid distribution identity node |
| HY-A-7 | hybrid distribution catalog identity node |
| ID-A-1 | identity properties |
| ID-A-2 | identity representations |
| IN-A-1 | identification |
| IR | identity register |
| IR-A-1 | identity register identification |
| IR-A-2 | identity register identity representation receiving method |
| IR-A-3 | identity register identity representation verification method |
| IR-A-4 | identity register identification validation method |
| IR-A-6 | identity register identification generating method |
| IR-A-7 | identity register identity |
| IT-T-1 | injection transport channel |
| IT-T-2 | injection transport representation |
| IV-A-1 | identity verifying signal communication system entity |
| PLMRS | public land mobile radio system |
| PP | physical property |
| PWN | public wired network |
| Σ | heat value accumulator |
| SCS | signal communication system |
| SCS-A-1 | signal communication system entities |
| SCS-A-2 | signal communication system entity identification |
| SCS-A-3 | signal communication system entity identification generating method |
| SCS-N-1 | signal communication system entity network |
| SCS-N-2 | signal communication system entity network identification |
| SCS-N-3 | signal communication system entity network interface |
| SCS-N-4 | signal communication system entity wired communication link |
| SCS-N-5 | signal communication system network |
| SCS-N-6 | signal communication system sub-network |
| SCS-N-7 | signal communication system network representation |
| SCS-N-8 | signal communication system network representation method |
| SCS-N-9 | signal communication system network representation interpretation method |
| SCS-T-1 | signal communication system transport representation |
| SCS-T-2 | signal communication system transport identification |
| SCS-T-4 | signal communication system transport identity |
| SG | signal |
| SG-A-1 | signal representation |
| SG-A-2 | signal representation integrity protection tag |
| SG-A-3 | signal representation authentication tag |
| SG-T-2 | signal distribution label |
| SG-T-3 | signal distribution label receiving method |
| SG-T-4 | signal injection label |
| SG-T-5 | signal injection label generation method |
| SG-T-6 | signal injection label receive method |
| SG-T-7 | signal distribution label generation method |
| SN | signal node |
| SN-A-1 | signal node commissioning confirmation |
| SN-A-2 | signal node commissioning confirmation transmission method |
| SN-A-3 | signal node catalog description |
| SN-A-4 | signal node commissioning identification message |
| SN-A-5 | signal node commissioning identification message confirmation |
| SN-A-6 | signal node commissioning identification message confirmation receive method |
| SN-A-7 | signal node commissioning identification message generation method |
| SN-A-8 | signal node commissioning identification message indication method |
| SN-A-9 | signal node commissioning identification message verification method |
| SN-A-11 | signal node catalog keywords |
| SN-A-12 | signal node representation cryptographic key system |
| SN-A-13 | signal node commissioning method |
| SN-A-14 | signal node catalog name |
| SN-A-15 | signal node client node identity verification method |
| SN-A-16 | signal node data interface |
| SN-A-17 | signal node distribution system identity verification method |
| SN-A-18 | signal node distribution system reference |
| SN-A-20 | signal node electrical actuator |
| SN-A-21 | signal node identity |
| SN-A-22 | signal node identity register |
| SN-A-23 | signal node identification |

-continued

List of references

| Abbreviation | Term |
| --- | --- |
| SN-A-24 | signal node identification transmit method |
| SN-A-25 | signal node local interface |
| SN-A-26 | signal node local interface method |
| SN-A-32 | signal node response |
| SN-A-33 | signal node response method |
| SN-A-34 | signal node physical property method |
| SN-A-35 | signal node physical unit sensor |
| SN-A-36 | signal node request |
| SN-A-37 | signal node request method |
| SN-A-39 | signal node signal representation interpretation method |
| SN-A-40 | signal node signal representation method |
| SN-A-42 | signal node signal representation property interface method |
| SN-A-43 | signal node signal representation property method |
| SN-A-44 | signal node signal representation property register |
| SN-A-45 | signal node user interface |
| SN-A-46 | signal node signal representation properties |
| SN-A-47 | signal node battery |
| SN-A-48 | signal node processor |
| SN-A-49 | signal node memory |
| SN-A-50 | signal node embedded system |
| SN-A-52 | signal node authentication identity |
| SN-A-53 | signal node authentication identification |
| SN-N-1 | signal node network identification |
| SN-N-2 | signal node network identity register |
| SN-N-3 | signal node network interface |
| SN-N-4 | signal node wired communication link |
| SN-T-1 | signal node catalog label |
| SN-T-2 | signal node injection transport cryptographic key system |
| SN-T-3 | signal node injection transport identity register |
| SN-T-4 | signal node injection transport identification |
| SN-T-5 | signal node injection transport response method |
| SN-T-6 | signal node injection transport representation property register |
| SN-T-7 | signal node injection transport request method |
| SN-T-8 | signal node injection transport representation interpretation method |
| SN-T-9 | signal node injection transport representation method |
| SN-T-10 | signal node injection transport representation properties |
| SN-T-11 | signal node injection transport representation property interface method |
| SN-T-12 | signal node injection transport representation property method |
| SN-T-13 | signal node operating entity transport identification |
| SN-T-15 | signal node injection transport identity |
| SN-T-16 | signal node transport identifications |
| SN-T-17 | signal node distribution system injection transport identity verification method |
| SNOE | signal node operating entity |
| SNOE-A-1 | signal node operating entity identification |
| SNOE-A-4 | signal node operator register |
| SNOE-T-1 | signal node operating entity channel |
| SNV | signal node vendor |
| SNV-A-1 | signal node vendor identification |
| SNV-A-3 | signal node vendor register |
| SNV-T-1 | signal node vendor channel |
| SNV-T-2 | signal node vendor transport identification |
| TRV | thermostatic radiator valve |
| WN | wide area network |

The invention claimed is:

1. A signal communication system,
the signal communication system comprising at least three signal communication system entities,
at least one of said signal communication system entities being a signal node being identified by a signal node identification and comprising a signal node physical property method being arranged to interact physically with its environment and to convert between one or more physical properties and corresponding one or more signals, the signal node comprising a processor, a memory and at least one of a physical unit sensor, an electrical actuator or a data interface to acquire data from a sensor,
at least one of said signal communication system entities being a client node, comprising a client node signal data interface being arranged to provide a data interface for signals and said client node being identified by a client node identification, and being arranged to receive at least one of said one or more signals to interact with said signal node, and
at least one of said signal communication system entities being a distribution system, being identified by a distribution system identification, being arranged to switch said at least one of said one or more signals in the form of signal representations between said signal node and said client node, the distribution system being implemented on dedicated or shared computing hardware;
the signal node being communicatively coupled to the distribution system using an injection transport channel to send an injection transport representation of a signal representation of said at least one of said one or more signals;

the client node being communicatively coupled to the distribution system using a distribution transport channel to receive a distribution transport representation of said signal representation of said at least one of said one or more signals;

the signal node being communicatively coupled to at least one of said client nodes to transport said signal representations from said signal node to said at least one of said client nodes using the injection transport channel, said distribution system and the distribution transport channel;

the signal node being configured to maintain a signal node identity register, comprising a signal node identification and one or more signal injection labels each being a handle of a respective signal of said one or more signals;

the signal node being arranged to carry out
a signal node signal representation method being arranged to create representations of signals to provide said signal representation from said signal, and
a signal node request method being arranged to transmit a signal node request to convey said signal representation to said injection transport channel;

the client node being configured to maintain a client node identity register, comprising a client node identification and one or more signal distribution labels each being a handle of a respective signal of said one or more signals;

the client node being arranged to carry out
a client node signal representation interpretation method being arranged to interpret representations of signals to provide said signal from said signal representation, and
a client node response method being arranged to receive a client node response conveying said signal representation on a distribution transport channel;

the distribution system being configured to distribute said signal representations, and being configured to maintain a distribution system identity register, comprising a distribution system identification, one or more of said signal node identifications with associated signal injection labels and one or more of said client node identifications with associated signal distribution labels;

the distribution system being arranged to carry out
a distribution system injection transport representation interpretation method being arranged to interpret transport representations to provide said signal representation and a corresponding signal injection label from said injection transport representation, and
a distribution system distribution transport representation method being arranged to create transport representations to provide said distribution transport representation from said signal representation and a corresponding signal distribution label;

wherein the distribution system is arranged to carry out a distribution system signal representation switching method arranged to switch said signal representations between said injection transport channel and said one or more distribution transport channels on the basis of a said signal injection label and said one or more associated signal distribution labels.

2. The signal communication system of claim 1,
the signal node further being arranged to carry out
a signal node signal representation interpretation method being arranged to provide a signal from a signal representation, and
a signal node response method being arranged to receive a signal node response conveying a signal representation on said injection transport channel;

the client node further being arranged to carry out
a client node signal representation method being arranged to provide a signal representation from a signal, and
a client node request method being arranged to transmit a client node request to convey a signal representation to a distribution transport channel; and the distribution system further being arranged to carry out
a distribution system distribution transport representation interpretation method being arranged to provide a signal representation and a corresponding signal distribution label from a distribution transport representation, and
a distribution system injection transport representation method being arranged to provide an injection transport representation from a signal representation and a corresponding signal injection label.

3. The signal communication system of claim 1, wherein the distribution system is configured to maintain a distribution system switching control register comprising distribution system signal representation switching parameter records each associating a signal injection label with one or more signal distribution labels.

4. The signal communication system of claim 3, wherein said distribution system signal representation switching method is arranged to provide a number of distribution transport representations, the number corresponding to the number of signal distribution labels associated with said signal injection label according to said distribution system signal representation switching parameter records.

5. The signal communication system of claim 4, wherein said distribution system signal representation switching method is arranged to provide said number of distribution transport representations each with a copy of said obtained signal representation and one of the one or more signal distribution labels associated with said signal injection label by a respective one of said distribution system signal representation switching parameter records.

6. The signal communication system of claim 3, wherein the distribution system is arranged to perform a distribution system signal representation switching parameter record deregistration method, arranged to reconfigure a distribution system signal representation switching parameter record to stop switching between injection transport representations and distribution transport representations configured in the regarded distribution system signal representation switching parameter record.

7. The signal communication system of claim 1, wherein each of said signal communication system entities comprises at least one signal communication system entity network interface to a signal communication system entity network comprising or being connected to a signal communication system network, and wherein said signal communication system entity network interface is arranged to apply said signal communication system network representation method to a signal communication system transport representation to establish a signal communication system network representation to convey on said signal communication system entity network, and to apply said signal communication system network representation interpretation method to establish a signal communication system transport representation from a signal communication system network representation received on said signal communication system entity network.

8. The signal communication system of claim 7, wherein the signal communication system entity network interfaces of at least two different signal communication system entities are arranged to interface different network technologies or standards.

9. The signal communication system of claim 1, wherein said signal node comprises a signal node battery and is arranged to be primarily battery-operated, and wherein said signal node comprises a signal node processor and a signal node memory.

10. The signal communication system of claim 1, wherein the signal node comprises a signal node physical unit sensor converting a physical property into a signal.

11. The signal communication system of claim 1, wherein the signal node comprises a signal node electrical actuator being arranged to be powered or controlled by electrical means, and being arranged to convert a signal into a physical property.

12. The signal communication system of claim 1, wherein the signal node maintains a signal node signal representation property register comprising signal node signal representation properties being used in providing and receiving signal representations, wherein the signal node is arranged to perform a signal node signal representation method, arranged to provide a signal representation from a signal based on the corresponding signal node signal representation properties, and wherein said signal node signal representation properties forms basis for at least one of the following: a signal representation integrity protection tag, a signal representation authentication tag, a formatting of the signal representation or an encryption of the signal representation.

13. The signal communication system of claim 1, wherein the signal node comprises a signal node commissioning method arranged to establish a communication between a signal node and a distribution system, wherein the signal node comprises a signal node commissioning identification message generation method arranged to generate a signal node commissioning identification message.

14. The signal communication system of claim 1, wherein the client node is a machine arranged as an autonomously working device for providing and receiving signals on said client node signal data interface, and wherein said client node comprises a client node processor and a client node memory.

15. The signal communication system of claim 1, wherein said client node comprises a client node application controller and said client node is arranged to receive one or more signals being input signals from one or more of said signal nodes, to process the received signals by said client node application controller to establish one or more signals being control signals and to transmit said signals being control signals to one or more of said signal nodes comprising signal node electrical actuators.

16. The signal communication system of claim 1, wherein the distribution system is communicatively coupled to an entity being a catalog system arranged to provide a list of catalog system records to be used to commission the switching of said signals in the distribution system, the catalog system and the distribution system being communicatively coupled by a distribution system catalog system channel.

17. The signal communication system of claim 1, wherein the distribution system is communicatively coupled to a multiplicity of distribution system communication entities, each using a distribution system communication channel for communication, wherein said multiplicity of distribution system communication entities comprises at least one signal node using an injection transport channel as distribution system communication channel and at least one client node using a distribution transport channel as distribution system communication channel.

18. The signal communication system of claim 1, comprising an identity register, the identity register, comprising an identity register identity, a corresponding identity register identification and one or more identifications arranged to verify respective identities of said signal communication system entities.

19. The signal communication system of claim 1, comprising a hybrid signal client node being a physical device arranged to comprise at least one of said signal nodes and at least one of said client nodes.

20. The signal communication system of claim 1, comprising a hybrid signal distribution node being a physical device arranged to comprise at least one of said signal nodes and at least one of said distribution systems.

* * * * *